(12) United States Patent
Hong et al.

(10) Patent No.: US 11,671,387 B2
(45) Date of Patent: Jun. 6, 2023

(54) USER INTERFACES FOR MESSAGING CONVERSATIONS

(71) Applicant: Apple Inc., Cupertino, CA (US)

(72) Inventors: Zheng Xuan Hong, San Jose, CA (US); Chia Yang Lin, San Francisco, CA (US); Chanaka G. Karunamuni, San Jose, CA (US); Nicole R. Ryan, San Francisco, CA (US); Graham R. Clarke, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/485,354

(22) Filed: Sep. 25, 2021

(65) Prior Publication Data

US 2022/0394003 A1    Dec. 8, 2022

Related U.S. Application Data

(60) Provisional application No. 63/197,478, filed on Jun. 6, 2021.

(51) Int. Cl.
| | |
|---|---|
| *H04L 51/046* | (2022.01) |
| *H04L 51/216* | (2022.01) |
| *H04L 51/226* | (2022.01) |
| *G06F 3/04883* | (2022.01) |
| *H04L 51/10* | (2022.01) |

(52) U.S. Cl.
CPC ........ *H04L 51/046* (2013.01); *G06F 3/04883* (2013.01); *H04L 51/10* (2013.01); *H04L 51/216* (2022.05); *H04L 51/226* (2022.05)

(58) Field of Classification Search
CPC .... H04L 51/10; H04L 51/046; G06F 3/04883
See application file for complete search history.

(56) References Cited

U.S. PATENT DOCUMENTS

| | | |
|---|---|---|
| 5,442,795 A | 8/1995 | Levine et al. |
| 6,323,846 B1 | 11/2001 | Westerman et al. |
| 6,570,557 B1 | 5/2003 | Westerman et al. |
| 6,677,932 B1 | 1/2004 | Westerman |
| 7,409,635 B2 | 8/2008 | Epstein |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |

(Continued)

FOREIGN PATENT DOCUMENTS

| | | | |
|---|---|---|---|
| CN | 113268179 A | * | 8/2021 |
| WO | 2013/169849 A2 | | 11/2013 |

(Continued)

OTHER PUBLICATIONS

Notice of Allowance received for U.S. Appl. No. 17/448,878, dated Jun. 8, 2022, 19 pages.

(Continued)

*Primary Examiner* — James R Sheleheda
(74) *Attorney, Agent, or Firm* — Kubota & Basol LLP

(57) ABSTRACT

In some embodiments, an electronic device displays a plurality of content items in a messaging conversation. In some embodiments, the electronic device displays user interfaces associated with one or more content items in a messaging conversation.

54 Claims, 67 Drawing Sheets

(56) References Cited

U.S. PATENT DOCUMENTS

| | | |
|---|---|---|
| 7,694,236 B2 | 4/2010 | Gusmorino et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,302,029 B2 | 10/2012 | Maekelae |
| 8,381,135 B2 | 2/2013 | Hotelling et al. |
| 8,479,122 B2 | 7/2013 | Hotelling et al. |
| 8,667,418 B2 | 3/2014 | Chaudhri et al. |
| 8,707,209 B2 * | 4/2014 | Wong ............ G06F 9/451 715/826 |
| 9,348,458 B2 | 5/2016 | Hotelling et al. |
| 9,600,447 B2 | 3/2017 | Wabyick et al. |
| 9,891,811 B2 * | 2/2018 | Federighi ........ G06F 3/0486 |
| 9,911,222 B2 * | 3/2018 | Setton ............ G06Q 30/00 |
| 9,933,937 B2 | 4/2018 | Lemay et al. |
| 9,959,037 B2 * | 5/2018 | Chaudhri ........ G06F 3/0482 |
| 10,404,640 B2 * | 9/2019 | Golden ........... H04L 65/1069 |
| 2002/0015024 A1 | 2/2002 | Westerman et al. |
| 2004/0240632 A1 * | 12/2004 | Wugofski ....... H04M 1/7243 379/88.13 |
| 2005/0190059 A1 | 9/2005 | Wehrenberg |
| 2005/0240880 A1 | 10/2005 | Banks et al. |
| 2005/0262533 A1 | 11/2005 | Hart et al. |
| 2006/0017692 A1 | 1/2006 | Wehrenberg et al. |
| 2006/0033724 A1 | 2/2006 | Chaudhri et al. |
| 2006/0161868 A1 | 7/2006 | Van et al. |
| 2006/0197753 A1 | 9/2006 | Hotelling |
| 2007/0035551 A1 | 2/2007 | Ubillos |
| 2008/0307360 A1 * | 12/2008 | Chaudhri ......... G06F 3/0481 715/835 |
| 2009/0187852 A1 | 7/2009 | Tsuruta |
| 2009/0228807 A1 * | 9/2009 | Lemay ............ G06F 3/0488 715/752 |
| 2011/0072470 A1 * | 3/2011 | Morris ............ H04N 21/64 725/62 |
| 2012/0185797 A1 * | 7/2012 | Thorsen .......... G06F 16/287 715/792 |
| 2013/0110927 A1 | 5/2013 | Marra et al. |
| 2013/0117378 A1 * | 5/2013 | Kotorov ........ G06Q 50/01 709/205 |
| 2013/0304836 A1 * | 11/2013 | Ku ............... H04L 51/52 709/206 |
| 2014/0040771 A1 * | 2/2014 | Tong ............. H04L 51/08 715/752 |
| 2014/0136988 A1 | 5/2014 | Jang |
| 2014/0136989 A1 * | 5/2014 | Choi ............. G06F 3/017 715/752 |
| 2014/0270530 A1 * | 9/2014 | Dwan ............ G06F 16/583 382/190 |
| 2015/0039706 A1 * | 2/2015 | Zilmer ........... H04L 51/56 709/206 |
| 2015/0206349 A1 * | 7/2015 | Rosenthal ....... H04N 21/41407 345/633 |
| 2015/0309720 A1 * | 10/2015 | Fisher ........... G06F 3/04842 715/752 |
| 2015/0326620 A1 * | 11/2015 | Kohnen .......... G06F 3/04842 715/730 |
| 2015/0350134 A1 | 12/2015 | Yang et al. |
| 2016/0110901 A1 * | 4/2016 | Connolly ....... G06T 11/60 345/661 |
| 2016/0112360 A1 * | 4/2016 | Brunn ........... G06F 16/9535 709/204 |
| 2016/0259805 A1 | 9/2016 | Ouzts et al. |
| 2016/0301643 A1 * | 10/2016 | Parashar ........ H04L 51/214 |
| 2016/0360116 A1 * | 12/2016 | Penha ........... H04N 23/64 |
| 2017/0235444 A1 * | 8/2017 | Zhang ........... G06F 16/9577 715/758 |
| 2018/0097757 A1 | 4/2018 | Nguyen et al. |
| 2018/0146254 A1 * | 5/2018 | Tang ............. H04N 21/47202 |
| 2018/0227253 A1 * | 8/2018 | Tao .............. H04L 51/04 |
| 2018/0335928 A1 * | 11/2018 | Van Os .......... G06F 3/04817 |
| 2019/0020615 A1 * | 1/2019 | Golden .......... H04L 65/1069 |
| 2020/0379565 A1 * | 12/2020 | Fleizach ........ G04G 13/026 |
| 2021/0168104 A1 * | 6/2021 | Choi ............. H04L 51/224 |
| 2022/0393997 A1 | 12/2022 | Hong et al. |

FOREIGN PATENT DOCUMENTS

| | | |
|---|---|---|
| WO | 2014/105276 A1 | 7/2014 |
| WO | 2015/099472 A1 | 7/2015 |

OTHER PUBLICATIONS

Notice of Allowance received for U.S. Appl. No. 17/448,878, dated May 25, 2022, 22 Pages.

International Search Report received for PCT Patent Application No. PCT/US2022/072722, dated Aug. 4, 2022, 4 pages.

Notice of Allowance received for U.S. Appl. No. 17/448,878, dated Sep. 13, 2022, 36 Pages.

* cited by examiner

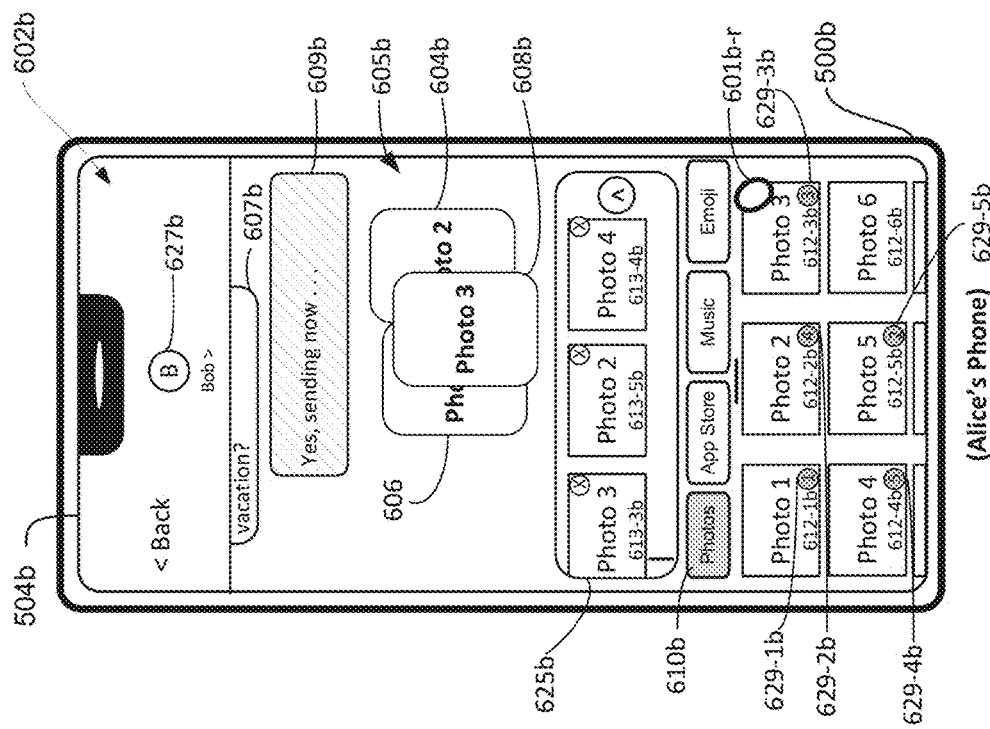

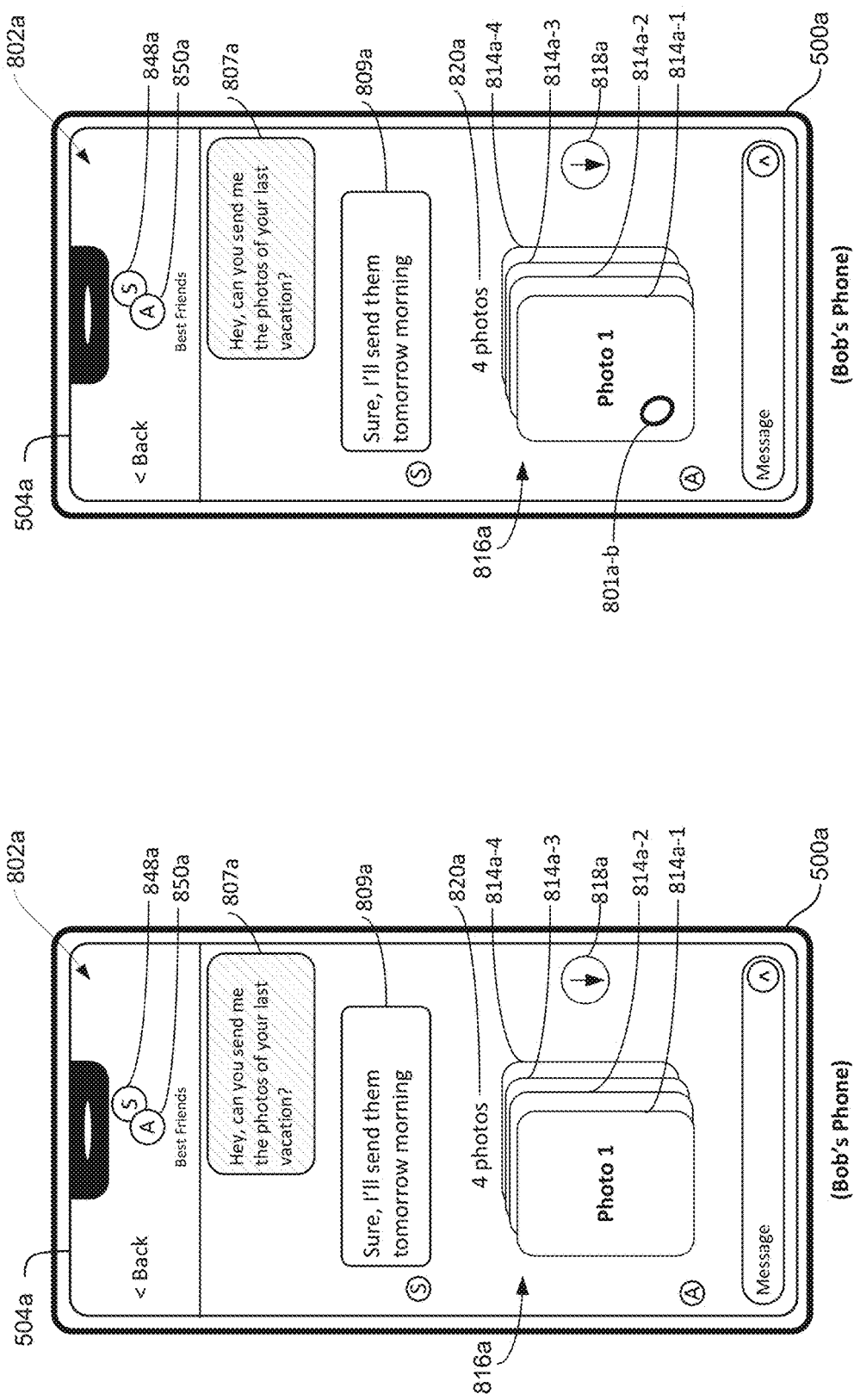

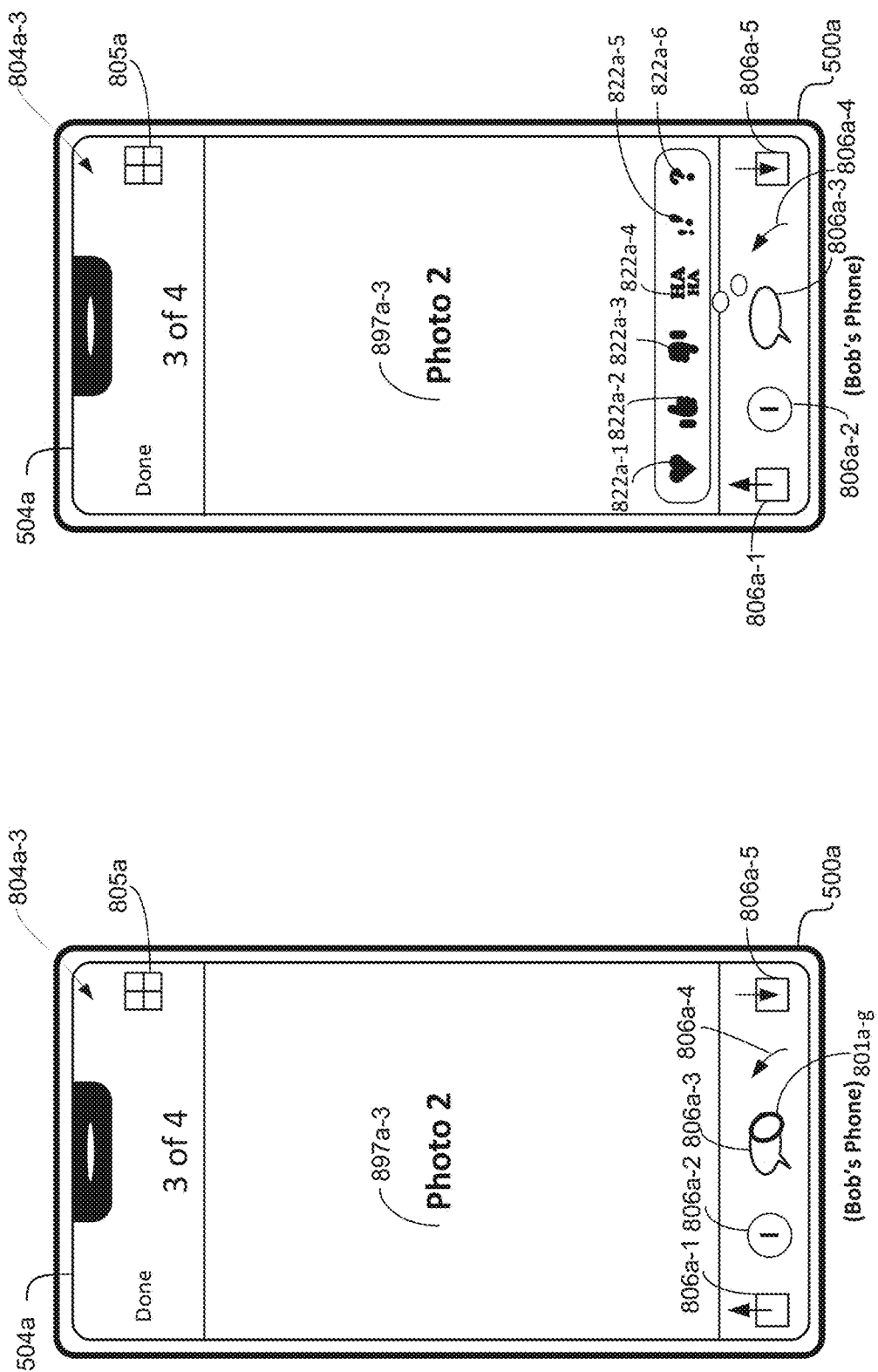

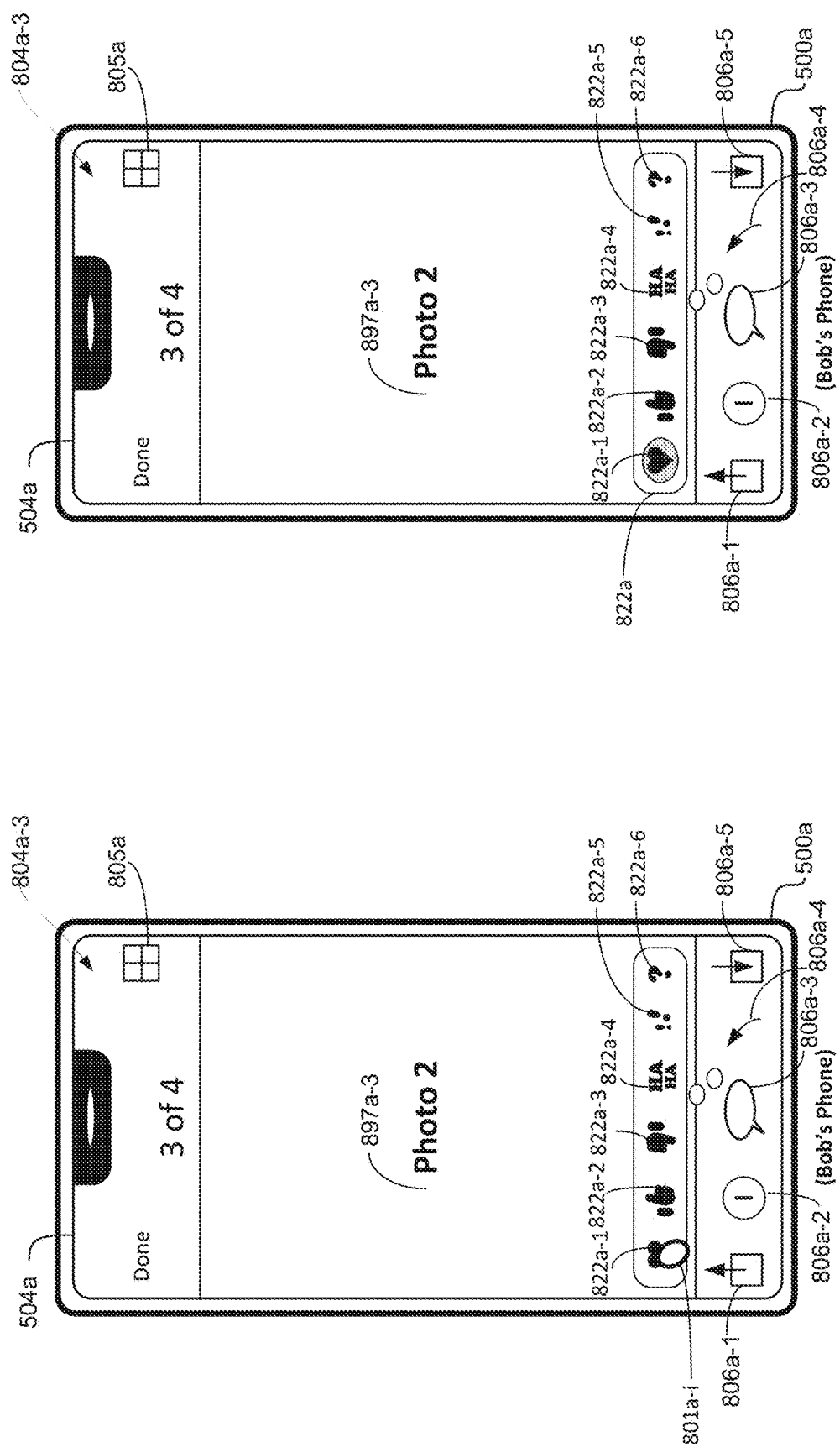

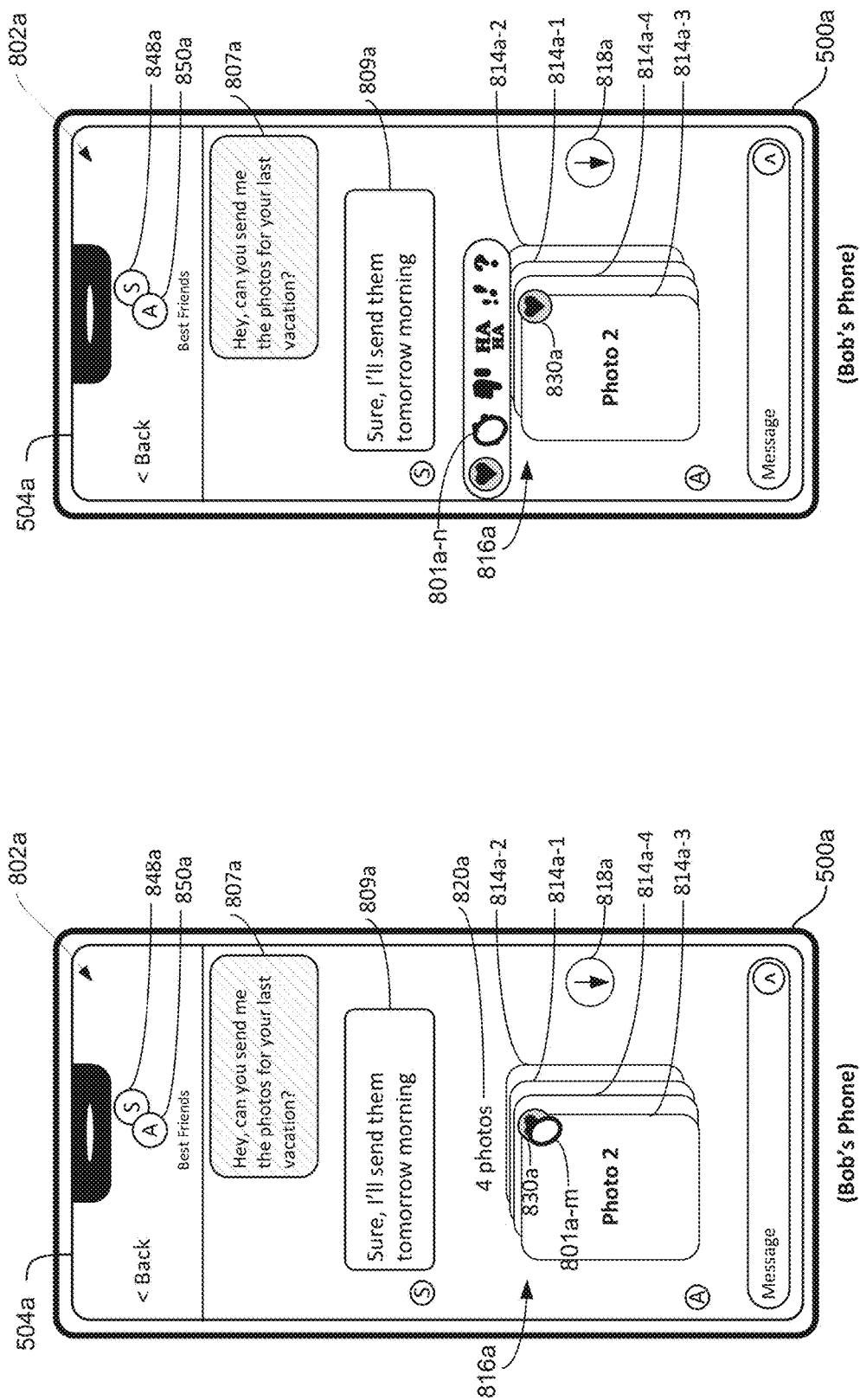

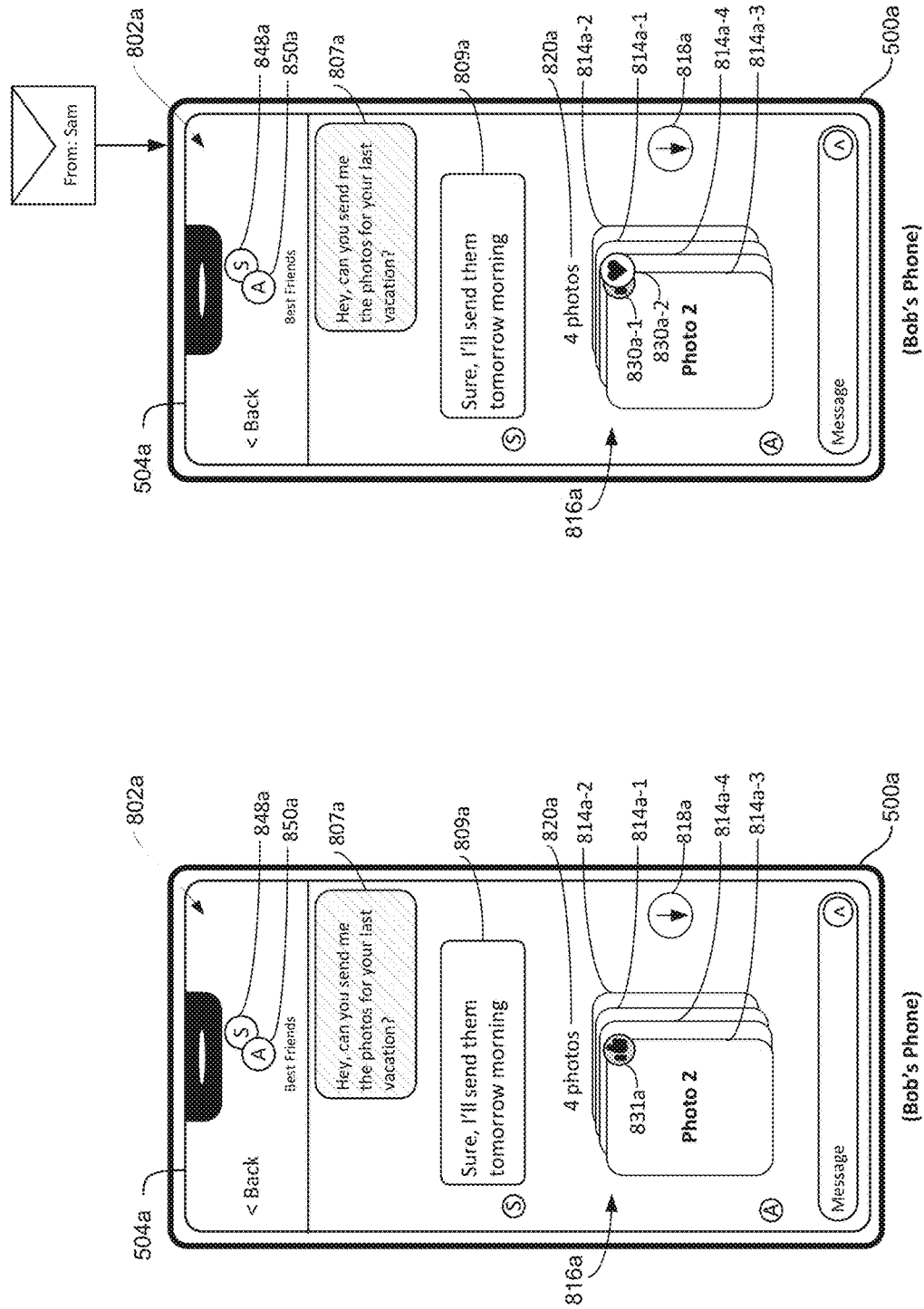

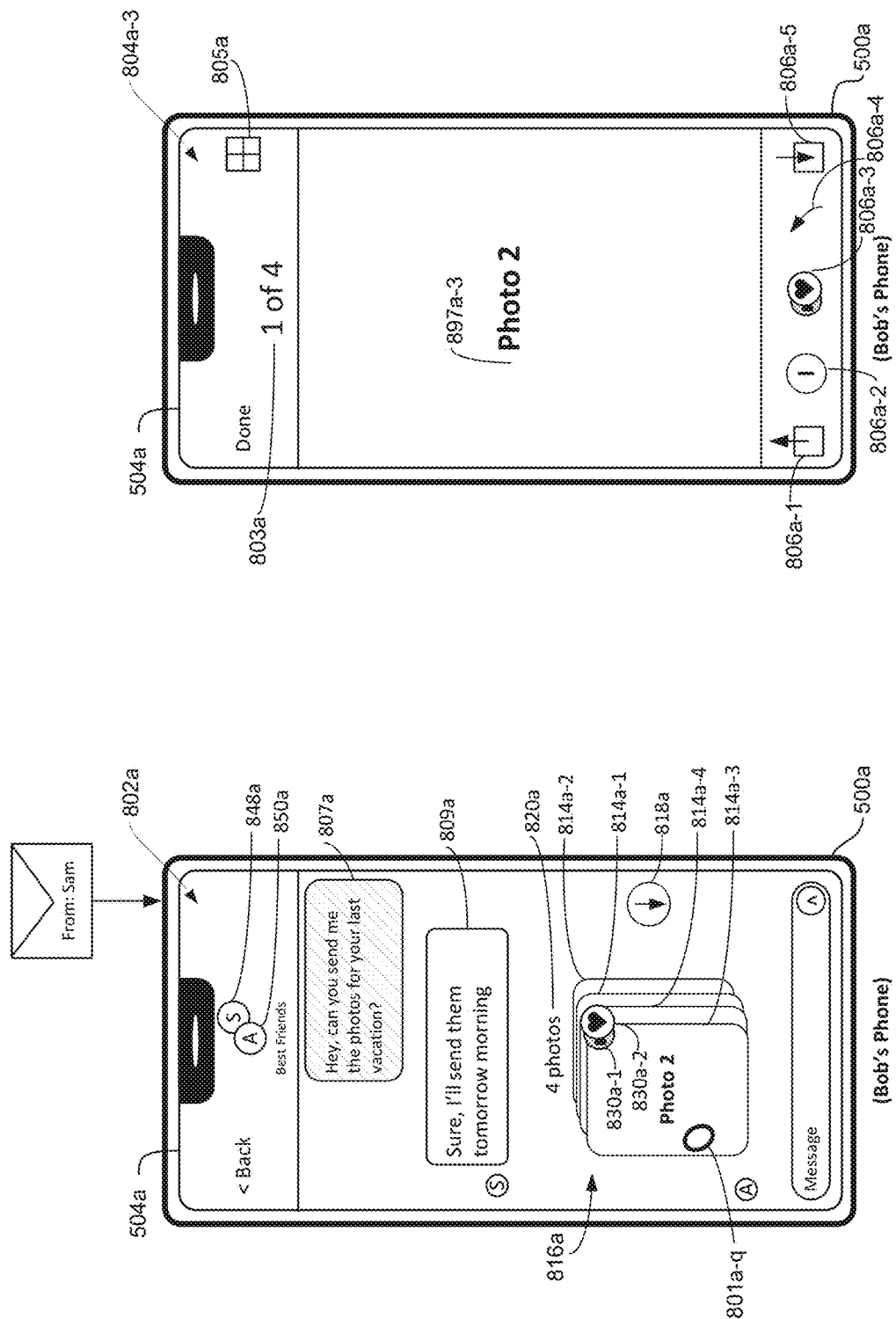

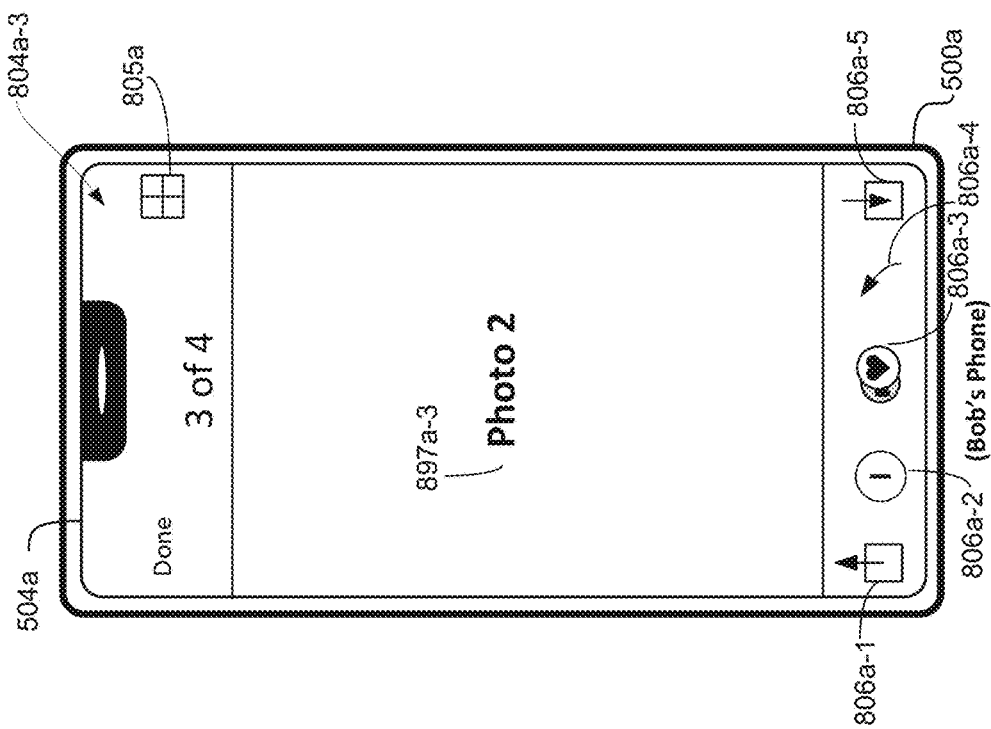
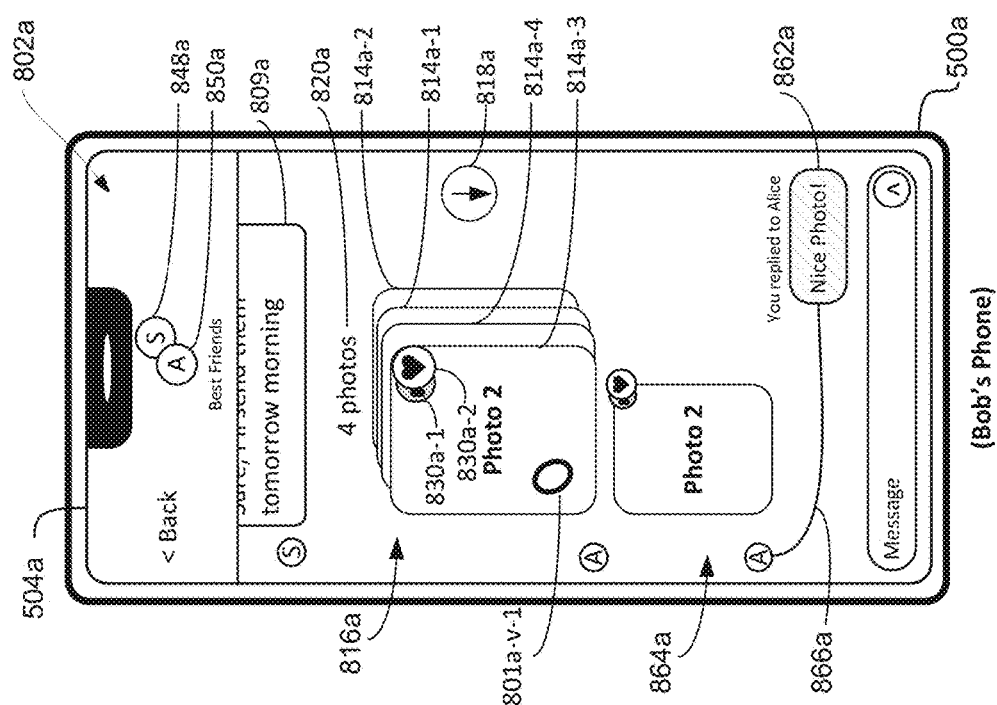
FIG. 8V-1
FIG. 8W

FIG. 8AAA

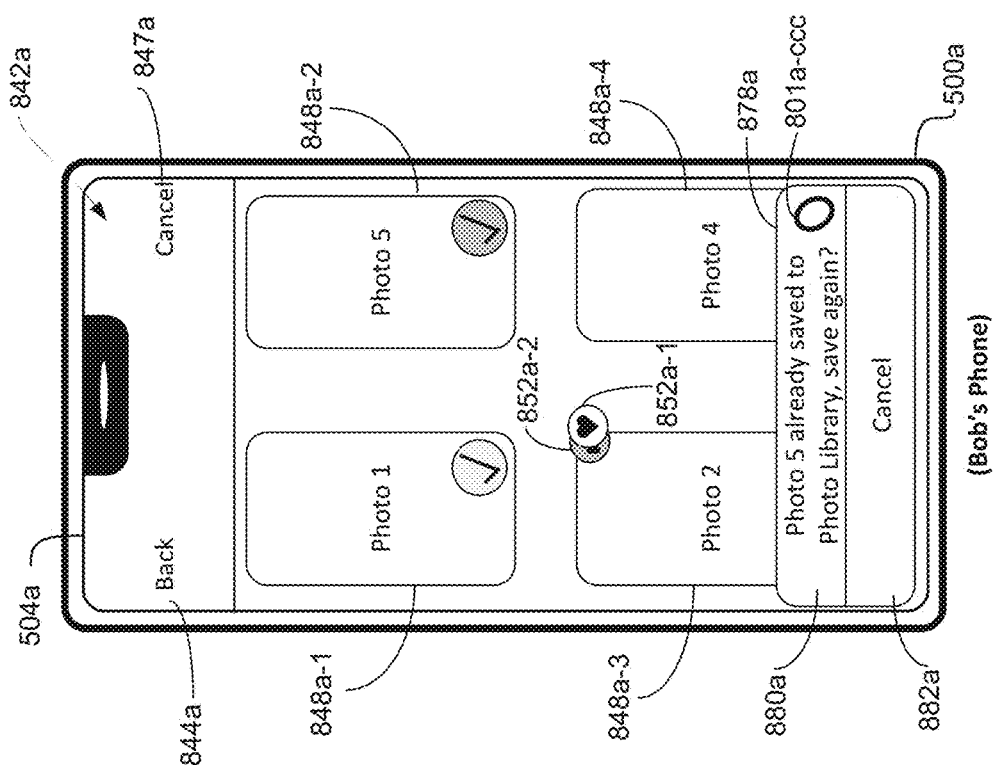
FIG. 8CCC
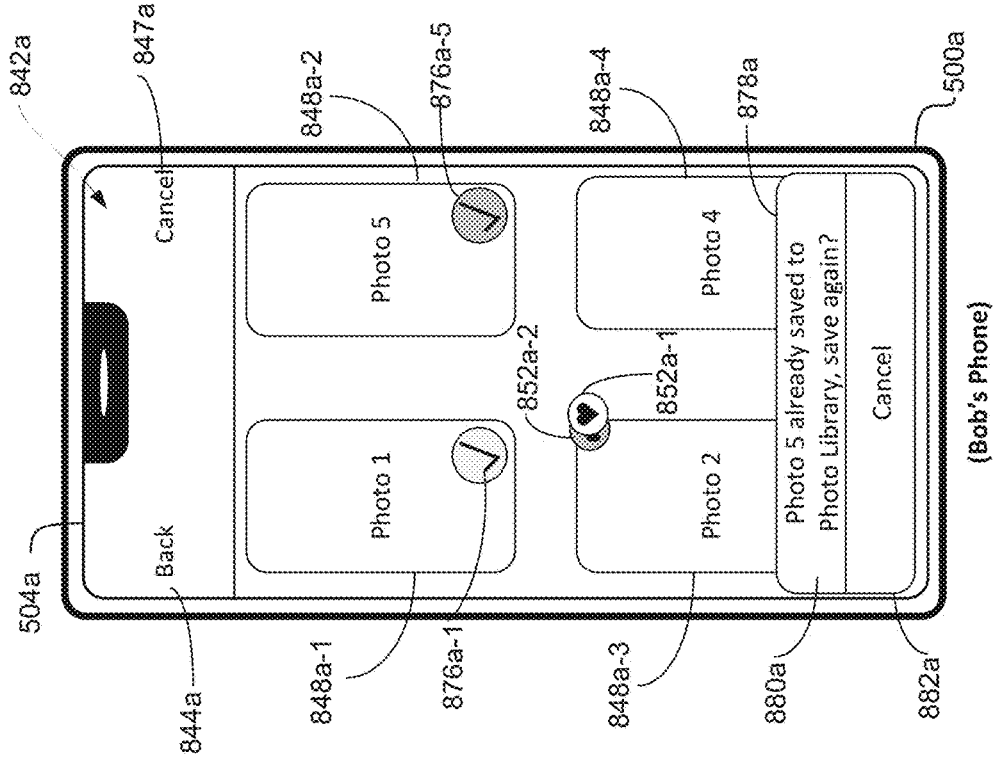
FIG. 8BBB

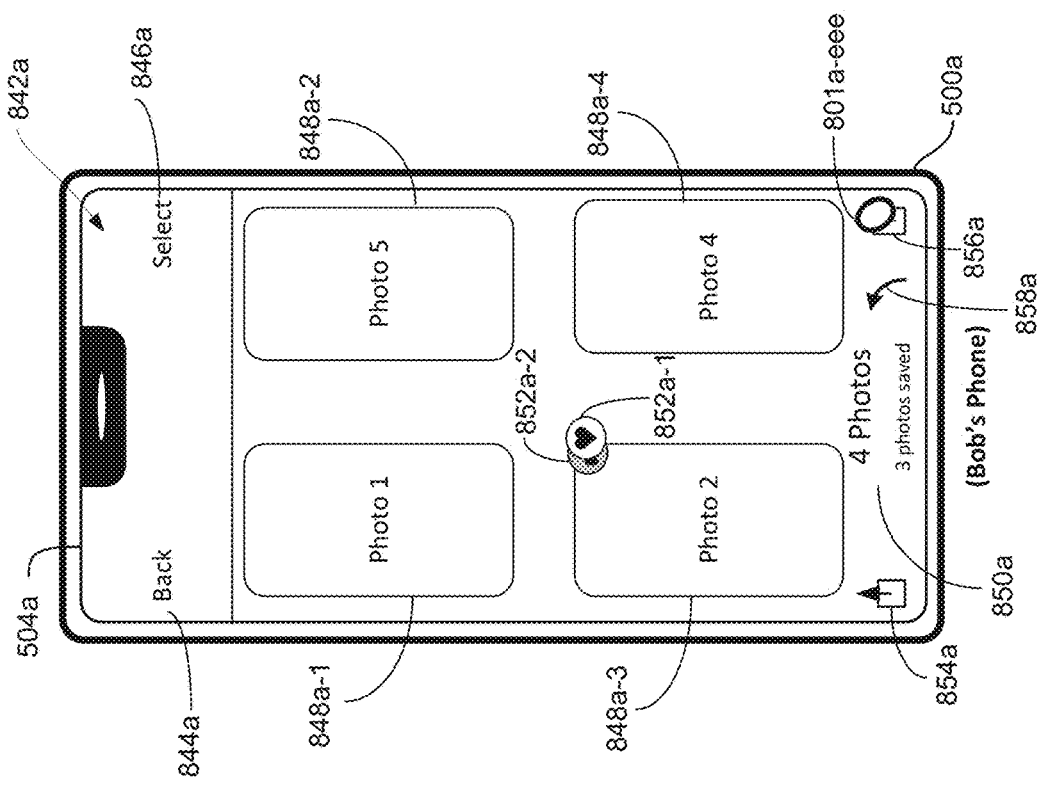
FIG. 8EEE
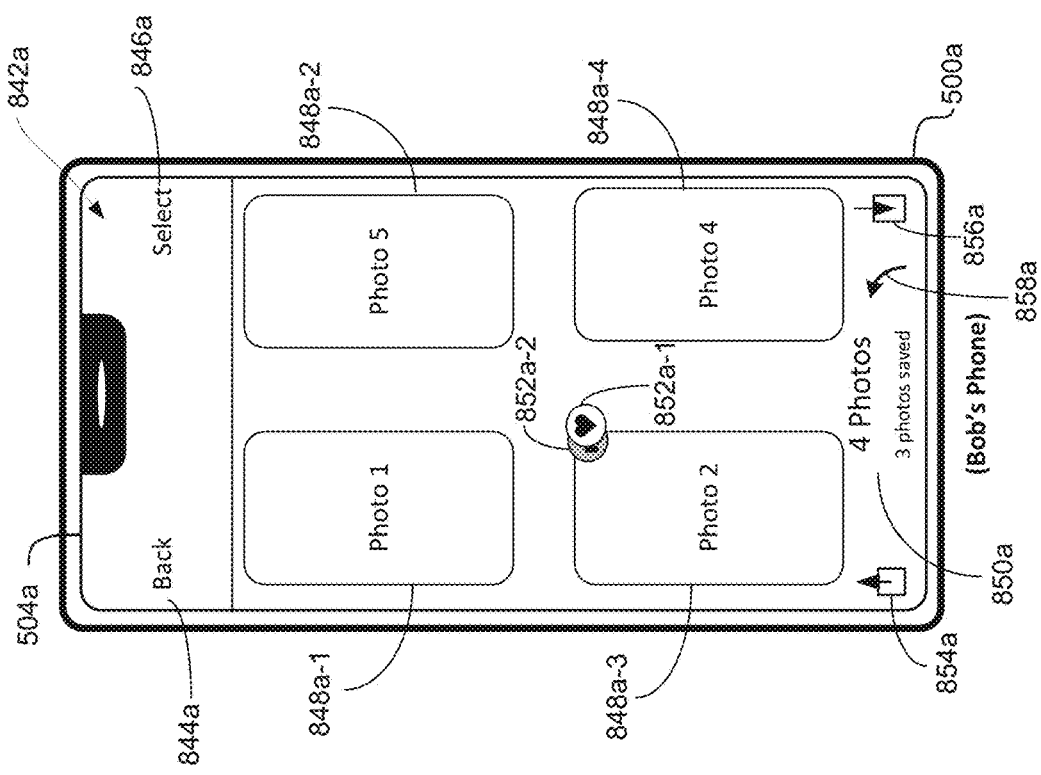
FIG. 8DDD

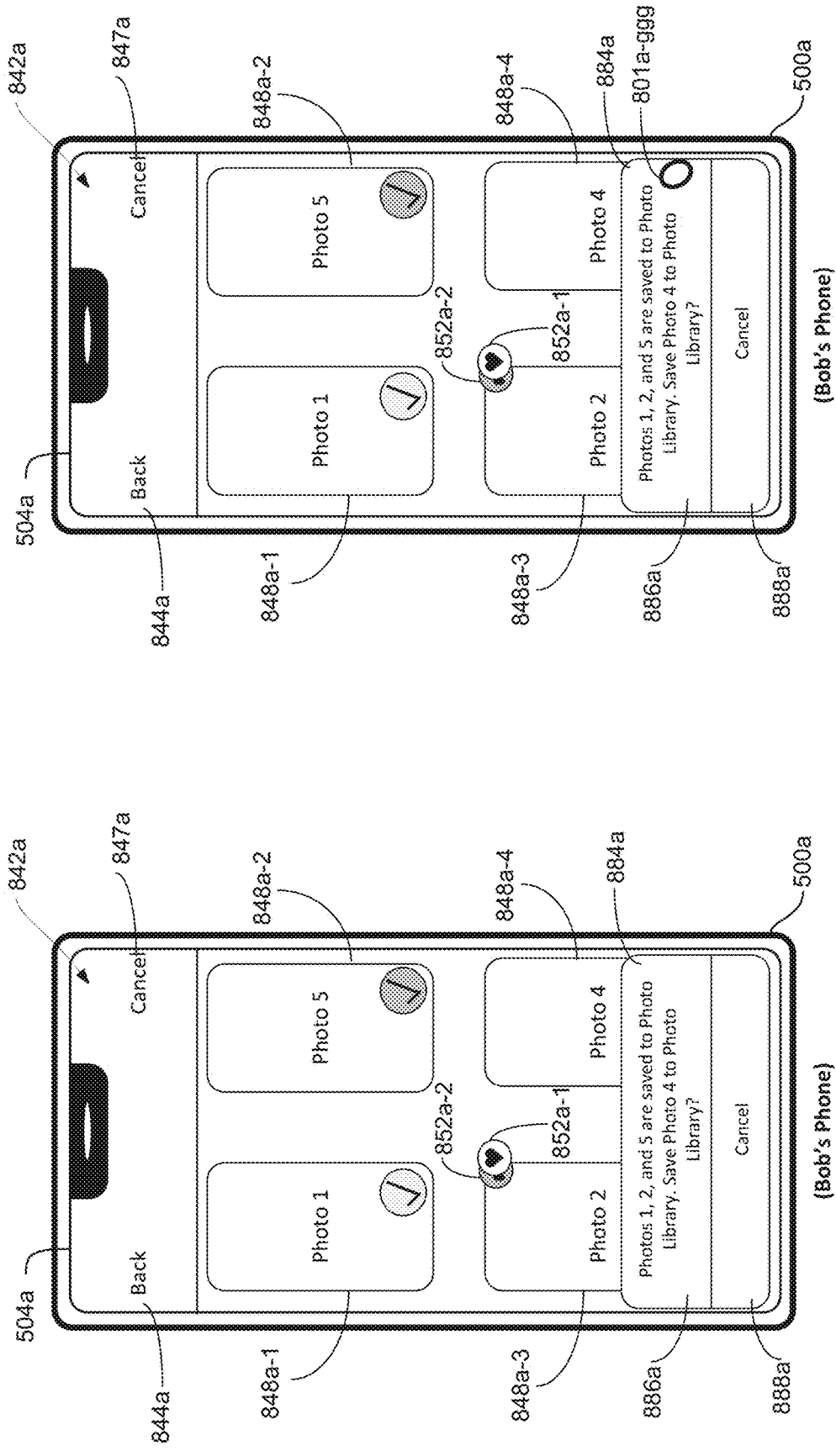

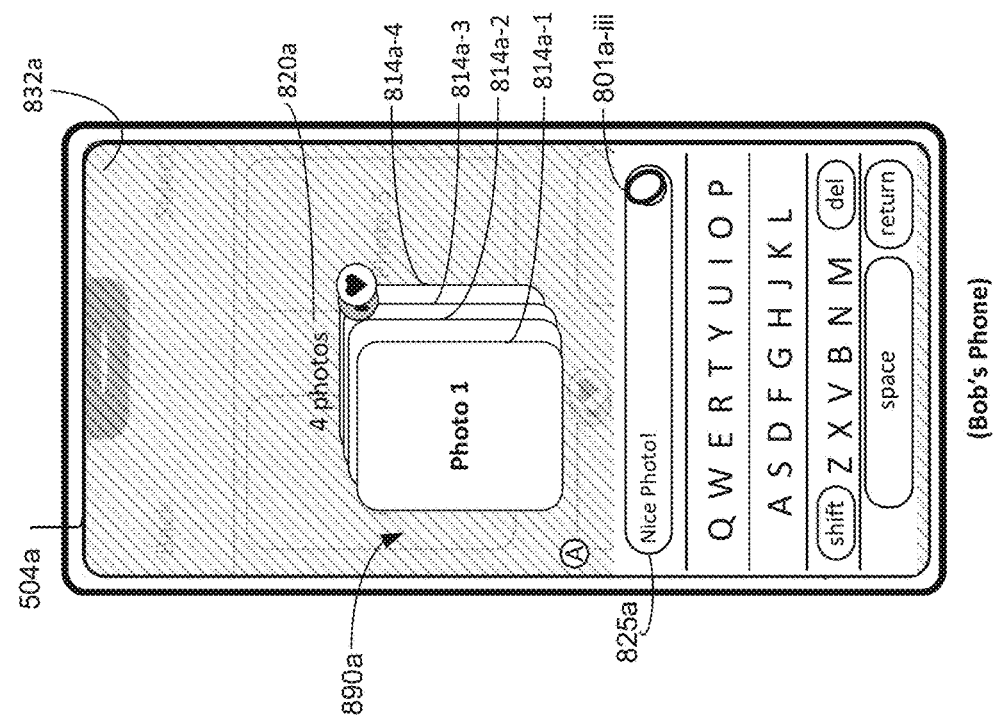
FIG. 8IIII
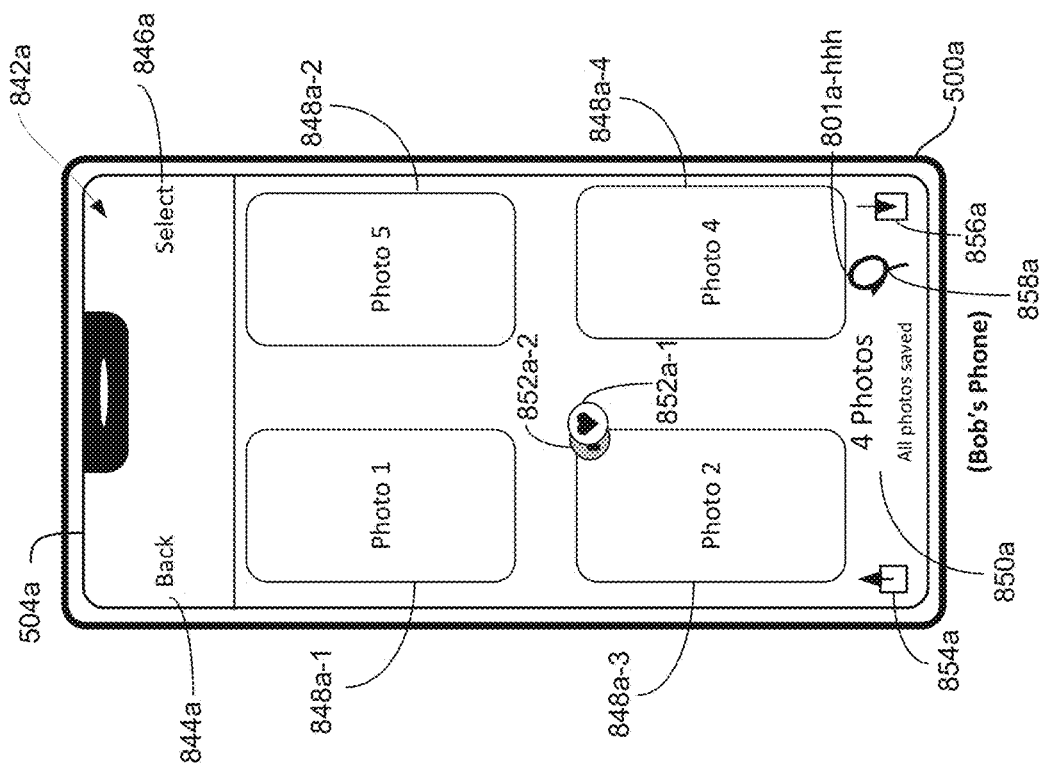
FIG. 8HHH

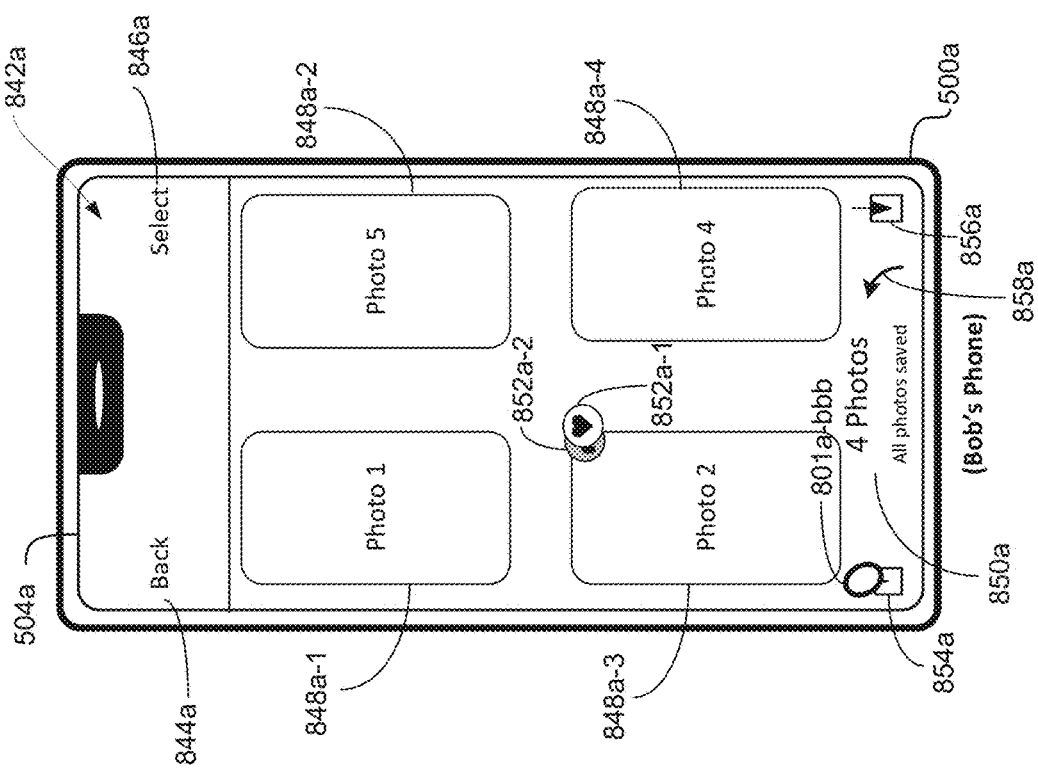
FIG. 8KKK
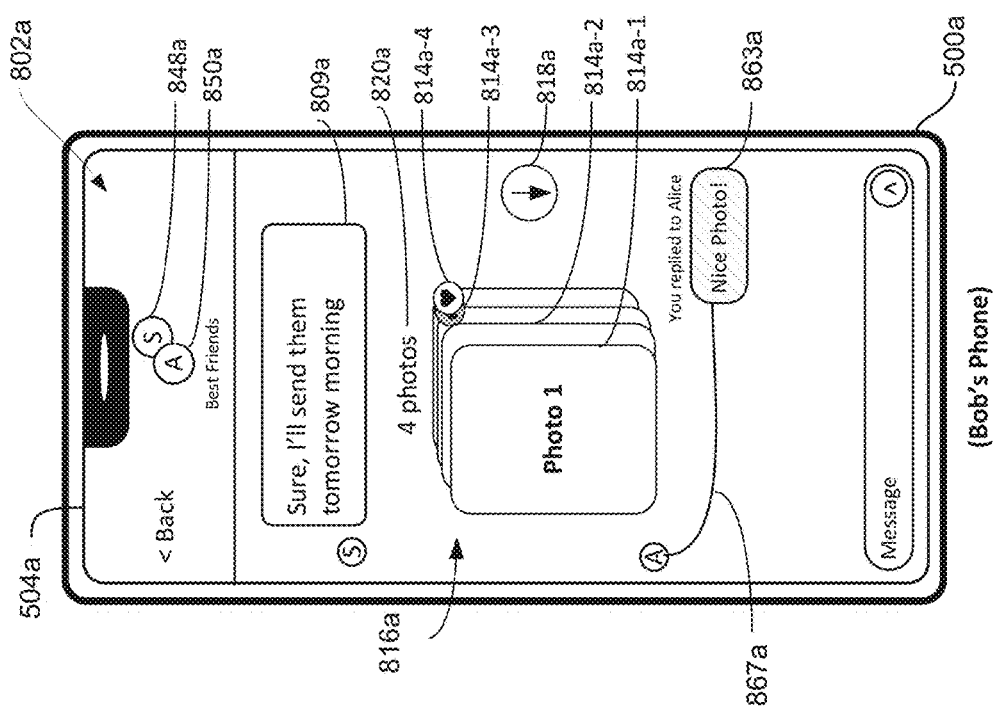
FIG. 8JJJ

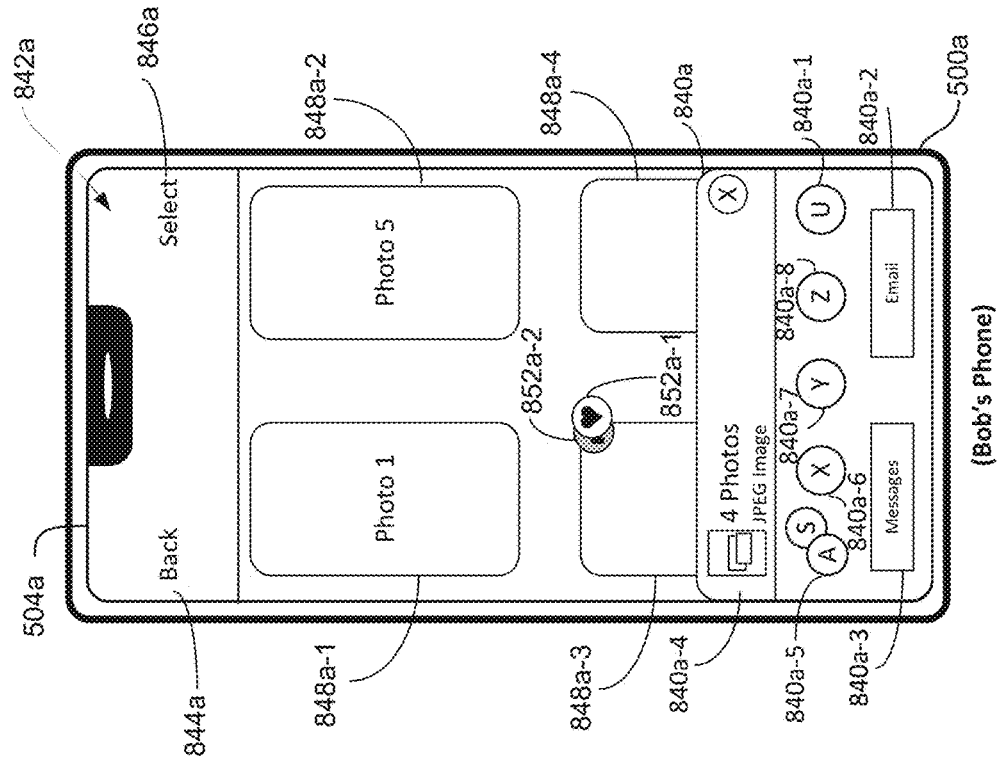
FIG. 8LLL

USER INTERFACES FOR MESSAGING CONVERSATIONS

CROSS-REFERENCE TO RELATED APPLICATIONS

This application claims the benefit of U.S. Provisional Application No. 63/197,478, filed Jun. 6, 2021, the content of which is incorporated herein by reference in its entirety for all purposes.

FIELD OF THE DISCLOSURE

This disclosure relates generally to electronic devices that present messaging user interfaces, and user interactions with such user interfaces.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, users wish to use electronic devices to send and receive messages that include a plurality of content items (e.g., photos, videos, etc.). An electronic device can present messaging user interface for facilitating the sending and receiving of such messages.

SUMMARY OF THE DISCLOSURE

Some embodiments described in this disclosure are directed to ways of displaying a plurality of content items in a messaging user interface. Some embodiments described in this disclosure are directed to ways of adding messaging activity associated with one or more content items included in a messaging conversation. Enhancing messaging interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
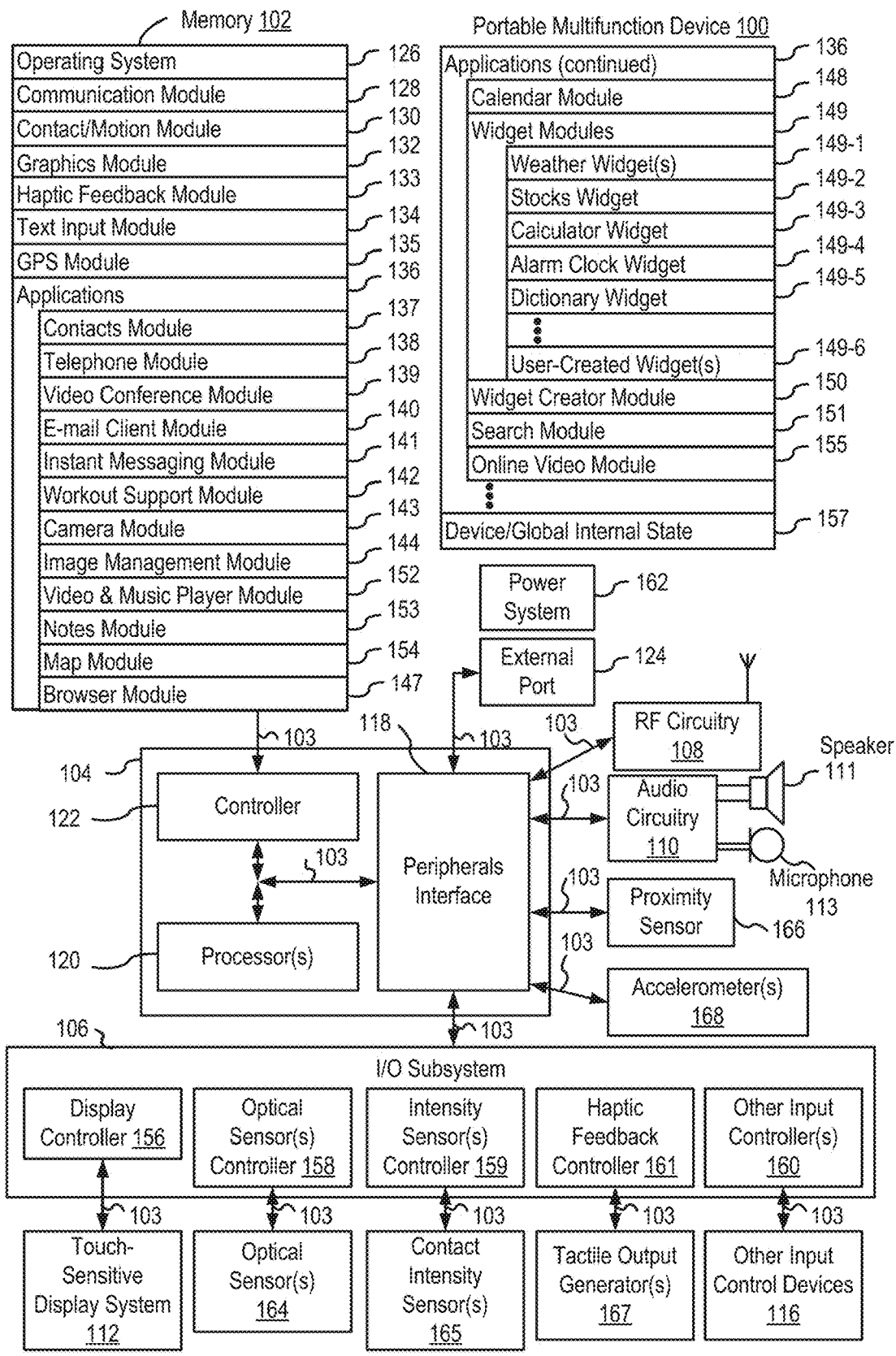
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient ways of displaying and interacting with a plurality of content items in a messaging conversation. In some implementations, an electronic device receives an indication that a respective message including a plurality of content items has been added to a messaging conversation. In some implementations, the electronic device presents representations of the plurality of content items in a first manner if one or more criteria are satisfied (e.g., if the respective message includes more than a respective number of content items). In some implementations, the electronic device presents representations of the content items in a second manner, different from the first manner, if the one or more criteria are not satisfied (e.g., if the respective message does not include more than a respective number of content items). Such techniques can reduce the cognitive burden on a user who uses such devices while presenting messaging user interfaces. Further, such techniques can reduce processor and battery power otherwise wasted on redundant user inputs.

There is also a need for electronic devices that provide efficient ways of adding message activity that is associated with one or more content items to a messaging conversation. In some implementations, message activity is added to a respective content item in the messaging conversation from a user interface separate from a messaging user interface. Such techniques can reduce the cognitive burden on a user who wishes to add messaging activity to a respective content item in a messaging conversation. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, touch screen 112, etc.). In some embodiments, the display generation component is separate from the computer system (e.g., an external monitor, a projection system, etc.). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. Nos. 6,323,846 (Westerman et al.), 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
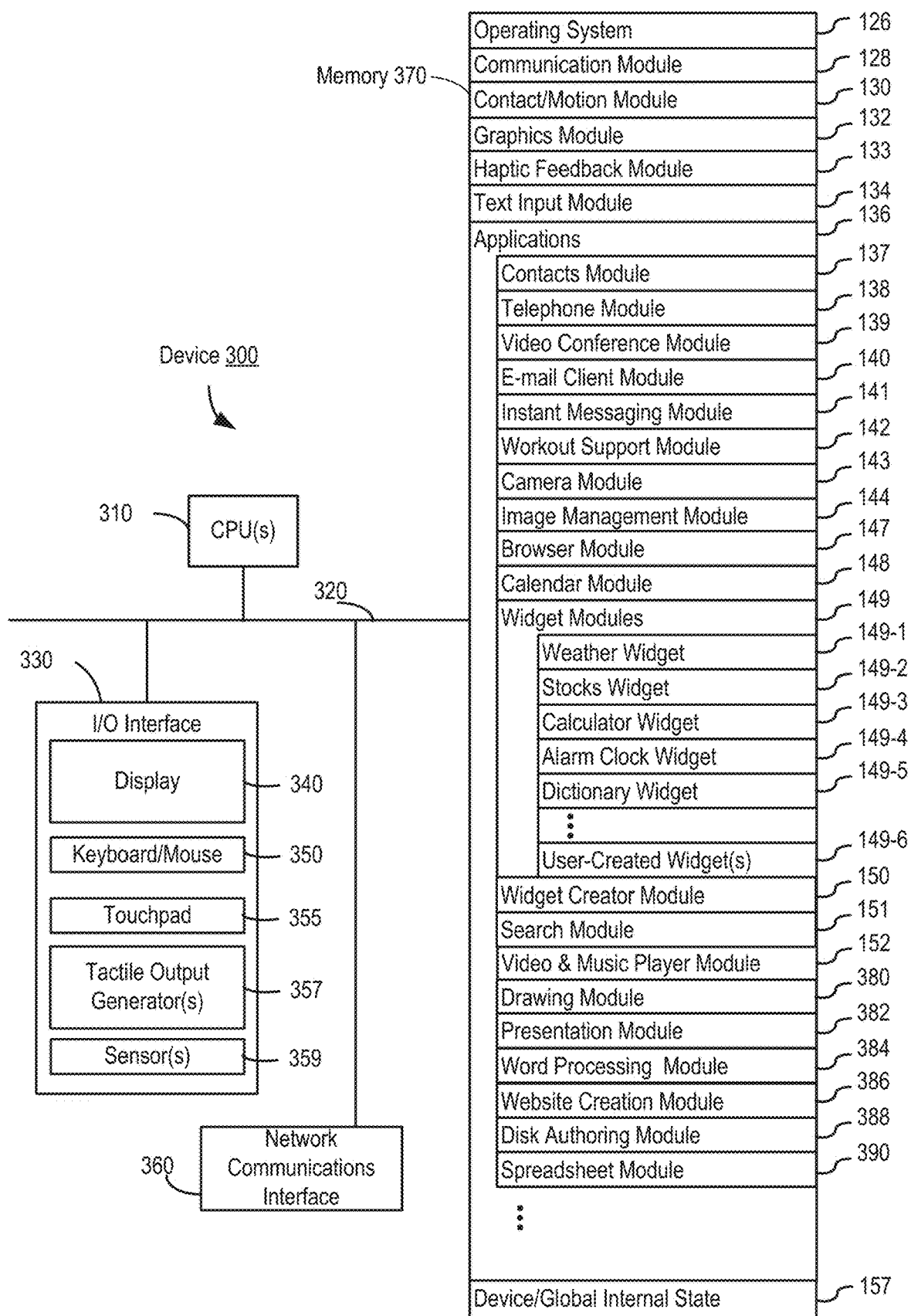
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;

Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions.

In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
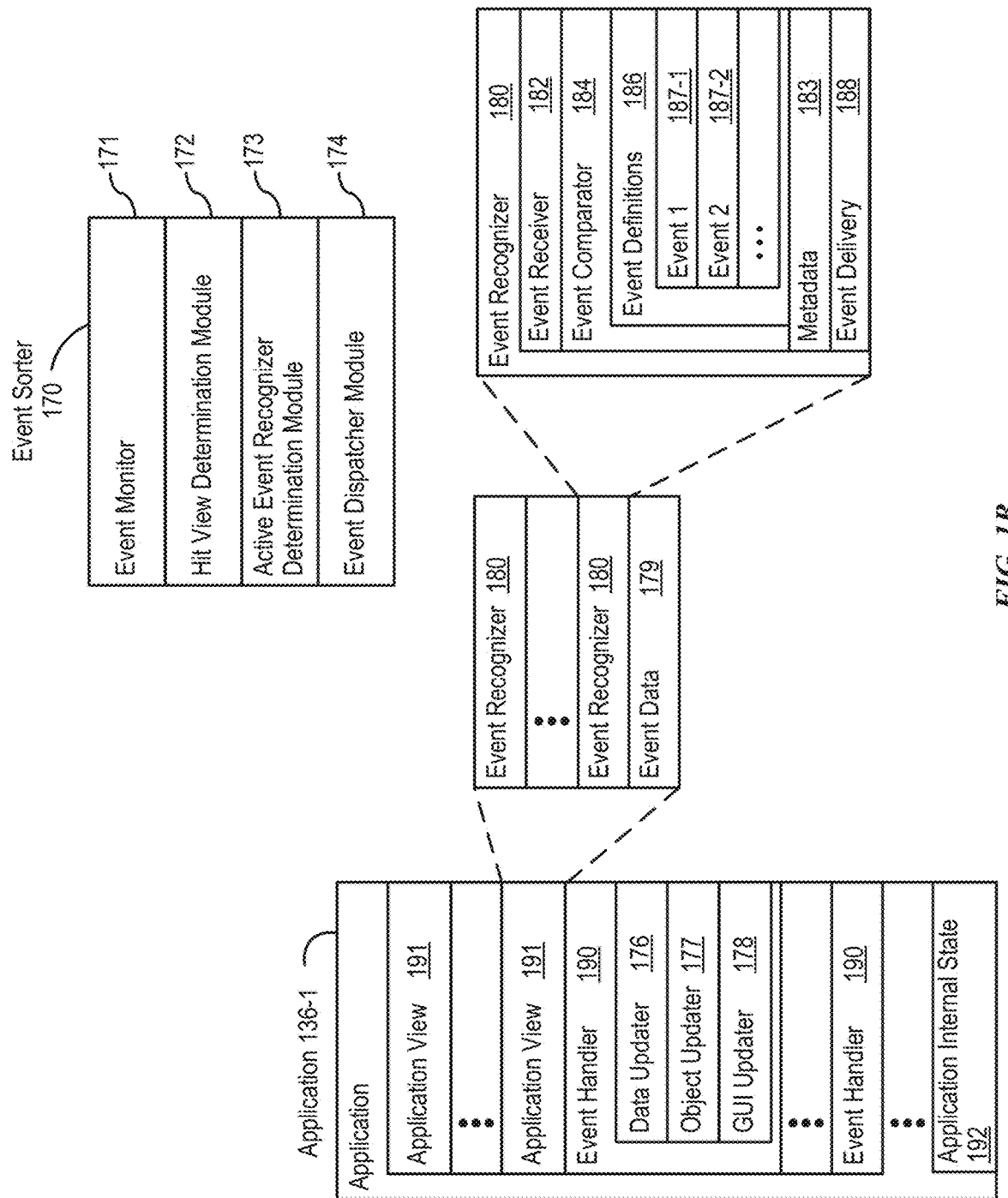
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
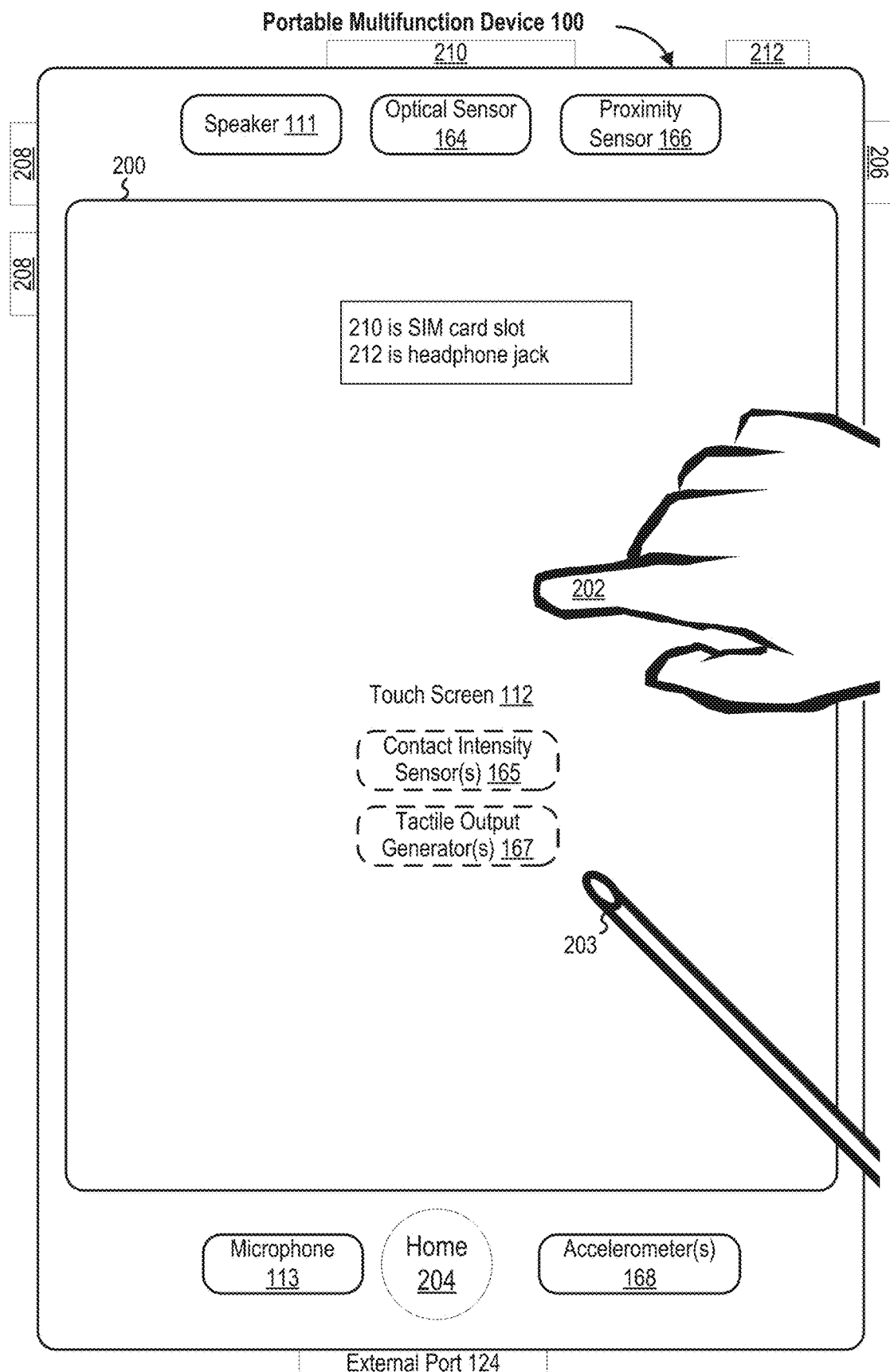
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
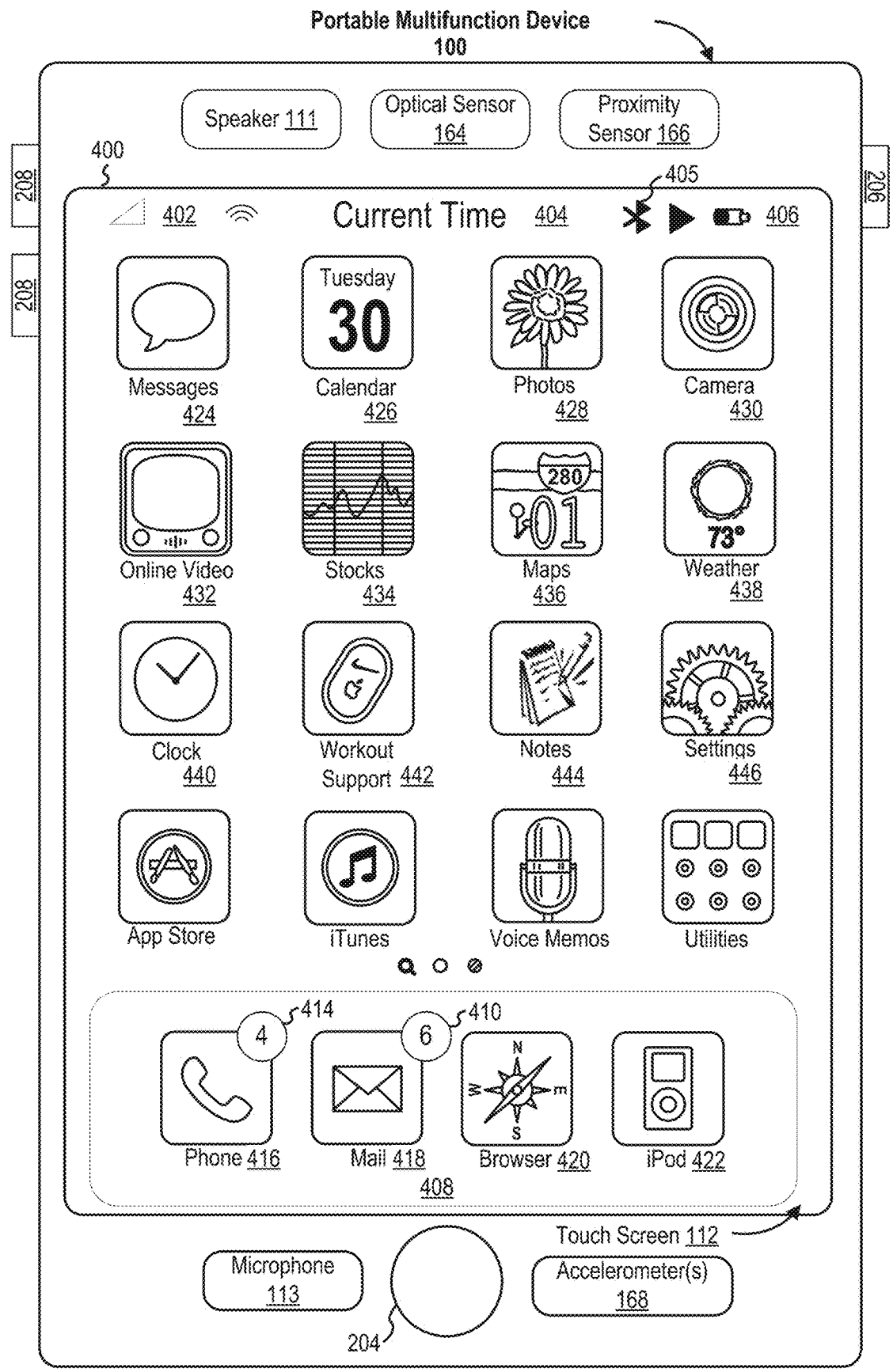
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, also referred to as iPod (trademark of Apple Inc.) module 152, labeled "iPod;" and
Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
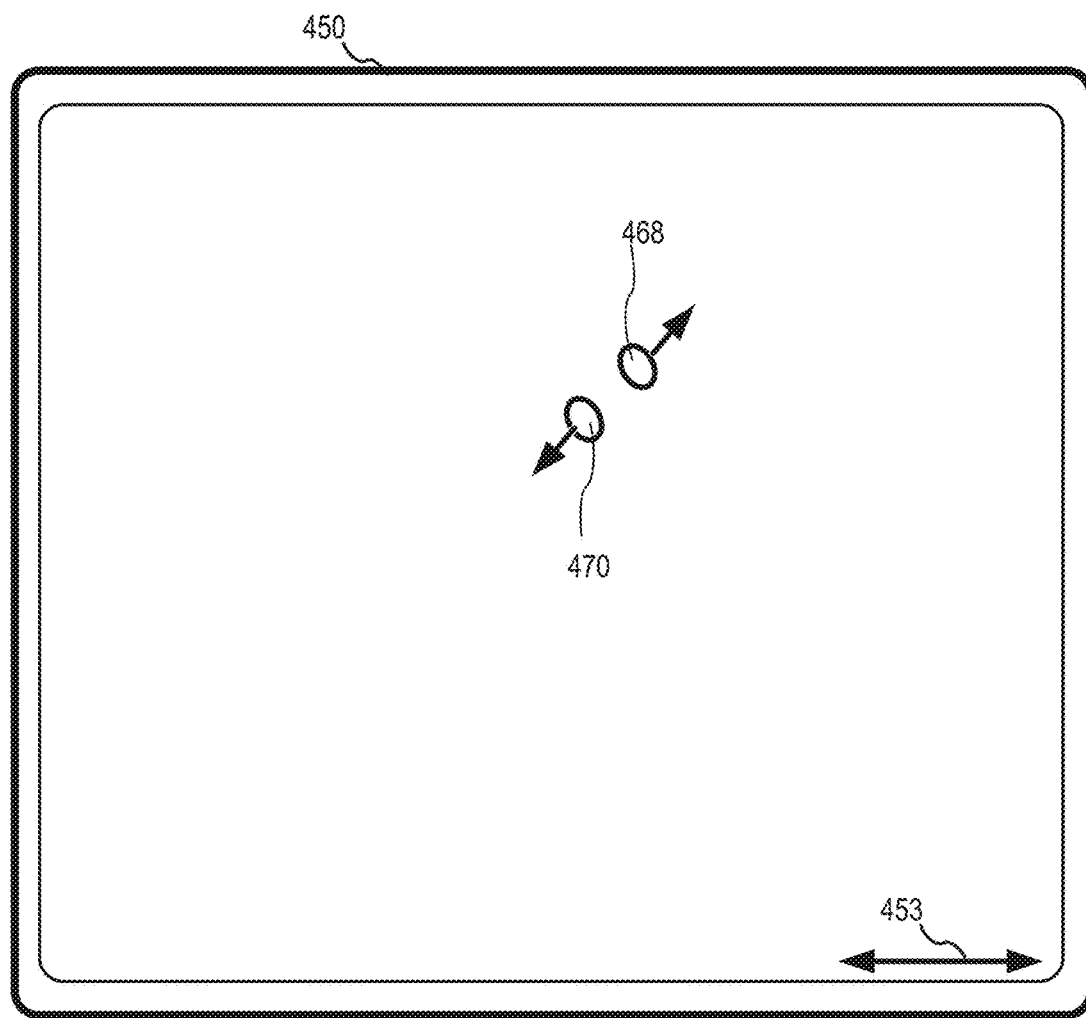
FIG. 4B illustrates an exemplary user interface for a multifunction device with a touch-sensitive surface that is separate from the display in accordance with some embodiments.
Figure 4B:
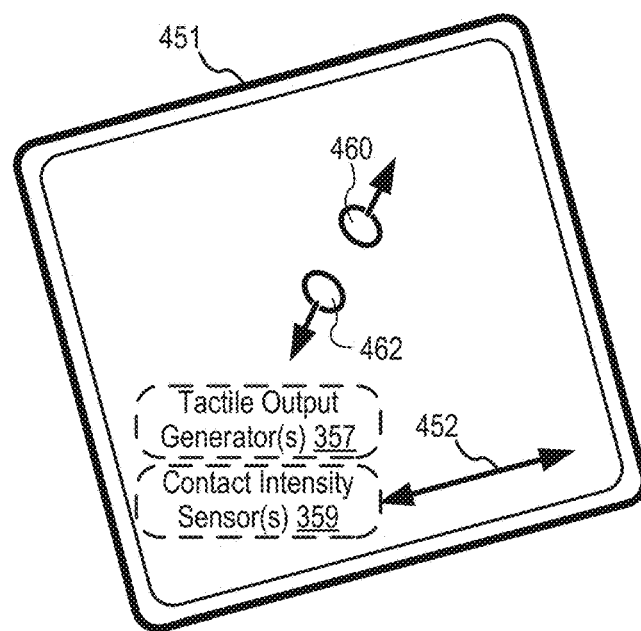

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
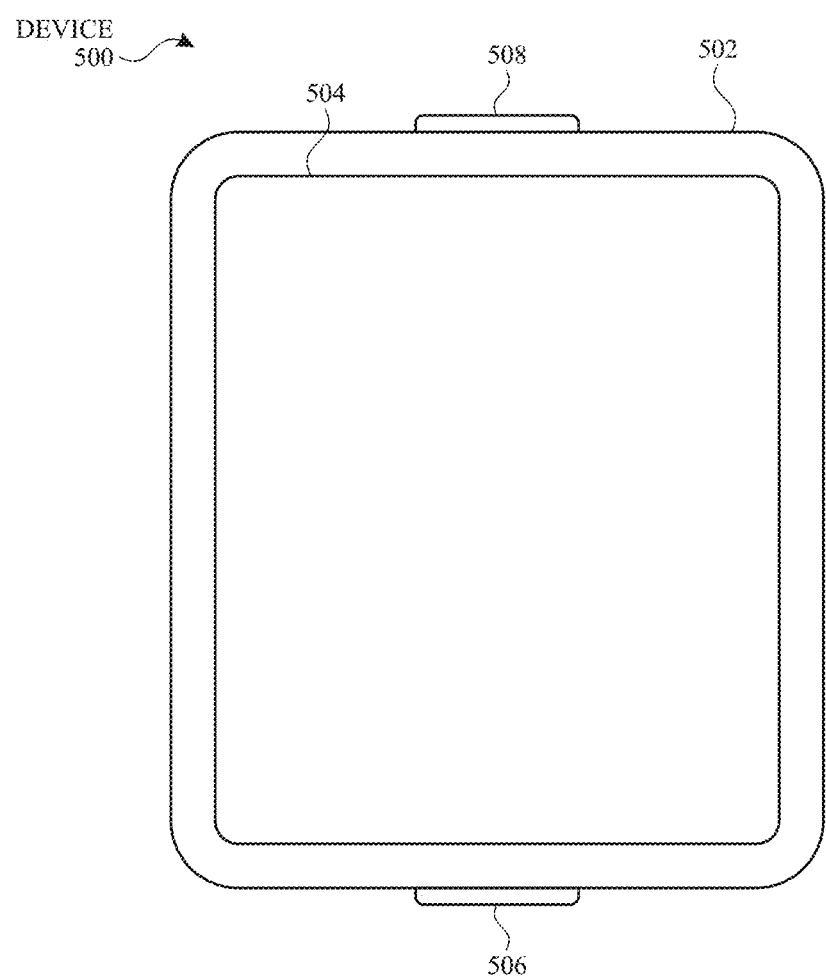
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
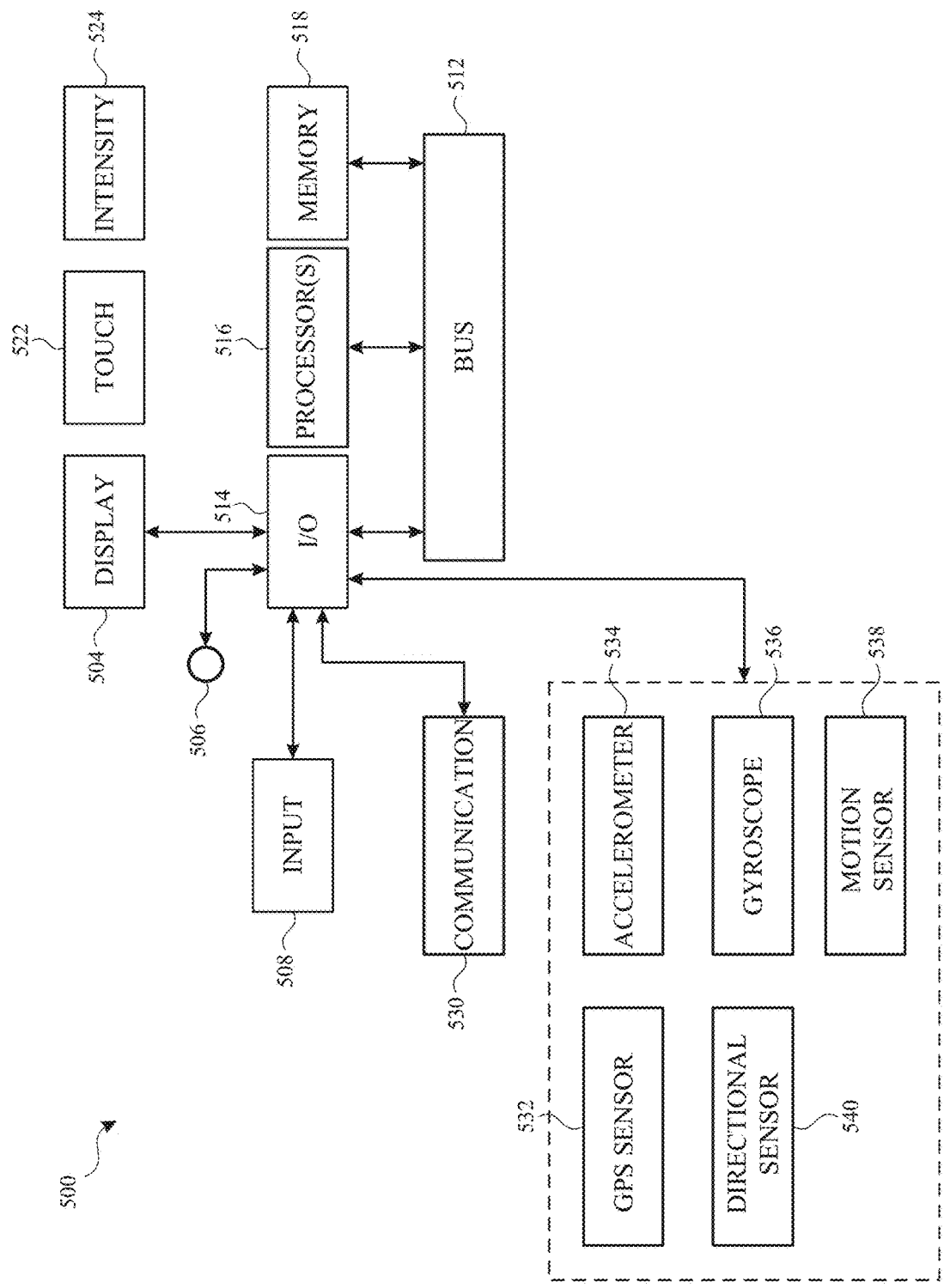
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
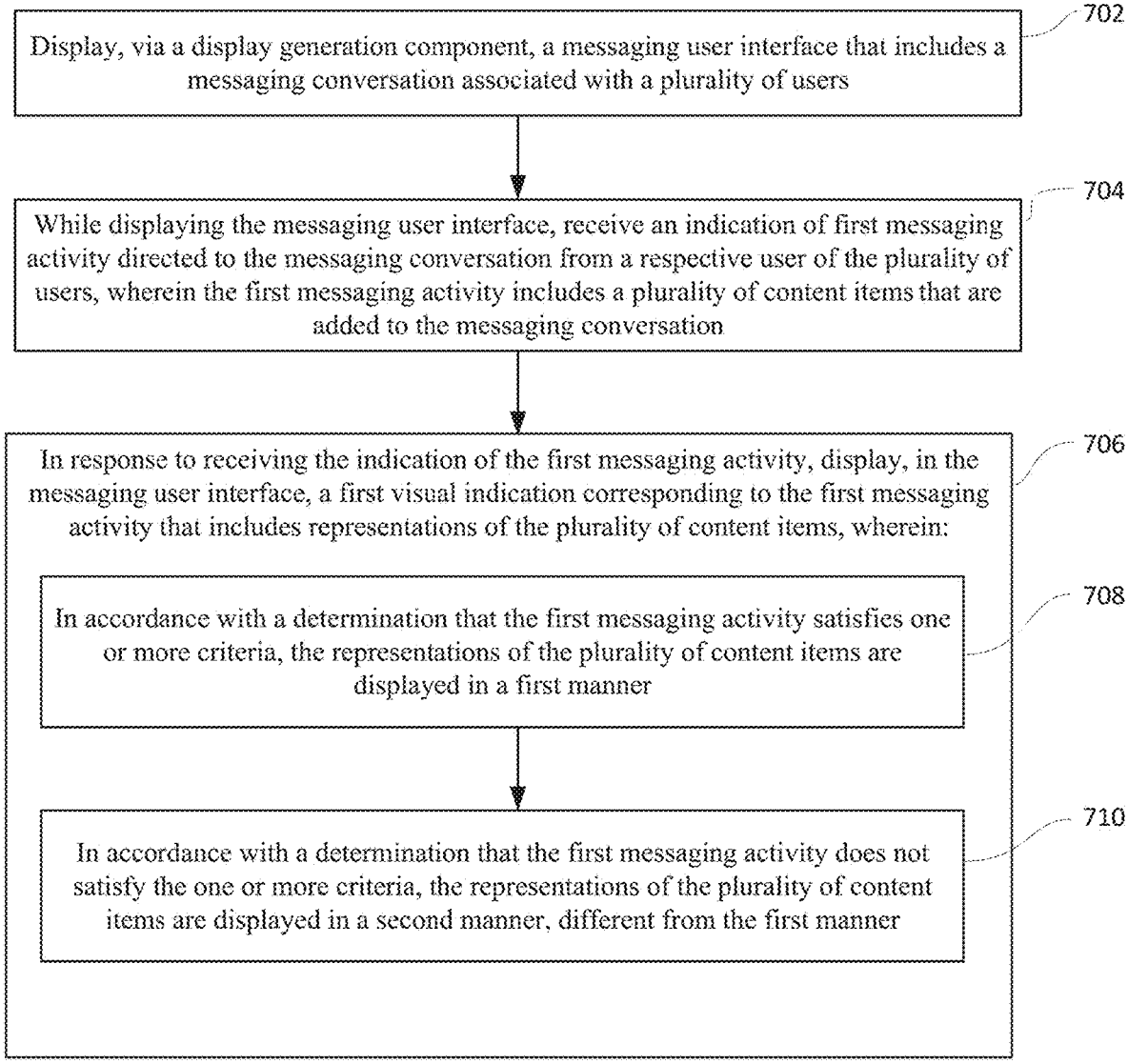
FIG. 7 is a flow diagram illustrating a method of displaying a plurality of content items in a messaging conversation in accordance with some embodiments.
Figure 9:
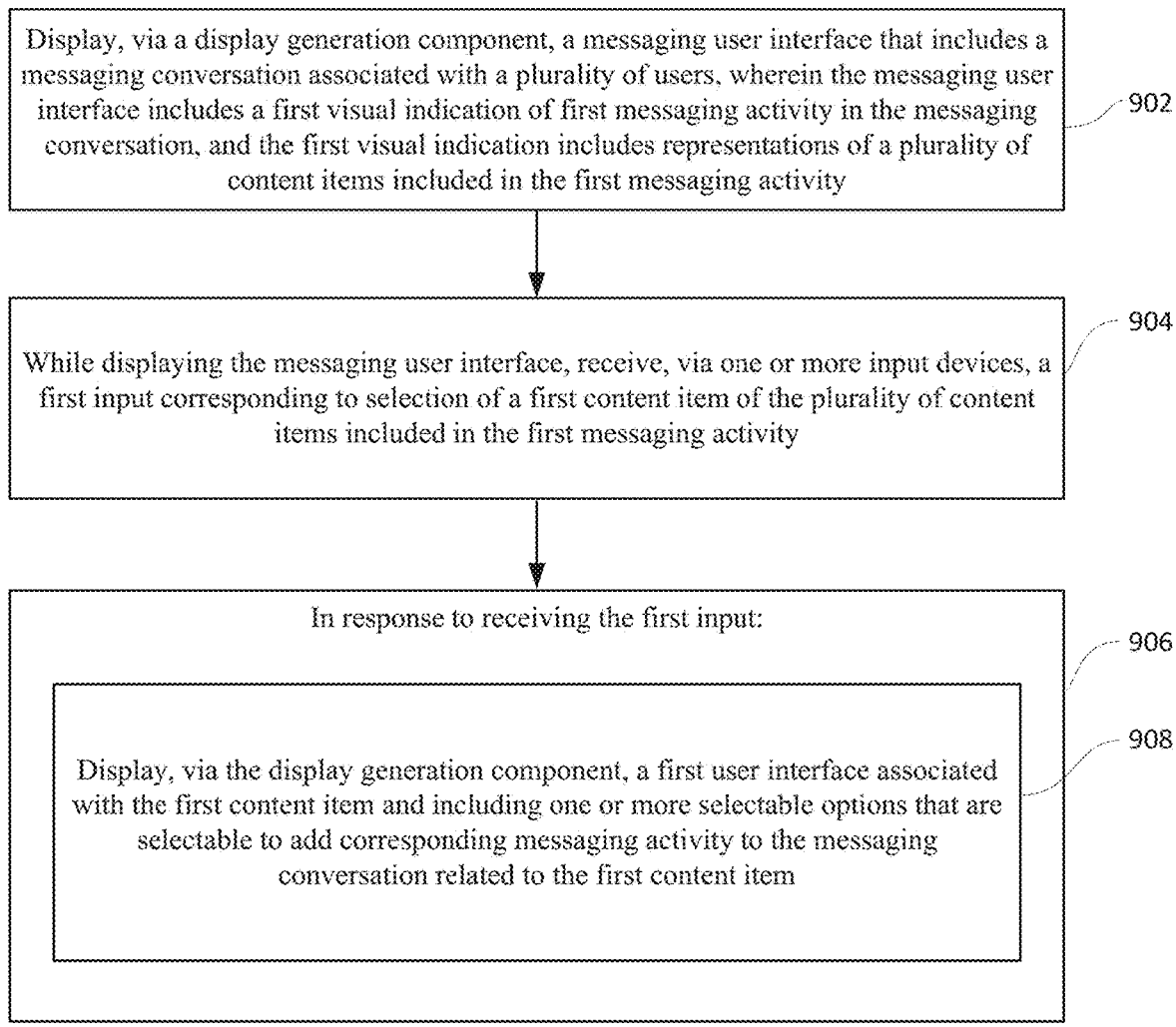
FIG. 9 is a flow diagram illustrating a method of interacting with a plurality of content items in a messaging conversation in accordance with some embodiments.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
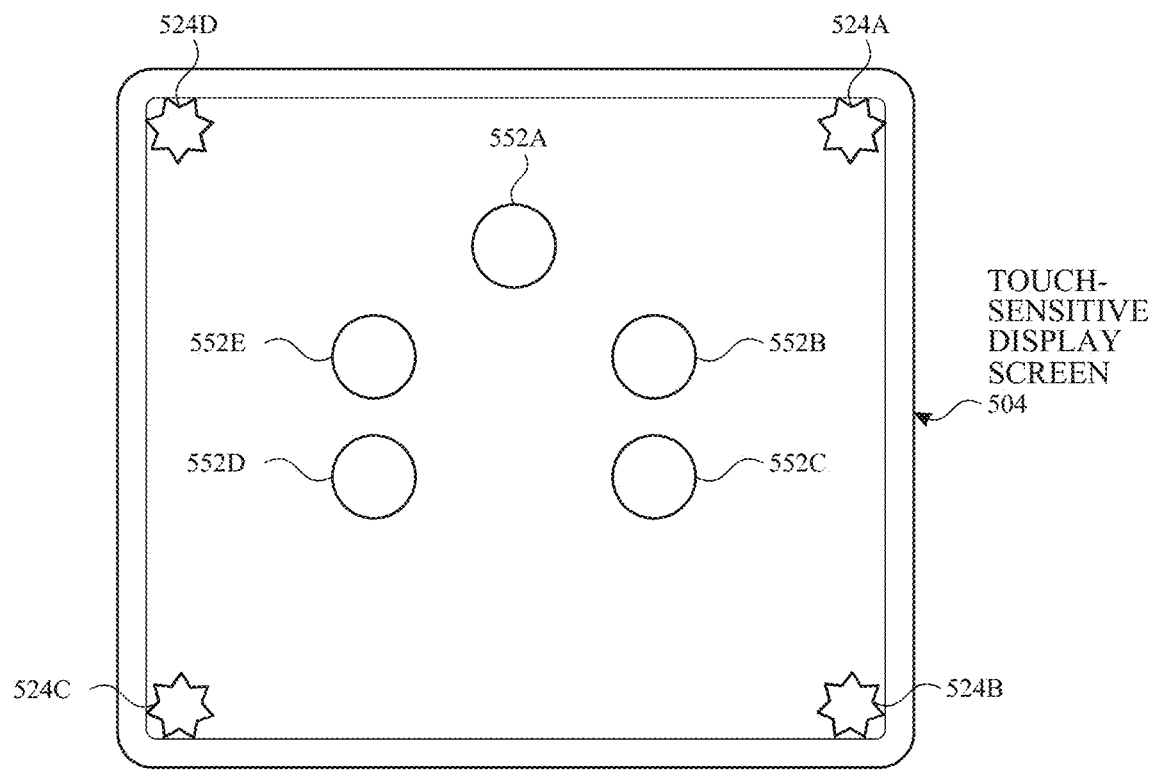
FIGS. 5C-5D illustrate exemplary components of a personal electronic device having a touch-sensitive display and intensity sensors in accordance with some embodiments.
Figure 5C:
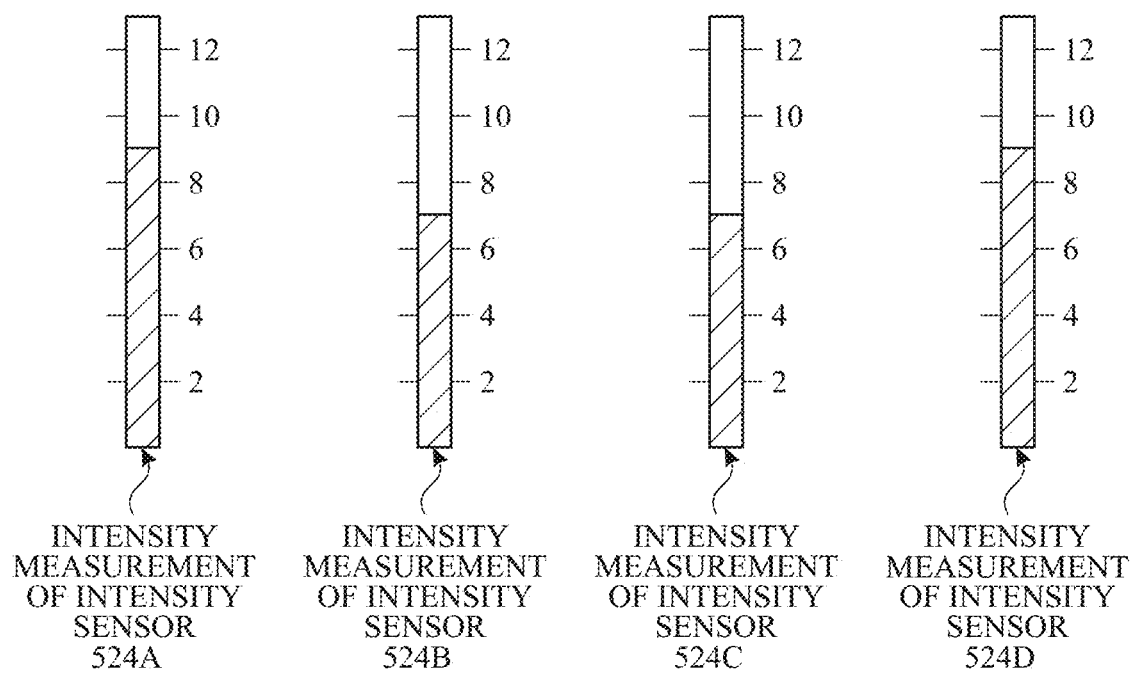
Figure 5D:
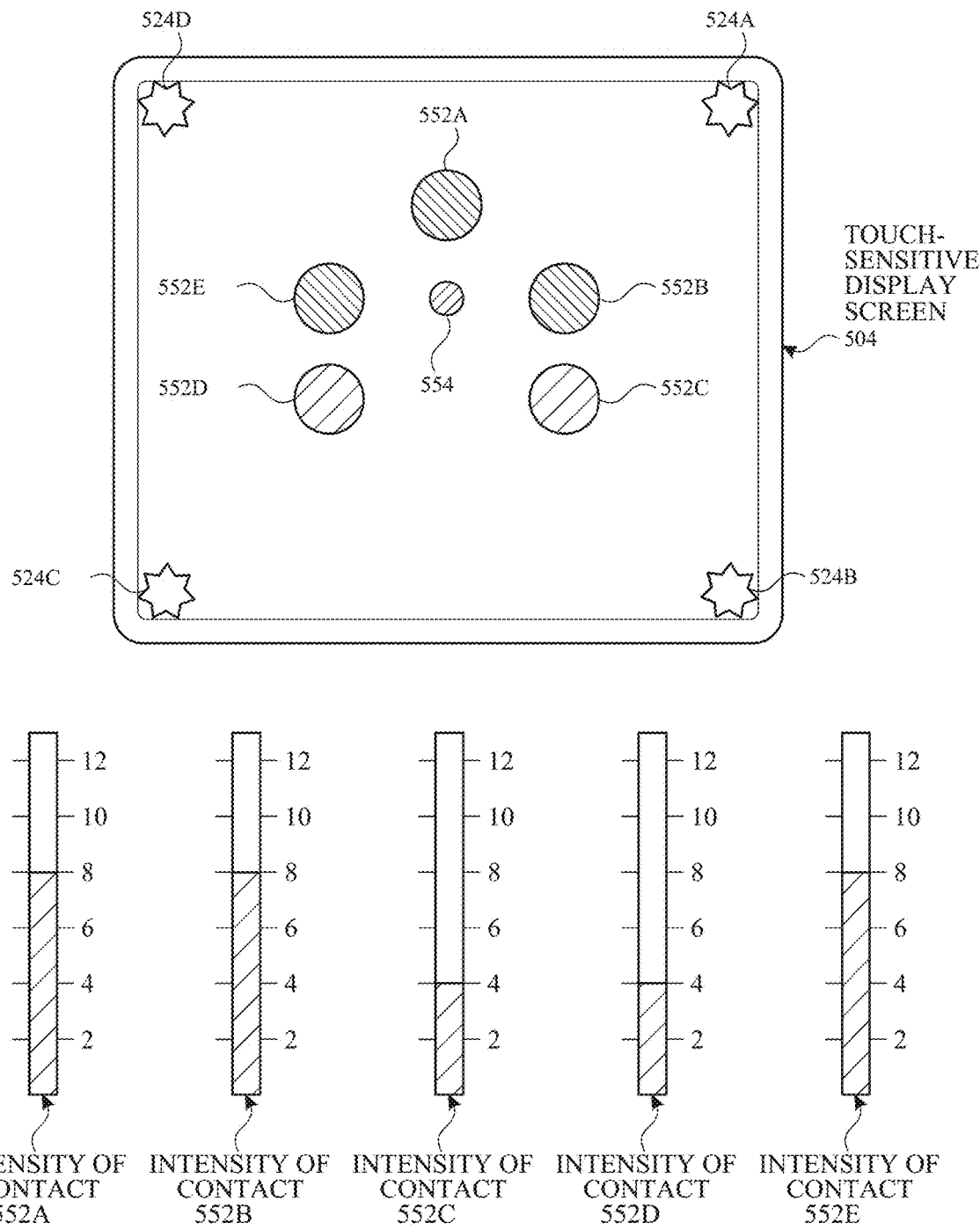

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
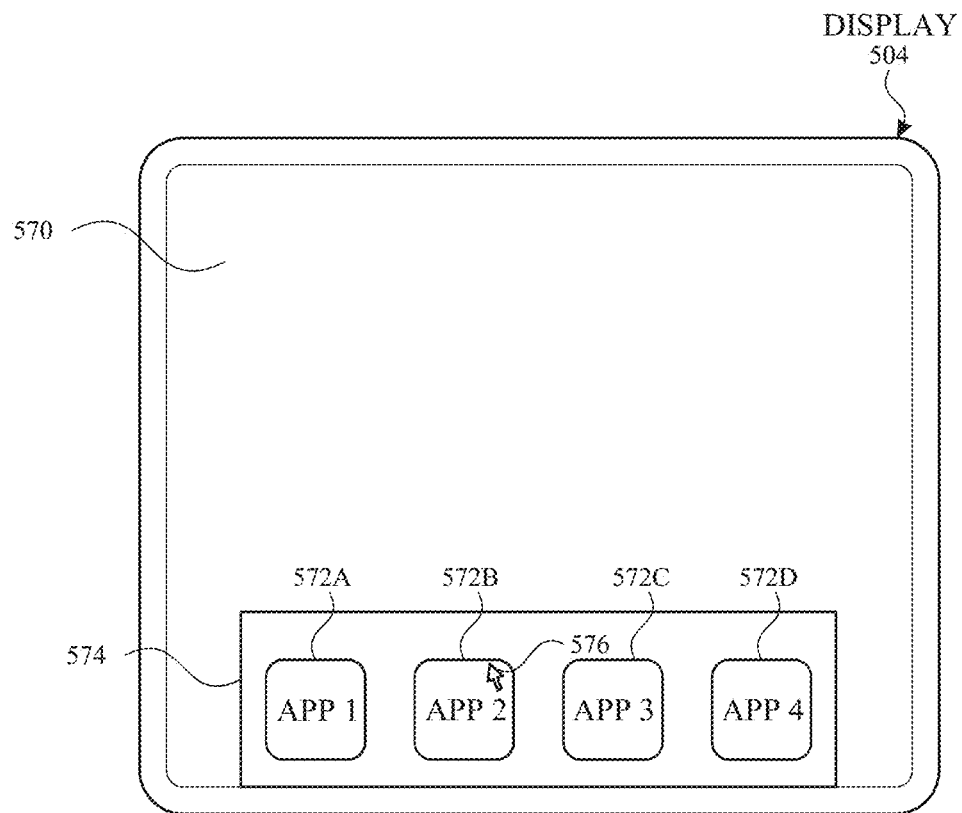
FIGS. 5E-5H illustrate exemplary components and user interfaces of a personal electronic device in accordance with some embodiments.
Figure 5E:
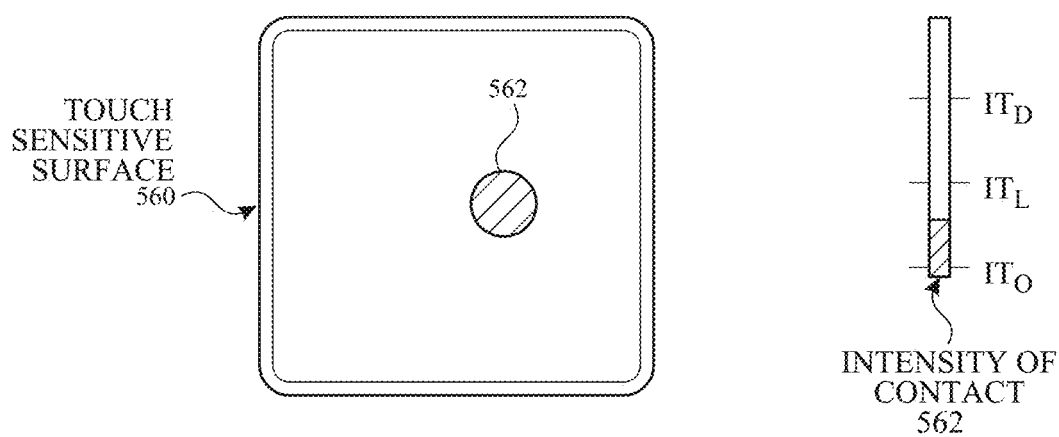
Figure 5F:
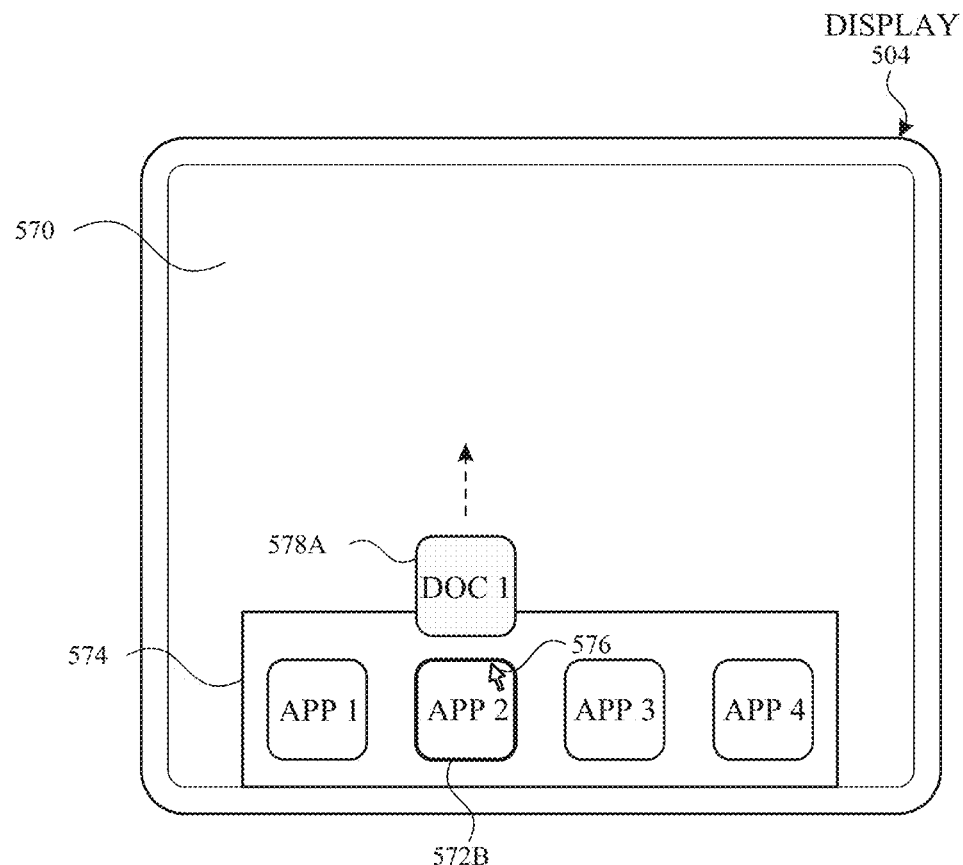
Figure 5F:
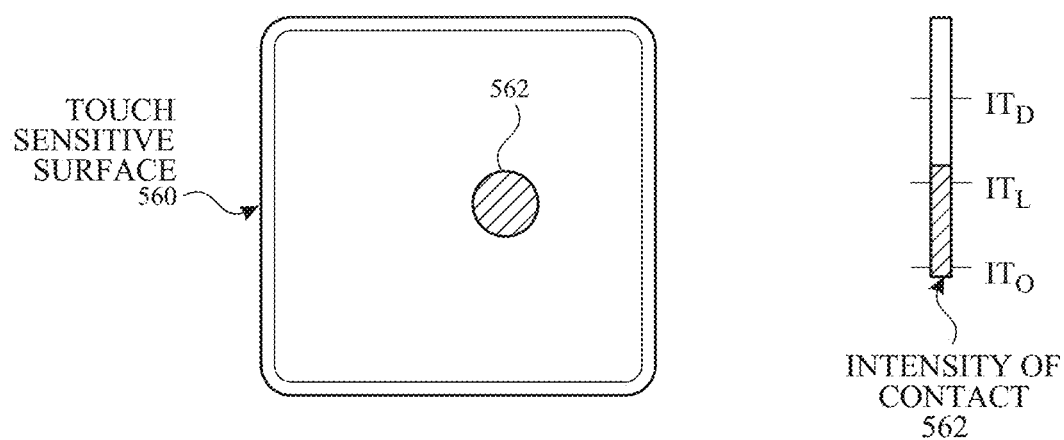
Figure 5G:
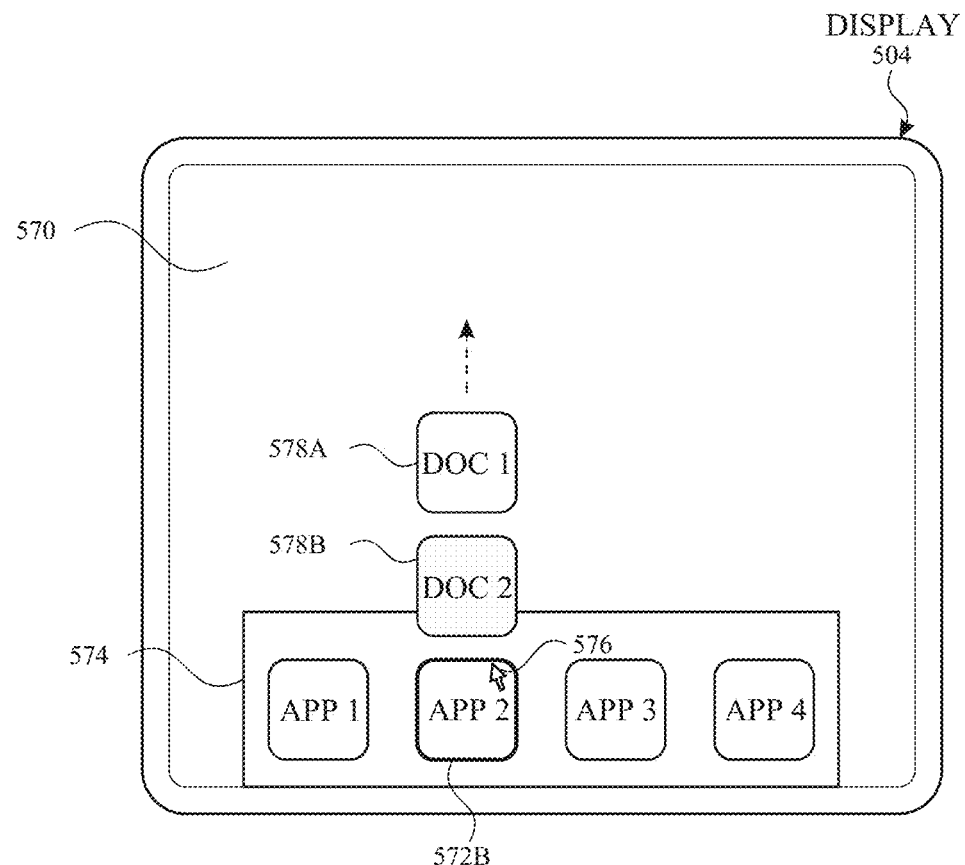
Figure 5G:
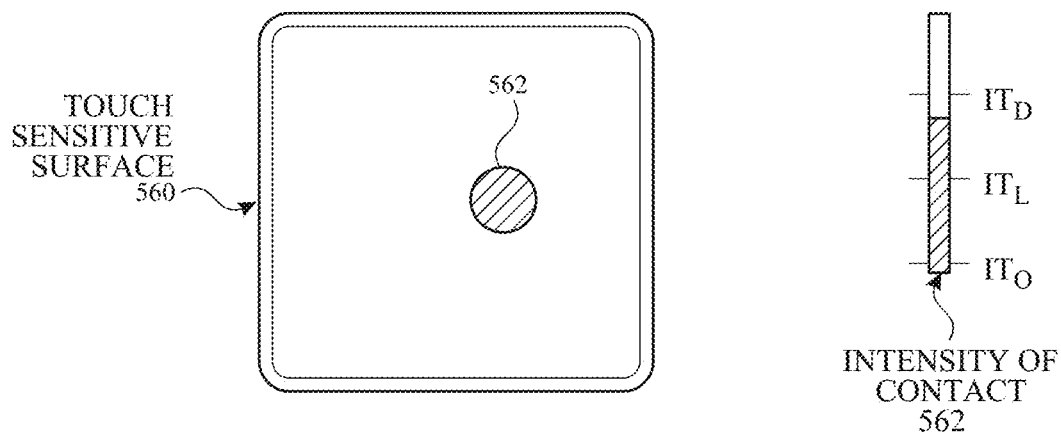
Figure 5H:
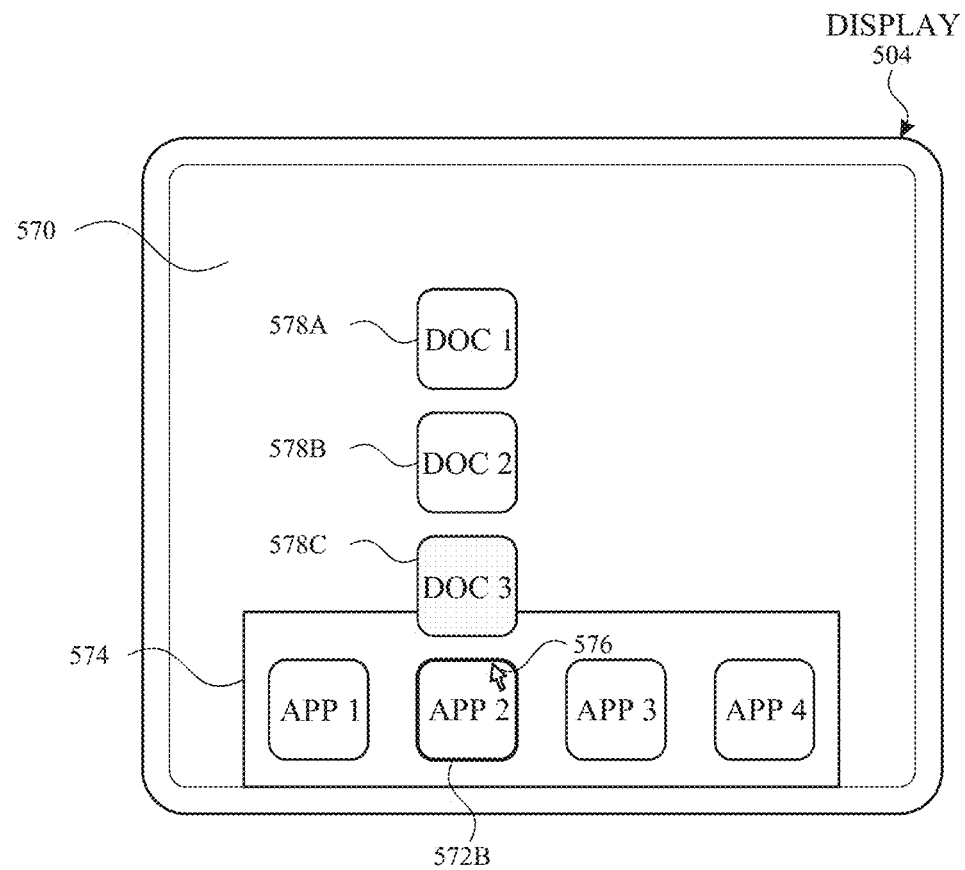
Figure 5H:
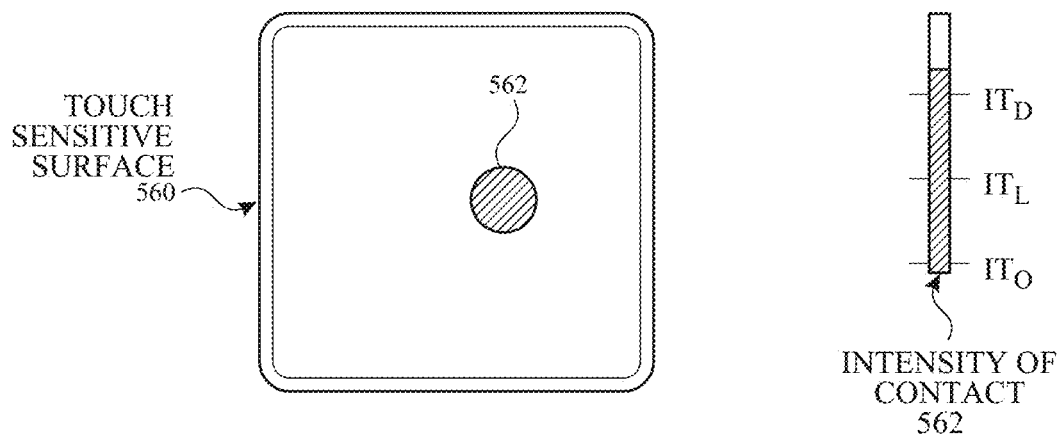

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as device 100, device 300, or device 500.

User Interfaces and Associated Processes

User Interfaces for Composing and Receiving Messages

Users interact with electronic devices in many different manners, including using electronic devices to display and compose messages in a messaging conversation. The embodiments described below provide ways in which an electronic device displays user interfaces for composing and displaying messages that include a plurality of content items. Providing efficient manners of adding content items to a messaging conversation and viewing such content items reduces the amount of time a user needs to interact with the device, which increases battery life for battery-powered devices. It is understood that people use devices. When a person uses a device, that person is optionally referred to as a user of the device.

FIGS. 6A-6JJ illustrate various ways an electronic device displays a plurality of content items in a messaging conversation in accordance with some embodiments of the disclosure. The embodiments in these figures are used to illustrate the processes described below, including the processes described with reference to FIG. 7. Although FIGS. 6A-6JJ illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6JJ.

Figure 6B:
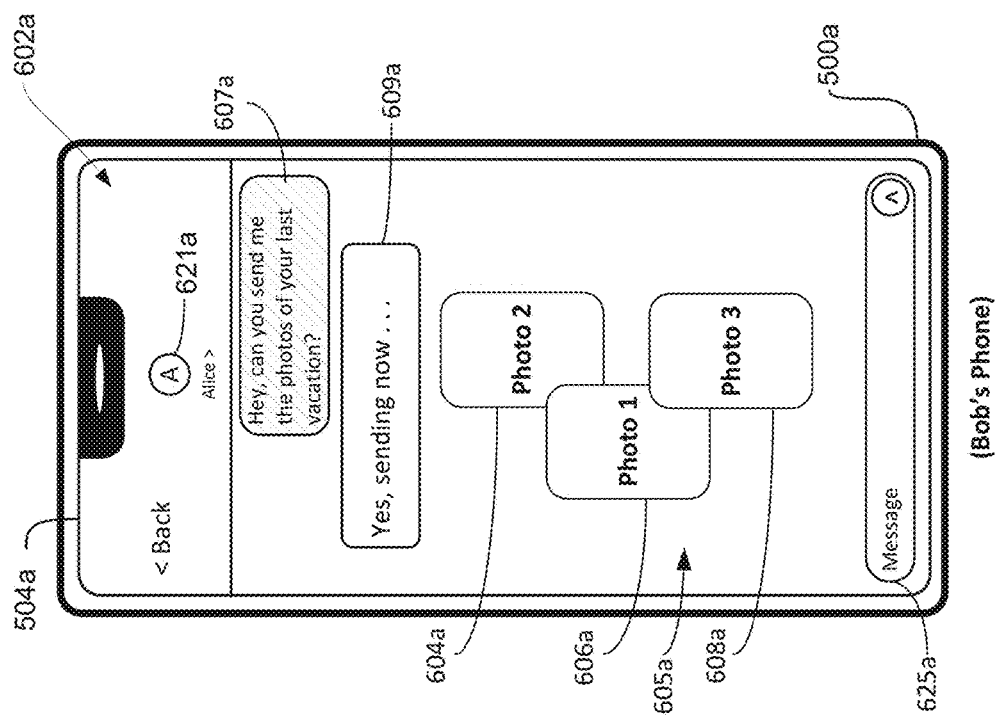
FIGS. 6A-6JJ illustrate various ways an electronic device displays a plurality of content items in a messaging conversation in accordance with some embodiments of the disclosure.
Figure 6A:
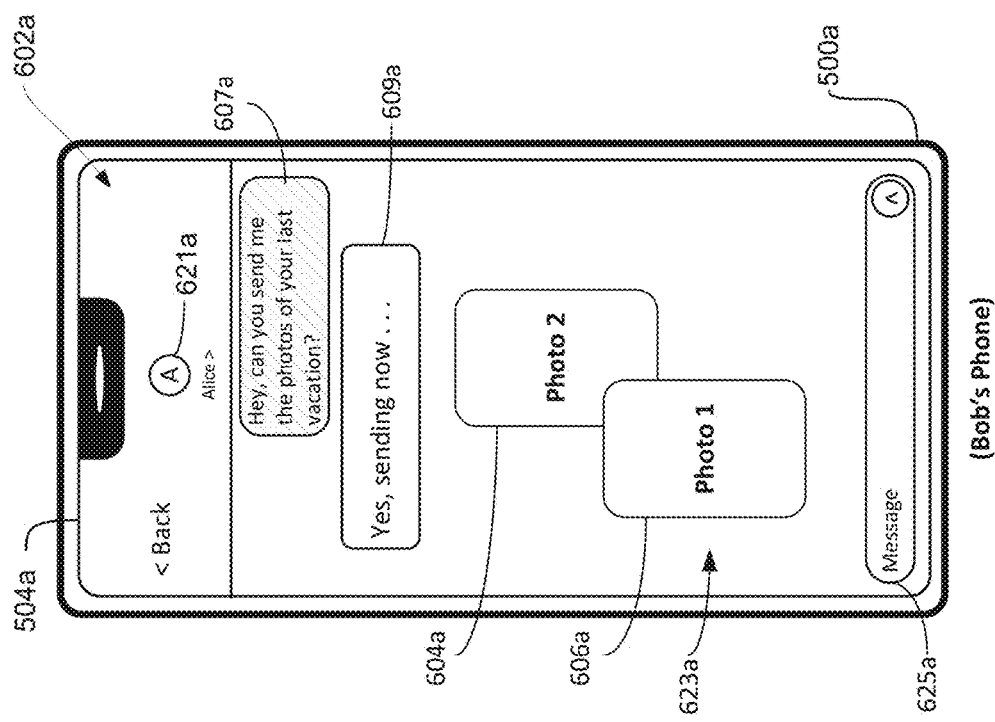

FIG. 6A illustrates an exemplary device 500a that includes a touchscreen 504a. In FIG. 6A, the electronic device 500a is presenting a messaging user interface 602a that includes a messaging conversation between a user Bob (the user associated with device 500a) and a contact named Alice (indicated by the representation 621a of Alice). The messaging user interface 602a includes a visual indication 607a of a first message that was added to the messaging conversation from a device associated with Bob, includes a visual indication 609a of a second message that was added to the messaging conversation from a device associated with Alice, and a visual indication 623a of a third message that was also added to the messaging conversation from a device associated with Alice. In some embodiments, the visual indication 609a is displayed, in messaging user interface 602a, in response to device 500a receiving an indication that a device associated with Alice has added a message to the messaging conversation which included the text "Yes, sending now . . . ." Similarly, in some embodiments, the visual indication 623a is displayed, in the messaging user interface 602a, in response to device 500a receiving an indication that a device associated with Alice has also added a message to the messaging conversation which included two content items, such as Photo 1 and Photo 2. The visual indication 623a corresponds to the third message in the messaging conversation that was added by a device associated with Alice and includes a representation of Photo 1 606a and a representation of Photo 2 604a.

In some embodiments, a visual indication of a message in the messaging conversation includes representations of the content items that were included in the message partially overlaid each other. For example, as illustrated in FIG. 6A, in response to receiving an indication that a third message was added to the messaging conversation by a device associated with Alice, the electronic device 500a displays a visual indication 623a of that message with a representation 606a of Photo 1 (corresponding to the Photo 1 included in the third message) and a representation 604a of Photo 2 (corresponding to the Photo 2 included in the third message) partially overlaid each other. As will be described in more detail later, in some embodiments, visual indications of respective messages in the messaging conversation optionally includes representations of the content items (e.g., photos) included in those respective messages displayed in a stack.

Similar to the example illustrated in FIG. 6A, FIG. 6B illustrates another exemplary scenario of device 500a displaying representations of content items partially overlaid each other. In FIG. 6B, device 500a receives an indication that a device associated with Alice has added a respective message to the messaging conversation that included three photos: Photo 1, Photo 2, and Photo 3. In response to receiving the indication that a device associated with Alice has added the respective message to the messaging conversation, device 500a displays a visual indication 605a corresponding to the respective message. Visual indication 605a includes a representation 606a of Photo 1 (corresponding to Photo 1 included in the respective message), a representation 604a of Photo 2 (corresponding to Photo 2 included in the respective message), and a representation 608a of Photo 3 (corresponding to Photo 3 included in the respective message). As illustrated in FIG. 6B, the representations 604a-608a are displayed partially overlaid each other. In some embodiments, the representations of respective content items (e.g., photos, videos, etc.) are displayed partially overlaid each other when the corresponding message in the messaging conversation includes at most three content items. As will be described in more detail later, in some embodiments, a visual indication of a respective message in the messaging conversation optionally displays representations of the content items as a stack when the number of content items in the corresponding message includes four or more content items.

In some embodiments, representations of content items are displayed in different manners (e.g., spatial layouts) based on whether an electronic device is displaying a user interface for composing a new message. For example, in FIG. 6C, while device 500a is not displaying a user interface composing a new message and while the representations 604a-608a are displayed in the manner described above, device 500a receives a request to display a user interface for composing a new message (indicated by touch contact 601a-c selecting text entry field 625a). In response to receiving the request to display a user interface for composing a new message, in FIG. 6D, device 500a updates the messaging user interface 602a to include a soft keyboard and a selectable option 610a for composing a new message. In some embodiments, the content of the new message being composed is visually indicated in the text entry field 625a. For example, in some embodiments, when the electronic device 500a detects one or more inputs directed to the selection of one or more characters at the soft keyboard, the selected one or more characters are indicated in the text entry field 625a in real time. Additionally, in some embodiments, selectable option 610a is selectable to cause the electronic device 500a to update the messaging user interface 602a to include a plurality of representations of photos that, when selected, cause those selected photos to be added to the new message being composed in the messaging user interface 602a, as will be described and illustrated in more detail later.

Additionally, in response to device 500a receiving the request to display a user interface for composing a new message, device 500a displays a plurality of selectable options for adding rich content to the message currently being composed in the messaging user interface 602a (indicated by the content displayed in text entry field 625a), including a selectable option for adding content associated with one or more applications that is downloadable on device 500a (indicated by the selectable option with the label "App Store"), a selectable option for adding information about a song recently played on device 500a (indicated by the selectable option with the label "Music"), and a selectable option for adding one or more graphical icons (indicated by the selectable option with the label "Emoji").

Figure 6D:
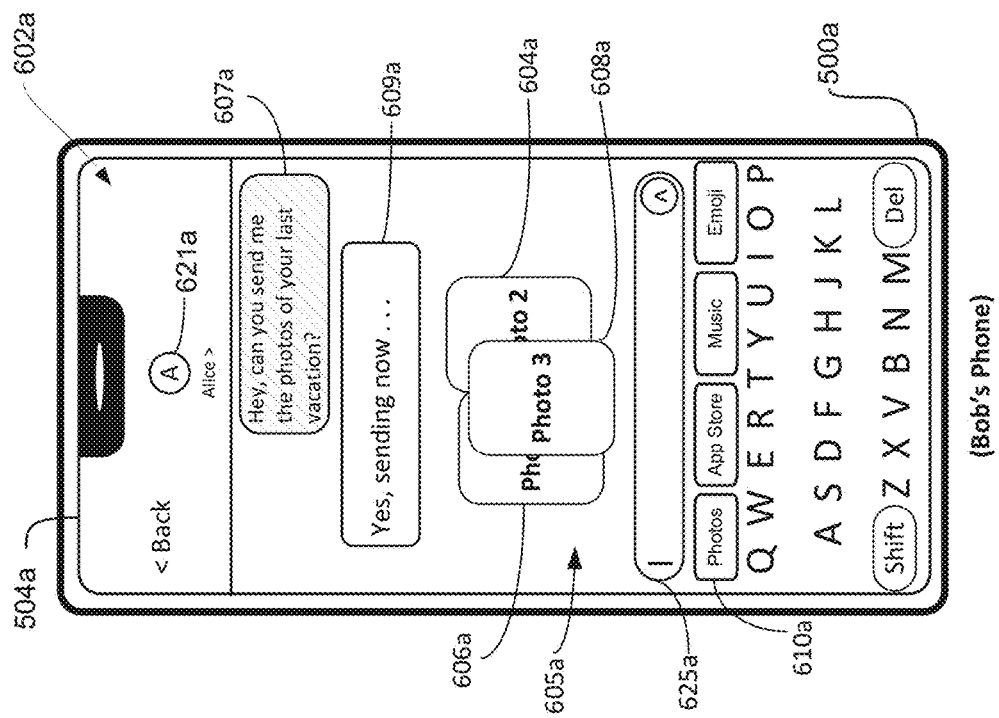
Figure 6C:
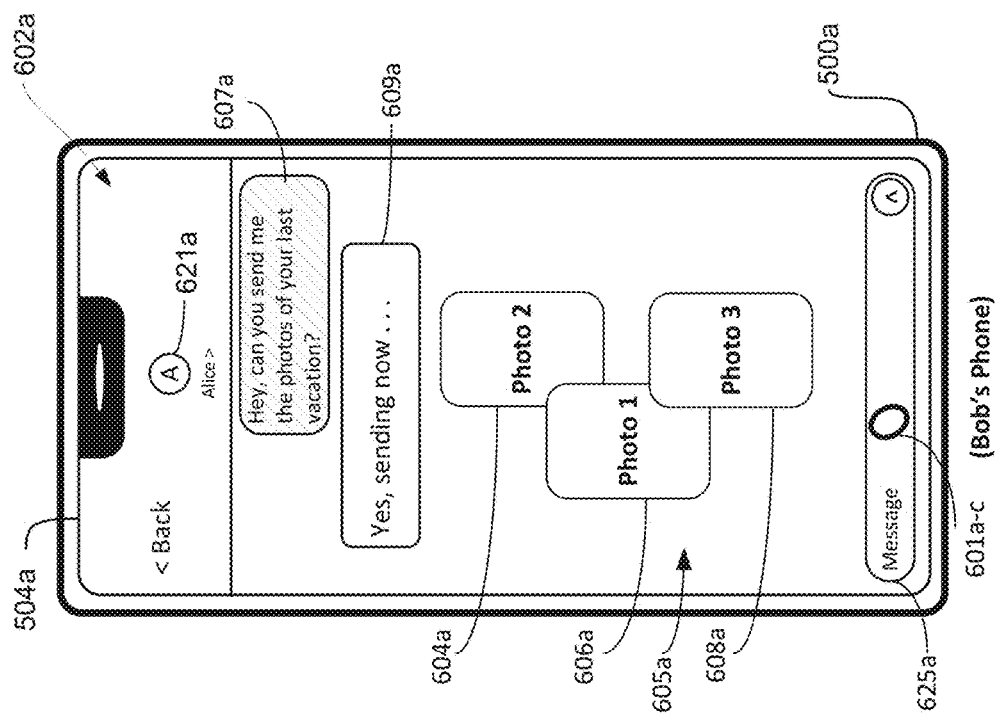

Further, as illustrated in FIG. 6D, in response to device 500a receiving the request to display a user interface for composing a new message, device 500a continues to display the visual indications 607a and 609a of respective messages in the messaging conversation at the same location in the messaging user interface 602a before the input for displaying a user interface for composing a new message was detected by device 500a (e.g., the same locations of the visual indications 607a and 609a in the messaging user interface 602a illustrated in FIG. 6B). However, in contrast, device 500a modifies the display of the representations 604a-608a of respective photos such that the locations of the visual indications 607a and 609a in the messaging user interface 602a remain the same when device 500a updates the messaging user interface 602a to include additional user interface elements for composing a new message (e.g., a soft keyboard and selectable options for adding rich content to the new message being composed in the messaging user interface 602a). Specifically, as illustrated in FIG. 6D, device 500a modifies the locations of the representations 604a-608a at visual indication 605a such that the representations 604a-608a overlap at different locations (as compared the overlapping positions of the representations 604a-608a in FIG. 6C). In some embodiments, in addition to device 500a modifying the position at which the representations 604a-608a overlap with each other, device 500a also adjusts the size of the representations 604a-608a at the visual indication 605a when device 500a receives the request to display a user interface for composing a new message. As a result of device 500 adjusting the positions of the representations 604a-608a to be displayed closer together, the same messaging content is able to be displayed when device 500a is displaying a user interface for composing a new message (as illustrated in FIG. 6D), and when device 500 is not displaying a user interface for composing a new message (as illustrated in FIG. 6C). In some embodiments, in response to device 500a displaying the user interface for composing a new message, device 500a optionally moves the visual indications 607a and 609a upwards in the messaging user interface 602a, but the visual indications 607a and 609a move less than an amount the visual indications would have moved had the positions of the representations 604a-608a not been changed.

Figure 6F:
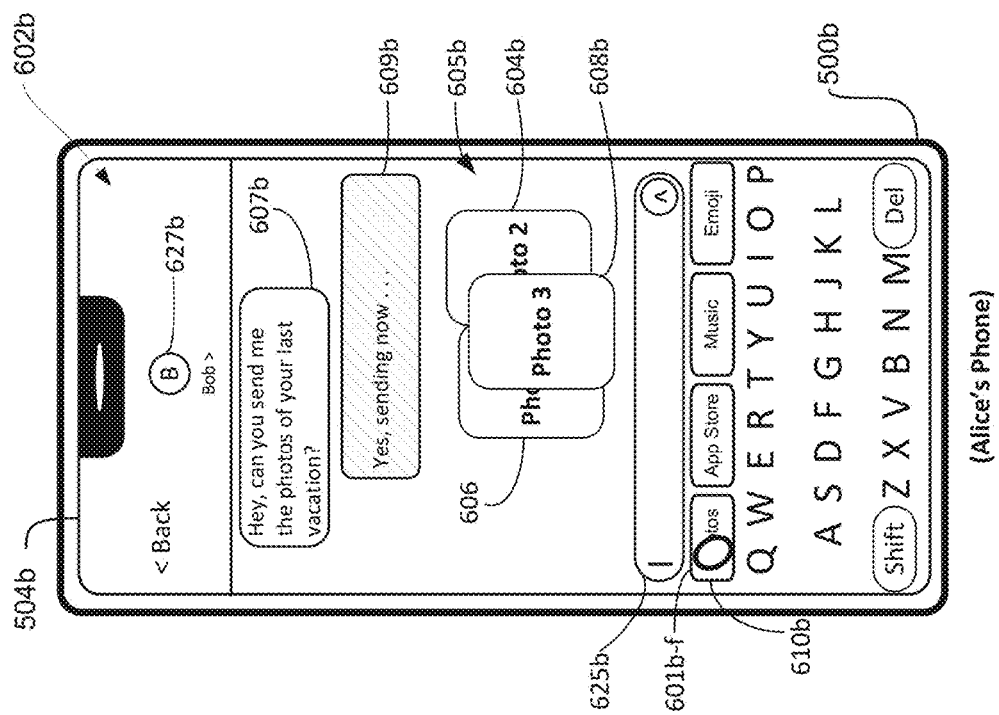

As mentioned previously, in some embodiments, one or more content items are optionally able to be added to a new message being composed. For example, in FIG. 6E, device 500b—associated with the user Alice—is displaying a messaging user interface 602b that includes a messaging conversation between Alice (the user associated with device 500b) and Bob (indicated by the representation 627b of Bob). The messaging user interface 602b is similar to the messaging user interface 602a previously described above. In FIG. 6F, the device 500b receives a request to display a plurality of photos that are available for inclusion in the new message being composed (represented by touch contact 601b-f selecting the selectable option 610b). In FIG. 6G, in response to receiving the request in FIG. 6F, device 500b updates the messaging user interface 602b to include a representation 612-1b of Photo 1, a representation 612-2b of Photo 2, a representation 612-3b of Photo 3, a representation 612-4b of Photo 4, a representation 612-5b of Photo 5, and a representation 612-6b of Photo 6. In some embodiments, the photos corresponding the representations 612-1b to 612-6b are selected for display in the messaging user interface 602b because those photos are currently accessible to device 500b via a photos application that is currently downloaded on device 500b.

In some embodiments, device 500b can assign respective priorities (e.g., a respective order) to the photos that are being added to the new message currently being composed, such that when the message is added (e.g., transmitted) to the messaging conversation, the visual indication of that message is displayed (e.g., ordered) in accordance with the assigned priorities (e.g., the photos are displayed in accordance with the order defined while the message was being composed). For example, in FIG. 6H, device 500b receives a request to add Photo 1 to the new message currently being composed (indicated by touch contact 601b-h selecting the representation 612-1b of Photo 1). In response to device 500b detecting the selection in FIG. 6H, in FIG. 6I, Photo 1 is added to the new message being composed in the messaging user interface 602b (indicated by device 500b displaying the representation 613-1b of Photo 1 in the text entry field 625b). Additionally, device 500b displays indication 629-1b indicating that Photo 1 is currently assigned the highest priority (e.g., is ordered first) in the message being composed in messaging user interface 602b (e.g., once the new message is added to the messaging conversation, the visual indication corresponding to the new message will include a representation of Photo 1 which will be visually emphasized over photos that have been assigned a lower priority (e.g., visually emphasized over photos that are ordered after Photo 1) but visually deemphasized relative to high priority photos (e.g., visually deemphasized over photos that are ordered before Photo 1)).

Figure 6E:
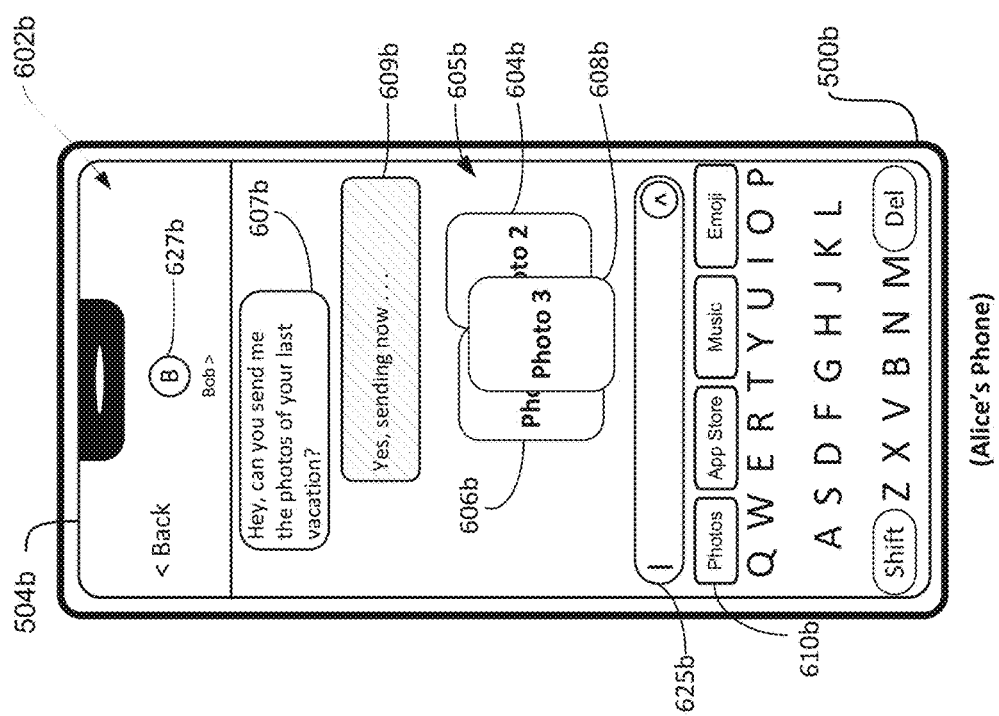
Figure 6H:
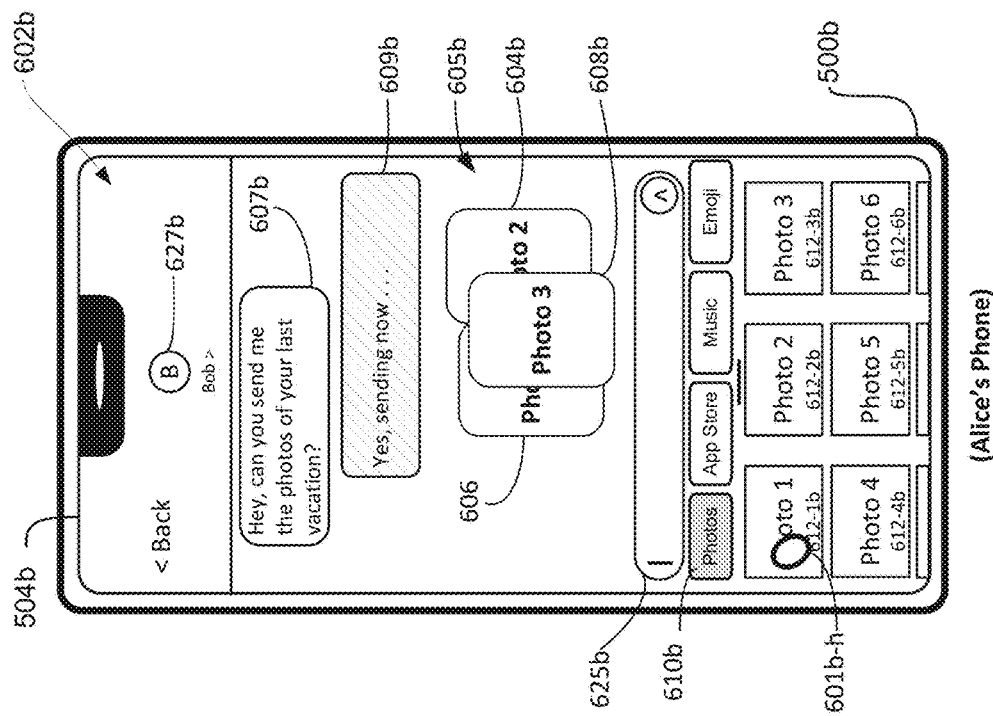
Figure 6G:
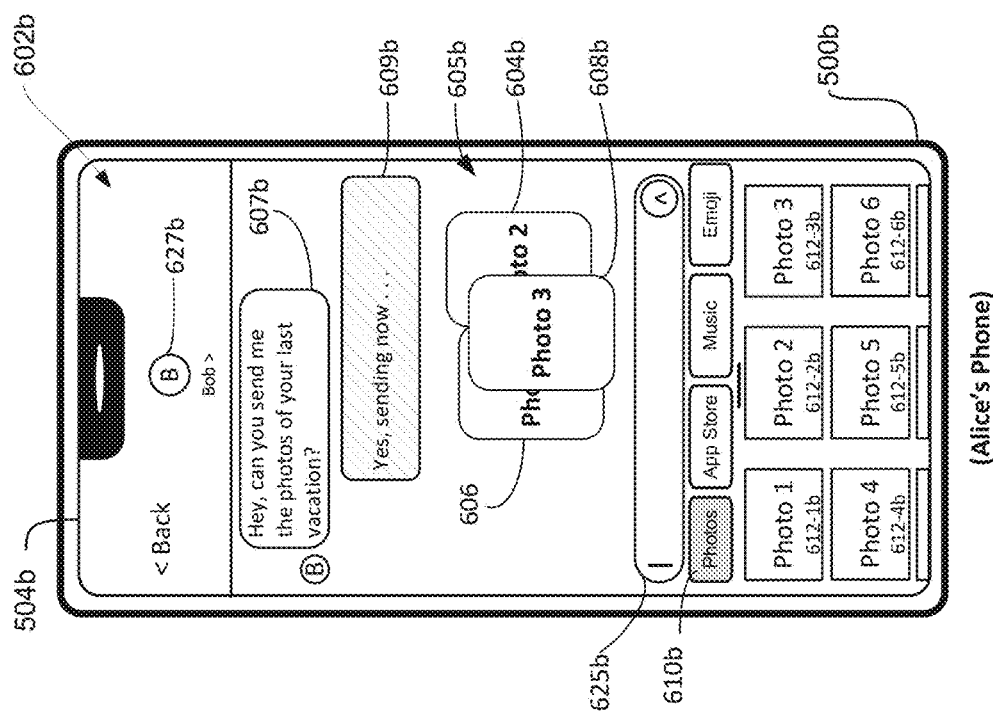
Figure 6J:
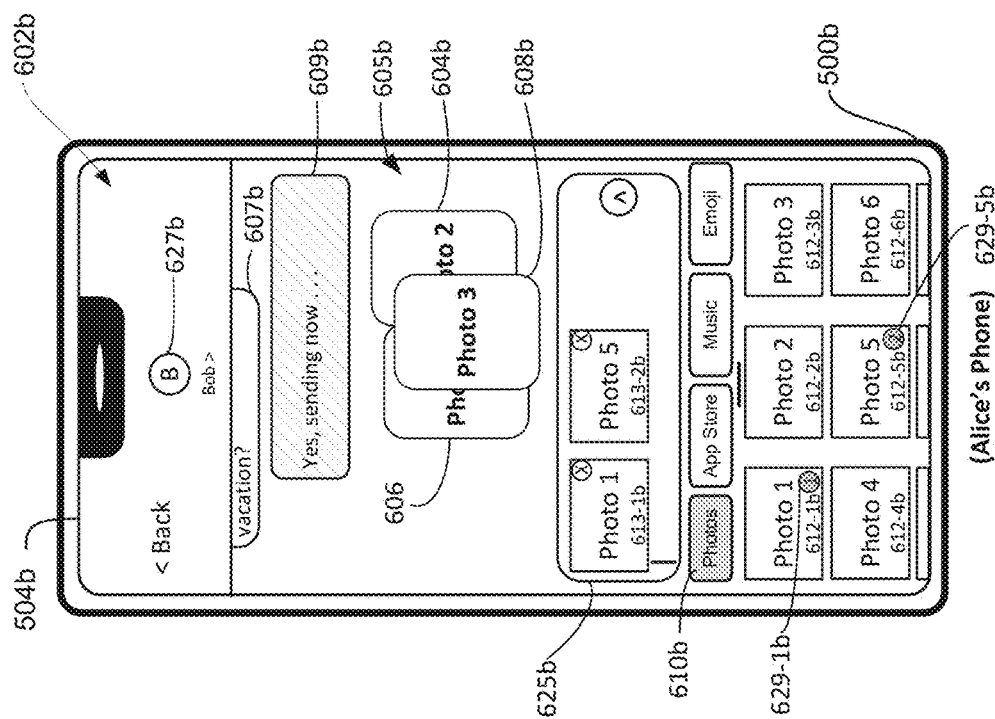
Figure 6I:
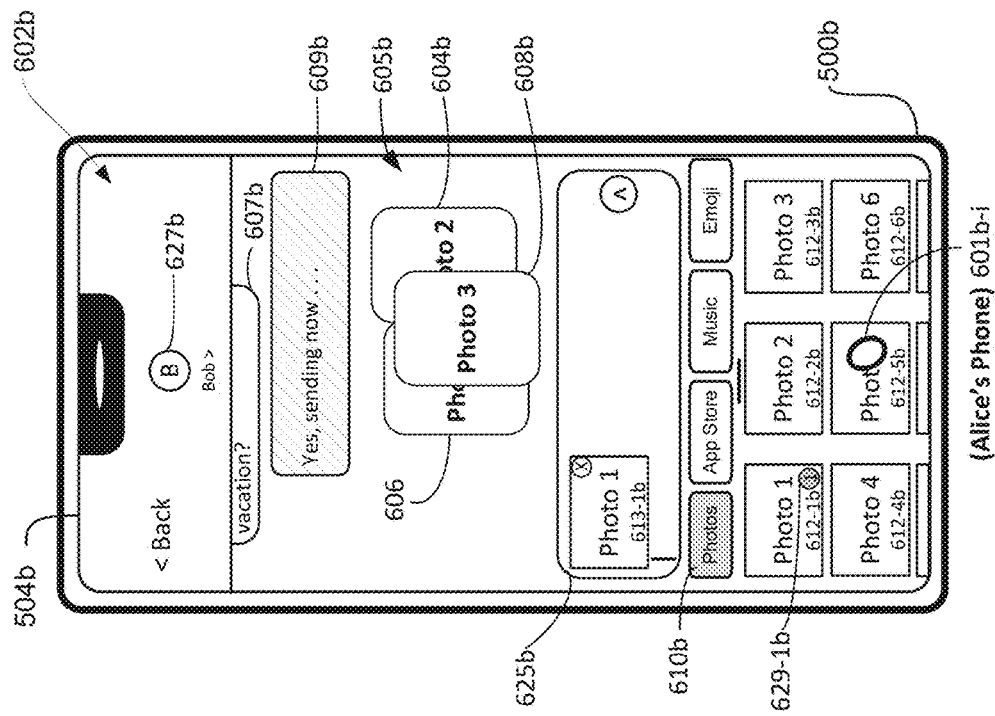

After adding Photo 1 to the new message being composed in messaging user interface 602b, in FIG. 6I, device 500b also detects a request to add Photo 5 to the new message being composed (indicated by touch contact 601b-i selecting the representation 612-5b of Photo 5). In response to device 500b detecting the selection in FIG. 6I, in FIG. 6J, Photo 5 is added to the new message being composed (indicated by device 500b displaying the representation 613-2b of Photo 5 in the text entry field 625b). Additionally, device 500b displays indication 629-5b indicating that Photo 5 is currently assigned the second highest priority (e.g., is ordered second) in the message being composed (e.g., once the new message is added to the messaging conversation, the visual indication corresponding to the new message will include a representation of Photo 5 which will be visually emphasized over photos that have been assigned a lower priority (e.g., visually emphasized over photos that are ordered after Photo 5), but visually deemphasized relative to high priority photos (e.g., visually deemphasized over photos that are ordered before Photo 5)).

Figure 6L:
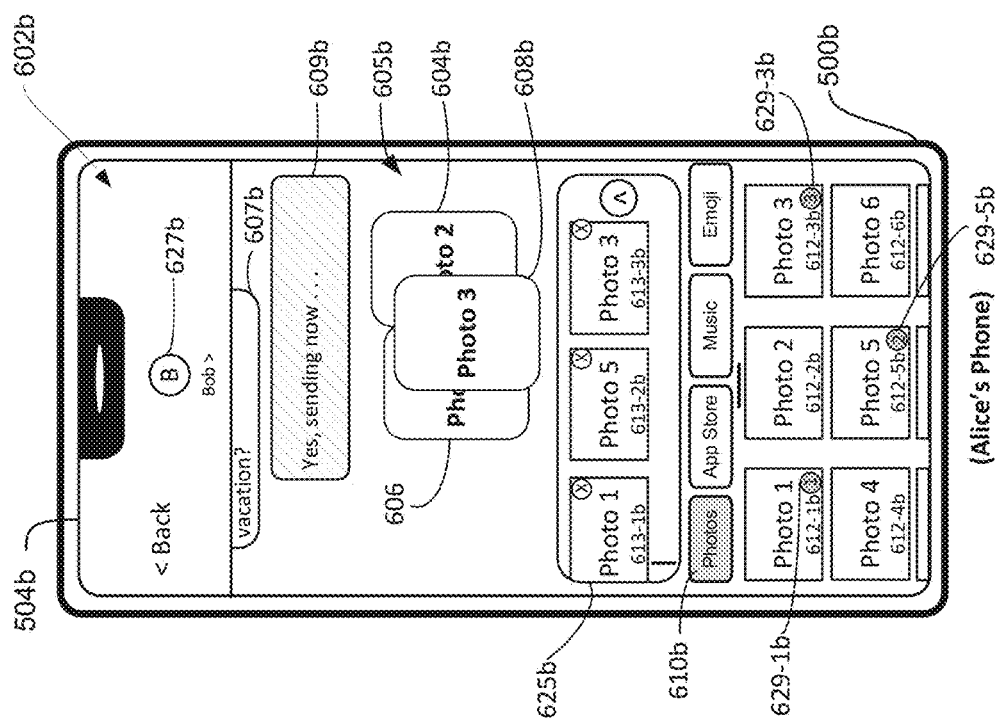
Figure 6K:
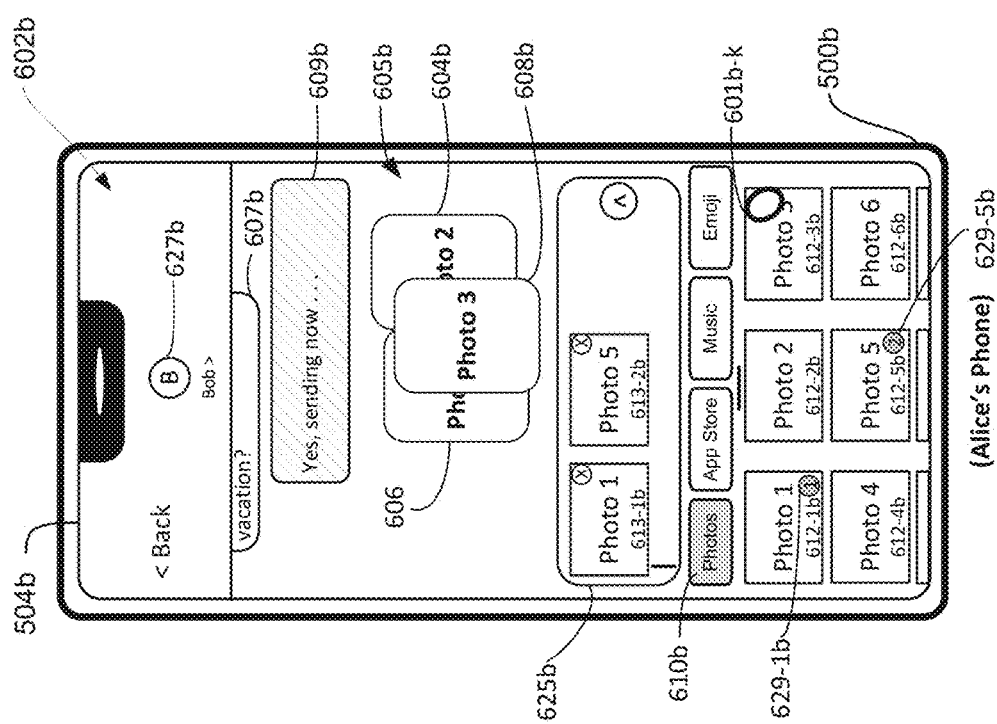

After adding Photos 1 and 5 to the new message being composed in the messaging user interface 602b, in FIG. 6K, device 500b detects a request to add Photo 3 to the new message being composed (indicated by touch contact 601b-k selecting the representation 612-3b of Photo 3). In response to device 500b detecting the selection in FIG. 6K, in FIG. 6L, Photo 3 is added the new message being composed in the messaging user interface 602b (indicated by device 500b displaying the representation 613-3b of Photo 3 in the text entry field 625b). Additionally, device 500b displays indication 629-3b indicating that Photo 3 is currently assigned the third highest priority (e.g., is ordered third) in the new message being composed (e.g., once the new message is added to the messaging conversation, the visual indication corresponding to the new message will include a representation of Photo 3 which will be visually emphasized over photos that have been assigned a lower priority (e.g., visually emphasized over photos that are ordered after Photo 3) but visually deemphasized relative to high priority photos (e.g., visually deemphasized over photos that are ordered before Photo 3)).

Figure 6N:
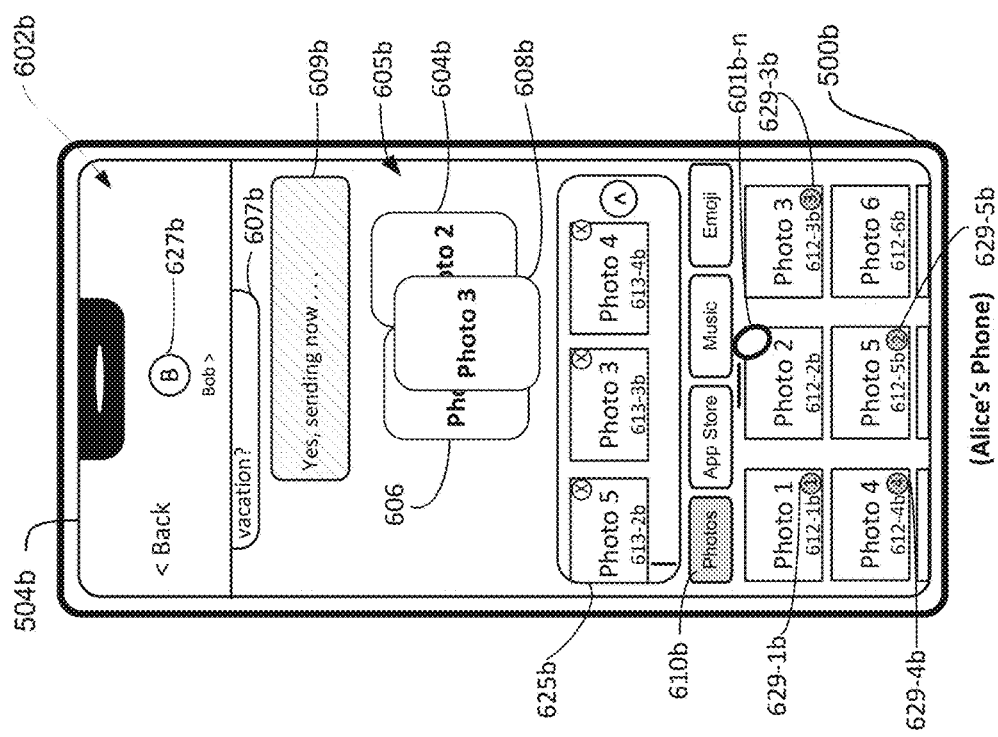
Figure 6M:
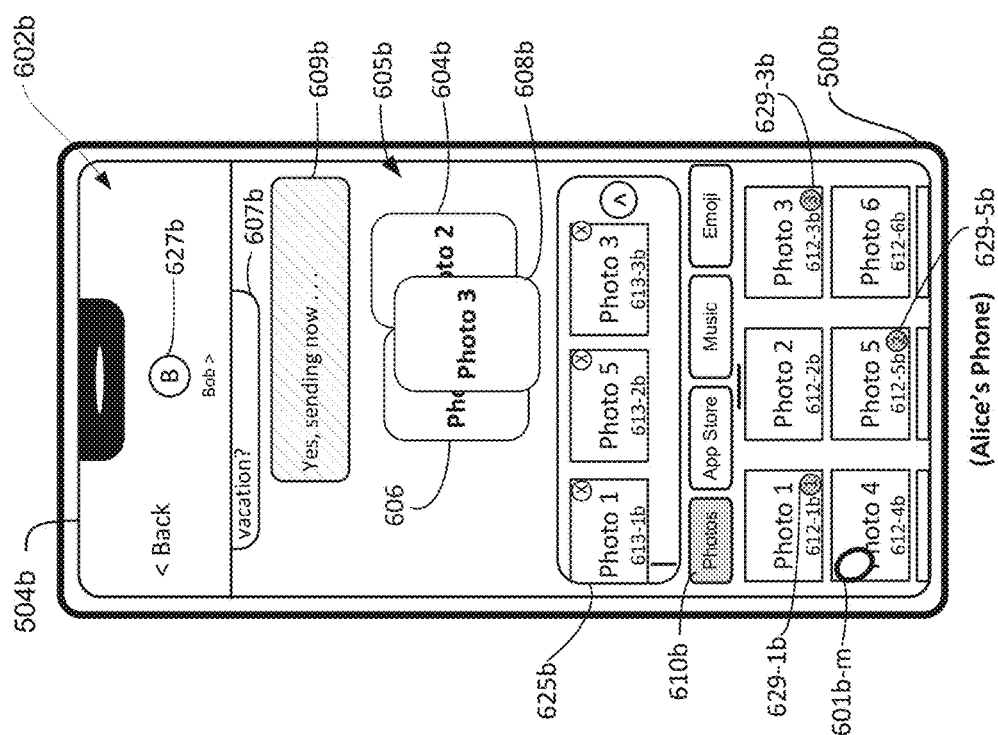

After adding Photos 1, 5, and 3 to the new message being composed in the messaging user interface 602*b*, in FIG. 6M, device 500*b* detects a request to add Photo 4 to the new message being composed (indicated by touch contact 601*b-m* selecting the representation 612-4*b* of Photo 4). In response to device 500*b* detecting the selection in FIG. 6M, in FIG. 6N, Photo 4 is added to the new message that is currently being composed in the messaging user interface 602*b* (indicated by device 500*b* displaying the representation 613-4*b* of Photo 4 in the text entry field 625*b*). Additionally, device 500*b* displays indication 629-4*b* indicating that Photo 4 is currently assigned the fourth highest priority (e.g., is ordered fourth) in the new message being composed in messaging user interface 602*b* (e.g., once the new message is added to the messaging conversation, the visual indication corresponding to the new message will include a representation of Photo 4 which will be visually emphasized over photos that have been assigned a lower priority (e.g., visually emphasized over photos that are ordered after Photo 4) but visually deemphasized relative to high priority photos (e.g., visually deemphasized over photos that are ordered before Photo 4)).

Additionally, in FIG. 6N, after adding Photos 1, 5, 3, and 4 to the new message being composed in the messaging user interface 602*b*, device 500*b* receives a request to add Photo 2 to the new message being composed (indicated by touch contact 601*b-n* selecting the representation 612-2*b* of Photo 2). In response to device 500*b* detecting the selection in FIG. 6N, in FIG. 6O, Photo 2 is added to the message being composed in messaging user interface 602*b* (indicated by device 500*b* displaying the representation 613-5*b* of Photo 2 in the text entry field 625*b*). Additionally, device 500*b* displays indication 629-2*b* indicating that Photo 2 is currently assigned the fifth highest priority (e.g., is ordered fifth) in the new message being composed in messaging user interface 602*b* (e.g., once the new message is added to the messaging conversation, the visual indication corresponding to the new message will include a representation of Photo 2 which will be visually emphasized over photos that have been assigned a lower priority (e.g., visually emphasized over photos that are ordered after Photo 2) but visually deemphasized relative to high priority photos (e.g., visually deemphasized over photos that are ordered before Photo 2)).

In some embodiments, the priorities assigned to the photos included in the new message that is currently being composed are optionally able to be reassigned (e.g., the order assigned to the photos in the message can be changed). For example, in FIG. 6P, device 500*b* receives a request to move the representation 613-5*b* to the current location of the representation 613-4*b* of photo 4 in the text entry field 625*b* (indicated by touch contact 601*b-p* moving the representation 613-5*b* of Photo to the left). In response to device 500*b* receiving the request in FIG. 6P, in FIG. 6Q, device 500*b* rearranges (e.g., reorders) the representation 613-5*b* of Photo 2 and the representation 613-4*b* of Photo 4, such that the new location of the representation 613-5*b* of Photo 2 corresponds to the previous location of the representation 613-4*b* of Photo 4 in text entry field 625*b*, and the new location of the representation 613-4*b* of Photo 4 corresponds to the previous location of the representation 613-5*b* of Photo 2 in text entry field 625*b*. The priorities (e.g., order) assigned to Photos 2 and 4 are also updated in accordance with their new positions (e.g., with their new order) in the text entry field 625*b*. Specifically, the indication 629-2*b* is updated to indicate that Photo 2 is currently assigned with the fourth highest priority (e.g., ordered fourth) in the new message being composed in messaging user interface 602*b*, and the indication 629-4*b* is updated to indicate that Photo 4 is currently assigned with the fifth highest priority (e.g., ordered fifth) in the message being composed in messaging user interface 602*b*.

Figure 6P:
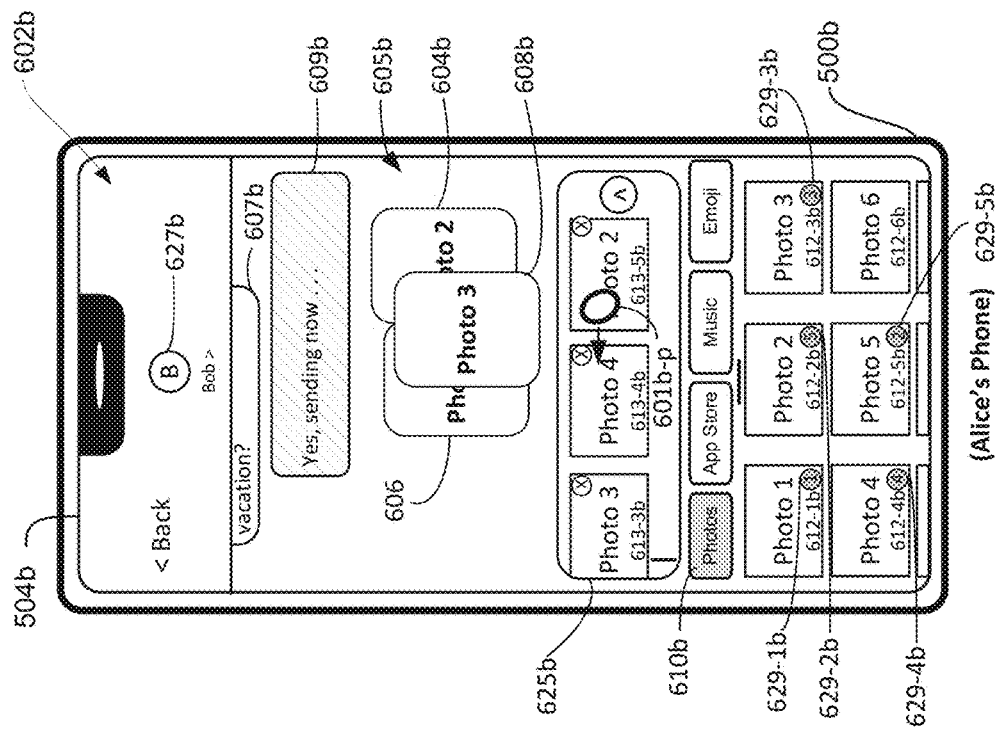

In some embodiments, a photo can be removed from inclusion from the new message being composed in the messaging user interface 602*b*. For example, in FIG. 6R, while Photo 3 is currently included in the new message being composed in messaging user interface 602*b* (indicated by the representation 613-3*b* of Photo 3 being displayed in text entry field 625*b*), device 500*b* detects a first selection of the representation 612-3*b* of Photo 3 (indicated by touch contact 601*b-r* tapping the representation 612-3*b* of Photo 3). In FIG. 6S, in response to device 500*b* detecting the selection of the representation 612-3*b* of Photo 3 in FIG. 6R, device 500*b* updates the visual appearance of the indication 629-3*b* to indicate that Photo 3 is still included in the new message being composed in the messaging user interface 602*b*, and to indicate that another selection of the representation 612-3*b* of Photo 3 will result in Photo 3 no longer being included in the new message being composed in the messaging user interface 602*b*.

Additionally, in FIG. 6S, device 500*b* detects a second selection of the representation 612-3*b* of Photo 3 (indicated by touch contact 601*b-s* tapping the representation 612-3*b* of Photo 3). In FIG. 6T, in response to device 500*b* detecting the second selection of the representation 612-3*b* of Photo 3, device 500*b* removes Photo 3 from inclusion in the message being composed in the messaging user interface 602*b* (indicated by indication 629-3*b* no longer being displayed at the representation 612-3*b* of Photo 3, and indicated by the representation 613-3*b* of Photo 3 also no longer being displayed in text entry field 625*b*). The priorities (e.g., order) of the photos currently included in the new message being composed are also updated because Photo 3 is no longer being included in the new message. Specifically, device 500*b* updates the priority of Photo 2 from being assigned with the fourth highest priority to being assigned with the third highest priority in the new message (e.g., from being ordered fourth to being ordered third in the message) (indicated by indication 629-2*b*). Similarly, device 500*b* updates the priority of Photo 4 from being assigned with the fifth highest priority to being assigned with the fourth highest priority in the new message (e.g., from being ordered fifth to being ordered fourth in the message) (indicated by indication 629-4*b*).

Figure 6O:
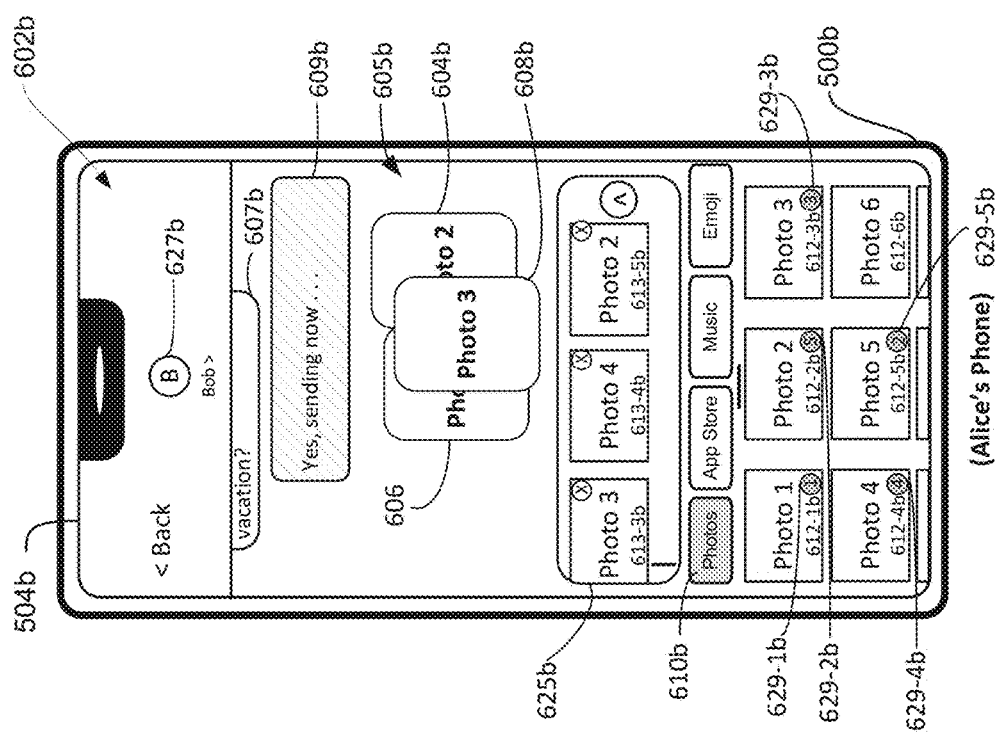
Figure 6T:
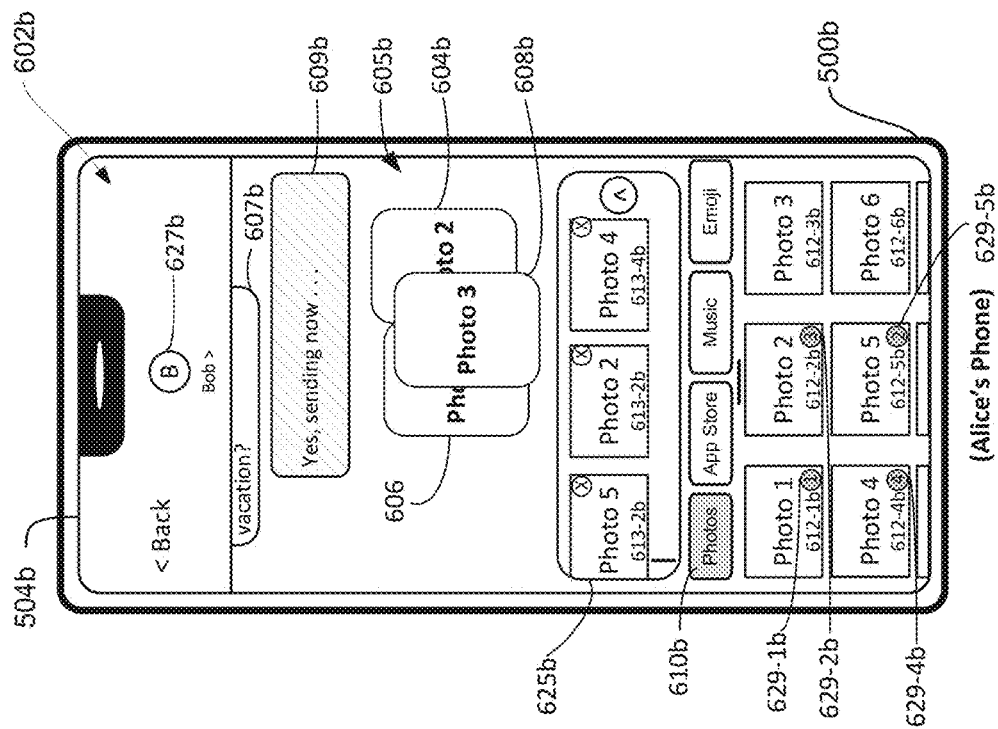
Figure 6S:
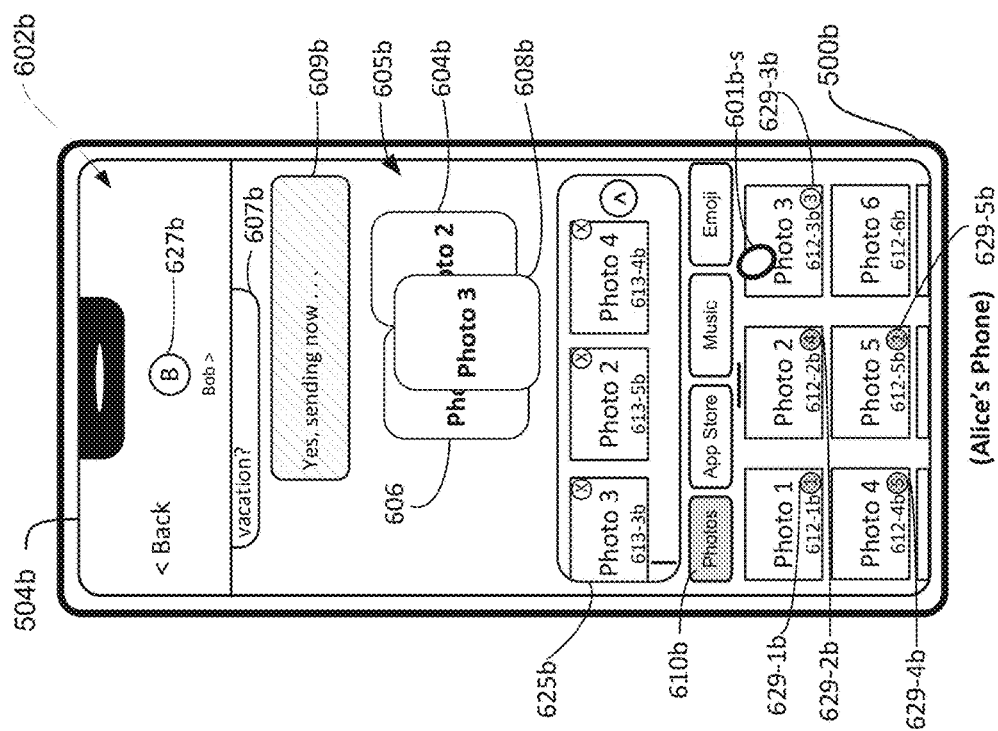
Figure 6V:
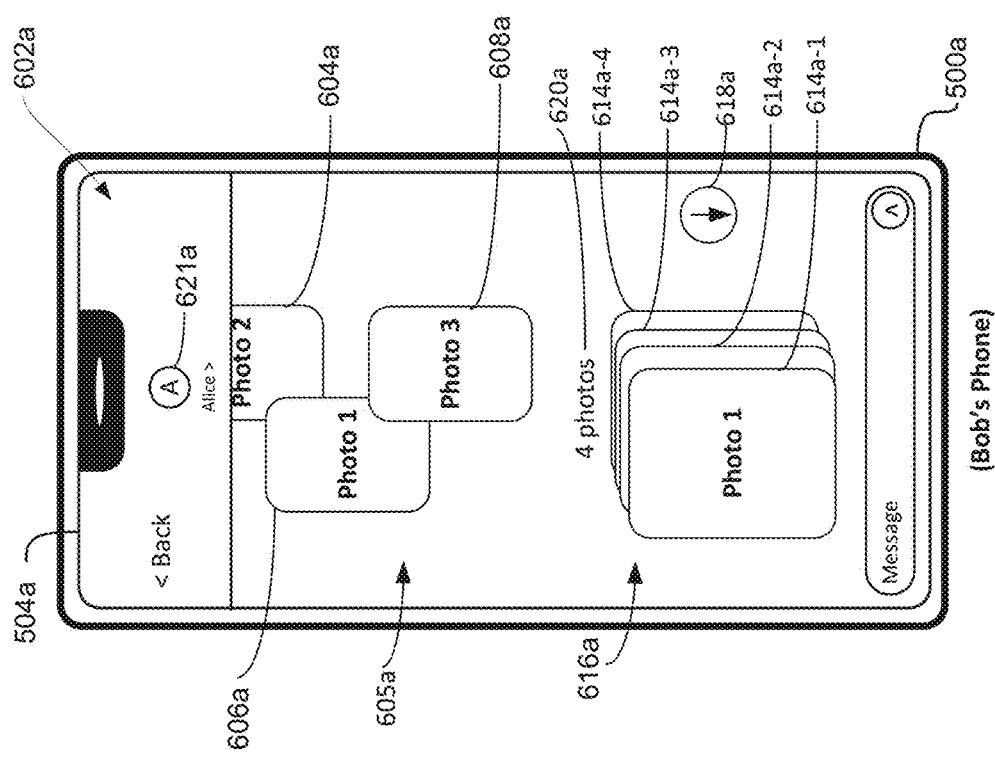
Figure 6U:
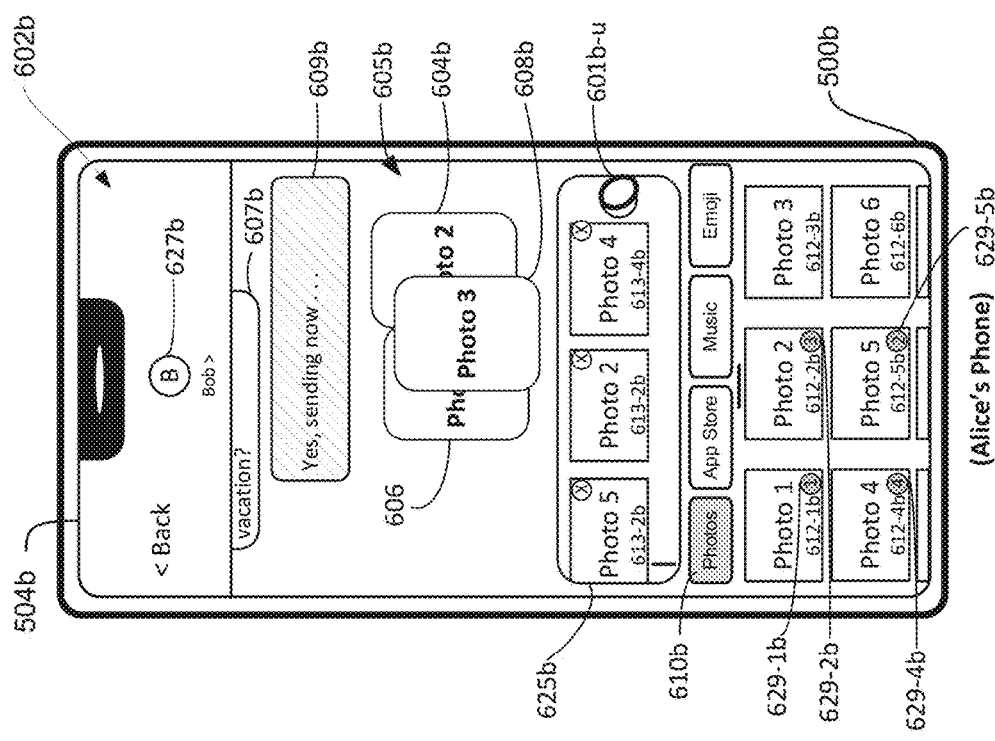

In FIG. 6U, after Photos 1, 2, 4, and 5 have been added to the new message, device 500*b* detects a request to transmit the composed message to the messaging conversation (indicated by touch contact 601*b-u* selecting the selectable option displayed in the text entry field 625*b*). In response to device 500*b* detecting the request, device 500*b* adds the newly composed message to the messaging conversation. In some embodiments, when an electronic device adds a message to a message conversation, the devices associated with the other users in the messaging conversation receive an indication of the new message that has been added to the messaging conversation. For example, in FIG. 6V, after device 500*b* (the device associated with Alice) adds the composed message to the messaging conversation, device 500*a* (associated with the user Bob) receives an indication of the new message that was added to the messaging conversation by the device (e.g., device 500b) associated with Alice. In response to receiving the indication, device 500a updates the messaging user interface 602a to include a visual indication 616a corresponding to the new message that was added to the messaging conversation (e.g., the message composed and transmitted as illustrated and described with respect to FIG. 6U).

The visual indication 616a includes a stack of content items. The stack of content items includes a representation 614a-1 of Photo 1 (corresponding to the Photo 1 included in the new message that was added to the messaging conversation), a representation 614a-2 of Photo 5 (corresponding to the Photo 5 included in the new message that was added to the messaging conversation), a representation 614a-3 of Photo 2 (corresponding to the Photo 2 included in the new message that was added to the messaging conversation), and a representation 614a-4 of Photo 4 (corresponding to the Photo 4 included in the new message that was added to the messaging conversation). In some embodiments, the visual indication of a respective message in the messaging conversation includes a stack of content items because the corresponding respective message included at least four content items (e.g., at least four photos).

The representation 614a-1 of Photo 1 is being displayed at the top of the stack (e.g., the first position in the stack) because Photo 1 was assigned with the highest priority (e.g., was ordered first) when the message corresponding to visual indication 616a was composed (indicated by indication 629-1b in FIG. 6U). Similarly, the representation 614a-2 of Photo 5 is being displayed at the second position in the stack because Photo 5 was assigned with the second highest priority (e.g., was ordered second) when the message corresponding to the visual indication 616a was composed (indicated by indication 629-5b in FIG. 6U). Similarly, the representation 614a-3 of Photo 2 is being displayed at the third position in the stack because Photo 2 was assigned with the third highest priority (e.g., was ordered third) when the message corresponding to the visual indication 616a was composed (indicated by indication 629-2b in FIG. 6U). Similarly, the representation 614a-4 of Photo 4 is being displayed at the bottom (e.g., last) position in the stack because Photo 4 was assigned with the fourth highest priority (e.g., was ordered fourth) when the message corresponding to the visual indication 616a was composed (indicated by indication 629-4b in FIG. 6U).

Figure 6X:
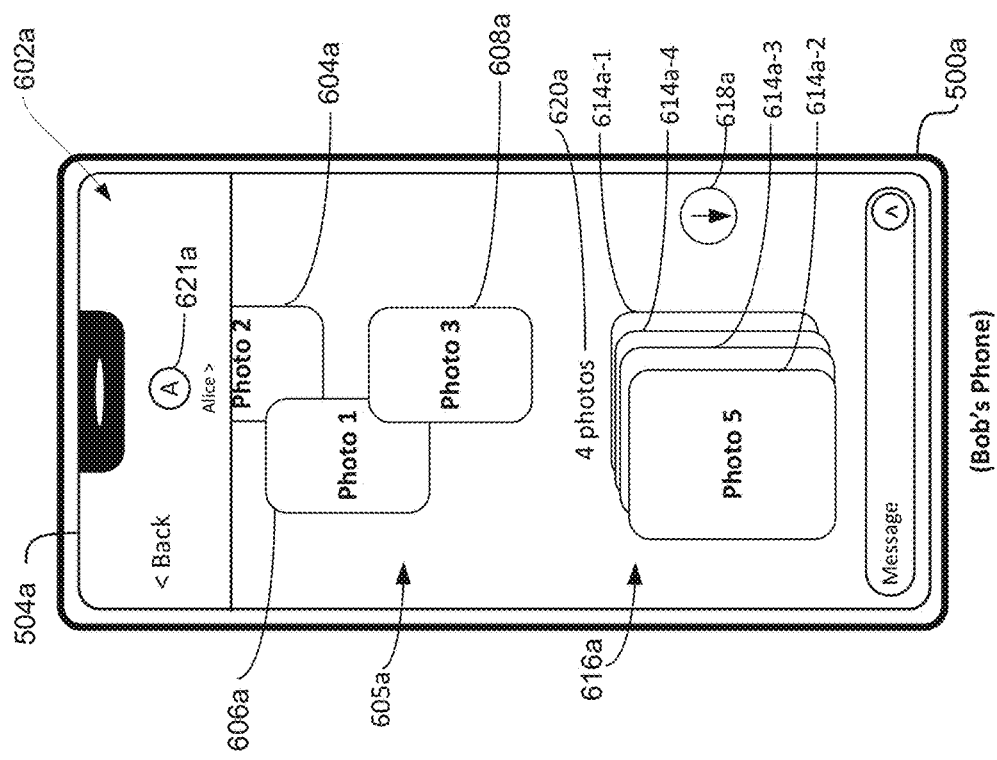
Figure 6W:
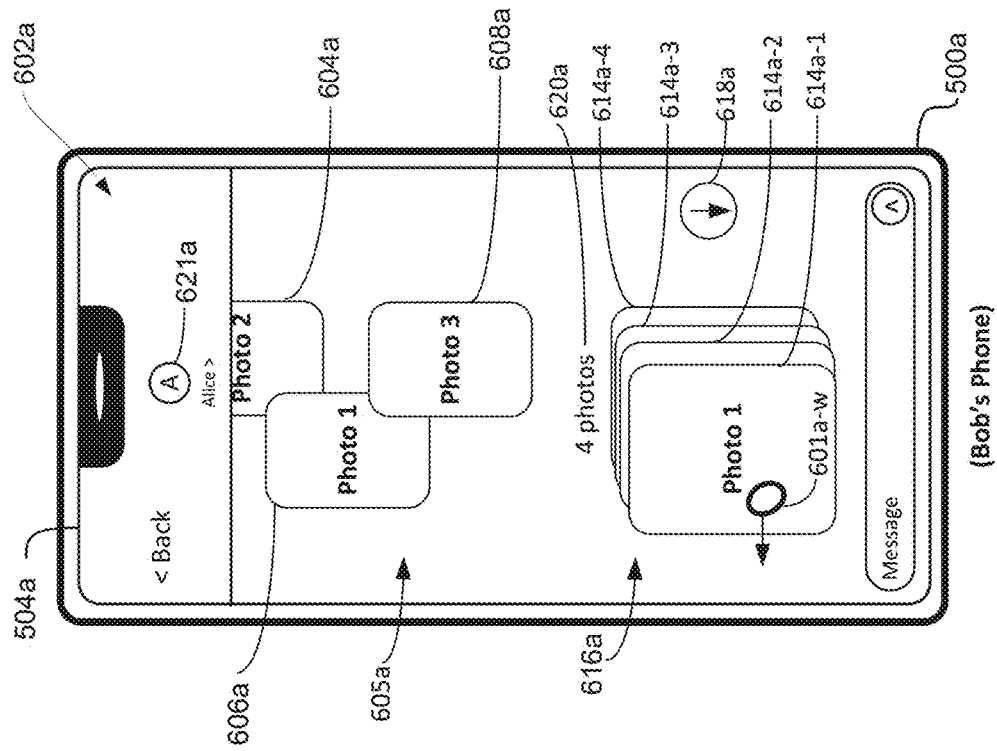

As illustrated in FIG. 6W, visual indication 616a also includes an indication 620a that indicates the number and type of content items included in the stack (4 photos). As will be described in more detail with respect to method 900, indication 620a is selectable, and when selected, causes the electronic device 500a to display the respective photos corresponding to the representations 614a-1 to 614a-4 in a grid (e.g., arranged in rows and/or columns). Additionally, as will be described in more detail below, device 500a also displays a selectable option 618a that, when selected, causes the electronic device 500a to initiate a process to save the respective photos corresponding to the representations 614a-1 to 614a-4 to the electronic device 500a.

In some embodiments, device 500a detects one or more inputs for changing the content item that is displayed at the top of the stack (e.g., by cycling through the stack of content items). For example, in FIG. 6W, while the representation 614a-1 of Photo 1 is being displayed at the top of the stack (e.g., first position in the stack), device 500a detects a request to display the content item currently at the second position in the stack (e.g., the representation 614a-2 of Photo 2) at the top of the stack—indicated by touch contact 601a-w swiping to the left on the stack and/or representation 614a-1. In FIG. 6X, in response to device 500a receiving the input in FIG. 6W, device 500a switches the representation being displayed at the top of the stack from the representation 614a-1 of Photo 1 to the representation 614a-2 of Photo 5. Similarly, because the representation 614a-2 of Photo 5 moved from the second position in the stack to the first position in the stack, the positions of the other content items in the stack are also rearranged accordingly. Specifically, device 500a rearranges the content items in the stack such that the representation 614a-3 of Photo 2 is now being displayed at the second position in the stack (initially at the third position in the stack, as described and illustrated with respect to FIG. 6W), the representation 614a-4 of Photo 4 is now being displayed at the second position in the stack (initially at the fourth position in the stack, as described and illustrated with respect to FIG. 6W), and the representation 614a-1 of Photo 1 is being displayed at the bottom of the stack (initially at the first position in the stack, as described and illustrated with respect to FIG. 6W). It is understood that device 500b could also detect one or more swipes directed to the stack in a rightward direction, which in some embodiments, causes device 500a to analogously display the content item corresponding to the last position in the stack to become displayed at the first position in the stack, and analogously shift the positions of the remainder of the content items in the stack.

In some embodiments, a stack of content items is configured to accept a long swipe input, and when detected, the stack is optionally updated in accordance with the long swipe input in real time. For example, in FIG. 6Y, while the representation of 614a-2 is being displayed at the top of the stack, device 500a detects a touchdown of touch contact 601a-y on the touchscreen 504a (e.g., on the stack) and detects that touch contact 601a-y has swiped by a first amount in the left direction. In response to device 500a detecting the swipe in FIG. 6Y, in FIG. 6Z, device 500a changes the representation being displayed at the top of the stack from the representation 614a-2 of Photo 5 to the representation 614a-3 of Photo 2 (previously at the second position in the stack, as illustrated in FIG. 6Y). Similarly, because the representation 614a-3 of Photo 2 moved from the second position in the stack to the top of the stack, the positions of the other content items in the stack are also rearranged accordingly. Specifically, device 500a rearranges the content items in the stack such that the representation 614a-4 of Photo 4 is now being displayed at the second position in the stack (previously at the third position in the stack, as described and illustrated in FIG. 6Y), the representation 614a-1 of Photo 1 is now being displayed at the third position in the stack (previously at the fourth position in the stack, as illustrated in FIG. 6Y), and the representation 614a-2 of Photo 5 is now being displayed at the fourth (e.g., last) position in the stack (previously at the first position in the stack, as illustrated in FIG. 6Y).

Figure 6Z:
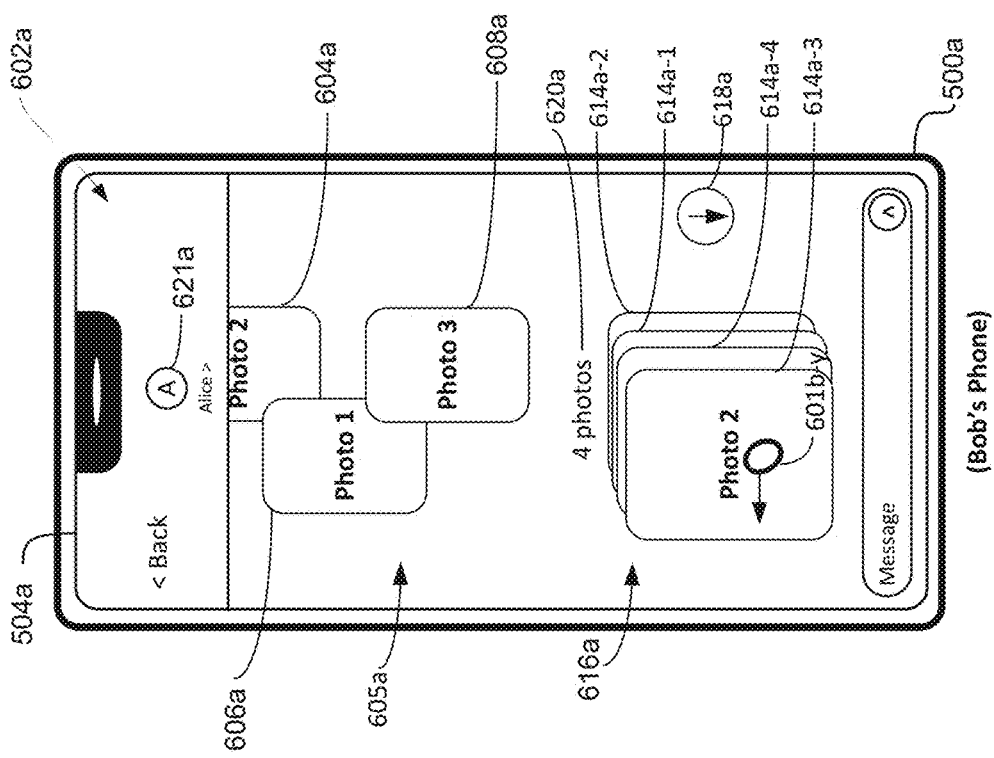
Figure 6Y:
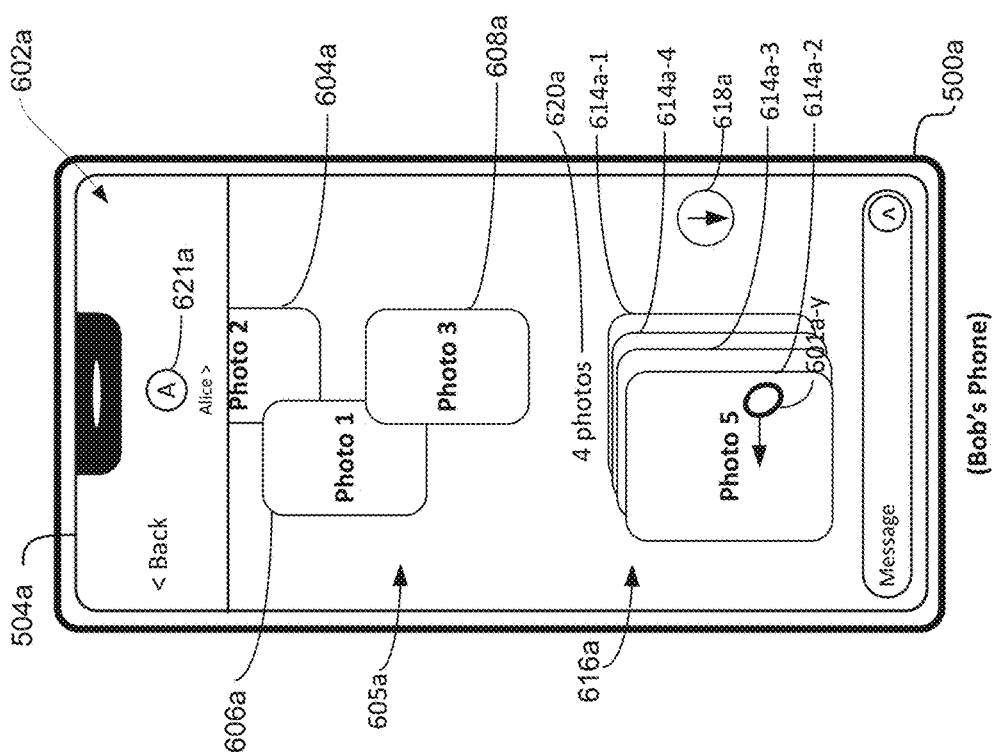
Figure 6B:
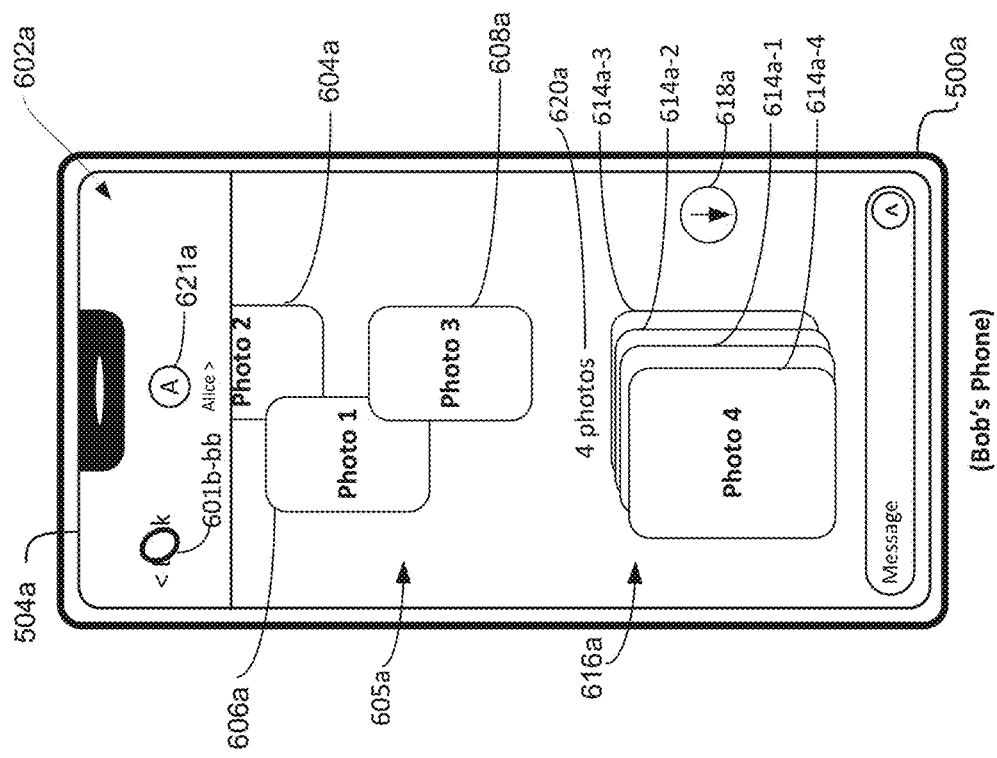
Figure 6A:
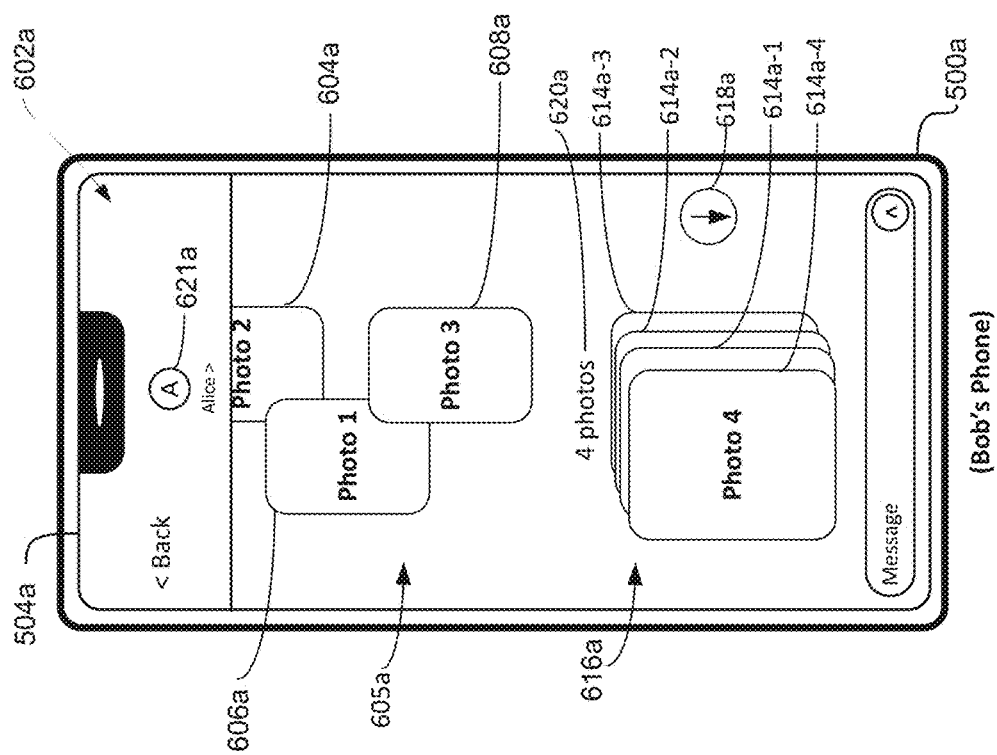
Figure 6D:
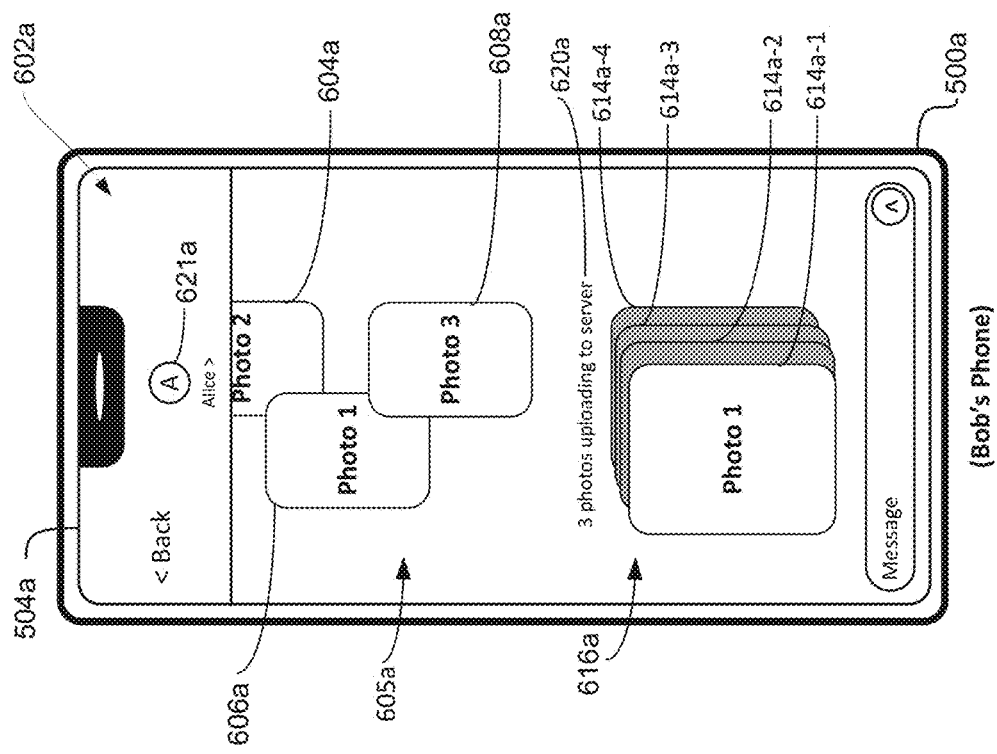
Figure 6C:
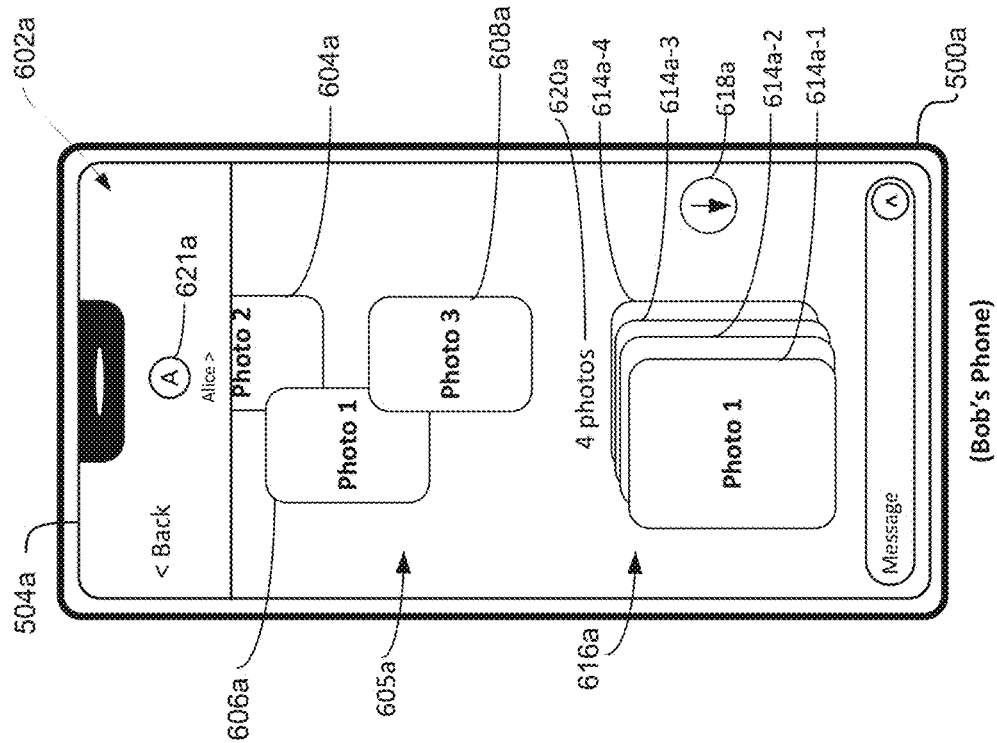
Figure 6F:
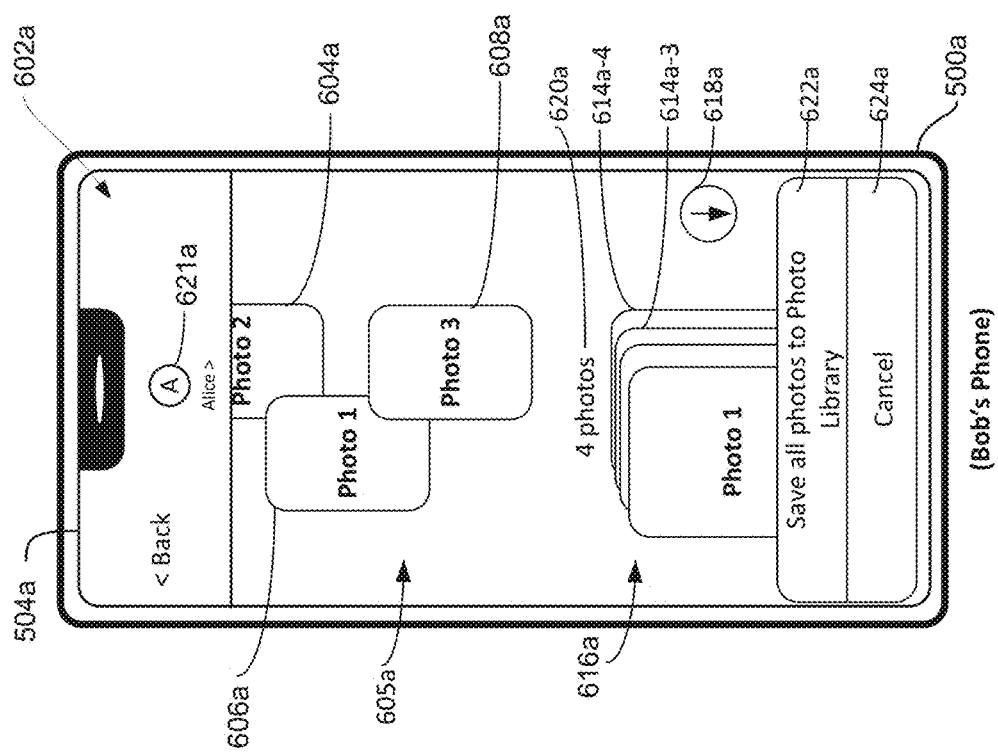
Figure 6E:
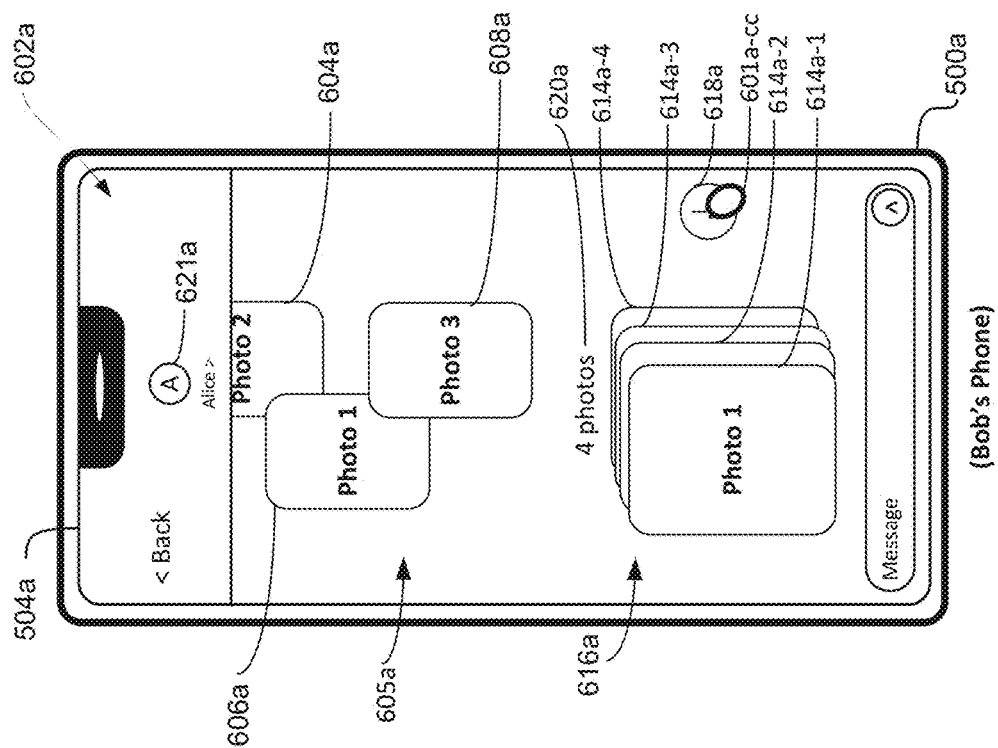
Figure 6H:
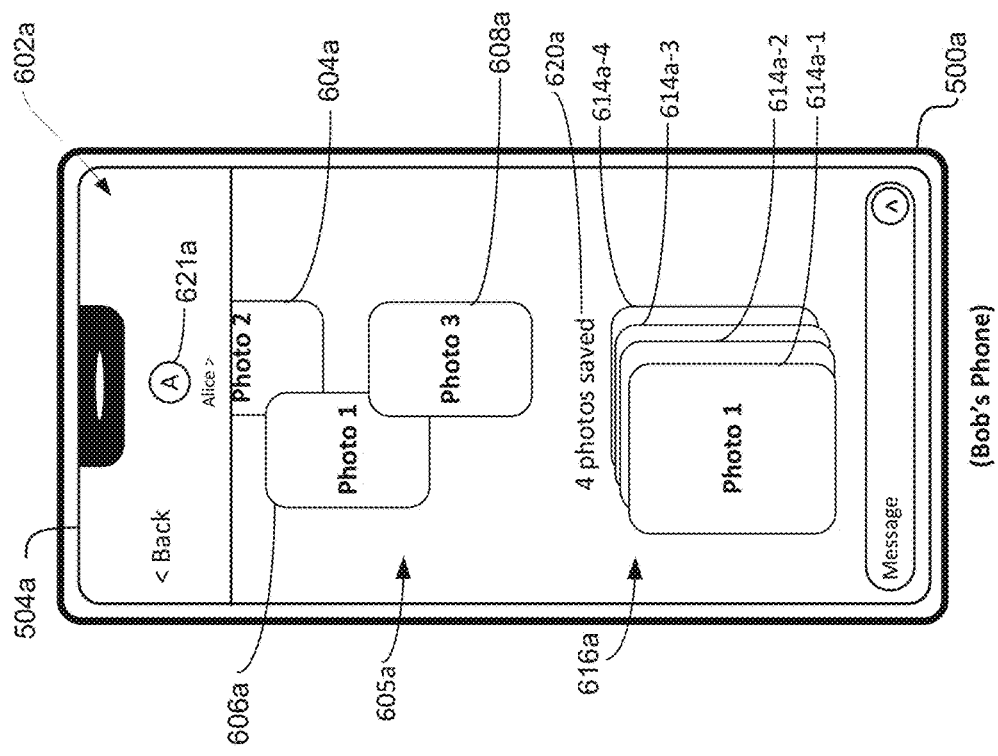
Figure 6G:
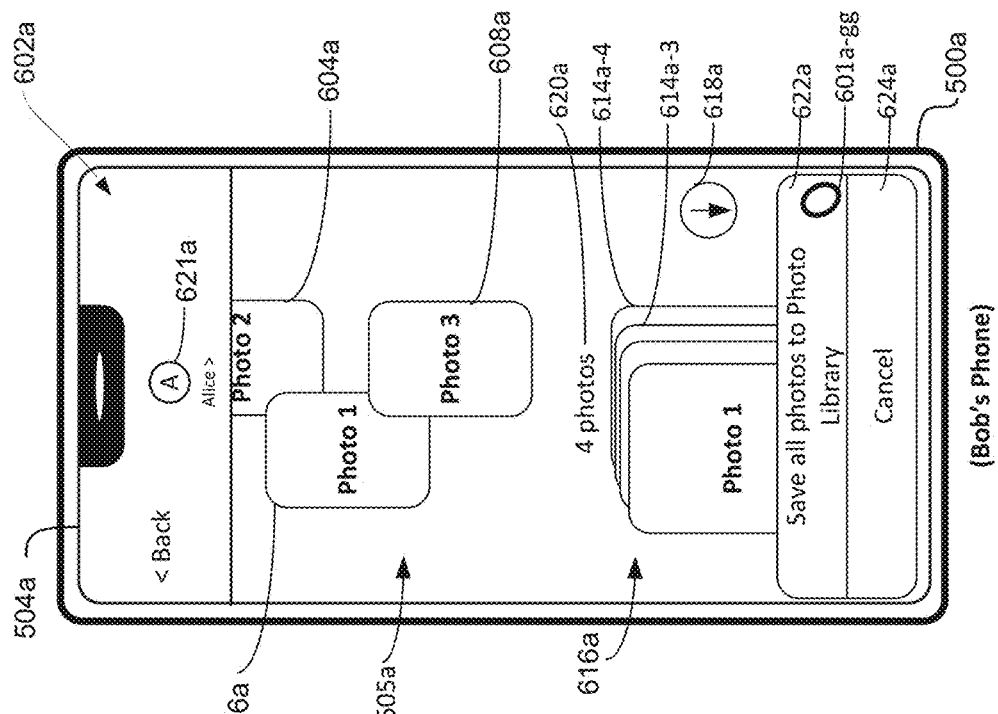
Figure 6J:
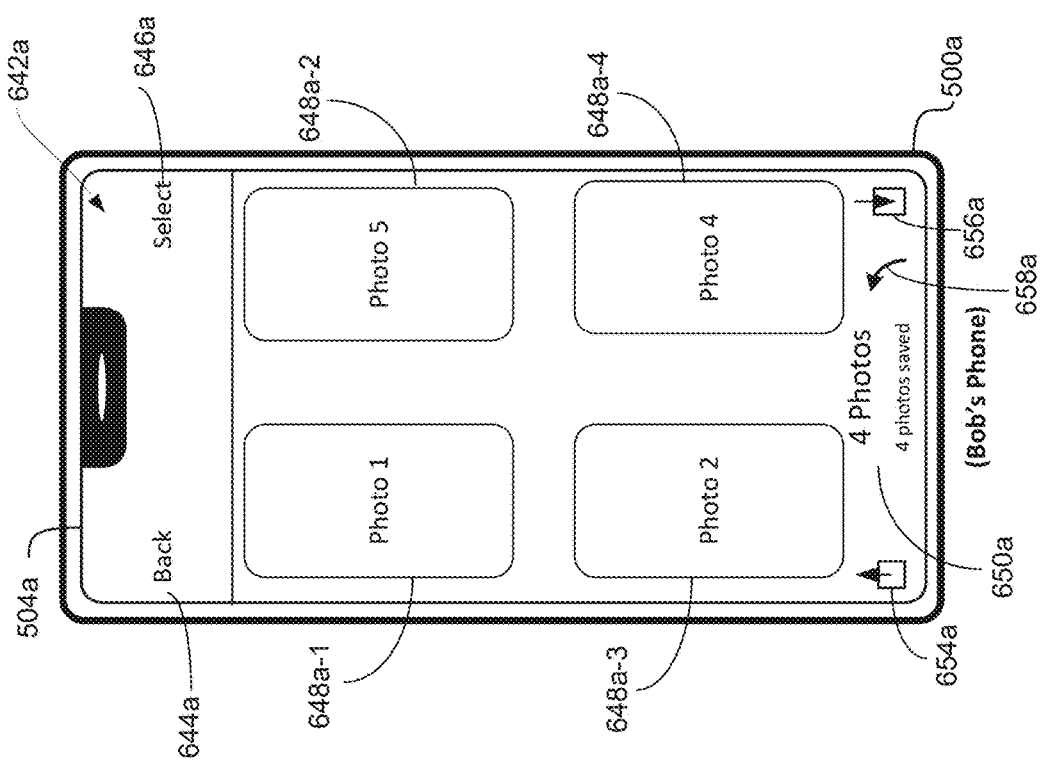
Figure 6I:
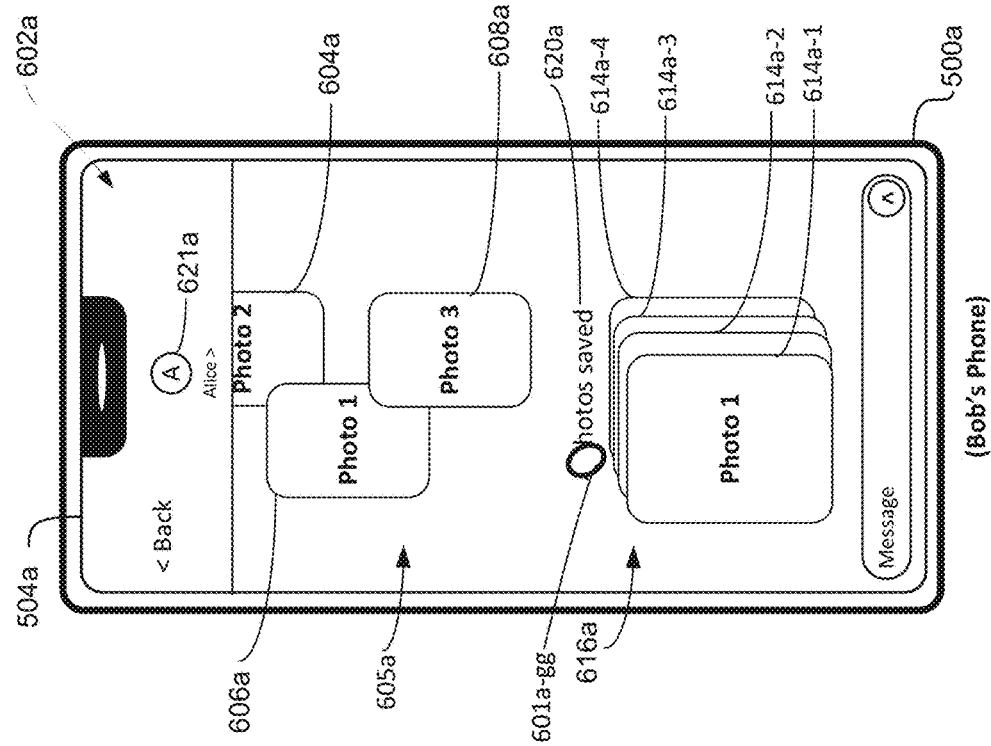

After device 500b updates the positions of the content items in the stack, device 500b detects additional (e.g., continued) movement of touch contact 601b-y in the leftward direction in FIG. 6Z (e.g., without liftoff of the contact between FIGS. 6Y and 6Z). In FIG. 6AA, in response to device 500a detecting continued movement of touch contact 601b-y in FIG. 6Z, device 500a again updates the representation being displayed at the first position in the stack from the representation 614a-2 of Photo 2 to the representation 614a-4 of Photo 4 (previously at the second position in the stack, as illustrated in FIG. 6Z). Similarly, because the representation 614a-4 of Photo 4 moved from the second position in the stack to the first position in the stack, the positions of the other content items in the stack are also rearranged accordingly. Specifically, device 500*a* rearranges the content items in the stack such that the representation 614*a*-1 of Photo 1 is now being displayed at the second position in the stack (initially at the third position in the stack, as illustrated with respect to FIG. 6Z), the representation 614*a*-2 of Photo 5 is now being displayed at the third position in the stack (previously at the fourth position in the stack, as illustrated in FIG. 6Z), and the representation 614*a*-3 of Photo 2 is now being displayed at the fourth position in the stack (previously at the first position in the stack, as described and illustrated with respect to FIG. 6Z).

In some embodiments, the representations included in a stack are displayed in accordance with the priorities originally (e.g., original order) assigned to the corresponding content items (e.g., the ordered assigned to the content items when the corresponding message was being composed) when the electronic device displays a respective messaging conversation after having previously exiting the messaging conversation. For example, in FIG. 6BB, after device 500*a* detected a sequence of inputs to change the positions of the representations 614*a*-1 to 614*a*-4 in the stack, device 500*a* detects a request to stop displaying the messaging conversation (indicated by touch contact 601*b*-*bb* selecting the selectable option labeled "Back"). In some embodiments, in response to detecting the input in FIG. 6BB, the electronic device 500*a* displays, in the messaging user interface 602*a*, one or more representations of messaging conversations that the user of device 500*a* (Bob) is part of (e.g., the messaging conversations that device 500*a* has access to), including a representation of the messaging conversation between the user Bob and the contact Alice. In FIG. 6CC, after device 500*a* received the request to exit the messaging conversation between, device 500*a* received one or more inputs for redisplaying, in the messaging user interface 602, the messaging conversation between the contact named Alice and the user Bob. As illustrated in FIG. 6CC, representations 614*a*-1 to 614*a*-4 are no longer displayed at the positions in the stack illustrated in FIG. 6BB because device 500*a* previously stopped displaying the messaging conversation between Alice and Bob. Instead, the representations 614*a*-1 to 614*a*-4 are displayed at positions in the stack in accordance with the priorities (e.g., order) assigned when the message corresponding to the visual indication 616*a* was composed and added to the messaging conversation (as described previously).

In some embodiments, an electronic device optionally receives an indication of a message that has been recently added to the messaging conversation while the content items of that message are still being uploaded to a respective server. For example, in FIG. 6DD, device 500*a* receives an indication of a new message that has been added to the messaging conversation. In response to receiving the indication, device 500*a* updates the messaging user interface 602*a* to include a visual indication 616*a* corresponding to the new message that was added to the messaging conversation. The visual indication 616*a* includes a stack of content items because the message that corresponds to the visual indication 616*a* includes four photos: Photo 1, Photo 2, Photo 4, and Photo 5 (e.g., content items). The stack of content items includes a representation 614*a*-1 of Photo 1 (corresponding to the Photo 1 in the corresponding message that was added to the messaging conversation), a representation 614*a*-2 of Photo 5 (corresponding to the Photo 5 in the corresponding message that was added to the messaging conversation), a representation 614*a*-3 of Photo 2 (corresponding to the Photo 2 in the corresponding message that was added to the messaging conversation), and a representation 614*a*-4 of Photo 4 (corresponding to the Photo 4 in the corresponding message that was added to the messaging conversation). As indicated by indication 620*a*, three of the content items in the corresponding message are still being uploaded to a server—Photo 5, Photo 2, and Photo 4—and those photos are not available to be downloaded to (e.g., displayed by) device 500*a*. In some embodiments, the representations corresponding to the content items that are not currently able to be displayed by device 500*a* include a placeholder image while the representations of content items that are available for display at device 500*a* include an indication of the corresponding content, as illustrated in FIG. 6DD. For example, the representation 614*a*-4 of Photo 4 (corresponding to the Photo 4 in the corresponding message), the representation 614*a*-3 of Photo 2 (corresponding to the Photo 2 in the corresponding message), and the representation 614*a*-2 of Photo 5 (corresponding to the Photo 5 in the corresponding message) are displayed with a placeholder image because the content items corresponding to these representations are not currently available to be downloaded by device 500*a*. In contrast, the representation 614*a*-1 of Photo 1 (corresponding to the Photo 1 in the corresponding message) is displayed with a visual appearance indicating the content of Photo 1.

As previously mentioned, in some embodiments, the messaging user interface 618*a* includes a selectable option for saving one or more content items corresponding to the representations included in a visual indication of a respective message. For example, in FIG. 6EE, device 500*a* is displaying a selectable object 618*a* that, when selected, causes device 500*a* to initiate a process to save the respective photos corresponding to the representations 614*a*-1 to 614*a*-4 to the electronic device 500*a*. In some embodiments, the selectable option 618*a* is displayed in the messaging user interface because device 500*a* (or a server in communication with device 500*a*) determines that the user of device 500*a* (Bob) is likely to download the photos corresponding to the representations 614*a*-1 to 614*a*-4 (Photo 1, Photo 2, Photo 4, and Photo 5). In some embodiments, device 500*a* does not display the selectable option 618*a* in the messaging user interface 602*b* when device 500*a* (or a server in communication with device 500*a*) determines that a user of device 500*a* is not likely to save/download the content items corresponding to the representations 614*a*-1 to 614*a*-4 and/or because the content items corresponding to the representations 614*a*-1 to 614*a*-4 are of a particular content type (e.g., that is not able to be saved to device 500*a*). In FIG. 6FF, in response to receiving the request in FIG. 6EE, device 500*a* displays a menu that includes a selectable option 622*a* that, when selected, causes device 500*a* to save the photos corresponding the representations 614*a*-1 to 614*a*-4 (Photo 1, Photo 2, Photo 4, and Photo 5) to device 500*a*. In some embodiments, device 500*a* saves the content items to a particular application downloaded on device 500*a* such as a photo and/or video application. The menu displayed by device 500*a* also includes a selectable option 624*a* that, when selected, causes the menu to stop displaying in the messaging user interface 602*a* without saving the photos corresponding to the representations 614*a*-1 to 614*a*-4 to device 500*a*. In FIG. 6GG, while device 500*a* is displaying the selectable options 622*a* and 624*a*, device 500*a* detects a selection of the selectable option 622*a* (indicated by touch contact 610*a*-*gg* tapping the selectable option 622*a*). In FIG. 6HH, in response to detecting the selection in FIG. 6GG, device 500*a* saves the photos corresponding the representations 614a-1 to 614a-4 to device 500a (represented by device 500a updating the indication 620a from indicating the number of content items included at the visual indication 616a (4 photos) to indicating the number of the content items in the visual indication 616a that have been saved (4 photos saved).

As mentioned previously, in some embodiments, selectable option 620a is selectable to display the representations of content items at the visual indication 616a in a grid. For example, in FIG. 6II, device 500a detects a selection of indication 620a (indicated by touch contact 601a-gg tapping the indication 620a). The characteristics of indication 620a will be described in more detail with reference to method 900. In FIG. 6JJ, in response to device 500a receiving the request in FIG. 6II, device 500a displays, in a grid layout, a representation 648-1 of Photo 1 (corresponding to the Photo 1 included in the message that corresponds to visual indication 616a), a representation 648-2 of Photo 5 (corresponding to the Photo 5 included in the message that corresponds to visual indication 616a), a representation 648-3 of Photo 2 (corresponding to the Photo 2 included in the message that corresponds to visual indication 616a), a representation 648-4 of Photo 4 (corresponding to the Photo 4 included in the message that corresponds to visual indication 616a). The operations of selectable options 644a, 646a, 654a, 656a, and 658a, and will be described in detail with reference to method 900.

FIG. 7 is a flow diagram illustrating a method of displaying a plurality of content items in a messaging conversation in accordance with some embodiments. The method 700 is optionally performed at an electronic device such as device 100, device 300, device 500, device 500a, or device 500b as described above with reference to FIGS. 1A-1B, 2-3, 4A-4B and 5A-5H. Some operations in method 700 are, optionally combined and/or order of some operations is, optionally, changed.

As described below, the method 700 provides ways in which an electronic device displays a plurality of content items in a messaging conversation in accordance with some embodiments. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component and one or more input devices (e.g., a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control)). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device displays (702), via the display generation component, a messaging user interface that includes a messaging conversation associated with a plurality of users (e.g., the electronic device and the electronic devices associated with the plurality of users have access to the messaging conversation). In some embodiments, the messaging conversation includes messages sent from the electronic device and messages sent from the electronic devices associated with the plurality of users. In some embodiments, messages sent from the electronic device (e.g., from a user account associated with the electronic device) are displayed on a first side of the messaging conversation (e.g., the right side) and messages sent from a different electronic device (e.g., from a user account associated with the different electronic device) are displayed on a second side (e.g., the left side) of the messaging conversation.

In some embodiments, while displaying the messaging user interface, the electronic device receives (704) an indication of first messaging activity directed to the messaging conversation from a respective user of the plurality of users (e.g., the electronic device receives an indication that a device associated with the respective user has added a message to the messaging conversation. The respective user is optionally the user associated with the electronic device or the user associated with another device that is part of the messaging conversation), such as device 500 receiving the indication that a device associated with the user Alice has added a message to the messaging conversation that included two photos (Photo 1 and Photo 2) as described in FIG. 6A, wherein the first messaging activity includes a plurality of content items that are added to the messaging conversation (e.g., the message added to the messaging conversation includes photos, videos, and/or or other types of media items). In some embodiments, the electronic device receives an indication of first messaging activity when the electronic device associated with the respective user detects a sequence of one or more inputs for transmitting (e.g., adding) a message to the message conversation. In some embodiments, the indication of the first message activity includes text and/or content items such as videos, photos, and/or other types of media items (e.g., gifs, jpegs, etc.) that a respective user has added to the messaging conversation. In some embodiments, the respective user that caused the first messaging activity to be generated is the user of the electronic device. In some embodiments, the respective user that caused the first messaging activity to be generated is a user of a different electronic device. In some embodiments, text is included in the first messaging activity when a device associated with the respective user detects input directed to a (e.g., soft) keyboard (e.g., that is displayed in the messaging user interface). In some embodiments, content items are included in the first messaging activity when a device associated with the respective user receives a sequence of inputs for adding one or more content items (e.g., photos, videos, and/or other types of media items) to the first messaging activity. In some embodiments, the content items are of the same type (e.g., are only photos). Alternatively, in some embodiments, the content items are of different types (e.g., includes photos and videos).

In some embodiments, in response to receiving the indication of the first messaging activity, the electronic device displays (706), (e.g., at a respective location) in the messaging user interface, a first visual indication corresponding to the first messaging activity that includes representations of the plurality of content items, such as device 500a displaying the visual indication 623a in messaging user interface 602 in FIG. 6A. For example, in response to a respective user adding the plurality of content items to the messaging conversation, the electronic device receives an indication that the respective user has added the plurality of content items to the messaging conversation. In some embodiments, in response to the electronic device receiving the indication of the first messaging activity, the electronic device visually indicates (e.g., displays) the plurality of content items included in the first message activity. In some embodiments, displaying the first visual indication includes indicating the user associated with the device that added the plurality of content items to the messaging conversation, as well as the representations of the content items added to the messaging conversation.

In some embodiments, in accordance with a determination that the first messaging activity satisfies one or more criteria (e.g., if content items included in the first messaging activity exceed a respective threshold number of content items (e.g., 4, 8, 12 content items). In some embodiments, the one or more criteria is independent of the respective user or the device associated with the respective user that caused the first messaging activity to be added to the messaging conversation), the representations of the plurality of content items are displayed (e.g., at the respective location) in a first manner (708). For example, if the message corresponding to the visual indication 623a included four or more content items, the representations of those content items would be displayed as a stack, similar to the stack of content items displayed in FIG. 6V. For example, if the content items in the first messaging activity exceed a respective threshold of content items (e.g., 4, 8, 12 content items), the content items are displayed in a manner different than when the content items do not exceed the respective threshold of content items (e.g., 4, 8, 12, content items). In some embodiments, displaying the content items in accordance with the first manner includes displaying the content items with a first visual appearance (e.g., a first color). In some embodiments, displaying the content items in accordance with the first manner includes displaying the plurality of content items in a stack such that each item in the stack corresponds to one of the content items (e.g., the content items are displayed as a collection of items in a single user interface element). In some embodiments, the stack of content items displays one content item at a time (e.g., visually emphasizes one content item while other content items in the stack are visually de-emphasized), and input directed to the stack of content items causes the stack to display (e.g., visually emphasize) a new content items in the stack.

In some embodiments, in accordance with a determination that the first messaging activity does not satisfy the one or more criteria (e.g., if content items included in the first messaging activity do not exceed a respective threshold number of content items (e.g., 4, 8, 12 content items)), the representations of the plurality of content items are displayed (e.g., at the respective location) in a second manner, different from the first manner (710), such as the representations 604a and 606a being displayed partially overlapping in FIG. 6A. For example, if the content items in the first messaging activity do not exceed a respective threshold of content items (e.g., 4, 8, 12 content items), the content items are displayed in a manner different than when the content items do exceed the respective threshold of content items (e.g., 4, 8, 12, content items). In some embodiments, displaying the content items in accordance with the second manner includes displaying the content items with a second visual appearance (e.g., a second color). In some embodiments, displaying the content items in accordance with the second manner includes displaying the plurality of content items includes displaying the content items in a pre-determined (e.g., spatial) layout different from the stack of content items described above. For example, displaying, within the first visual indication, the content items such that at least one content item is partially overlaid another content item (e.g., overlaid at the edges (or corners) of another content item).

The above-described manner of displaying content items of a first message in a first manner or a second manner based on one or more criteria provides an efficient way of displaying content items in a message differently based on criteria satisfied, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more criteria include a criterion that is satisfied based on a number of content items included in the first messaging activity (e.g., including at least 4, 8, 12, 16 content items). For example, if the message added to the message conversation in FIG. 6V did not include four content items, device 500a would not display the representation of those content items, in the messaging user interface 602, in a stack. Similarly, as illustrated in FIG. 6V, when a message that is added to the messaging conversation includes four or more content items, device 500a displays the representations of those content items in a stack. For example, if the number of content items included in the first messaging activity is at least four content items, displaying the first visual indication of the first messaging activity includes displaying the plurality of content items in the first manner (e.g., with a first visual appearance or in a stack of content items as described previously). Similarly, if the number of content items included in the first messaging activity is not more than a respective number of content items (e.g., at least 4, 8, 12, 16 content items), displaying the first visual indication of the first messaging activity includes displaying the plurality of content items in a second manner (e.g., with a second visual appearance or in accordance with a spatial layout where each representation of a content item is at least partially overlaid another representation of another content item (e.g., but is not overlaid two content items)).

The above-described manner of displaying the content items included in the first messaging activity in a first manner or a second manner based on criteria satisfied provides an efficient way of displaying content items included in a first messaging activity differently based on the number of content items included in the first messaging activity, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, displaying the representations of the plurality of content items in the second manner includes displaying the representations of the plurality of content items in a first spatial layout, such as the representations of Photos 1, 2, and 3 overlapping with one another as illustrated in FIG. 6B. For example, the content items at the respective location in the messaging user interface are displayed in accordance with a first spatial layout. In some embodiments, the first spatial layout defines the (e.g., display) size, aspect ratio, etc. of each content item in the messaging user interface and the position of each content item at the respective location. In some embodiments, displaying the plurality of content items in accordance with the first spatial layout includes displaying the representation of the content items with a first size and at positions at the respective location such the representations of content items are at least partially overlaid each other (e.g., overlaid the edges (or corners) of another content item) but not overlaid two content items). In some embodiments, when the plurality of content items are displayed in the second manner and/or first spatial layout, the plurality of content items are not interactable in one or more of the ways described herein and/or method 900 (e.g., not swipable to change the display order of the content items). In some embodiments, displaying the plurality of content items in the first manner includes displaying less than 50% of each content item that is underneath the content items at the top of the stack is visible. In contrast, displaying the plurality of content items in the second manner includes displaying more than 50% of each content item underneath the "top" photo is visible. The above-described manner of displaying representation of content items in a first spatial layout provides an efficient way of displaying representations of content items in accordance with a first spatial layout when one or more criteria are not satisfied, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, displaying the representations of the plurality of content items in the second manner includes, in accordance with a determination that a message composition user interface is being displayed in the messaging user interface (e.g., if the user interface elements for composing a message is being displayed by the electronic device), displaying the representations of the plurality of content items in a second spatial layout, different from the first spatial layout, such as the spatial layout of the representations 604a, 606a, and 608a illustrated in FIG. 6D. (e.g., and different from displaying the representations of the plurality of content items in the first manner). In some embodiments, the message composition user interface includes a soft keyboard and one or more selectable options for adding content items to a new message that is being composed in the messaging user interface. In some embodiments, the message composition user interface is displayed in response to the electronic device detecting a selection of a text entry field that is being displayed in the messaging user interface. For example, if the messaging user interface includes user interface elements for composing a message, the plurality of content items are displayed at the respective location in accordance with a second spatial layout. In some embodiments, the second spatial layout defines the size of the representations of content items and the positions of the representations of content items at the respective location in the messaging user interface. In some embodiments, the size in which the representation of the content items are displayed and/or the positions of the content items at the respective location in the messaging user interface are different than the characteristics defined by the first spatial layout. In some embodiments, before the electronic device displays the messaging composition user interface, the representations of the content items are being displayed at the respective location in accordance with the first spatial layout. In some embodiments, before the message composition user interface is being displayed in the messaging user interface, the messaging user interface is displaying a representation of a first message and a second message in the messaging conversation at respective locations in the messaging user interface. In some such embodiments, the respective locations of the representations of the first message and the second message in the messaging user interface do not change when the electronic device receives a request to display the message composition user interface.

In some embodiments, in accordance with a determination that the message composition user interface is not being displayed in the messaging user interface, displaying the representations of the plurality of content items in the first spatial layout, such as the spatial layout of the representations 604a, 606a, and 608a illustrated in FIG. 6C. For example, if the messaging user interface does not include a user interface for composing a message in the messaging conversation, the representations of the plurality of content items are displayed at the respective location in the messaging user interface in accordance with a first spatial layout. In some embodiments, the first spatial layout defines the size of each content item and the position of each content item at the respective location. In some embodiments, displaying the plurality of content items in accordance with the first spatial layout includes displaying the representation of the content items with a first size and at positions at the respective location in the messaging user interface such the representations of content items are partially overlaid each other (e.g., overlaid the edges (or corners) of another content item) but not overlaid two content items). In some embodiments, if the representations of the plurality of content items are displayed in the first manner, the spatial layout of the representations of the plurality of content items do not change based on whether a messaging composition user interface is being displayed by the electronic device.

The above-described manner of displaying representations of content items in accordance with a first spatial layout or a second spatial layout based on whether the electronic device is displaying a message composition user interface provides an efficient way of displaying representations of content items in a messaging user interface differently based on the user interfaces that are being displayed by the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the messaging user interface, the electronic device receives, via the one or more input devices, a first input corresponding to a request to compose messaging activity that includes one or more content items, such as the input detected by device 500a in FIG. 6C (e.g., the electronic device is displaying a messaging user interface when the electronic device detects a request to compose a respective message. In some embodiments, the request to compose a message is received when the electronic device detects a selection of a text entry field in the messaging user interface).

In some embodiments, in response to receiving the first input, the electronic device updates the messaging user interface to include a content item selection user interface that includes first representations of a first plurality of content items for inclusion in the messaging activity, such as device 500a displaying a selectable option similar to selectable option 610*b* illustrated in FIG. 6G and representations of photos similar to the representations of photos included in FIG. 6G. For example, in response to receiving the request for composing a message, the electronic device displays representations of a plurality of content items (e.g., photos) that are available to be added to (e.g., included in) the message that is currently being composed. In some embodiments, the first representations are being displayed because the content items (e.g., photos) have been recently created (e.g., captured via a camera of the electronic device), have been most recently saved to a photos application on the electronic device, and/or have been most recently modified.

In some embodiments, while displaying the content item selection user interface, the electronic device receives, via the one or more input devices, a sequence of one or more inputs that includes selection of a subset of the first representations of the first plurality of content items for inclusion in the messaging activity, such as the inputs selecting the representations corresponding to Photos 1-5 in FIGS. 6H-6O (e.g., the electronic device detects a request to add one or more photos to the message that is currently being composed. In some embodiments the subset of the first representations of the first plurality of content items are selected when the electronic device detects a touchdown and liftoff of a touch contact at a location corresponding to each of the representations included in the subset).

In some embodiments, in response to receiving the sequence of one or more inputs, the electronic device displays, via the display generation component, one or more indications that the subset of the first representations has been selected for inclusion in the messaging activity, such as device displaying the visual indications 629-1*b* to 629-5*b* in FIG. 6O (e.g., the electronic device provides an indication that the content items corresponding to the subset of the first representations has been added to the message that is currently being composed at the electronic device. In some embodiments, the one or more indications also indicate the priority assigned to the content items corresponding to the selected subset of first representations in the messaging activity).

In some embodiments, in accordance with a determination that the sequence of one or more inputs corresponded to selection of a first representation in the subset of the first representations before selection of a second representation in the subset of the first representations, the one or more indications that the subset of the first representations has been selected for inclusion in the messaging activity also indicate that a content item corresponding to the first representation will have priority over a content item corresponding to the second representation in the messaging activity. For example, the indication 629-1*b* indicates that Photo 1 in the message being composed in messaging user interface 602*b* is assigned with the highest priority. For example, because the content item corresponding to the first representation was added to the messaging activity before the content item corresponding to the second representation was added to the messaging activity, the electronic device assigns the content item corresponding to the first representation with a higher priority than the priority assigned to the second content item. In some embodiments, the priorities assigned to the content items in the messaging activity provide an indication of the order the content items will be displayed once the messaging activity is transmitted to the messaging conversation (or which content items will be visually emphasized over other content items included in the messaging activity).

In some embodiments, in accordance with a determination that the sequence of one or more inputs corresponded to selection of the second representation in the subset of the first representations before selection of the first representation in the subset of the first representations, the one or more indications that the subset of the first representations has been selected for inclusion in the messaging activity also indicate that the content item corresponding to the second representation will have priority over the content item corresponding to the first representation in the messaging activity. For example, because the content item corresponding to the first representation was added to the messaging activity after the content item corresponding to the second representation was added to the messaging activity, the electronic device assigns the content item corresponding to the first representation with a lower priority than the priority assigned to the second content item. In some embodiments, the priorities assigned to the content items in the messaging activity provide an indication of the order the content items will be displayed in a messaging user interface once the messaging activity is transmitted to the messaging conversation (or which content items will be visually emphasized over other content items included in the messaging activity and/or stack of content items).

The above-described manner of indicating the priorities assigned to content items included in the messaging activity provides an efficient way of indicating the order in which the content items will be displayed in a messaging user interface when that messaging activity is added to the messaging conversation, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the messaging user interface includes a message activity input region, such as text entry field 625*b*. In some embodiments, in response to receiving the sequence of one or more inputs, the electronic device updates the message activity input region to include the subset of the first representations that has been selected for inclusion in the messaging activity, such as the representations 613-1*b* and 613-2*b* included in text entry field 625*b* (e.g., representations of the content items that are currently selected for inclusion in the messaging activity are displayed in the message activity input region), wherein the subset of the first representations includes the first representation and the second representation, and the sequence of one or more inputs corresponded to selection of the first representation before selection of the second representation such that the content item corresponding to the first representation will have priority over the content item corresponding to the second representation in the messaging activity (e.g., the content item corresponding to the first representation is currently assigned with a higher priority than the content item corresponding to the second representation because the content item corresponding to the first representation was added to the messaging activity before the content item corresponding to the second representation was added to the messaging activity).

In some embodiments, while displaying the subset of the first representations in the message activity input region, the electronic device receives, via the one or more input devices, second input corresponding to a request to rearrange the first representation relative to the second representation in the message activity input region, such as the input detected in FIG. 6P (e.g., the electronic device detects a request to switch the locations of the first and second representations in message activity input region). In some embodiments, the electronic device receives the second input when a touch contact drags the first representation to the current location of the second representation and/or when the touch contact drags the second representation to the current location of the first representation.

In some embodiments, in response to receiving the second input, the electronic device rearranges the first representation relative to the second representation in the message activity input region in accordance with the second input (such as the reordering of the representations 613-5b and 613-4b in FIG. 6Q), and the electronic device updates priorities associated with the first representation and the second representation such that the content item corresponding to the second representation will have priority over the content item corresponding to the first representation in the messaging activity (such as the priorities of Photo 2 and Photo 4 from the priorities assigned in FIG. 6P to the priorities assigned in FIG. 6Q). For example, after detecting the request to switch the order of the first representation and the second representation in the message activity input region, the electronic device switches the locations of the first representation and the second representation in the message activity input region. Additionally, because the respective positions of the first representation and the second representation in the message activity input region changed, the priorities of the first representation and the second representation are updated accordingly. For example, before the second input is received the content item corresponding to the first representation is assigned with a first respective priority and the content item corresponding to the second representation is assigned with a second respective priority. After the second input is received, the respective priorities assigned to the respective content items are switched—such that the content item corresponding to the first representation is assigned with the second respective priority and the content item corresponding to the second representation is assigned with the first respective priority.

The above-described manner of updating the priorities of content items selected for inclusion in the messaging activity when positions of the representations corresponding to the content items are changed in the message input region provides an efficient way of adjusting the priorities assigned to content items that have been added to the messaging activity, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the content item selection user interface (e.g., the electronic device is currently displaying, in the messaging user interface, a plurality of representations of content items that are available for inclusion in a message being composed in the messaging user interface) and while the first representation and the second representation in the subset of first representations are selected for inclusion in the messaging activity (e.g., the electronic device has detected one or more inputs that have caused the content items corresponding to the first representation and second representation to be included in the messaging activity), wherein selection of the first representation for inclusion in the messaging activity is reflected in a first visual indication displayed in association with the first representation, the first visual indication having a respective visual characteristic having a first value, the electronic device receives, via the one or more input devices, one or more inputs directed to the first representation, such as the touch contact 601b-r and 601b-s in FIGS. 6R and 6S.

In some embodiments, in response to receiving the one or more inputs directed to the first representation, in accordance with a determination that the one or more inputs include more than a threshold number of selections of the first representation, deselecting the first representation from inclusion in the messaging activity, ceasing display of the first visual indication, and updating a priority that the content item corresponding to the second representation will have in the messaging activity, such as Photo 3 being removed from inclusion in the message being composed in FIG. 6S. For example, if the electronic device detects that the first representation has been selected more than a threshold number of times, the content item corresponding to the first representation is removed from the first messaging activity. In some embodiments, the priorities of other content items included in the messaging activity are updated accordingly when a respective content item is removed from the messaging activity. For example, if the messaging activity included a first content item that has the highest priority in the messaging conversation, a second content item that has the second highest priority in the messaging conversation, and a third content item that has the third highest priority in the messaging when the first content item was deselected (e.g., removed) from the messaging activity, the electronic device optionally updates the priority of the second content item to have the highest priority in the messaging activity and updates the priority of the third content item to have the second highest priority in the messaging activity.

In some embodiments, in accordance with a determination that the one or more inputs do not include more than the threshold number of selections of the first representation, displaying the first visual indication with the respective visual characteristic having a second value, different from the first value, while maintaining the first representation as selected for inclusion in the messaging activity and without updating the priority that the content item corresponding to the second representation will have in the messaging activity, such as the priority of Photo 3 in the message being composed remaining the same in FIG. 6R even though touch contact 601b-r selected the representation corresponding to Photo 3. For example, if the first representation has not been selected for more than a threshold number of times, the first visual indication indicates that the another selection of the first representation will cause the content item corresponding to the first representation to be removed from the first messaging activity. In some embodiments, when the first visual indication is displayed with the second value, the visual appearance of the first visual indication is different than when the first visual indication is displayed with the first value.

The above-described manner of removing a content item from a message being composed in the messaging user interface when a representation corresponding to that content item has been selected a predetermined number of times provides an efficient way of removing content items from messaging activity currently being composed in the messaging user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the representations of the plurality of content items in the messaging user interface in the first manner, the electronic device receives an indication of second messaging activity directed to the messaging conversation, wherein the second messaging activity includes a second plurality of content items that are added to the messaging conversation, such as device 500 receiving an indication that a device associated with Alice has added a message including four photos to the messaging conversation in FIG. 6V. In some embodiments, while the electronic device is displaying representations of the plurality of content items at the respective location in the messaging user interface, the electronic device receives an indication of a new messaging activity in the messaging conversation. In some embodiments, the respective user that caused the second messaging activity is the user of the electronic device. In some embodiments, the respective user that caused the second messaging activity is a user of a different electronic device.

In some embodiments, in response to receiving the indication of the second messaging activity, in accordance with a determination that the second messaging activity does not satisfy the one or more criteria (e.g., if the number content items included in the second messaging activity does not exceed a respective threshold number of content items (e.g., 4, 8, 12 content items)), the electronic device concurrently displays, in the messaging user interface, the representations of the plurality of content items in the first manner (e.g., the electronic device does not change the manner in which the representations of content items are presented because the first messaging activity and second messaging activity are independent of each other), and representations of the second plurality of content items in the second manner, such as the manner in which device 500 is displaying the representations of the content items in visual indication 605a and 616a in FIG. 6V (e.g. the representation of the second plurality of content items are displayed in a second manner at a second respective location in the messaging user interface). For example, if the number of content items in the second messaging activity does not exceed a respective threshold of content items (e.g., 4, 8, 12 content items), representations of these content items are displayed in a manner different than when the content items do exceed the respective threshold of content items (e.g., 4, 8, 12, content items). In some embodiments, displaying the representations of the second plurality of content items in the second manner includes displaying the second plurality of content items with a second visual appearance (e.g., a second color). In some embodiments, displaying the representations of the second plurality of content items in the second manner includes displaying the representations of the second plurality of content items in a pre-determined (e.g., spatial) layout different from the stack of content items described above. For example, displaying, at a second respective location in the messaging user interface, the representations of content items such that at least one content item is partially overlaid another content item (e.g., overlaid at the edges (or corners) of another content item).

The above-described manner of displaying representations of content items differently based on whether the corresponding messaging activity satisfies one or more criteria provides an efficient way of displaying content items in a messaging user interface differently based on criteria satisfied, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, displaying the representations of the plurality of content items in the first manner includes displaying the representations of the plurality of content items as a stack of representations of content items, such as in the stack illustrated in FIG. 6V. For example, if the number of content items included in the first messaging activity is at least four content items, the representations of the plurality of content items are displayed as a stack of representations. In some embodiments, displaying the representations of content items in a stack includes displaying each of the representations of content items with varying priority levels (e.g., varying levels of visual emphasis and/or visual prominence). In some embodiments, the electronic device prioritizes the display of a respective representation in the stack (e.g., a representation of a content item is not obscured by other representations of other content items). In some embodiments, (e.g., swipe) input directed to the stack causes the stack to prioritize display of a representation of a new content item. In some embodiments, the second manner is different from the first manner because a (e.g., swipe) input directed to the representations of content items does not cause a representation of a new content item to be prioritized. In some embodiments, when the stack of representations of content items are initially displayed in the messaging user interface, the electronic device provides an indication that input can be directed to the stack (e.g., the representations in the stack spread apart (fan out) in an animation when initially displayed in the messaging user interface).

The above-described manner of displaying representation of content items as a stack provides an efficient way for displaying a plurality of representation of content items as a stack when criteria for displaying the representations of content items in the first manner is satisfied, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, displaying the representations of the plurality of content items in the first manner includes displaying, in the messaging user interface in association with the representations of the plurality of content items, a selectable option that is selectable to display a respective user interface that includes the representations of the plurality of content items displayed in a third manner, different from the first manner, such as the indication 620a in FIG. 6II. For example, if the electronic device is displaying plurality of content items included in the first visual indication in the first manner, the first visual indication also includes a selectable option to display the plurality of content items in rows and columns (e.g., arranged in accordance with a "grid" layout). In some embodiments, the selectable option is displayed regardless of the respective manner in which the electronic device is displaying the plurality of content items included in the first visual indication. In some embodiments, the selectable option is not displayed in the first visual indication if the electronic device is displaying the plurality of content items in accordance with a second manner.

The above-described manner of displaying a selectable option, that when selected, displays the plurality of content items in a third manner provides an efficient way of displaying the plurality of content items in different manners in response to an input, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the selectable option includes status information for the plurality of content items, such as the status indicated in indication 620a in FIG. 6II ("4 photos saved"). For example, in some embodiments, the selectable option (e.g., included in the first visual indication) provides information about the plurality of content items with respect to the electronic device. For example, if the none of content items corresponding to the representations of content items (e.g., included in the first visual indication) have been saved to the electronic device, the selectable option indicates the number of content items that can be saved/downloaded to the electronic device (e.g., "2 content items", "10 content items", etc.). In some embodiments, if a subset of the content items included in the first visual indication have been downloaded to the electronic device, the selectable option indicates the number of content items that have been downloaded (e.g., while also indicating the total number of content item that can be downloaded to the electronic device). In some embodiments, if the electronic device does not have access to a respective number of content items included in the visual indication because those content items are still being uploaded to a particular server, the selectable option indicates the number of content items that are still uploading to the server. In some embodiments, the selectable option indicates when the electronic device will no longer have access to the content items included in the first visual indication (e.g., the date at which the content items expire).

The above-described manner of indicating a status of the plurality of content items provides an efficient way of indicating a status of the plurality of content items with respect to an electronic device that is displaying the plurality of content items, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that the first messaging activity satisfies one or more second criteria, displaying, in the messaging user interface in association with the representations of the plurality of content items, a selectable option that is selectable to initiate a process to save the plurality of content items to the electronic device, such as the selectable option 618a in FIG. 6FF. For example, if the content items corresponding to the plurality of representations of content items included in the first visual indication is downloadable to the electronic device (or a determination has been made that a user of the electronic device is likely to download the plurality of content items (e.g., exceeds a probability threshold such as 70%, 80%, 90%, etc.)), the electronic device updates the messaging user interface to include a selectable option for downloading/saving the plurality of content items to the electronic device. In some embodiments, if a subset of the plurality of content items have previously been downloaded to the electronic device, initiating the process to save the plurality of content items to the electronic device includes initiating a process to download/save the plurality of content items that have not previously been downloaded (e.g., without initiating a process to download/save the plurality of content items that have already been saved/downloaded to the electronic device). In some embodiments, if none of the plurality of content items have been downloaded to the electronic device, initiating the process to save the plurality of content items to the electronic device includes initiating a process to download/save all of the content items included in the plurality of content items to the electronic device (or to a respective application available on the electronic device).

The above-described manner of displaying a selectable option for downloading/saving the plurality of content items provides an efficient way for initiating a process to save the plurality of content items from messaging user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, displaying the representations of the plurality of content items in the first manner includes displaying, in the messaging user interface in association with the representations of the plurality of content items, status information for the plurality of content items (e.g., while the representations of the content items included in the first visual indication are being displayed in the first manner, the electronic device displays a status of those content items with respect to the electronic device). In some embodiments, when none of the content items have been saved/downloaded to the electronic device, the status information indicates the total number of content items available to be saved to the electronic device (e.g., the number of content items that correspond to the first visual indication). In some embodiments, when a portion of the plurality of content items have been previously saved/downloaded to the electronic device, the status information indicates the number of content of the plurality of content items that have bene previously saved/downloaded.

In some embodiments, while displaying the selectable option that is selectable to initiate the process to save the plurality of content items to the electronic device, the electronic device receives, via the one or more input devices, a first input corresponding to selection of the selectable option (e.g., the electronic device detects a request to download the plurality of content items while the electronic device is displaying the messaging user interface), such as the input 601a-cc selecting selectable option 618a in FIG. 6EE. In some embodiments, in response to receiving the first input, the electronic device initiates the process to save the plurality of content items to the electronic device. In some embodiments, initiating the process to save the plurality of content items to the electronic device includes initiating a process to save all of the plurality of content items that are not currently downloaded to the electronic device. In some embodiments, the electronic device prompts a user of the electronic to confirm/approve the process to save the plurality of content items to the electronic device. In some embodiments, after initiating the process to save the plurality of content items to the electronic device (e.g., after the plurality of content items are saved to the electronic device), the electronic device 500 updates the status information for the plurality of content items to indicate that the plurality of content items are saved to the electronic device, such as the status updating from "4 photos" in FIG. 6EE to "4 photos saved" in FIG. 6HH. For example, before the request to save the plurality of content items was received the status information associated with the plurality of content items was indicating that none of the plurality of content items are currently saved to the electronic device. After the request to save the plurality of content items was received (and after the plurality of content items have been successfully saved to the electronic device), the electronic device updates the status information from indicating that none of content items are currently saved to the electronic device to indicating that all of the content items are currently saved to the electronic device (e.g., indicates that the respective number of the plurality of content items that are currently saved to the electronic device).

The above-described manner of updating the status information displayed in the messaging user interface when the status of the plurality of content items with respect to the electronic device changes provides an efficient way for indicating the current status of the plurality of content items with respect to the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the representations of the plurality of content items (e.g., included in (or displayed at) the first visual indication) includes a first representation of a first content item (e.g., a first photo, a first video), and displaying the representations of the plurality of content items in the first manner includes, in accordance with a determination that the first content item is available for viewing, displaying the first representation of the first content item with a first visual appearance and at position corresponding to a first priority in the representations of the plurality of content items, such as the appearance and position of the representation 614a-1 of Photo 1 in the stack in FIG. 6DD. For example, the priority of the first representation (e.g., assigned to the first representation) of the first content item changes based on whether the electronic device has access to the first content item. For example, if the first content item is able to be displayed by the electronic device, the representation of the first content is displayed with a higher priority over content items that are not available to be displayed by the electronic device. In some embodiments, displaying the first representation of the first content with the first visual appearance includes displaying the first content item (or a representation of the first content item). In some embodiments, if the visual indication is displaying the plurality of content items in a stack, the representation of the first content item is closer to the top of the stack (e.g., the position of the representation of the first content item is closer to the top of the stack) than the representations of other content items that are not available for display/viewing (e.g., the positions of the representation of the other content items are further from the top of the stack than the first representation of the first content item). In some embodiments, the first content item is not available for viewing if the electronic device is not able to download the content item from a respective server.

In some embodiments, displaying the representations of the plurality of content items in the first manner includes, in accordance with a determination that the first content item is not available for viewing, displaying the first representation of the first content item with a second visual appearance, different from the first visual appearance, and at position corresponding to a second priority, lower than the first priority, in the representations of the plurality of content items, such as displaying the representation 614a-1 of Photo 1 at the second position in the stack in FIG. 6DD if Photo 1 is still being downloaded from a server. For example, the priority assigned to the first representation of the first content item is lower when the first content item is not available for viewing. In some embodiments, the first content item is not available for viewing if the first content item is still being uploaded to a server (e.g., unable to be downloaded by the electronic device). In some embodiments, when the first content item is not available for viewing, displaying the representation of the first content item with the second visual appearance includes displaying a placeholder image or placeholder gray box (e.g., until the first content item is available for viewing). In some embodiments, if the first visual indication includes the plurality of content items displayed in a stack, the representation of the first content item is displayed closer to the bottom of stack than the representations of content items that are available for viewing.

The above-described manner of changing the priority of the representation of the first content item based on whether the first content item is available for viewing provides an efficient way of prioritizing the display of representations of content items that are available for viewing, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the representations of the plurality of content items in the first manner, wherein the representations of the plurality of content items are displayed in a first order in the first manner (e.g., the electronic device is currently displaying the plurality of content items in a particular order at the first visual indication. In some embodiments, the order corresponds the positions of the representations of the plurality of content items in a stack (e.g., the visual order of the representations of the content items displayed at the first visual indication)), the electronic device receives, via the one or more input devices, a first input directed to the representations of the plurality of content items, such as the input 601a-w in FIG. 6W.

In some embodiments, in response to receiving the first input, in accordance with a determination that the first input includes movement that satisfies one or more second criteria (e.g., if the first input corresponds to a horizontal swipe or dragging gesture performed on the stack of content items), the electronic device updates display of the representations of the plurality of content items to display the representations of the plurality of content items in a second order, different from the first order, in the first manner, such as the order of the representations illustrated in FIG. 6X. In some embodiments, if the movement is a vertical swipe or dragging gesture, the movement does not satisfy the one or more second criteria, and instead of updating the order of the content items in the stack, the electronic device scrolls through the messaging user interface, optionally including scrolling the stack of content items out of view on the display. For example, if a first representation of a first content item is being displayed with the highest priority in the first visual indication (e.g., at the top of the stack) when the first input is received, a second representation of a second content item is displayed with the highest priority (e.g., at the top of the stack) in response to the first (e.g., swipe) input. In some embodiments, as a result, the second representation of the second content item moving from a respective position in the stack to the top of the stack (e.g., the first position in the stack), the respective positions of the other content items in the stack are also rearranged accordingly. In some embodiments, if the electronic device is displaying the representations of the plurality of content items in accordance with the second manner, the order of the representations of the plurality of content items do not change in response to an input.

The above-described manner of changing the order of the representations of the plurality of content items at a respective visual indication in response to an input provides an efficient way for display content items in different orders, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that the respective user indicated a first respective order for the representations of the plurality of content items in the first messaging activity, the first order is the first respective order. For example, the electronic device displays the representations of the plurality of content items in the order (e.g., in accordance with the priority) assigned to the corresponding content items when the respective user was composing the message that corresponds to the first visual indication (e.g., the first messaging activity). In some embodiments, the first respective order corresponds to the order in which the content items were added to the first messaging activity.

In some embodiments, in accordance with a determination that the respective user indicated a second respective order, different from the first respective order, for the representations of the plurality of content items in the first messaging activity, the first order is the second respective order. For example, the electronic device displays the representations of the plurality of content items in the order (e.g., in accordance with the priority) assigned to the corresponding content items when the respective user was composing the message that corresponds to the first visual indication (e.g., the first messaging activity). In some embodiments, the second respective order corresponds to the order in which the content items were added to the first messaging activity.

The above-described manner of visually ordering the representations of content items at a visual indication of a messaging activity different based on priorities assigned to the content items during composition of that message activity provides an efficient way for display content items in different orders, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the representations of the plurality of content items in the second order in the first manner, the electronic device cases display of the messaging user interface, such as in response to the input 601b-bb selecting the selectable option in FIG. 6BB. For example, the electronic device ceases displaying the messaging user interface in response to the electronic device detecting a selection of a "Back" button or "Done" button in the messaging user interface. In some embodiments, after ceasing display of the messaging user interface, the electronic device displays the messaging user interface, including the messaging conversation associated with the plurality of users, wherein the messaging user interface includes the representations of the plurality of content items displayed in the first order in the first manner, such as the order of the representations 614a-1 to 614a-4 in FIG. 6CC. For example, the representations of content items included in the first visual indication are displayed in accordance with the priorities originally assigned to the corresponding content items (e.g., the priorities assigned while the first messaging activity was being composed), even if the order of the content items was previously changed in the messaging user interface in response to user input after the messaging activity was composed and transmitted to the messaging conversation.

The above-described manner of displaying representations of content items at a first visual indication in accordance with the order defined by the respective user that composed the corresponding message activity provides an efficient way for displaying the representation of content items based on the ordering defined by the respective user after the order of those representations have changed in response to one or more inputs, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the ways of displaying representations of a plurality of content items in a messaging conversation described above with reference to method 700 optionally have one or more of the characteristics of the ways for interacting with a plurality of representations of content items described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 7 are, optionally, implemented by components depicted in FIGS. 1A-1B. For example, receiving operation 704 and displaying operations 702 and 706, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Selection of a Content Item in a Messaging User Interface

Users interact with electronic devices in many different manners, including using electronic devices for accessing user interfaces associated with one or more content items in a messaging conversation. In some embodiments, the user interfaces associated with a respective content item in a messaging conversation include selectable option(s) for adding messaging activity to that respective content item in the messaging conversation. The embodiments described below provide ways in which an electronic device displays user interfaces associated with content items in a messaging conversation. Providing efficient manners of accessing user interfaces associated with a respective content item in a messaging conversation reduces the amount of time a user needs to interact with the device, which increases battery life for battery-powered devices. It is understood that people use devices. When a person uses a device, that person is optionally referred to as a user of the device.

FIGS. 8A-8LLL illustrate various way of interacting with a plurality of content items in a messaging conversation in accordance with some embodiments of the disclosure. The embodiments in these figures are used to illustrate the processes described below, including the processes described with reference to FIG. 9. Although FIGS. 8A-8LLL illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8LLL.

Figure 8D:
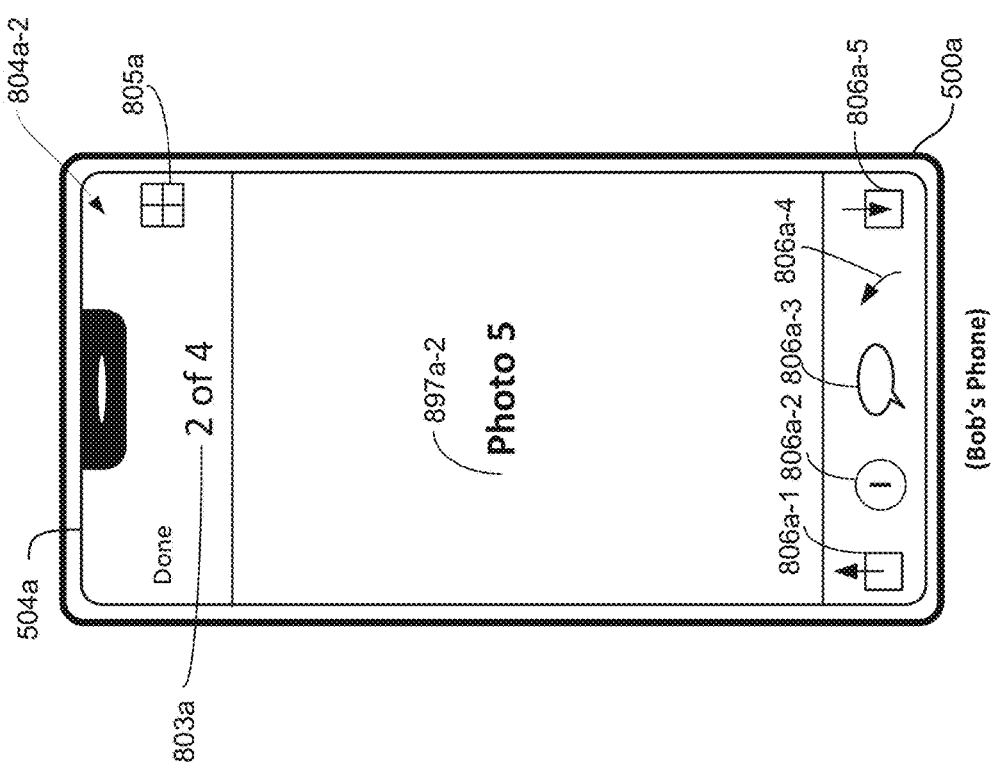
FIGS. 8A-8LLL illustrate various way of interacting with a plurality of content items in a messaging conversation in accordance with some embodiments of the disclosure.
Figure 8C:
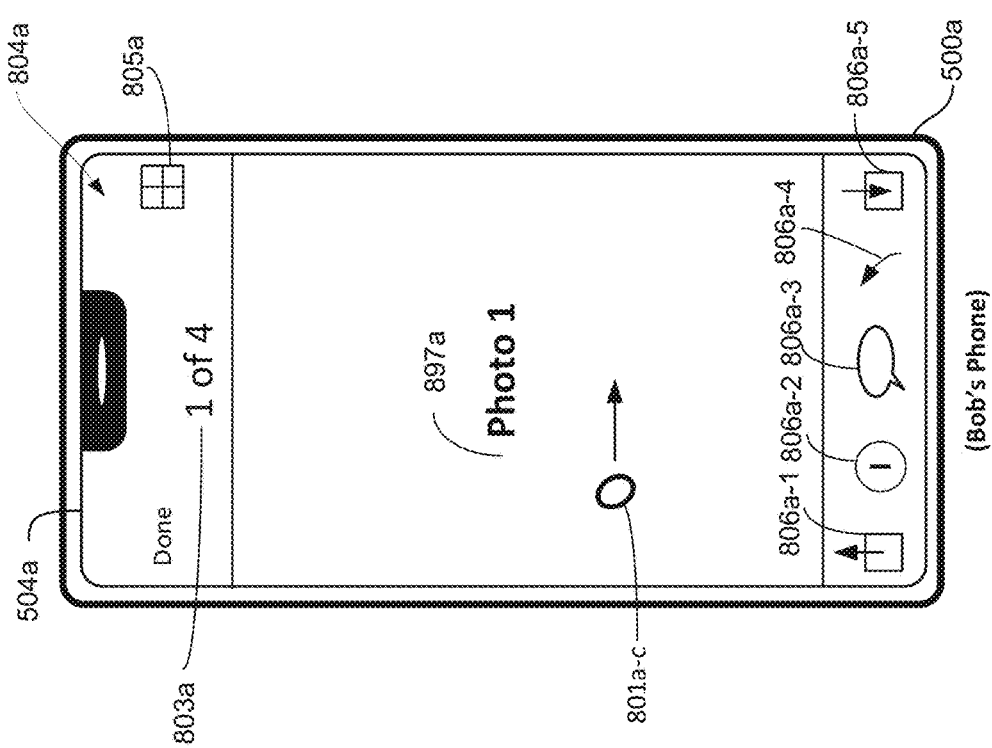
Figure 8F:
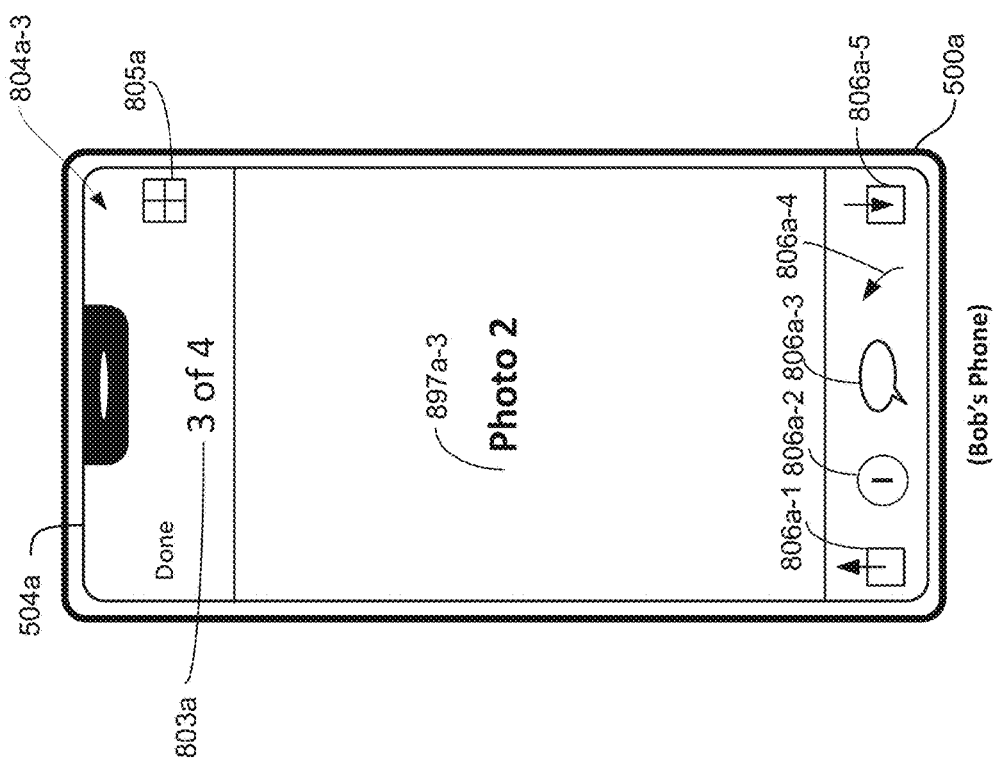
Figure 8E:
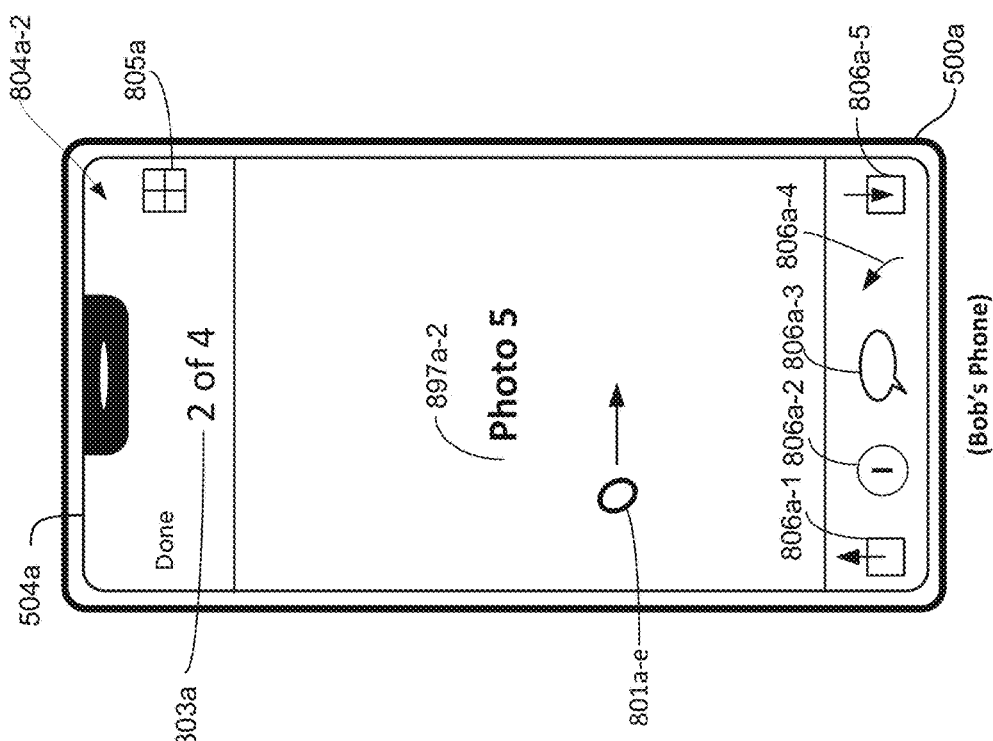
Figure 8L:
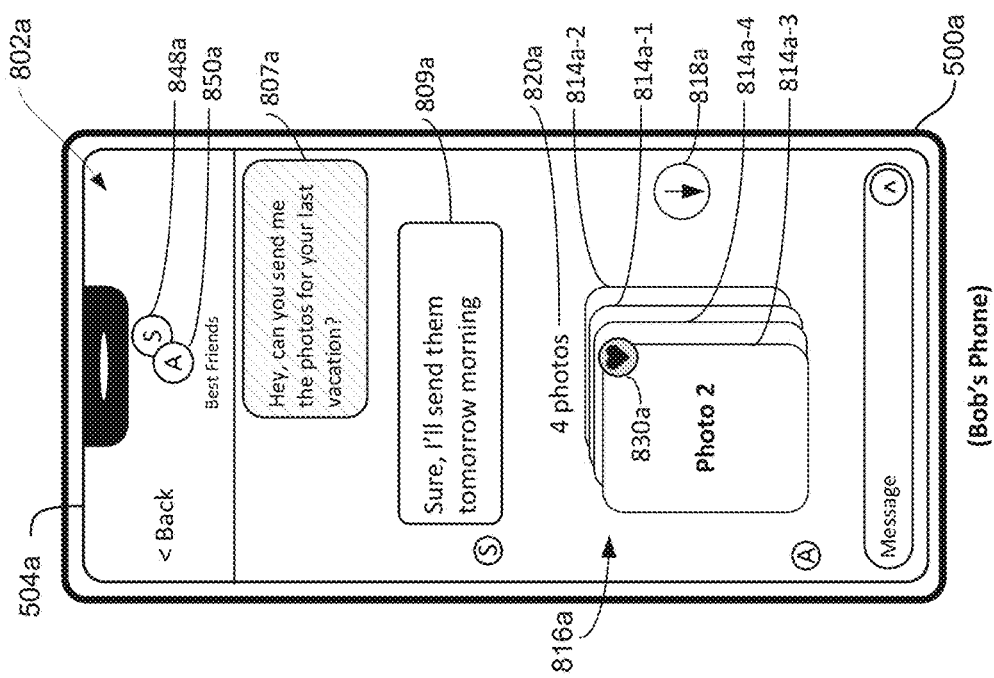
Figure 8K:
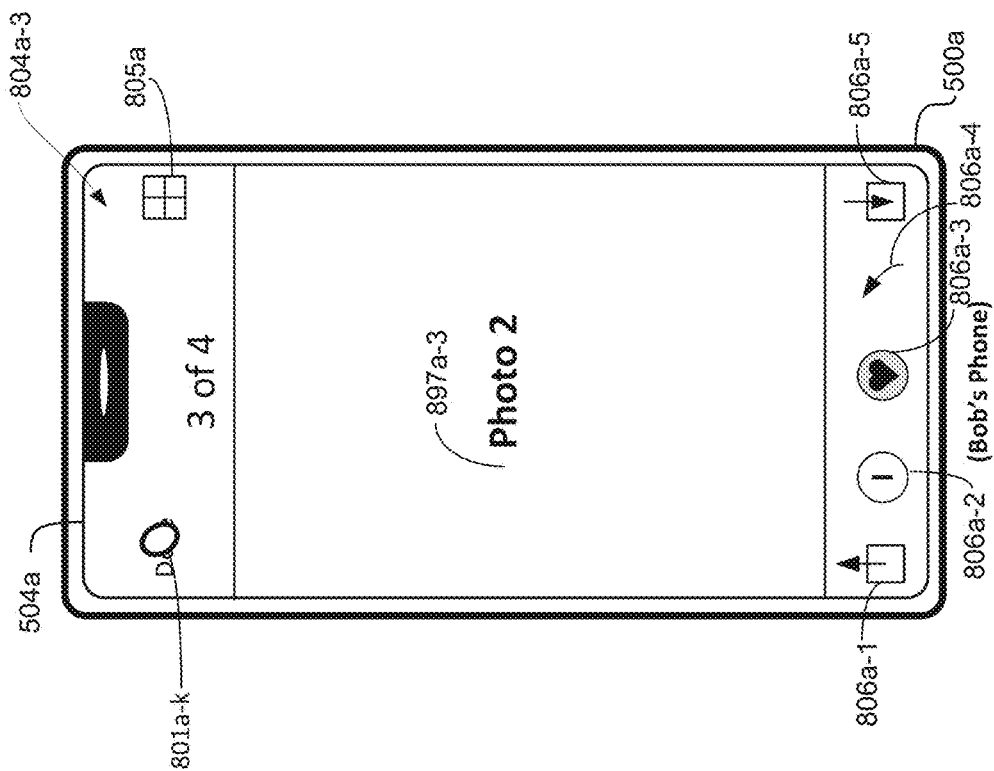
Figure 8T:
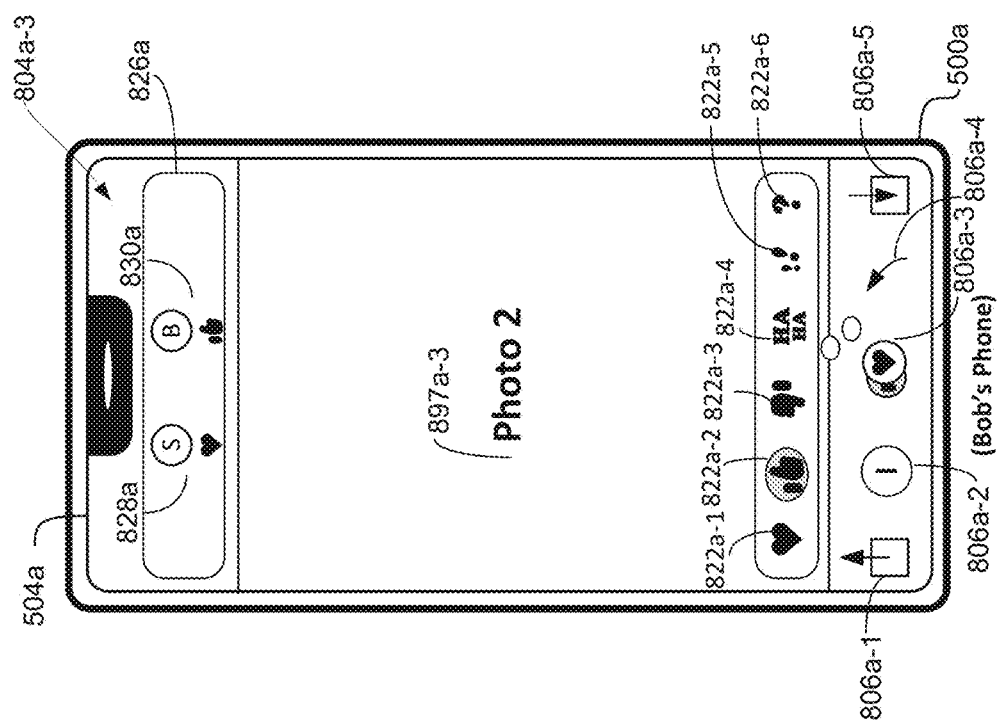
Figure 8S:
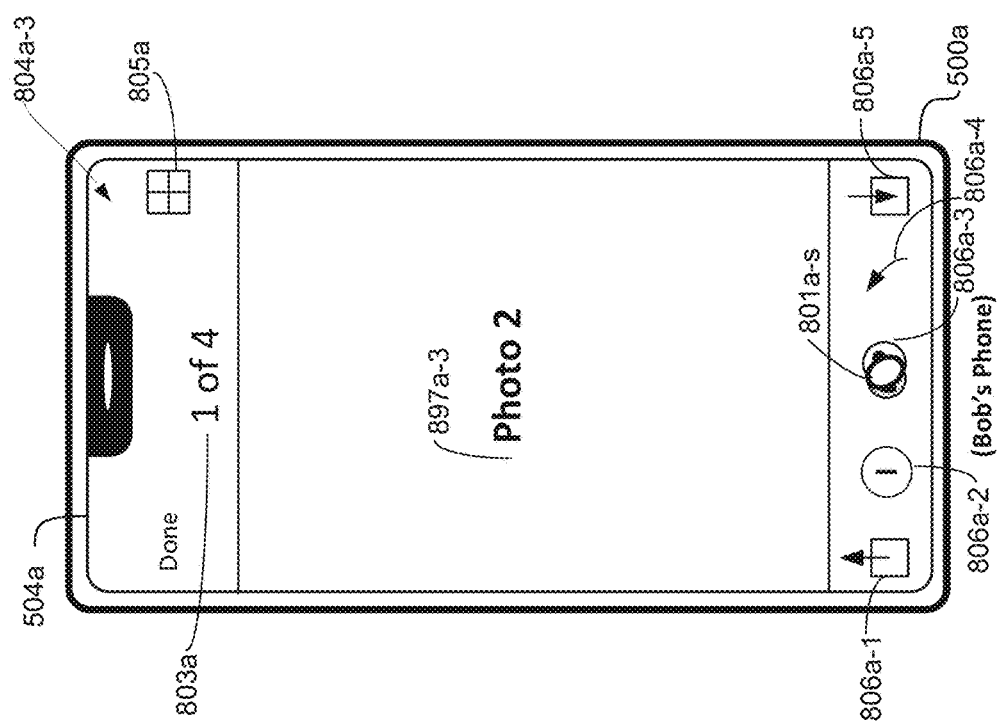
Figure 8V:
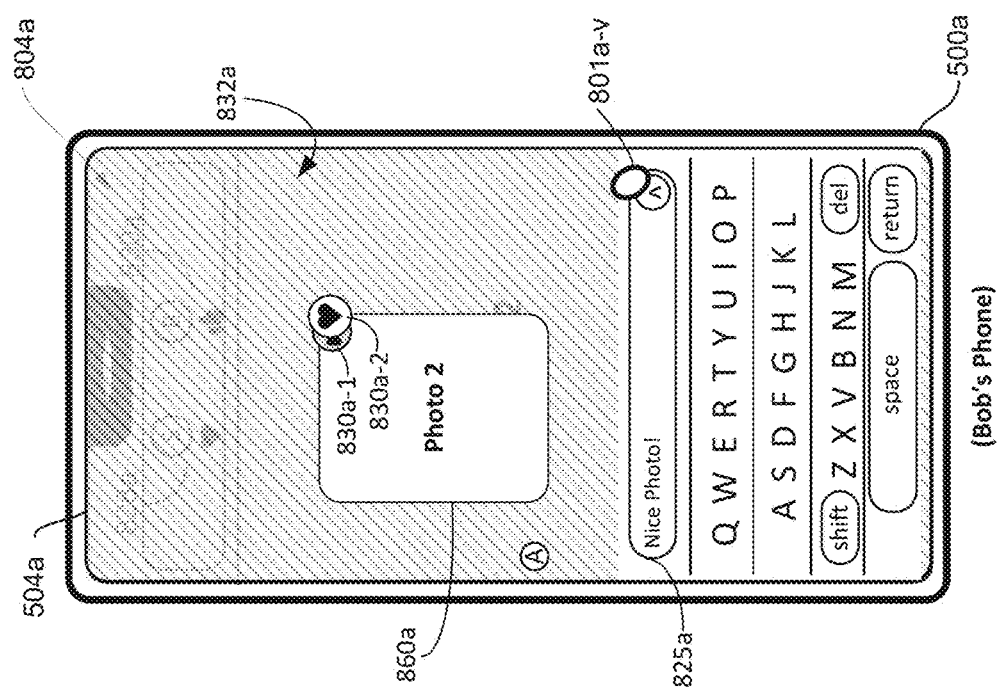
Figure 8U:
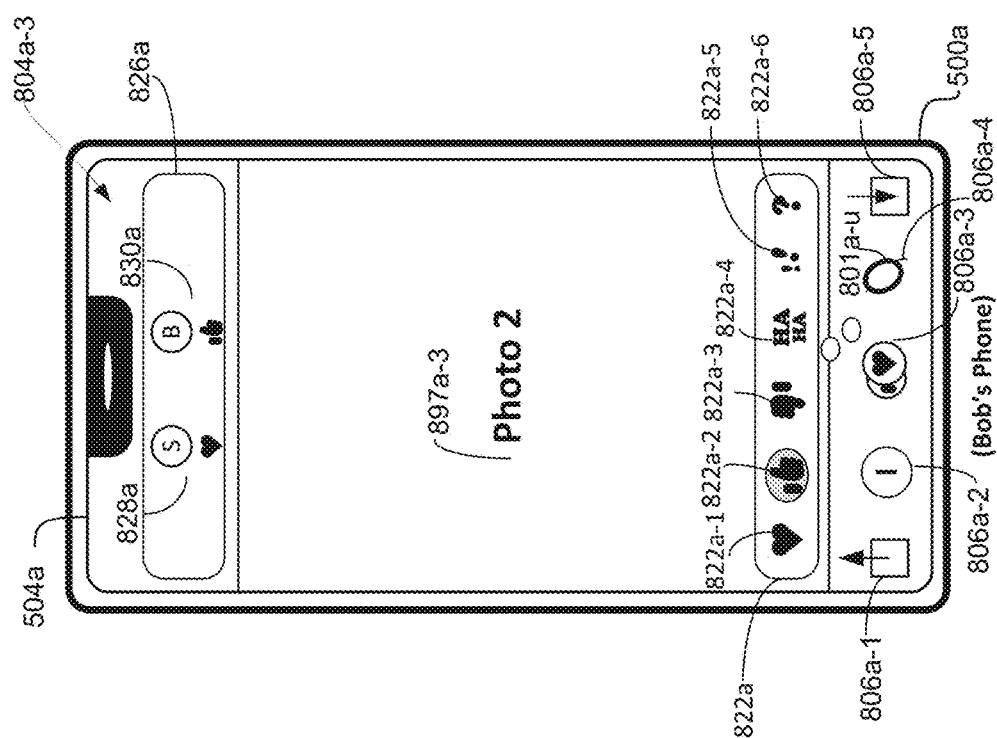
Figure 8Y:
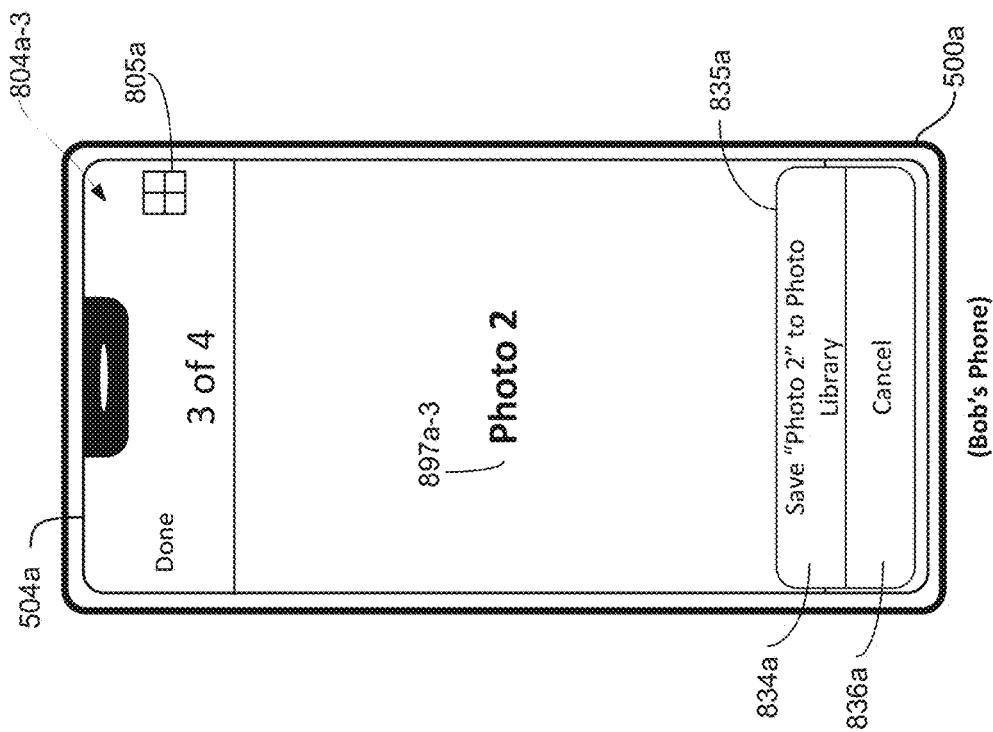
Figure 8X:
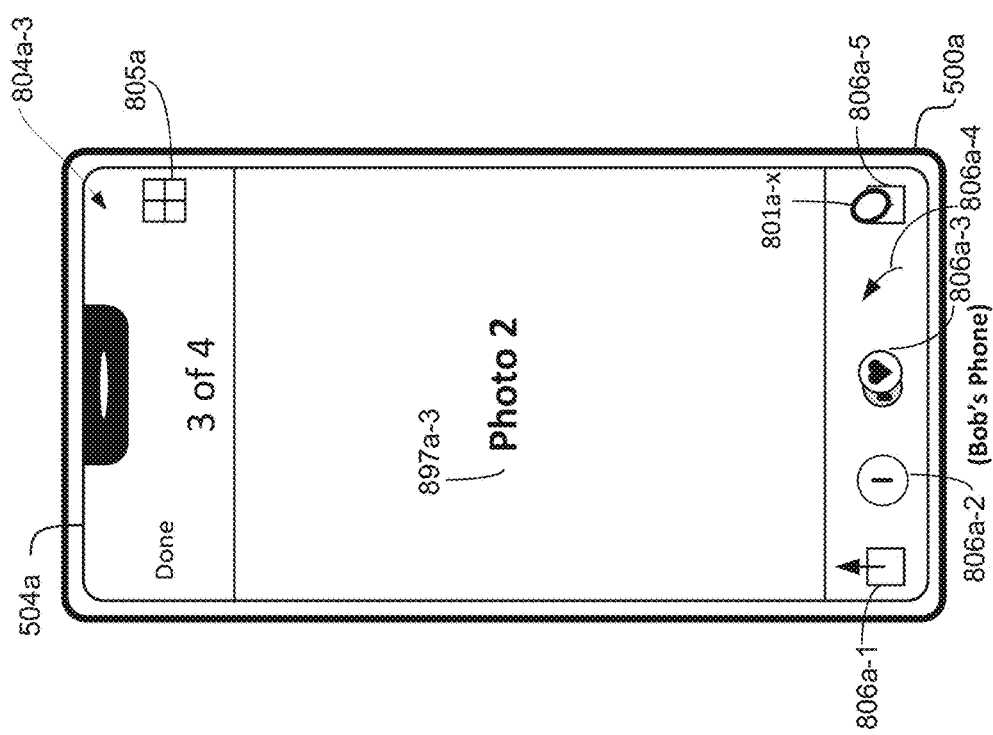
Figure 8A:
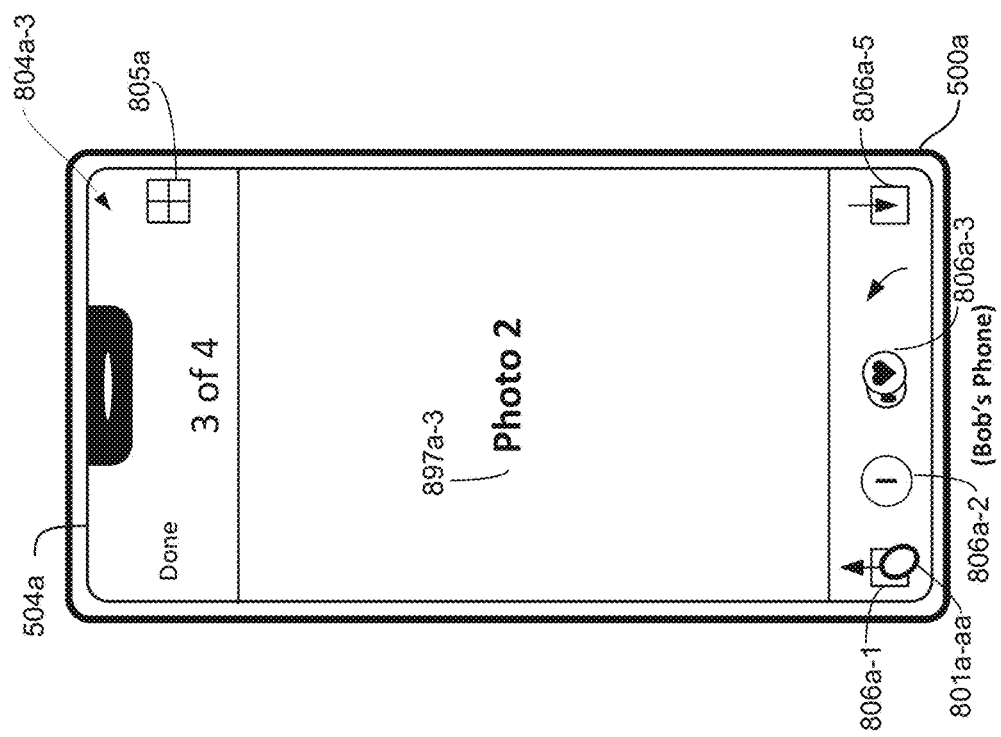

FIG. 8A illustrates an exemplary device 500a that includes a touchscreen 504a. In FIG. 8A, device 500a is presenting a messaging user interface 802a that includes a messaging conversation between a user of device 500a (Bob), a contact named Alice (indicated by the representation 850a of Alice), and a contact named Sam (indicated by the representation 848a of Sam). The messaging user interface 802a includes a visual indication 807a of a first message that was added to the messaging conversation with a device associated with Bob, includes a visual indication 809a of a second message that was added to the messaging conversation with a device associated with Sam, and a visual indication 816a of a third message that was added to the messaging conversation with a device associated with Alice. The visual indication 816a includes a representation 814a-1 of Photo 1, a representation 814a-2 of Photo 5, a representation 814a-3 of Photo 2, and a representation 814a-4 of Photo 4. In some embodiments, the visual indication 816a is displayed, in the messaging user interface 802a, in response to device 500a receiving an indication that a device associated with Alice has added a message including four photos—Photo 1, Photo 2, Photo 4, and Photo 5—to the messaging conversation. In the example of FIG. 8A, device 500a is displaying the representations 814a-1 to 814a-4 in a stack because the message corresponding to the visual indication 816a includes four photos: Photo 1, Photo 2, Photo 4, and Photo 5. As previously described with reference to FIG. 6U, in some embodiments, device 500a displays representations of content items in a stack when an electronic device receives an indication that a message including four or more content items has been added to the messaging conversation. Visual indication 816a optionally has one or more characteristics similar to the visual indication 616a described previously.

In some embodiments, when an electronic device is displaying representations of content items in a stack, the representation that is being displayed at the top of the stack (e.g., being displayed at the first position in the stack) is selectable, and when selected, causes the electronic device to display a user interface for the content item that corresponds to the selected representation. For example, in FIG. 8B, while device 500a is displaying the representation 814a-1 of Photo 1 at the top of the stack, device 500a receives an input selecting the representation 814a-1 of Photo 1 (indicated by touch contact 801a-b tapping on the representation 814a-1). In FIG. 8C, in response to device 500a detecting a selection of the representation 814a-1 of Photo 1, device 500a displays a user interface 804a for Photo 1 (e.g., the photo corresponding to the representation 814a-1). User interface 804a includes a representation 897a of Photo 1 and includes an indication 803a indicating that the representation corresponding to Photo 1 in FIG. 8B (e.g., the representation 814a-1) is currently at the top of the stack. Additionally, indication 803a indicates that the representation corresponding to Photo 1 in the visual indication 816a is one of the four representations included in the visual indication 816a. Additionally, or alternatively, in some embodiments, when an electronic device is displaying representations of content items in a stack, the stack is selectable, and when selected, causes the electronic device to display a user interface for the content item corresponding to the representation that is being displayed at the top of the stack.

Additionally, user interface 804a includes a selectable option 805a that, when selected, causes the electronic device 500a to display a user interface that includes representations of the content items included in the visual indication 816a, a selectable option 806a-1 that, when selected, causes the electronic device 500a to initiate a process to share Photo 1 with one or more users (e.g., users associated with one or more second electronic devices), a selectable option 806a-2 that, when selected, causes electronic device 500a to display information about/associated with Photo 1, a selectable option 806a-3 that, when selected, causes the electronic device 500a to initiate a process to add a reaction (e.g., tapback) to Photo 1 in the messaging conversation, and selectable option 806a-4 that, when selected, causes device 500a to initiate a process to reply to Photo 1 in the message conversation, and a selectable option 806a-5 that, when selected, causes device 500a to initiate a process to save Photo 1 to the electronic device 500a.

Figure 8Z:
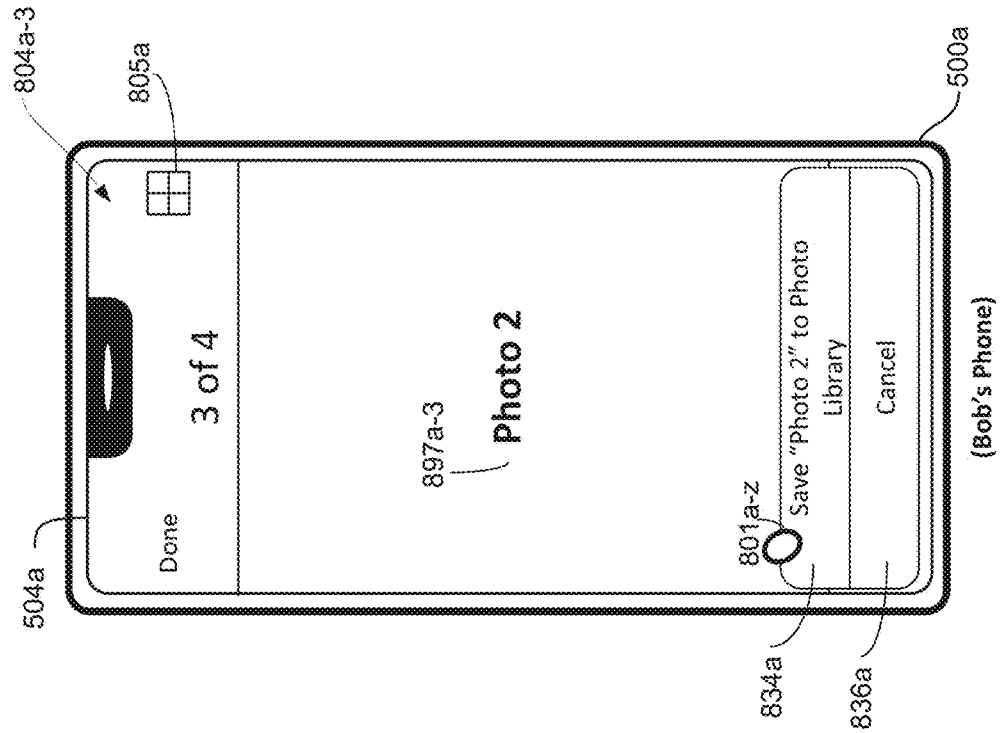
Figure 8C:
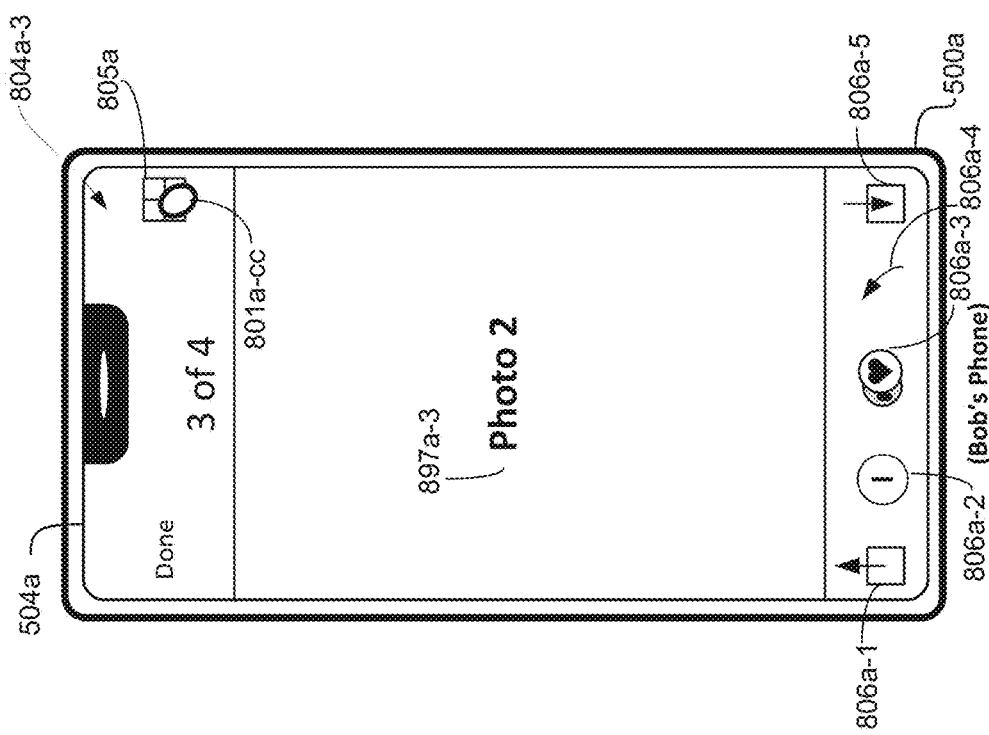
Figure 8B:
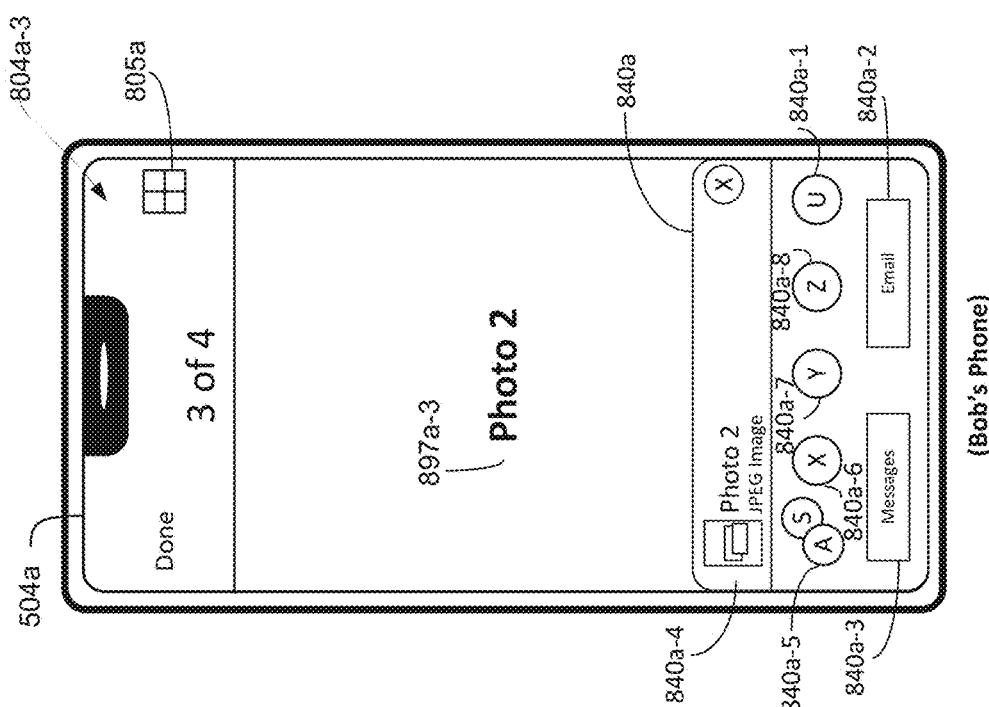
Figure 8E:
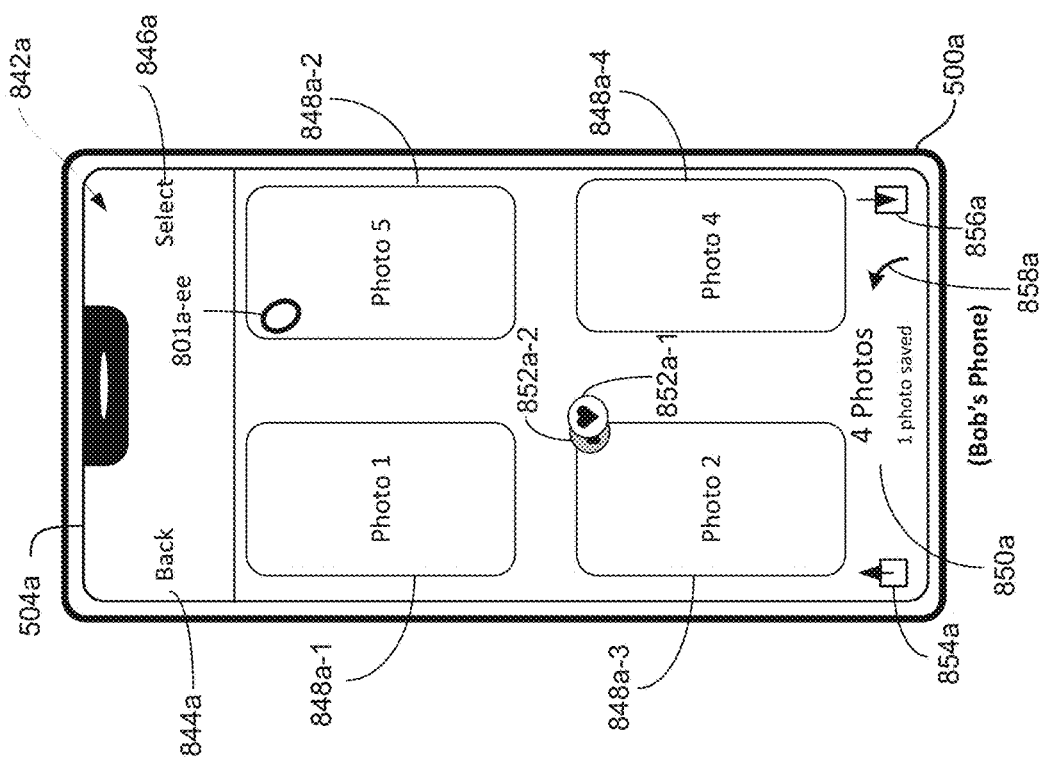
Figure 8D:
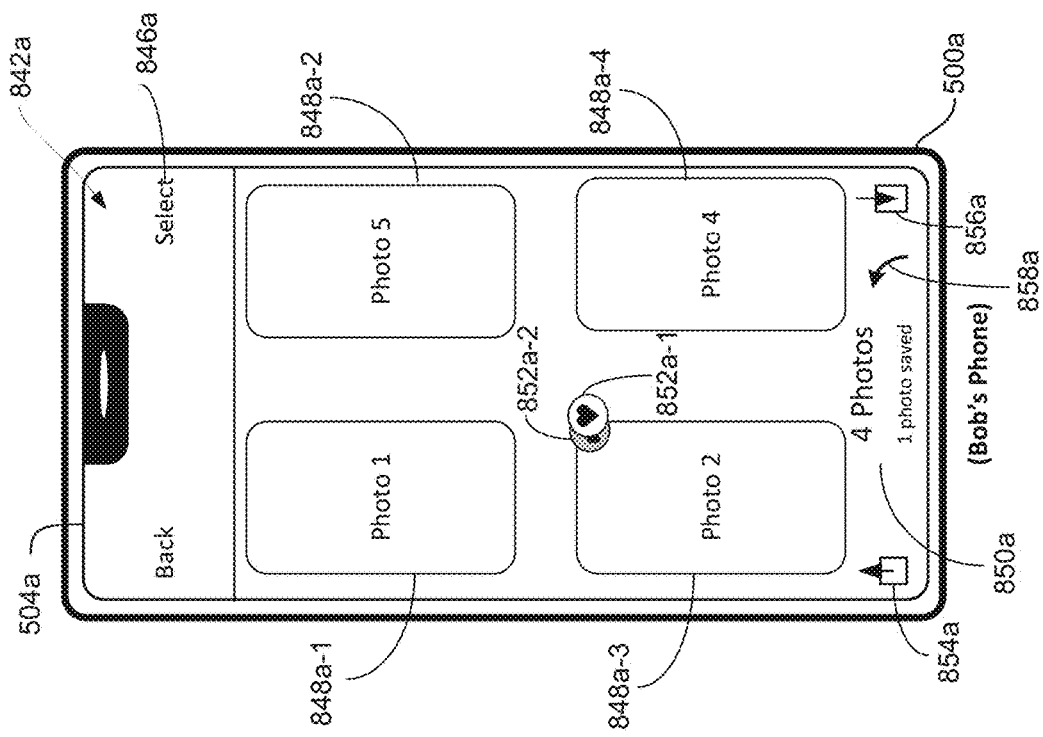

In FIG. 8C, while device 500a is displaying a user interface 804a associated with Photo 1, the electronic device 500a detects a request to display a user interface corresponding to another photo included in the visual indication 816a (indicated by touch contact 801a-c swiping to the right on representation 897a of Photo 1). In some embodiments, the next user interface displayed by device 500a is based on the representation in stack that is ordered (e.g., directly) after the representation of Photo 1. For example, in FIG. 8D, in response to device 500a detecting the swipe input in FIG. 8C, device 500a displays a user interface 804a-2 for Photo 5 because Photo 5 corresponds to the representation 814a-2 which is ordered after the representation 814a-1 of Photo 1 in the stack, as illustrated in FIG. 8B. User interface 804a-2 optionally has one or more characteristics similar to user interface 804a illustrated in FIG. 8C. Specifically, user interface 804-2a includes a representation 897a-2 of Photo 5 and includes an indication 803a indicating that the representation corresponding to Photo 5 in FIG. 8B (e.g., the representation 814a-2) is currently at the second position in the stack. Additionally, indication 803a indicates that the representation corresponding to Photo 5 in the visual indication 816a is one of the four representations included in the visual indication 816a. It is understood that while device 500a is displaying user interface 804a, device 500a could also detect a swipe in a leftward direction, which in some embodiments, causes device 500a to analogously display a user interface for the content item corresponding to representation being displayed at the bottom of the stack (Photo 4), because no other representations are ordered in front of the representation 814a-1 of Photo 1 in the stack, as illustrated in FIG. 8B (e.g., because device 500a is displaying the representation 814a-1 at the top of the stack).

Additionally, user interface 804a-2 includes a selectable option 805a that, when selected, causes the electronic device 500a to display a user interface that includes representations of the content items included in the visual indication 816a, a selectable option 806a-1 that, when selected, causes the electronic device 500a to initiate a process to share Photo 5 with one or more users (e.g., users associated with one or more second electronic devices), a selectable option 806a-2 that, when selected, causes electronic device 500a to display information about/associated with Photo 5, a selectable option 806a-3 that, when selected, causes the electronic device 500a to initiate a process to add a reaction (e.g., tapback) to Photo 5 in the messaging conversation, and a selectable option 806a-4 that, when selected, causes device 500a to initiate a process to reply to Photo 5 in the message conversation, and a selectable option 806a-5 that, when selected, causes device 500a to initiate a process to save Photo 5 to the electronic device 500a.

In FIG. 8E, while device 500a is displaying a user interface 804a-2 associated with Photo 5, the electronic device 500a detects another request to display a user interface for another photo included in the visual indication 816a (indicated by touch contact 801a-e swiping to the right on representation 897a-2 of Photo 5). In FIG. 8F, in response to the electronic device 500a detecting the request to display a user interface associated with another photo included in the visual indication 816a, the electronic device 500a displays a user interface 804a-3 for Photo 2 because Photo 2 corresponds to the representation 814a-3 in FIG. 8B, which is ordered (e.g., directly) after the representation 814a-2 of Photo 5 in the stack. User interface 804a-3 optionally has one or more similar characteristics to user interface 804a illustrated in FIG. 8C.

Specifically, user interface 804a-3 includes a representation 897a-2 of Photo 2 and includes an indication 803a indicating that the representation corresponding to Photo 2 in FIG. 8B (e.g., the representation 814a-3) is currently at the third position in the stack. Additionally, indication 803a indicates that the representation corresponding to Photo 2 in the visual indication 816a is one of the four representations of photos included in the visual indication 816a.

Additionally, user interface 804a-3 includes a selectable option 805a that, when selected, causes the electronic device 500a to display a user interface that includes representations of the content items included in the visual indication 816a, a selectable option 806a-1 that, when selected, causes the electronic device 500a to initiate a process to share Photo 2 with one or more users (e.g., users associated with one or more second electronic devices), a selectable option 806a-2 that, when selected, causes electronic device 500a to display information about/associated with Photo 2, a selectable option 806a-3 that, when selected, causes the electronic device 500a to initiate a process to add a reaction (e.g., tapback) to Photo 2 in the messaging conversation, and a selectable option 806a-4 that, when selected, causes device 500a to initiate a process to reply to Photo 2 in the message conversation, and a selectable option 806a-5 that, when selected, causes device 500a to initiate a process to save Photo 2 to the electronic device 500a.

Figure 8G:
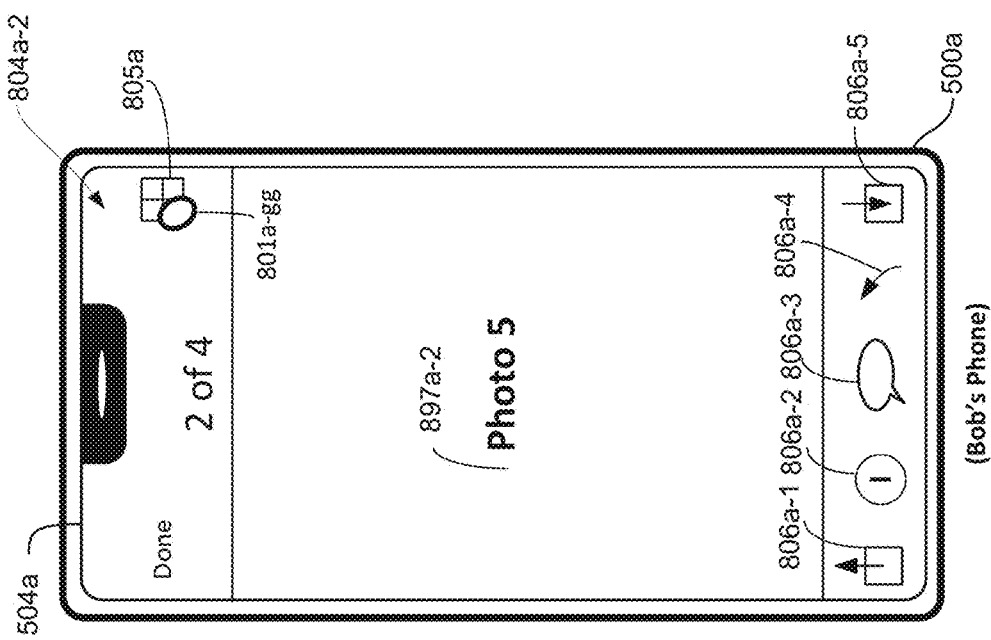
Figure 8F:
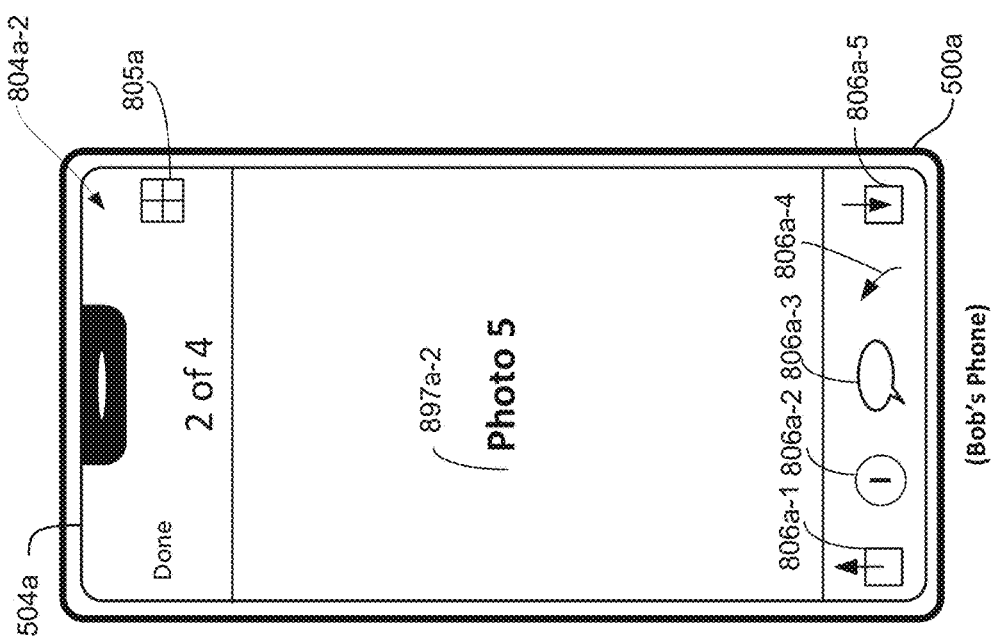
Figure 8I:
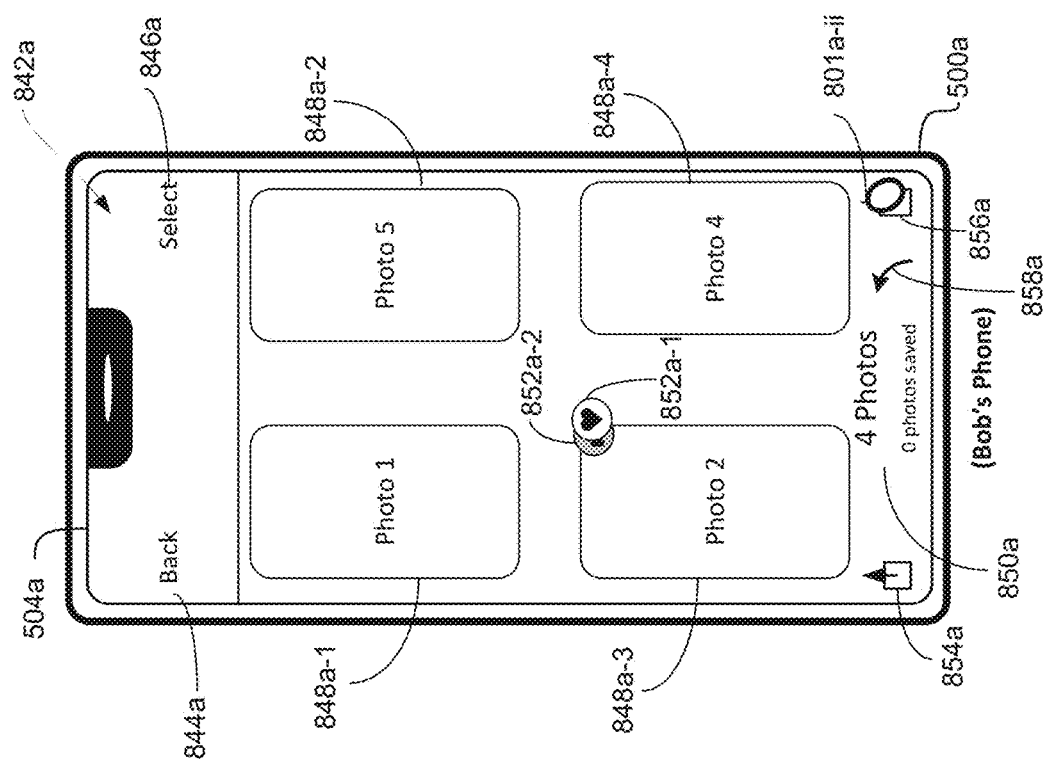
Figure 8H:
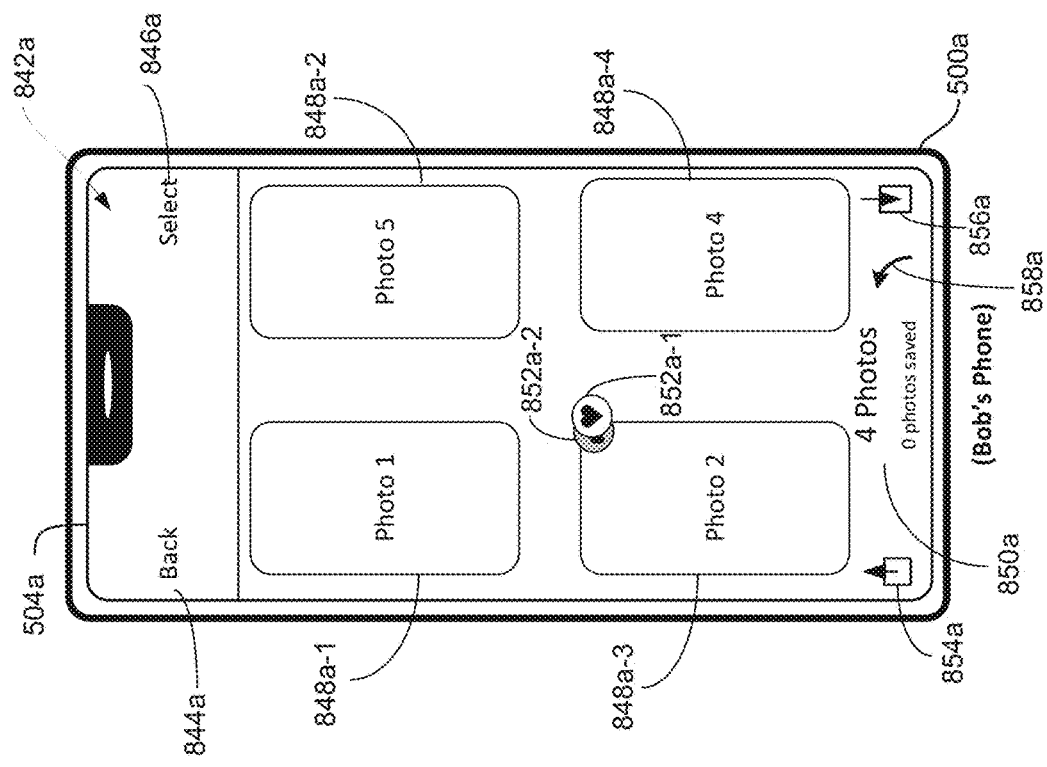
Figure 8K:
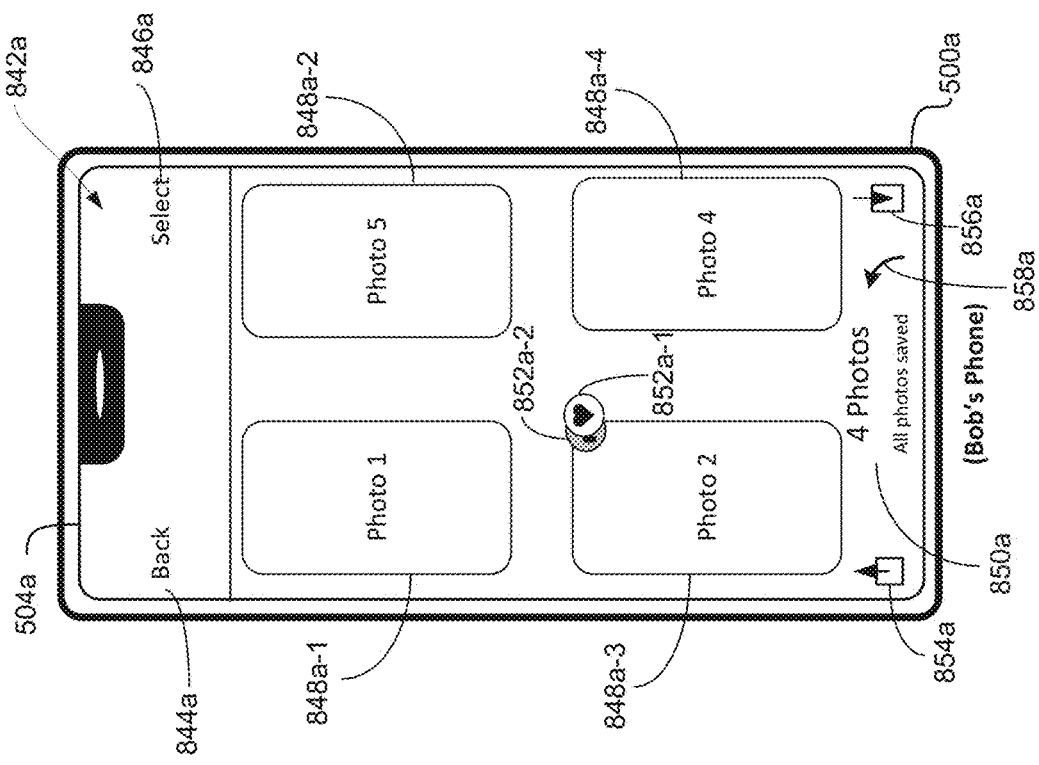
Figure 8J:
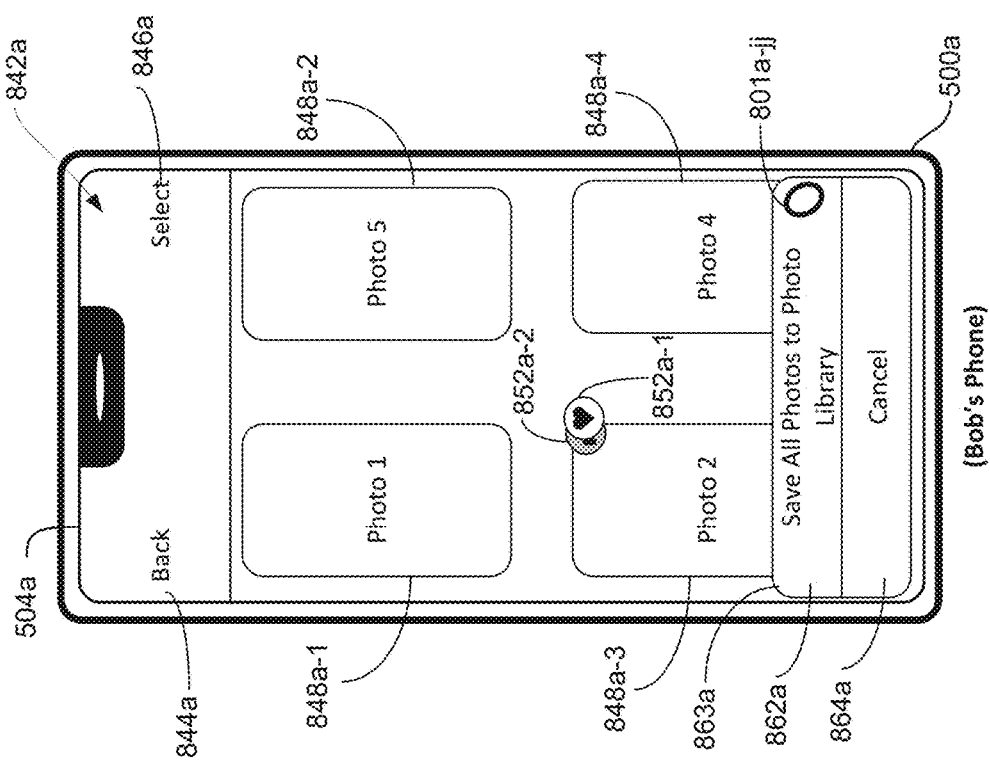

In FIG. 8G, while device 500a is displaying the user interface 804a-3, device 500a detects a request to add a tapback (e.g., message tag) to Photo 2 in the messaging conversation (represented by touch contact 801a-g selecting the selectable option 806a-3). In response to device 500a detecting the request in FIG. 8G, in FIG. 8H, device 500a displays a plurality of tapbacks (e.g., message tags) including a heart tapback 822a-1, a thumbs up tapback 822a-2, a thumbs down tapback 822a-3, a laugh tapback 822a-4, an emphasis tapback 822a-5, and a question mark tapback 822a-6 that, when selected, causes device 500a to add the selected tapback (e.g., message tag) to Photo 2 in the messaging conversation. In FIG. 8I, while device 500a is displaying the plurality of tapbacks (e.g., message tags), device 500a detects a selection of the heart tapback 822a-1 (indicated by touch contact 801a-i tapping on the heart tapback 822a-1). In FIG. 8J, in response to detecting the selection of the heart tapback 822a-1 in FIG. 8I, device 500a displays a visual indication indicating that the heart tapback 822a-1 has been selected. In FIG. 8K, after a respective amount of time has passed from indicating that the heart tapback 822a-1 has been selected (e.g., 0.3, 0.7, 1, 3 seconds), device 500a stops displaying, in the user interface 804a-3, the tapbacks (e.g., message tags) 822a-1 to 822a-6. Additionally, in FIG. 8K, because a tapback (e.g., message tag) has now been added to Photo 2 in the message conversation, device 500a updates the visual appearance of selectable option 806a-3 to indicate the tapbacks(s) that have been added to Photo 2 in the messaging conversation. Specifically, because a heart tapback was added to Photo 2 (and because no other tapbacks (e.g., message tags) have been added to Photo 2 in the messaging conversation), device 500a updates the visual appearance of selectable option 806a-3 to indicate that a heart tapback has been added to Photo 2 in the messaging conversation.

In FIG. 8K, after device 500a added a heart tapback to Photo 2 in the messaging conversation, device 500a detects a request to navigate back to the messaging user interface 802a (indicated by touch contact 801a-k selecting the selectable option with the label "Done"). In some embodiments, device 500a updates the representation displayed at the top of the stack (e.g., first position in the stack), in the messaging user interface 802a, to correspond to the photo that was being displayed by device 500a when the request to navigate back to the messaging user interface 802a is received. For example, in FIG. 8L, because device 500a was displaying a representation of Photo 2 when the request to navigate back to the messaging user interface 802a was received in FIG. 8K, device 500a updates the representation displayed at the top of the stack from the representation 814a-1 of Photo 1 to the representation 814a-3 corresponding to Photo 2. As a result of device 500a updating position of the representation 814a-3 of Photo 2 in the stack from the third position to the first position (e.g., to the top of the stack), the positions of the representations of the other content items in the stack are also rearranged accordingly. Specifically, device 500a rearranges the representations of other content items in the stack such that the representation 814a-4 of Photo 4 is now being displayed at the second position in the stack (previously at the fourth position in the stack, as illustrated in FIG. 8A), the representation 814a-1 of Photo 1 is now being displayed at the third position in the stack (previously at the first position in the stack, as illustrated in FIG. 8A), and the representation 814a-2 of Photo 5 is now being displayed at the bottom of the stack (previously at the second position in the stack, as illustrated in FIG. 8A). In addition to the positions of the items in the stack being rearranged by device 500a (e.g., the positions of the representations 814a-1 to 814a-4), device 500a also updates to the messaging user interface 802a to include a representation 830a of a heart tapback at the representation 814a-3 of Photo 2 because a heart tapback for Photo 2 was added to the messaging conversation as described in FIG. 8I.

Figure 8M:
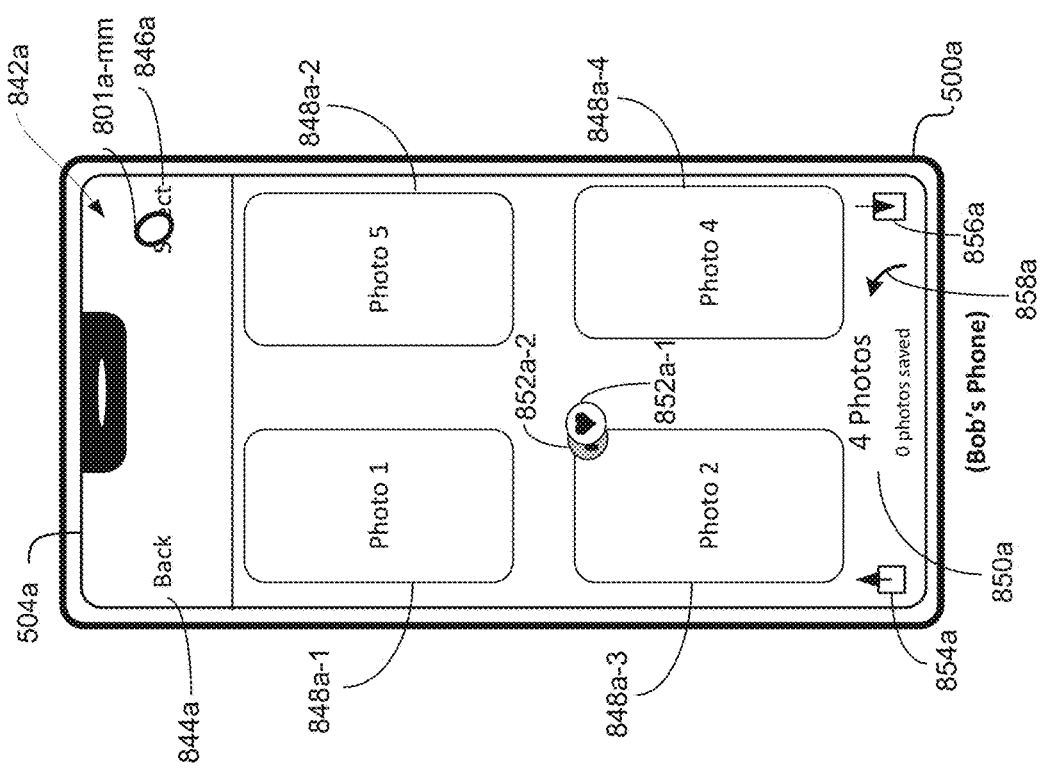
Figure 8L:
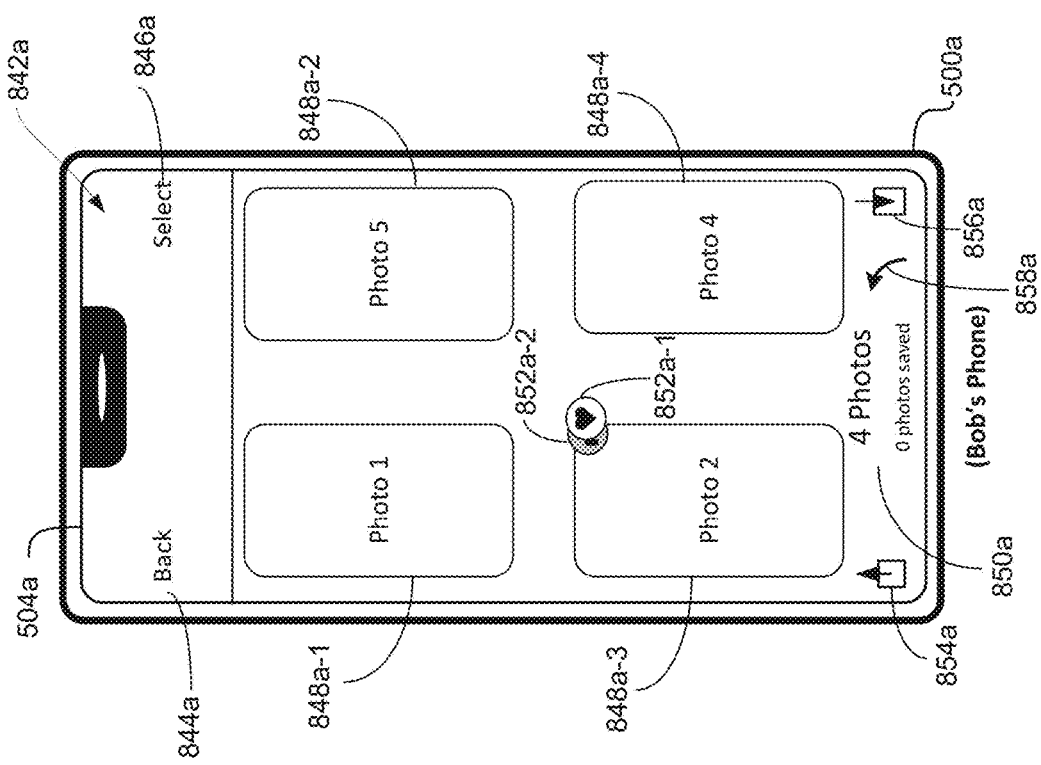
Figure 8O:
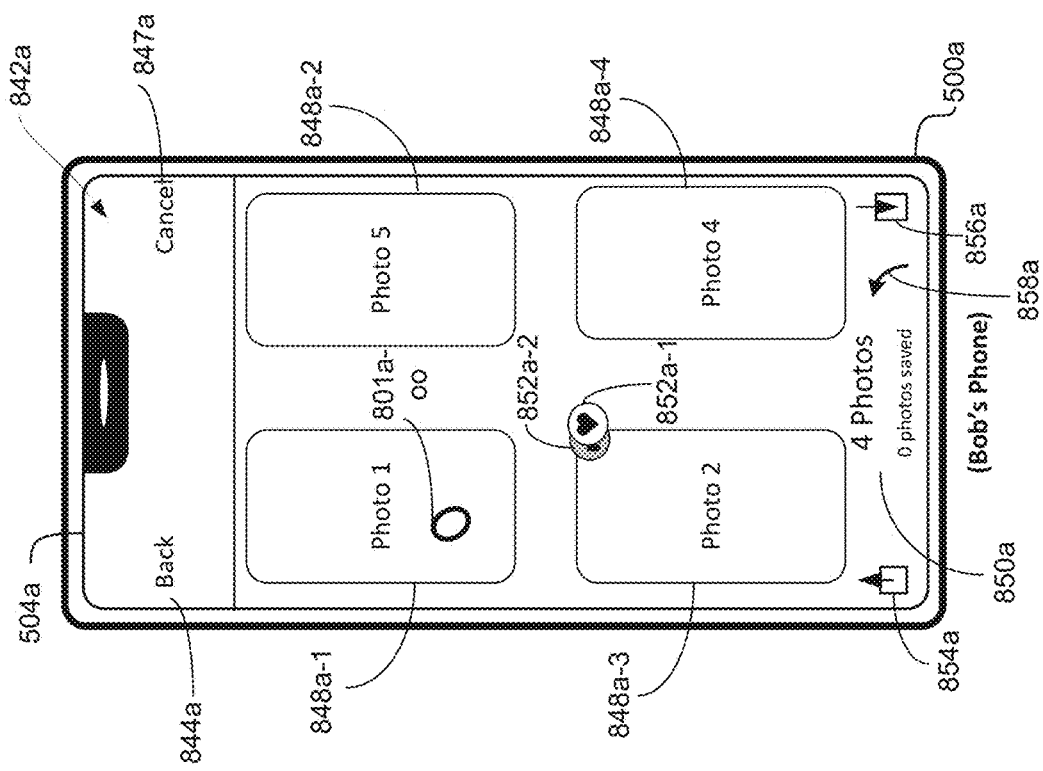
Figure 8N:
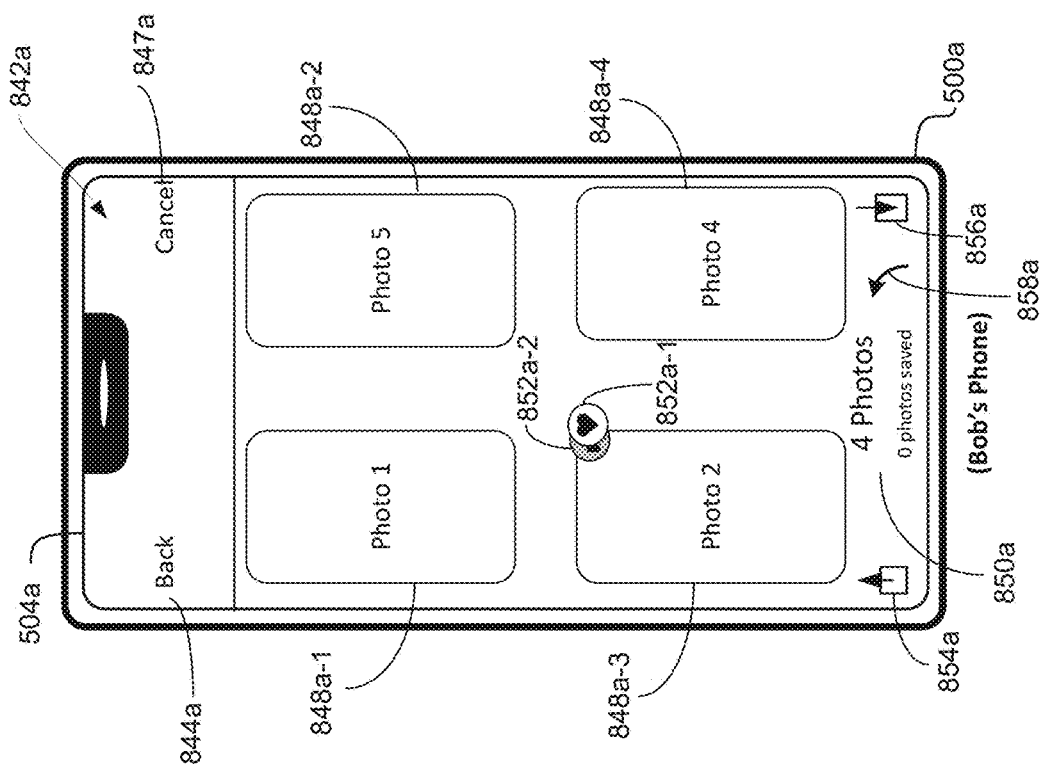

In some embodiments, tapbacks (e.g., message tags) previously added to a message in the messaging conversation can be changed/adjusted. For example, in FIG. 8M, device 500a detects a selection of the representation 830a of the heart tapback displayed at the representation 814a-3 of Photo 2 (indicated by touch contact 801a-m pressing down on the touchscreen 504a at a location corresponding the representation 830a for more than a threshold period of time (e.g., 0.5, 1, 2, 5, seconds). In FIG. 8N, in response to detecting the input in FIG. 8M, device 500a updates the messaging user interface 802a to include a heart tapback, a thumbs up tapback, a thumbs down tapback, a laugh tapback, an emphasis tapback, and a question mark tapback, previously described and illustrated in FIG. 8H. While displaying the plurality of tapbacks (e.g., message tags) in FIG. 8N, device 500a detects a selection of the thumbs up tapback (indicated by touch contact 801a-n tapping at a location on the touchscreen 504a corresponding to the thumbs-up message tag). In response to device 500a detecting the input in FIG. 8N, in FIG. 8O, device 500a updates the tapback (e.g., message tag) previously added to the messaging conversation by device 500a from the heart tapback to the thumbs up tapback (indicated by device 500a updating the messaging user interface to display a representation 831a of the thumbs up tapback).

Figure 8Q:
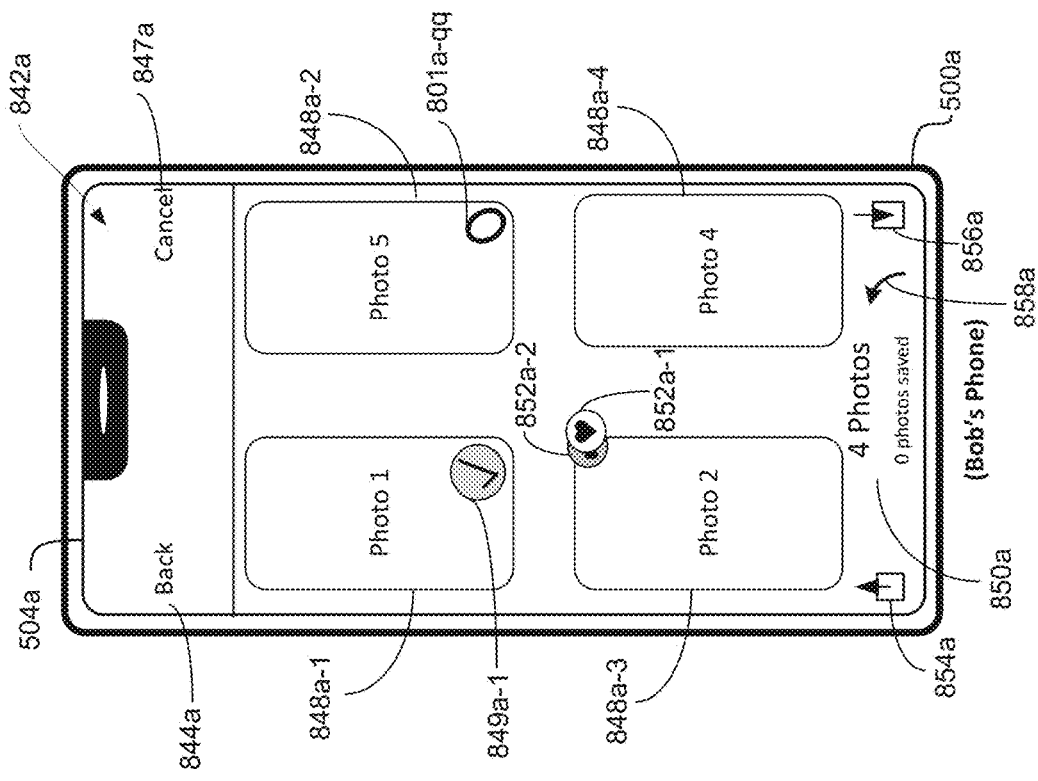

In some embodiments, device 500a displays tapbacks (e.g, message tags) that were added to a respective message (or content item) in the messaging conversation by the devices of other users in the messaging conversation. For example, in FIG. 8P, device 500a receives an indication that Sam has added a heart tapback to Photo 2 in the messaging conversation. In response to device 500a receiving the indication that a device associated with Sam has added a heart tapback to Photo 2 in the messaging conversation, device 500a updates the messaging user interface 802a to display a representation 830a-2 of a heart tapback at the representation 814a-3 corresponding to Photo 2. In FIG. 8Q, while displaying the updated messaging user interface 802a and while the representation 814a-3 of Photo 2 is being displayed at the top of the stack, the electronic device 500a detects a selection of the stack of items included in the visual indication 816a (indicated by touch contact 801a-q selecting the stack included in visual indication 816a).

As described previously, in some embodiments, the representation that is being displayed at the top of the stack is selectable, and when selected, causes the electronic device to display a user interface associated with the content item corresponding to the selected representation. For example, in FIG. 8R, in response to the electronic device 500a detecting a selection of the representation 814a-3 of Photo 2, device 500a displays a user interface 804a-3 associated with Photo 2 (e.g., the photo corresponding to the representation 814a-3). User interface 804a includes a representation 897a-3 of Photo 2 and includes an indication 803a indicating that the representation corresponding to Photo 2 in FIG. 8B (e.g., the representation 814a-3) is currently at the top of the stack. Additionally, indication 803a indicates that the representation corresponding to Photo 2 in the visual indication 816a is one of the four representations included in the visual indication 816a.

Additionally, user interface 804a-3 includes a selectable option 805a that, when selected, causes the electronic device 500a to display a user interface that includes representations of the content items included in the visual indication 816a, a selectable option 806a-1 that, when selected, causes the electronic device 500a to initiate a process to share Photo 2 with one or more users (e.g., users associated with one or more second electronic devices), a selectable option 806a-2 that, when selected, causes electronic device 500a to display information about/associated with Photo 2, a selectable option 806a-3 that, when selected, causes the electronic device 500a to initiate a process to add a reaction (e.g., message tag, tapback, etc.) to Photo 2 in the messaging conversation, and selectable option 806a-4 that, when selected, causes device 500a to initiate a process to reply to Photo 2 in the message conversation, and a selectable option 806a-5 that, when selected, causes device 500a to initiate a process to save Photo 2 to the electronic device 500a. As illustrated, in FIG. 8R, because tapbacks (e.g., message tags) have previously been added to Photo 2 in the message conversation, device 500a is displaying selectable option 806a-3 with a visual appearance indicating the tapbacks (e.g., message tags) that have been previously added to Photo 2 in the messaging conversation. Specifically, selectable option 806a-3 is indicating that a heart tapback and a thumbs up tapback have previously been added to Photo 2 in the messaging conversation.

In FIG. 8S, while device 500a is displaying the user interface 804a-3, device 500a detects a selection of selectable option 806a-3 (indicated by touch contact 801a-s tapping on the selectable option 806a-3). In FIG. 8T, in response to device 500a detecting the selection in FIG. 8S, device 500a displays tapbacks 822a-1 to 822a-6, which were illustrated and described previously. Additionally, in FIG. 8T, because tapbacks (e.g., message tags) have been previously been added to Photo 2 in messaging conversation, device 500a displays an indication 826a indicating the users associated with the devices that have added tapbacks (e.g., message tags) to Photo 2. Specifically, indication 826a includes an indication 828a indicating that a user Sam has added a heart tapback to Photo 2 and an indication 830a indicating that a user Bob had added a thumbs up tapback to Photo 2.

In some embodiments, an electronic device optionally receives a request to reply to a particular content item (e.g., photo) in the messaging conversation. For example, in FIG. 8U, while the electronic device 500a is displaying user interface 804a-3, the electronic device 500a detects a request to reply to Photo 2 in the messaging conversation (indicated by touch contact 801a-u selecting selectable option 806a-4). In FIG. 8V, in response to receiving the request to reply to Photo 2 in the messaging conversation, device 500a displays a reply user interface 832a overlaid the user interface 804a illustrated in FIG. 8U. The reply user interface 832a includes a representation 860a of Photo 2 indicating that a message composed in the reply user interface 832a will be added to the messaging conversation as reply to Photo 2. The reply user interface 832a also includes a soft keyboard and a text entry field 825a. In the example of FIG. 8V, the user of device 500a (Bob) has selected a sequence of inputs directed to the soft keyboard for composing a reply message to Photo 2 that includes the text "Nice Photo!" (indicated by the text displayed in text entry field 825a). After the user has finished composing the reply message, device 500a detects a request to add the composed reply message ("Nice Photo!") to the messaging conversation (indicated by touch contact 801a-v selecting the selectable option in text entry field 825a). In FIG. 8V-1, in response to device 500a receiving the request to add the composed reply message to the messaging conversation, device 500a adds to the composed reply message to the messaging conversation, and updates the messaging user interface 802a to indicate that the reply message to Photo 2 has been successfully added to the messaging conversation. Specifically, in FIG. 8V-1, device 500a updates the messaging user interface 802a to include a representation 862a of the reply message that was added to the messaging conversation, and a line 866a connecting the representation 862a to the representation 864a of Photo 2 (indicating that the message corresponding to the representation 862a is a reply to Photo 2 in the messaging conversation).

Figure 8P:
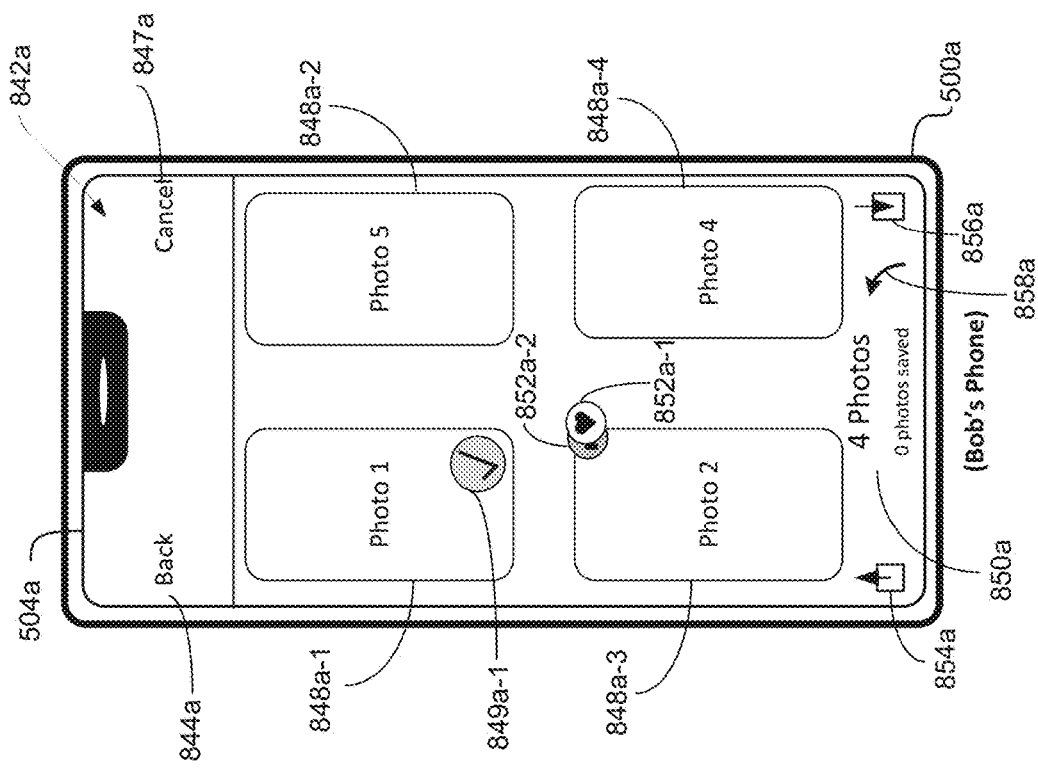
Figure 8S:
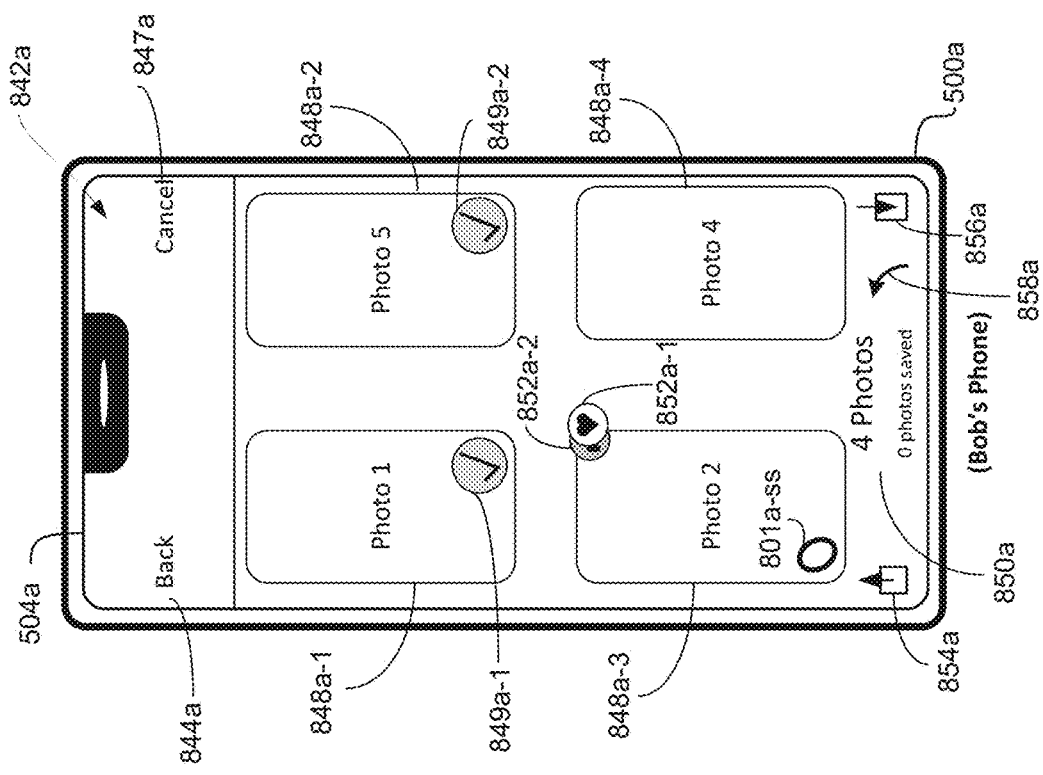
Figure 8R:
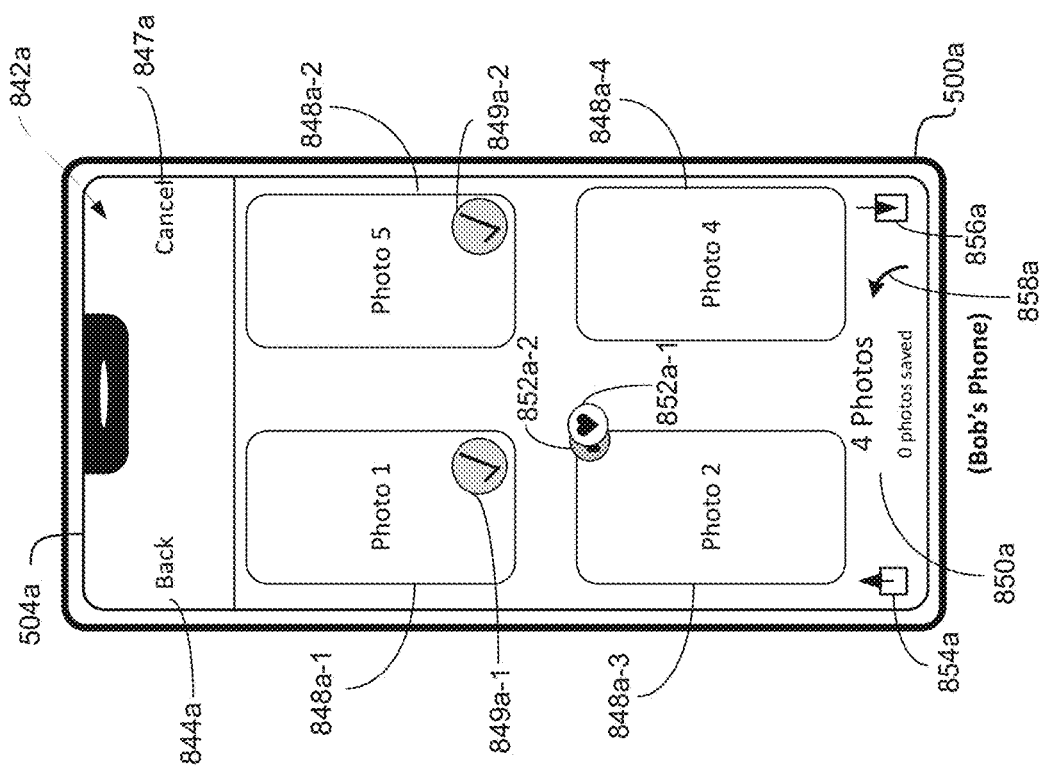
Figure 8U:
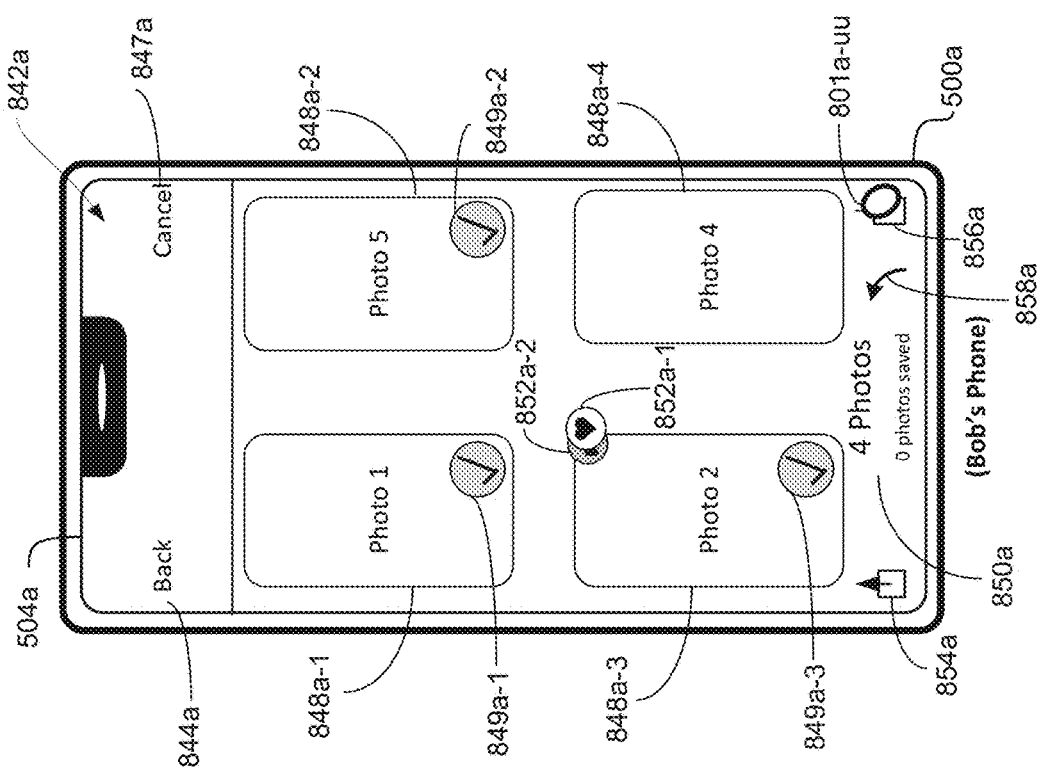
Figure 8T:
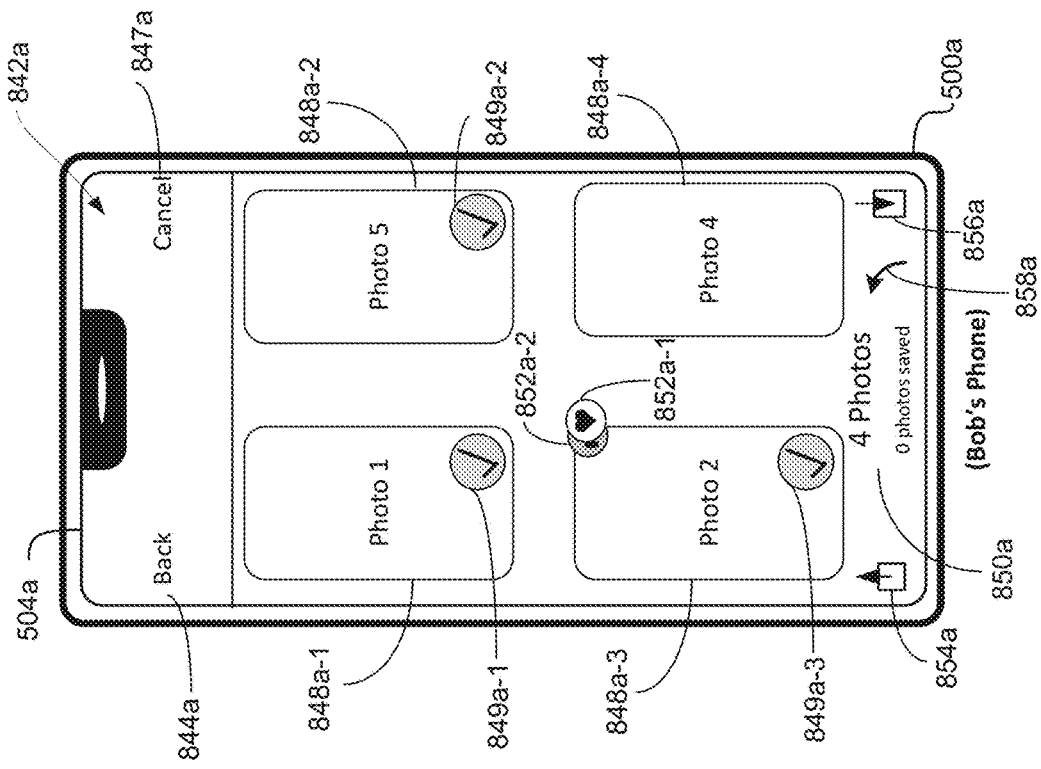
Figure 8W:
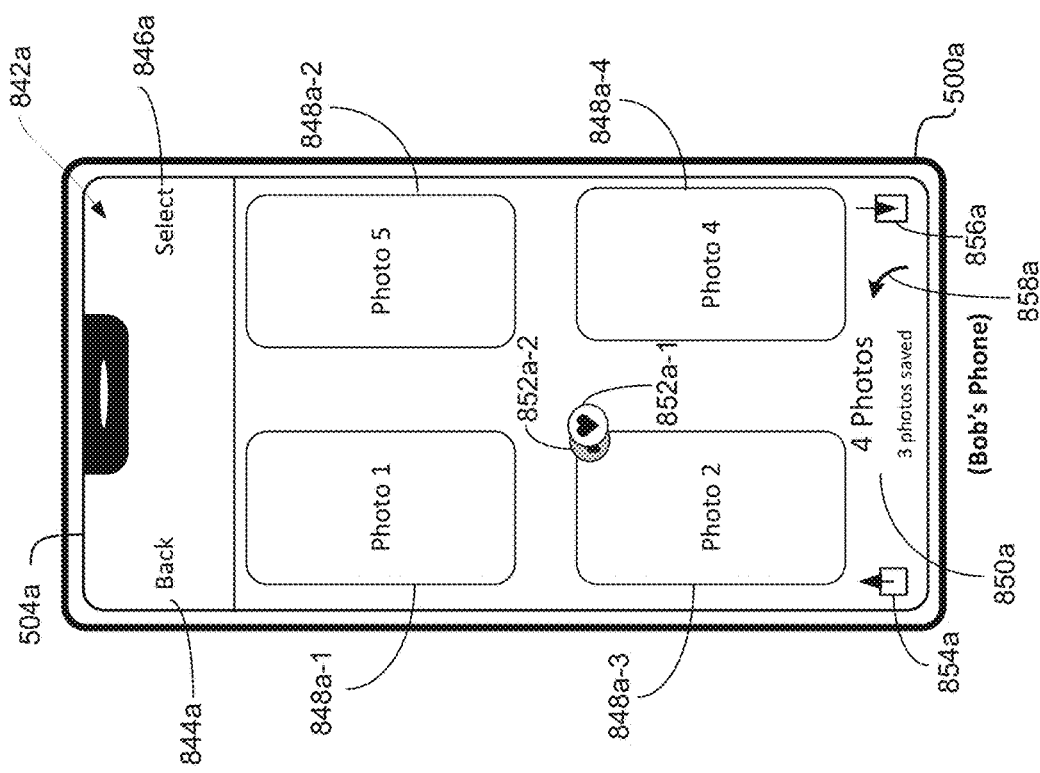
Figure 8V:
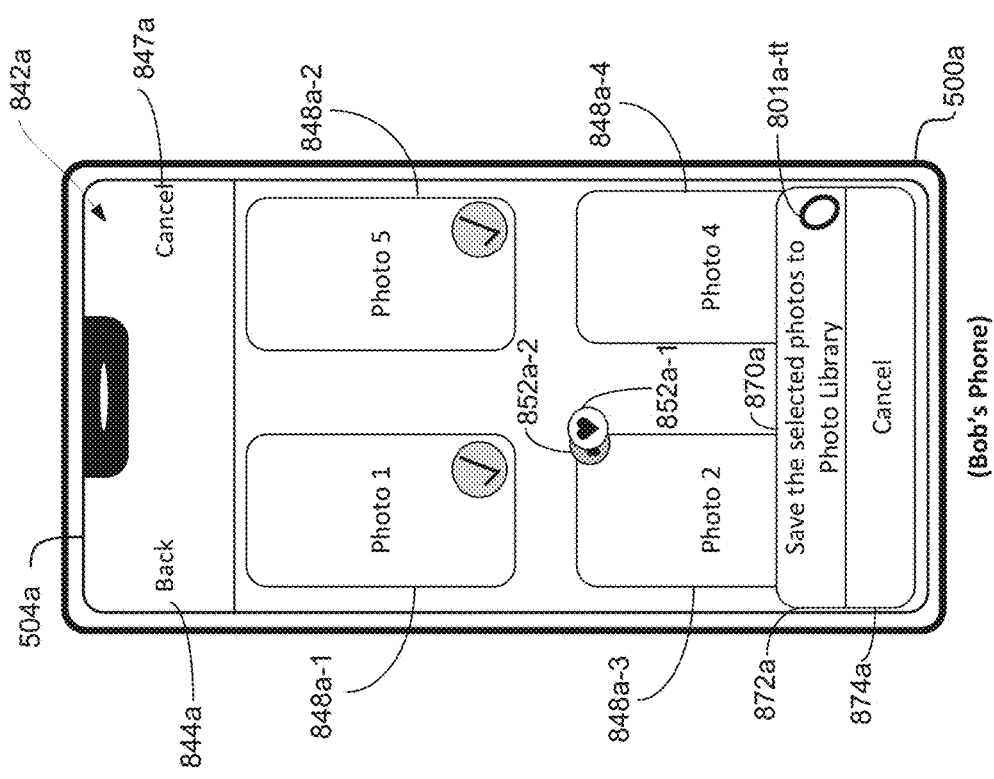
Figure 8Y:
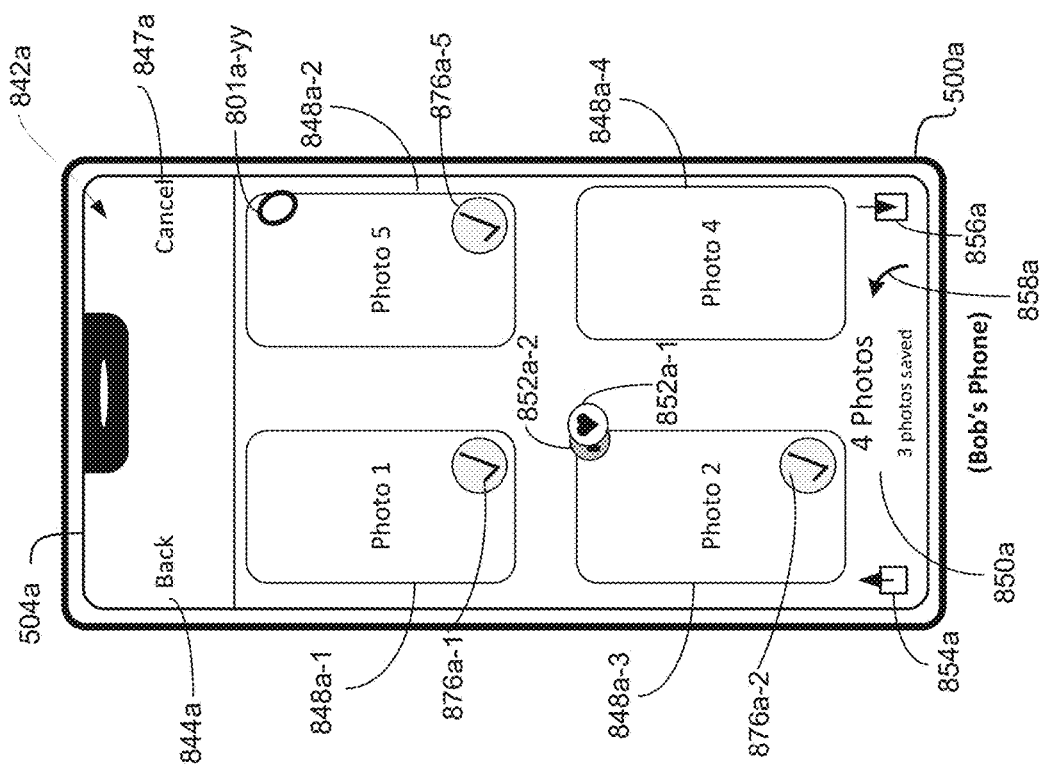
Figure 8X:
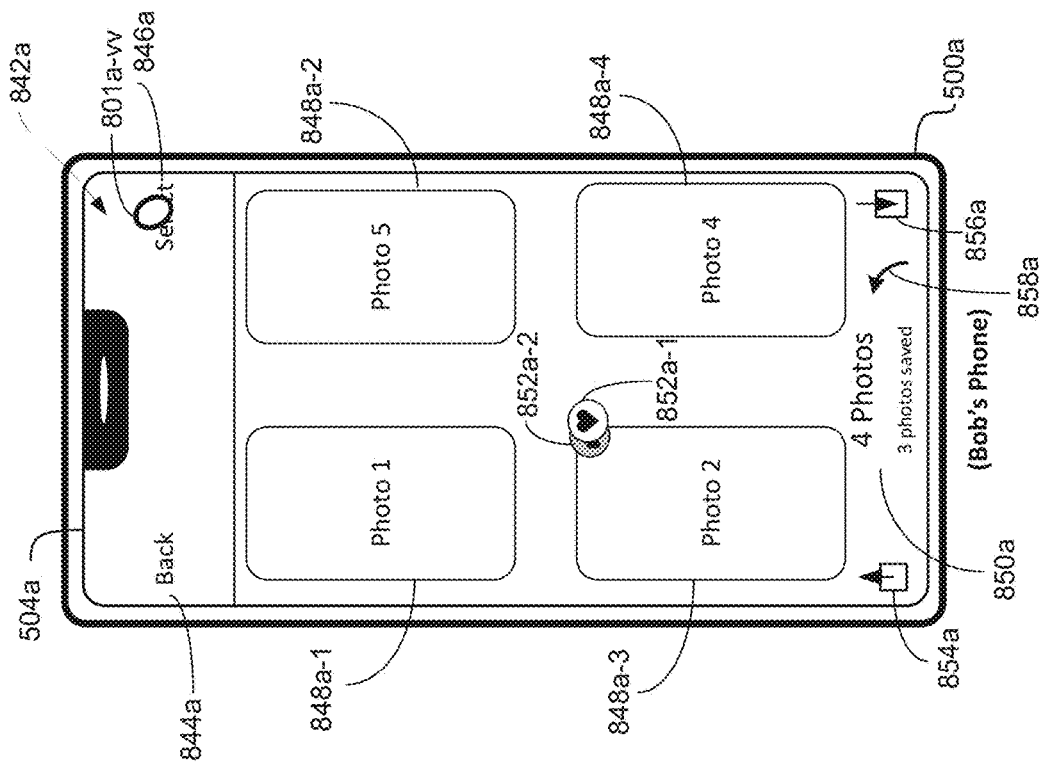
Figure 8Z:
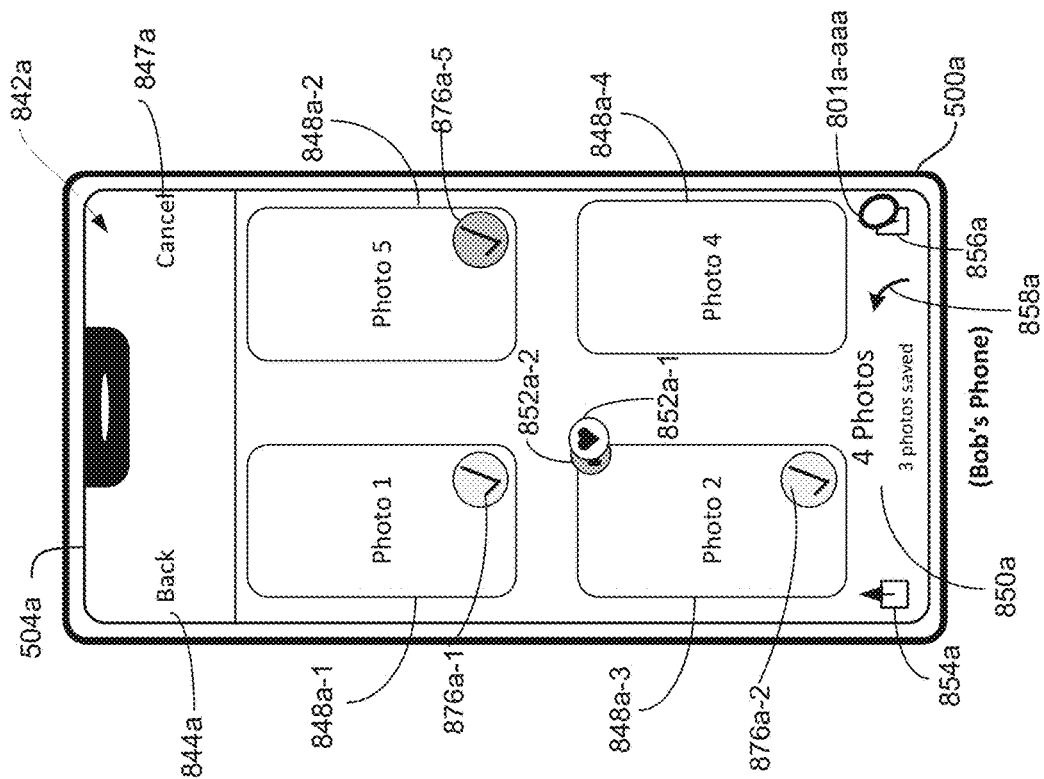
Figure 8Z:
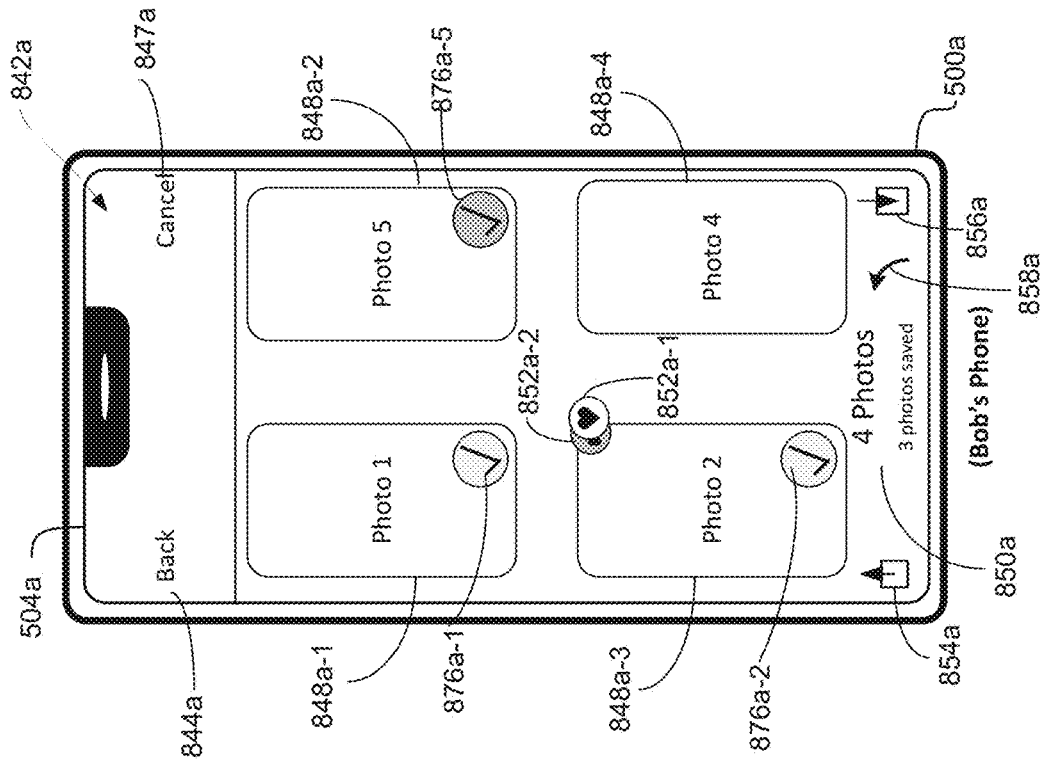

In some embodiments, the electronic device optionally initiates a process to save a particular content item included in the message that corresponds to the visual indication 816a. For example, in FIG. 8V-1, the electronic device 500a detects a selection of the representation 814a-3 of Photo 2 (indicated by touch contact 801a-v-1 tapping on the representation 814a-3 of Photo 2). In FIG. 8W, in response to device 500a detecting the selection of the representation 814a-3 of Photo 2, the electronic device 500a displays user interface 804a-3, as previously described and illustrated above. In FIG. 8X, while the electronic device 500a is displaying the user interface 804a-3, the electronic device 500a detects a selection of selectable option 806a-5 (indicated by touch contact 801a-x tapping on selectable option 806a-5). In response to electronic device 500a detecting the selection of selectable option 806a-5 in FIG. 8X, in FIG. 8Y, the electronic device 500a updates the user interface 804a-3 to include a menu 835a. Menu 835a includes a selectable option 834a that, when selected, causes electronic device 500a to save Photo 2 to a photos application installed on device 500a, and a selectable option 836a that, when selected, causes electronic device 500a to stop displaying the menu 835a in the user interface 804a without saving Photo 2 to the electronic device 500a. In FIG. 8Z, while the electronic device 500a is displaying the menu 835a in the user interface 804a-3, the electronic device 500a detects a selection of the selectable option 834a (indicated by touch contact 801a-z tapping on selectable option 834a). In FIG. 8AA, in response to device 500a detecting the selection of selectable option 834a in FIG. 8Z, the electronic device 500a saves Photo 2 to the photos application installed on device 500a, and ceases displaying the menu 835a.

As described previously, in some embodiments, selectable option 806a-1 is selectable to cause the electronic device 500a to initiate a process to share Photo 2 with one or more users (e.g., with the devices associated with the one or more users). For example, in FIG. 8AA, the electronic device 500a detects a selection of selectable option 806a-1 (indicated by touch contact 801a-aa tapping selectable option 806a-1). In FIG. 8BB, in response to device 500a detecting a selection of selectable option 806a-1 in FIG. 8AA, the electronic device 500a updates the user interface 804a-3 to include a menu 840a. The menu 840a includes an indication 840a-4 indicating that the selectable options 840a-1, 840a-2, 840a-3, 840a-5, 840a-6, 840a-7, and 804a-8 are associated with sharing Photo 2. The menu 840a also includes representations of messaging conversations that are accessible by device 500a (e.g., messaging conversations that the user of device 500a is part of), including a representation 840a-5 of a first messaging conversation between the user of device 500a (Bob), Alice, and Sam—the messaging conversation illustrated in FIG. 8A—a representation 840a-6 of a second messaging conversation between the user of device 500a (Bob) and a user named X, a representation 840a-7 of a third messaging conversation between the user of device 500a (Bob) and a user named Y, a representation 840a-8 of a fourth messaging conversation between the user of device 500a (Bob) and a user named Z, and a representation 840a-1 of a fifth messaging conversation between the user of device 500a (Bob) and a user named U. The representations 840a-1, 840a-5, 840a-6, 840a-7, and 840a-8 are selectable, and when selected, cause the electronic device 500a to compose, in the messaging conversation corresponding to the selected representation, a message that includes Photo 2. Additionally, menu 840a also includes a selectable option 840a-3 that, when selected, causes electronic device 500a to compose, in a messaging application installed on device 500a, a new message that includes Photo 2, and also includes a selectable option 840a-2 that, when selected, causes electronic device 500a to compose, in an email application installed on device 500a, a new email that includes Photo 2.

As mentioned previously, in some embodiments, selectable option 805a is selectable to cause the electronic device 500a to display representations of the content items included in the visual indication 816a illustrated in FIG. 8V-1 (e.g., display representations of the content items included in the message corresponding to visual indication 816a). For example, in FIG. 8CC, while device 500a is displaying user interface 804a-3, device 500a detects a selection of selectable option 805a (indicated by touch contact 801a-cc tapping on selectable option 805a). In FIG. 8DD, in response to the electronic device 500a detecting the selectable option 805a, the electronic device 500a displays user interface 842a. User interface 842a includes a representation 848-1 of Photo 1, a representation of 848-2 of Photo 5, a representation 848-3 of Photo 2, and a representation 848a-4 of Photo 4 (e.g., representations of the photos included in the message corresponding to the visual indication 816a). As illustrated, FIG. 8DD, device 500a is displaying the representations 848-1 to 848-4 in a grid layout (e.g., the representations are arranged in rows and columns).

In some embodiments, device 500a displays the representations in user interface 842a with one or more indications indicating that one or more tapbacks (e.g., message tags) have been added to the corresponding photo in the messaging conversation. For example, as illustrated in FIG. 8DD, device 500a is displaying an indication 852a-1 of a heart tapback and an indication 852a-1 of a thumbs up tapback because, as previously described, a device associated with the user Sam added a heart message tapback to Photo 2 in the messaging conversation, and because the user of device 500a, Bob, added a thumbs up tapback to Photo 2 in the messaging conversation (e.g., the photo that corresponds to the representation 848a-3). The user interface 842a also includes a selectable option 846a that, when selected, causes device 500a to enter a content selection mode which allows selection of the one or more representations displayed in user interface 842a, includes a selectable option 854a that, when selected, causes device 500a to initiate a process to share the photos corresponding to the representations 848a-1 to 848-4 with one or more users (e.g., with the devices associated with the one or more users), a selectable option 856a that, when selected, causes device 500a to initiate a process to download the photos corresponding to the representations 848-1 to 848-4 (e.g., download the photos included in the message corresponding to visual indication 816a illustrated in FIG. 8DD) to device 500a, and a selectable option 858a that, when selected, causes device 500a to initiate a process to compose a reply message to the message corresponding to visual indication 816a illustrated in FIG. 8DD. Additionally, user interface 842a also includes an indication 850a indicating information about the photos included in user interface 842a. Specifically, indication 850a indicates the total number of photos being displayed in user interface 842a, and how many photos of the total number of photos displayed in user interface 842a have been saved to the electronic device 500a.

In some embodiments, the representations of photos, displayed in the user interface 842a, are selectable, and when selected, cause device 500a to display a user interface associated with the photo corresponding to the selected representation. For example, in FIG. 8EE, while device 500a is displaying the user interface 842a, the electronic device 500a detects a selection of the representation 848a-2 of Photo 5 (indicated by touch contact 801a-ee tapping on the representation 848a-2 of Photo 5). In FIG. 8FF, in response to device 500a detecting the selection of the representation 848-2 of Photo 5 in FIG. 8EE, device 500a displays a user interface 804a-2 for Photo 5, as illustrated and described previously (e.g., the photo corresponding to the representation 848a-2).

In FIG. 8GG, while the electronic device 500a is displaying the user interface 804a-2, the electronic device 500a detects a selection of selectable option 805a (indicated by touch contact 801a-gg tapping on selectable option 805a). In FIG. 8HH, in response to device 500a detecting the selection of selectable option 805a in FIG. 8GG, the electronic device 500a displays user interface 842a, previously illustrated and described in FIG. 8DD. In FIG. 8II, while the electronic device is displaying user interface 842a, the electronic device 500a detects a selection of selectable option 856a (indicated by touch contact 801a-ii tapping on selectable option 856a). In FIG. 8JJ, in response to the electronic device 500a detecting the selection of selectable option 856a the electronic device initiates a process to download one or more of the photos corresponding to the representations 848-1 to 848-4. In some embodiments, as illustrated in FIG. 8JJ, if none of the photos corresponding to the representations 848-1 to 848-4 have been previously downloaded to the electronic device 500a, the electronic device 500a displays a menu 862a that includes a selectable option 862a that, when selected, causes the electronic device 500a to save the photos corresponding to the representations 848-1 to 848-4 (Photo 1, Photo 2, Photo 4, and Photo 5) to the electronic device 500a, and includes a selectable option 864a that, when selected, causes the electronic device 500a to stop displaying the menu 863a without saving the photos corresponding to the representations 848-1 to 848-4 to the electronic device 500a. In FIG. 8JJ, the electronic device 500a detects a selection of selectable option 862a (indicated by touch contact 801a-jj tapping on selectable option 862a). In response to device 500a detecting the selection of selectable option 862a, device 500a saves the photos corresponding to the representations 848a-1 to 848-4 (Photo 1, Photo 2, Photo 4, Photo 5) to a photos application installed on device 500a.

In FIG. 8KK, after device 500a saved the Photos 1, 2, 4, and 5 to the photos application installed on device 500a in FIG. 8JJ, device 500a ceases displaying menu 863a and updates indication 850a. Specifically, the electronic device 500a updates indication 850a from indicating that none of the photos corresponding to the representations 848-1 to 848-4 have been saved to device 500a (as illustrated in FIG. 8HH) to indicating that all of the photos corresponding to the representations 848-1 to 848-4 have been saved to device 500a.

In some embodiments, device 500a optionally allows a user of device 500a to select one or more of the representations displayed in the user interface 842a, and optionally save those selected representations to device 500a. For example, in FIG. 8LL, the electronic device 500a is displaying user interface 842a while none of the photos corresponding to the representations 848-1 to 848-4 have been saved to device 500a (indicated by indication 850a including the text "0 photos saved"). In FIG. 8MM, while device 500a is displaying user interface 842a and while none of the photos corresponding to the representations 848-1 to 848-4 have been saved to device 500a, device 500a detects a request to enter a content selection mode which allows one or more of the representations displayed in the user interface 842a to be selected (indicated by touch contact 801a-m m tapping on the selectable option 846a). In response to device 500a detecting the input in FIG. 8MM, in FIG. 8NN, device 500a enters the content selection mode (indicated by device 500a switching from displaying the selectable option 846a ("Select") to displaying the selectable option 847a ("Cancel")). In FIG. 8OO, after the electronic device 500a entered the content selection mode, device 500a detects a selection of the representation 848a-1 of Photo 1 (indicated by touch contact 801a-oo tapping on the representation 848a-1 of Photo 1). In FIG. 8PP, in response to detecting the selection of the representation 848a-1 illustrated in FIG. 8OO, the electronic device 500a selects the representation 848a-1 of Photo 1 and displays an indication 849a-1 indicating that the representation 848a-1 is currently selected by device 500a. In FIG. 8QQ, while the representation 848a-1 is currently selected by device 500a (indicated by indication 849a-1), the electronic device 500a detects a selection of the representation 848a-2 of Photo 5 (represented by touch contact 801a-qq tapping on the representation 848a-2 of Photo 5). In FIG. 8RR, in response to device 500a detecting the selection of the representation 848a-2, device 500a selects the representation 848a-2 of Photo 5 and displays an indication 849a-2 indicating that the representation 848a-2 is currently selected by device 500a. In FIG. 8SS, while the representation 848a-1 of Photo 1 and the representation 848a-2 of Photo 5 is currently selected by device 500a (indicated by indications 849a-1 and 849a-2), the electronic device 500a detects a request to select the representation 848a-3 of Photo 2 (indicated by touch contact 801a-s s tapping on the representation 848-3 of Photo 2). In FIG. 8TT, in response to device 500a detecting the selection of the representation 848a-3 in FIG. 8SS, the electronic device 500a selects the representation 848a-3 of Photo 2 and displays an indication 849a-3 indicating that the representation 848-3 is currently selected by device 500a.

In FIG. 8UU, while the representations 848a-1 to 848a-3 corresponding to Photos 1, 5, and 2 are currently selected (indicated by indications 849a-1, 849a-2, and 849a-3), the electronic device 500a detects a selection of selectable option 856a (indicated by touch contact 801a-uu tapping on the selectable option 856a). In some embodiments, if the electronic device 500a detects a selection of selectable option 865a while one or more representations in user interface 842a are selected, the electronic device 500a initiates a process to download the photos corresponding to the selected representations. For example, in FIG. 8VV, in response to detecting the selection of selectable option 864a while the representation 848a-1 of Photo 1, the representation 848a-2 of Photo 5, and the representation 848a-3 of Photo 2 are currently selected, device 500a displays a menu 870a that includes a selectable option 872a that, when selected, causes the electronic device 500a to save the photos corresponding to the selected representations—Photos 1, 2, and 5—to the electronic device 500a. Additionally, in FIG. 8VV, the electronic device 500a detects a selection of selectable option 872a (indicated by touch contact 801a-tt tapping on selectable option 872a). In response to device 500a detecting the selection of selectable option 872a, device 500a saves the photos corresponding to the selected representations (Photo 1, Photo 2, and Photo 5) to a photos application installed on device 500a. In FIG. 8WW, after device 500a saved Photos 1, 2, and 5 to the electronic device 500a, device 500a ceases displaying menu 870a and updates indication 850a. Specifically, device 500a updates indication 850a from indicating that none of the photos corresponding to the representations 848a-1 to 848a-4 have been saved to device 500a, as illustrated in FIG. 8LL, to indicating that three of the photos corresponding to the representations 848a-1 to 848a-4 have been saved to device 500a.

In some embodiments, the electronic device 500a optionally receives a request to resave one or more of the photos previously saved to the electronic device 500a. For example, in FIG. 8XX, while three of the photos corresponding to the representations 848a-1 to 848a-4 have been saved to device 500a (indicated by indication 850a including the text "3 photos saved"), device 500a receives a request to enter a content selection mode, which as described previously, allows one or more of the representations displayed in user interface 842a to be selected (indicated by touch contact 801a-vv tapping on the selectable option 846a). In FIG. 8YY, in response to device 500a detecting the input in FIG. 8XX, device 500a enters the content selection mode (indicated by device 500a switching from displaying the selectable option 846a ("Select") to displaying the selectable option 847a ("Cancel")). In some embodiments, while device 500a is in a content selection mode, device 500a displays a visual indication at the representations in user interface 842a that correspond to photos previously saved to device 500a. Specifically, in the example of FIG. 8YY, because Photos 1, 2, and 5 have previously been saved to the electronic device 500a, device 500a displays an indication 876a-1 at the representation 848a-1, an indication 876a-2 at the representation 848-3 of Photo 2, and an indication 876a-5 at the representation 848-2 of Photo 5 indicating that Photos 1, 2, and 5 have previously been saved to device 500a.

Additionally, in FIG. 8YY, while device 500a is displaying the indication 876a-5 indicating that Photo 5 is currently saved to the electronic device 500a and while device 500a is currently in a content selection mode, device 500a detects a selection of the representation 848a-2 of Photo 5 (represented by touch contact 801a-y y tapping on the representation 848a-2 of Photo 5). In FIG. 8ZZ, in response to device 500a detecting a selection of the representation 848a-2 of Photo 5, device 500a selects the representation 848a-2, and updates the visual appearance of indication 876a-5 from indicating that Photo 5 is currently saved to device 500a to indicating that the representation 848a-2 of Photo 5 is currently selected by device 500a. In FIG. 8AAA, while the representation 848a-2 of Photo 5 is currently selected, device 500a detects a selection of selectable option 856a (indicated by touch contact 801a-aaa tapping on selectable option 856a). In some embodiments, if the electronic device 500a detects a selection of selectable option 846a while the selected representations correspond to photos that have previously been saved to device 500a, the electronic device 500a initiates a process to resave those photos to device 500a. For example, in FIG. 8BBB, in response to detecting the selection of selectable option 856a while the representation 848a-2 of Photo 5 is currently selected and while Photo 5 is currently saved to the electronic device 500a, the electronic device displays a menu 878a. Menu 878a includes a selectable option 880a that, when selected, causes the electronic device to resave Photo 5 to device 500a (e.g., the photo corresponding to the selected representation). Additionally, selectable option 880a includes an indication identifying the selected photo(s) that have already been saved to device 500a ("Photo 5 already saved to Photo Library, save again?").

In FIG. 8CCC, while device 500a is displaying menu 878a, device 500a detects a selection of selectable option 880a (indicated by touch contact 801a-cc c tapping on selectable option 880a). In FIG. 8DDD, in response to device 500a detecting the selection of selectable option 880a, device 500a resaves Photo 5 to a photos application installed on device 500a and ceases displaying menu 878a in the user interface 842a. Additionally, as illustrated in FIG. 8DDD, device 500a continues to display indication 850a indicating that three of the photos corresponding to the representations 848a-1 to 848a-4 have been saved to device 500a (Photos 1, 2, and 5).

In some embodiments, selectable option 856a is selectable to save the remaining photos corresponding to the representations 848a-1 to 848-4 that have not been previously saved to the electronic device 500a. For example, in FIG. 8EEE, while three of the photos (Photos, 1, 2, and 5) of the four photos corresponding to the representations 848a-1 to 848a-4 have been saved to device 500a (indicated by indication 850a including the text "3 photos saved"), device 500a detects a selection of selectable option 856a (indicated by touch contact 801a-eee tapping on selectable option 856a). In FIG. 8FFF, in response to device 500a detecting the selection of selectable option 801a-eee in FIG. 8EEE, and because a portion of the photos corresponding to the representations 848a-1 to 84a8-4 are currently saved to device 500a, device 500a displays a menu 884a. Menu 884a includes a selectable option 886a that, when selected, causes device 500a to save, to device 500a, the photos corresponding to the representations 848-1 to 848-4 that are not currently saved to device 500a, and includes a selectable option 888a that, when selected, causes device 500a to cease displaying menu 884a without saving the photos corresponding to the representations 848a-1 to 848a-4 that are not currently saved to device 500a. Additionally, selectable option 886a is indicating which of the photos corresponding to the representations 848a-1 to 848a-4 have previously been saved to device 500*a*, and which of the photos corresponding to the representations 848*a*-1 to 848*a*-4 have not already been saved to device 500*a*.

In FIG. 8GGG, while the electronic device 500*a* is displaying the menu 884*a*, the electronic device 500*a* detects a selection of selectable option 886*a* (indicated by touch contact 801*a-ggg* tapping on selectable option 886*a*). In response to device 500*a* detecting the selection of selectable option 886*a*, device 500*a* saves Photo 4 to the photos application installed on device 500*a* (e.g., saves the photos corresponding to the representations 848*a*-1 to 848*a* that were not previously saved to device 500*a*). In FIG. 8HHH, after device 500*a* saved Photo 4 to the electronic device 500*a*, device 500*a* ceases displaying menu 884*a* and updates indication 850*a*. Specifically, device 500*a* updates indication 850*a* from indicating that three of the photos corresponding to the representations 848*a*-1 to 848*a*-4 have been saved to device 500*a*, as illustrated in FIG. 8DDD, to indicating that all of the photos corresponding to the representations 848*a*-1 to 848*a*-4 have been saved to device 500*a* ("All photos saved").

In some embodiments, an electronic device receives a request to reply to the photos corresponding to the representations 848*a*-1 to 848*a*-4 in the messaging conversation. For example, in FIG. 8HHH, while the electronic device 500*a* is displaying user interface 842*a*, the electronic device detects a request to reply to Photos 1, 2, 4, and 5 in the messaging conversation (e.g., device 500 receives a request to reply to the message corresponding to the visual indication 816*a*) (indicated by touch contact 801*a-hhh* selecting selectable option 858*a*). In response to receiving the request to reply to the Photos 1, 2, 4, and 5 in the messaging conversation, device 500*a* displays a reply user interface 832*a* overlaid on the user interface 804*a* illustrated in FIG. 8U. The reply user interface 832*a* includes a visual indication 890*a* of the message in the messaging conversation that included Photos 1, 2, 4, and 5. The reply user interface 832*a* also includes a soft keyboard and a text entry field 825*a*.

In the example of FIG. 8III, the user of device 500*a* (Bob) has provided a sequence of inputs directed to the soft keyboard for composing a reply message to the message corresponding to the visual indication 890*a* that includes the text "Nice Photo!" (indicated by the text displayed in text entry field 825*a*). After the user of device 500*a* has finished composing the reply message, device 500*a* detects a request to add the composed reply message ("Nice Photo!") to the messaging conversation (indicated by touch contact 801*a-iii* selecting the selectable option in text entry field 825*a*). In FIG. 8JJJ, in response to device 500*a* receiving the request to add the composed reply message to the messaging conversation, device 500*a* adds to the reply message to the messaging conversation, and updates the messaging user interface 802*a* to indicate that a reply to the message corresponding to the visual indication 816*a* has been successfully added to the messaging conversation. Specifically, in FIG. 8JJJ, device 500*a* updates the messaging user interface 802*a* to include a representation 863*a* of the reply message that was added to the messaging conversation by device 500*a*, and a line 867*a* connecting the visual indication 816*a* to the representation 863*a* of the reply message (indicating that the message corresponding to the representation 863*a* is a reply to the message corresponding to the visual indication 816*a*).

As described previously, in some embodiments, the electronic device 500*a* receives a request to share the photos corresponding to the representations 848*a*-1 to 848-2 with one or more users. For example, in FIG. 8KKK, the electronic device 500*a* detects a selection of selectable option 854*a* (indicated by touch contact 801*a-bbb* tapping selectable option 854*a*). In FIG. 8LLL, in response to device 500*a* detecting a selection of selectable option 854*a* in FIG. 8KKK, the electronic device 500*a* displays a menu 840*a*. The menu 840*a* includes an indication 840*a*-4 indicating that the selectable options 840*a*-1, 840*a*-2, 840*a*-3, 840*a*-5, 840*a*-6, 840*a*-7, and 804*a*-8 are associated with sharing four photos: Photo 1, Photo 2, Photo 4, and Photo 5. The menu 840*a* also includes representations of the messaging conversations that are accessible by device 500*a* (e.g., messaging conversations that the user of device 500*a* is part of), including a representation 840*a*-5 of a first messaging conversation between the user of device 500*a* (Bob), Alice, and Sam—the messaging conversation illustrated in FIG. 8A—a representation 840*a*-6 of a second messaging conversation between the user of device 500*a* (Bob) and a user named X, a representation 840*a*-7 of a third messaging conversation between the user of device 500*a* (Bob) and a user named Y, a representation 840*a*-8 of a fourth messaging conversation between the user of device 500*a* (Bob) and a user named Z, and a representation 840*a*-1 of a fifth messaging conversation between the user of device 500*a* (Bob) and a user named U. The representations 840*a*-1, 840*a*-5, 840*a*-6, 840*a*-7, and 840*a*-8 are selectable, and when selected, cause the electronic device to compose, in the messaging conversation corresponding to the selected representation, a message that includes Photos 1, 2, 4, and 5. Additionally, menu 840*a* also includes a selectable option 840*a*-3 that, when selected, causes electronic device 500*a* to compose, in a messaging application installed on device 500*a*, a new message that includes Photos 1, 2, 4, and 5, and also includes a selectable option 840*a*-2 that, when selected, causes electronic device 500*a* to compose, in an email application installed on device 500*a*, a new email that includes Photos 1, 2, 4, and 5.

FIG. 9 is a flow diagram illustrating a method of selecting and displaying user interfaces associated with a content item in a messaging conversation. The method 900 is optionally performed at an electronic device such as device 100, device 300, device 500, device 500*a*, device 500*b* as described above with reference to FIGS. 1A-1B, 2-3, 4A-4B and 5A-5H. Some operations in method 900 are, optionally combined and/or order of some operations is, optionally, changed.

As described below, the method 900 provides ways in which an electronic device displays user interfaces associated with one or more content items in a messaging conversation and/or adds messaging activity to one or more content items in a messaging conversation. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device in communication with a display generation component and one or more input devices (e.g., a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control)). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device displays (902), via the display generation component, a messaging user interface that includes a messaging conversation associated with a plurality of users (e.g., in some embodiments, the messaging user interface has one or more characteristics of the messaging user interface described in method 700), wherein the messaging user interface includes a first visual indication of first messaging activity in the messaging conversation (e.g., such as the visual indication described with reference to method 700 when the one or more criteria are or are not satisfied), and the first visual indication includes representations of a plurality of content items (e.g., photos, videos, and/or other media items, etc.) included in the first messaging activity, such as the visual indication 816a included in the messaging user interface 802a in FIG. 8B. For example, the electronic device displays a visual indication of messaging activity added by an electronic device that has access to the messaging conversation. In some embodiments, in addition to the representations of the plurality of content items, the visual indication also includes a representation of a typed message (e.g., includes text). In some embodiments, the first visual indication is displayed by the electronic device because the electronic device received an indication that a device associated with a respective user of the plurality of users has added a new message to the messaging conversation. In some embodiments, the first visual indication includes one or more representation of content items because an electronic device that added the first messaging activity to the messaging conversation detected a sequence of one or more inputs for adding content items to the first messaging activity. In some embodiments, the content items are of the same type (e.g., the content items correspond to only images/photos) or are of different types (e.g., the content items correspond to both images and videos).

In while displaying the messaging user interface, the electronic device receives (904), via the one or more input devices, a first input corresponding to selection of a first content item of the plurality of content items included in the first messaging activity, such as the selection of the representation of Photo 1 in FIG. 8B (e.g., the electronic device receives an input for selecting the visual indication corresponding to message activity that includes the plurality of content items). In some embodiments, the first input corresponds to selection of the first content item in accordance with a determination that a first representation of the first content item of the plurality of content items was visually emphasized in the first visual indication when the first input was received. For example, when the visual indication is selected, the first content item is being displayed with visual prominence over other content items also included in the visual indication. For example, the first content item is displayed at the top of the stack of content items, and the other content items in the stack are below the first content item.

In some embodiments, in response to receiving the first input (906), the electronic device displays (908), via the display generation component, a first user interface associated with the first content item and including one or more selectable options that are selectable to add corresponding messaging activity to the messaging conversation related to the first content item, such as user interface 804a in FIG. 8C (e.g., and not a second content item of the plurality of content items). In some embodiments, when the electronic device detects a selection of the first visual indication, the content items included in the first visual indication are displayed in a stack (e.g., a collection). In some embodiments, the stack of content items displays one content item at a time (e.g., visually emphasizes one content item), and input directed to the stack of content items causes the stack to display (e.g., visually emphasize) a new content item in the stack. In some embodiments, the way the content items are displayed in the visual indication is similar to the manner in which the content items are displayed in method 700. In some embodiments, when the visual indication is selected, the first content item is being visually emphasized by the stack (e.g., is the current cover photo in the stack). In some embodiments, different portions of the visual indication of the first messaging activity are selectable. For example, text in the first messaging activity is selectable and the stack of content items is also selectable. In some embodiments, in response to selecting the stack when a particular photo is being visually emphasized among the other content items that are also being displayed in the visual indication, the electronic device displays a user interface (e.g., a first user interface) that includes selectable options for transmitting (e.g., adding) messaging activity to the messaging conversation. For example, in some embodiments, the first user interface includes one or more selectable options for transmitting a reply to the first content item (or optionally the plurality of content items) in the messaging conversation and/or for transmitting (e.g., adding) a tag to the first content item (e.g., adding reactions such as "like," "heart," question mark, emphasis, and laugh).

The above-described manner of displaying a user interface associated with a content item being visually emphasized in a respective visual indication when that visual indication is selected provides an efficient way of accessing user interfaces associated with visually emphasized content items and for adding messaging activity related to that content item in the messaging conversation, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the messaging user interface, wherein the first representation of the first content item is visually emphasized in the first visual indication, the electronic device receives, via the one or more input devices, a second input corresponding to a swipe input on the first visual indication, such as the if the touch input 801a-b in FIG. 8B corresponded to a swipe gesture instead of a selection gesture. For example, while the representation corresponding to the first content item is visually emphasized in a stack, the electronic device receives a second input that corresponds to a drag or swipe gesture. In some embodiments, the second input includes movement that satisfies one or more criteria. In some embodiments, if the second input corresponds to a vertical swipe or dragging gesture, the movement of the second input does not satisfy the one or more second criteria, and instead of updating the order of the content items in the stack, the electronic device scrolls through the messaging user interface, optionally including scrolling the stack of content items out of view on the display.

In some embodiments, in response to receiving the second input, the electronic device updates the first visual indication to visually emphasize a second representation of a second content item, different from the first content item, of the plurality of content items, such as device 500 displaying the representation 814*a*-2 of Photo 2 at the top of the stack if the touch contact 801*a*-*b* corresponded to a swipe input in FIG. 8B. For example, if a first representation of a first content item is being displayed with the highest priority in the first visual indication (e.g., at the top of the stack) when the first input is received, a second representation of a second content item is displayed with the highest priority (e.g., at the top of the stack) in response to the second (e.g., swipe) input. In some embodiments, as a result, the second representation of the second content item moves from a respective position in the stack to the top of the stack (e.g., the first position in the stack), the respective positions of the other content items in the stack are also rearranged accordingly.

In some embodiments, while displaying the updated first visual indication, the electronic device receives, via the one or more input devices, a third input corresponding to selection of the second content item of the plurality of content items included in the first visual indication of the first messaging activity (e.g., in some embodiments, the third input corresponds to selection of the second content item in accordance with a determination that the second representation of the second content item, different from the first content item, of the plurality of content items was visually emphasized in the first visual indication when the third input was received). In some embodiments, in response to receiving the third input, displaying, via the display generation component, a second user interface associated with the second content item and including one or more selectable options that are selectable to add corresponding messaging activity to the messaging conversation related to the second content item, such as device 500*a* displaying the user interface 804*a*-3 illustrated in FIG. 8F if representation corresponding to Photo 2 is displayed at the top of the stack (e.g., and not the first content item of the plurality of content items). For example, because the representation of the second content item was being visually emphasized when the electronic device detected selection of the second content item, the electronic device displays a user interface associated with the second content item (e.g., the content item corresponding to the representation being visually emphasized). In some embodiments, the second user interface includes selectable options for transmitting a reply to the second content items in the messaging conversation and/or for adding a tag to the second content item in the messaging conversation (e.g., adding tags such as a "like" tag, a "heart" tag, a question mark tag, an emphasis tag, a laugh tag, etc.). In some embodiments, while the electronic device is displaying the second user interface, the electronic device switches to displaying the first user interface associated with the first content item in response to the electronic device detecting one or more inputs. The above-described manner of displaying a user interface associated with a second content item when a representation of the second content item is being visually emphasized in a visual indication of a message in the messaging conversation provides an efficient way of accessing user interfaces associated with visually emphasized content items and for adding messaging activity related to that content item in the messaging conversation, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the representations of the plurality of content items in the first visual indication is associated with an order, such as the order of the representations 814*a*-1 to 814*a*-4 illustrated in FIG. 8B. In some embodiments, the representations of the plurality of content items is associated with a particular order because the messaging activity corresponding to the first visual indication defines a priority of each content item. In some embodiments, the representations of the plurality of content items are ordered in accordance the priorities of the corresponding content items in the first messaging activity.

In some embodiments, while displaying, via the display generation component, the first user interface associated with the first content item, wherein the first user interface includes a representation of the first content item (e.g., the electronic device is currently displaying a first user interface that includes a representation of the content item currently being visually emphasized in the first visual indication), the electronic device receives, via the one or more input devices, a second input corresponding to a request to switch to displaying a representation of a respective content item, different from the first content item, included in the plurality of content items. For example, while the electronic device is displaying a user interface that includes a representation of the content item currently being visually emphasized at the first visual indication, the electronic device receives a request to display a representation of another content item that is also included in the first messaging activity (e.g., the messaging activity corresponding to the first visual indication). In some embodiments, the electronic device detects the second input when a user swipes to the left or to the right while the electronic device is displaying the first user interface.

In some embodiments, in accordance with a determination that the order associated with the representations of the plurality of content items in the first visual indication is a first order, the electronic device displays, via the display generation component, a second user interface associated with a second content item, different from the first content item, of the plurality of content items, wherein the second user interface includes a representation of the second content item, such as device 500 displaying the user interface 804*a*-2 associated with Photo 5 (e.g., includes a visual indication of the (e.g., content corresponding to the) second content item). In some embodiments, the first messaging activity includes a first content item with a first priority, a second content item with a second priority, and a third content item with a third priority. In some embodiments, the first content item has the highest priority in the first messaging activity, the second content item has the second highest priority in the first messaging activity, and the third content item has the third highest priority in the first messaging activity (e.g., the first priority is higher than the second priority, and the second priority is higher than the third priority). In some embodiments, the priorities of the content items in the first messaging activity define an order associated with the representations of the content items in the first visual indication. For example, because of the priorities assigned to the content items in the first messaging activity, the order defines that the representation of the first content item is ordered before the representations of the second content item and the third content item (e.g., because the first content item is assigned with the highest priority), defines that the representation of the second content item is ordered after the representation of the first content item and before the representation of the third content (e.g., because the priority of the second content items is the second highest), and defines that the representation of the third content is ordered after the representations of the first and second content items (e.g., because the third content item is assigned with the lowest priority). Accordingly, in some embodiments, when the second input is received, the electronic device displays a representation of the content item that immediately proceeds or follows the first content item in the first order. In some embodiments, the electronic device displays the third user interface if the electronic device detects that a user of the electronic device has swiped to the left.

In some embodiments, in accordance with a determination that the order associated with the representations of the plurality of content items in the first visual indication is a second order, different from the first order, the electronic device displays, via the display generation component, a third user interface associated with a third content item, different from the first and the second content items, of the plurality of content items, wherein the third user interface includes a representation of the third content item (e.g., includes a visual indication of the (e.g., content corresponding to the) third content item), such as the device 500 displaying a user interface associated with another content item if the ordering of the representations 814*a*-1 to 814*a*-4 are different. In some embodiments, the first messaging activity includes a first content item with a first priority, a second content item with a second priority, and a third content item with a third priority. In some embodiments, the first content item has the highest priority in the first messaging activity, the third content item has the second highest priority in the first messaging activity, and the second content item has the third highest priority in the first messaging activity (e.g., the first priority is higher than the third priority, and the third priority is higher than the second priority). In some embodiments, the priorities of the content items in the first messaging activity define an order that is associated with the representations of the content items in the first visual indication. For example, because of the priorities assigned to the content items in the first messaging activity, the order defines that the representation of the first content item is ordered before the representations of the second content item and the third content item (e.g., because the first content item is assigned with the highest priority), defines that the representation of the third content item is ordered after the representation of the first content item and before the representation of the second content (e.g., because the priority of the third content item is the second highest), and defines that the representation of the second content is ordered after the representations of the first and third content item (e.g., because the second content item is assigned with the lowest priority). Accordingly, in some embodiments, when the second input is received, the electronic device displays a representation of the content item that immediately proceeds or follows the first content item in the second order. In some embodiments, the electronic device displays the third user interface if the electronic device detects that a user of the electronic device has swiped to the right.

The above-described manner of displaying a user interface associated with the second or the third content item when an input is received while displaying a user interface for the first content item provides an efficient way for displaying user interfaces in an order associated with the content items, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, after receiving the second input and while displaying the third user interface associated with the third content item in response to receiving the second input, the electronic device receives, via the one or more input devices, a third input corresponding to a request to cease display of the third user interface and display the messaging user interface, such as the input 801*a*-*k* tapping the selectable option labeled "Done". For example, after the electronic device switched from displaying a user interface associated with the first content item to displaying a user interface associated with the second content item, the electronic device receives a request to navigate back to the messaging user interface. In some embodiments, the request is detected when the electronic device detects a selection of a selectable object that causes the electronic device to navigate back to the messaging user interface (e.g., selects a "back" button).

In some embodiments, in response to receiving the third input, the electronic device ceases display of the third user interface, and displaying, via the display generation component, the messaging user interface, wherein the messaging user interface includes the first visual indication of the first messaging activity, and a third representation of the third content item of the plurality of content items is visually emphasized in the first visual indication of the first messaging activity, such as the electronic device visually emphasizing representation 814*a*-3 of Photo 2 in the visual indication 816*a* after receiving the input in FIG. 8K. For example, because the electronic device was displaying the a user interface associated with the first content item (e.g., the third user interface) when the request to navigate back to the messaging user interface was received, the electronic device visually emphasizes the representation of the third content item in the first visual indication over the representations of other content items that are also included in the first visual indication. Put differently, the visual ordering of the representations of content items included in the first visual indication is optionally adjusted when the third input is received. For example, in some embodiments, before displaying the first user interface and the third user interface (as described above), the representations of the content items are being displayed in a first order. In some embodiments, if the representations of a plurality of content items are being displayed in a stack, the first order corresponds to the order (e.g., positions) of the representations in the stack. For example, if the first visual indication includes a representation of a first content item, a representation of a second content item, and a representation of a third content item that are being displayed in a first order, the representation of the first content item is optionally displayed at the top of the stack, the representation of the third content is optionally displayed at the second position in the stack, and the representation of the second content item is optionally displayed at the bottom of the stack (e.g., last position in the stack). In some embodiments, the representations of content items at the visual indication (e.g., the representations of the first, second, and third content) are visually ordered different in response to receiving the third input. For example, after receiving the third input, the visually ordering of the representations of content items are displayed in accordance with a second order. For example, the representation of the third content is now displayed at the top of the stack, the representation of the second content is now displayed at the second position in the stack, and the representation of the first content is now displayed at the bottom (e.g., last position in the stack).

The above-described manner of visually emphasizing the representation of the content item that was being displayed in a respective user interface before a request for navigating back to the messaging user interface was detected provides an efficient way of visually emphasizing different representations of content items in the first visual indication, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more selectable options that are selectable to add the corresponding messaging activity to the messaging conversation related to the first content item include a respective selectable option that is selectable to initiate a process to respond to the first content item with at least one of a set of predefined responses, such as the selectable option 806a-3 in FIG. 8F. For example, the user interface associated with the first content item includes a selectable option for initiating a process to add a predefined response to the first content item in the messaging conversation. In some embodiments, the predefined responses include adding a "like" tag, a "heart" tag, a question mark tag, an emphasis tag, and/or a laugh tag to the first content item in the messaging conversation. In some embodiments, if the electronic device has added a respective tag (e.g., predefined response) to the first content item, that respective tag is displayed with a first visual appearance while the other tags are displayed with a second visual appearance (e.g., indicating the other tags have not been added to the first content item in the messaging conversation by the electronic device). In some embodiments, the predefined responses include a predefined message that is determined based on the first content item and the context of the first messaging conversation. In some embodiments, when the electronic device detects a selection of a predefined response (e.g., a tag), the electronic device adds to the messaging conversation the predefined response. In some embodiments, other electronic devices associated with the users in the messaging conversation receive an indication that the electronic device has added the predefined response to the messaging conversation, and subsequently displays an indication of the predefined response in the messaging user interface.

The above-described manner of including a selectable option to respond to a respective content item in a messaging conversation provides an efficient way of responding to content items in a messaging conversation in user interfaces other than a messaging user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that a respective user of the plurality of users has responded to the first content item in the messaging conversation, the respective selectable option is displayed with a first visual appearance that indicates the response of the respective user to the first content item, such as the visual appearance of selectable object 806a-3 in FIG. 8K. For example, the respective selectable option visually indicates the predefined responses (e.g., tags) that have been added to the first content item in the messaging conversation. For example, if a device associated with the respective user "hearted" the first content item in the first messaging conversation, the selectable option visually indicates that the first content item has been "hearted". In some embodiments, if a second respective user (e.g., a device associated with the second respective user) has also added a predefined response (e.g., tag) to the first content item in the messaging conversation, the selectable option includes an indication of the predefined response added by the second user. For example, if the device associated with the second respective user "liked" the first content item, the selectable option visually indicates that the first content item in the messaging conversation has been "liked" and "hearted". In some embodiments, the respective user is the user of the electronic device. Alternatively, in some embodiments, the respective user is another user in the messaging conversation.

In some embodiments, in accordance with a determination that the respective user has not responded to the first content item in the messaging conversation, the respective selectable option is displayed with a second visual appearance, different than the first visual appearance, that does not indicate the response of the respective user to the first content item, such as the visual appearance of selectable option 806a-3 in FIG. 8F. For example, if the electronic device is displaying the selectable option while no users in the messaging conversation (e.g., the device associated with the users) have added a predefined response to the first content items in the messaging conversation, the selectable option does not visually indicate the predefined responses that have been added to the first content item. In some embodiments, if a device associated with a second respective user has added a predefined response to the first content item in the messaging conversation while the device associated with the respective user has not added a predefined response to the first content item. In some such embodiments, the selectable option indicates the predefined response added by the device associated with the second respective user without indicating the respective user has not responded to the first content item.

The above-described manner of indicating the predefined responses that have been added to the first content item in a messaging conversation at a selectable option provides an efficient way for indicating the current responses to the first content item in the messaging conversation (e.g., while the electronic device is not displaying the messaging conversation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, initiating the process to respond to the first content item with at least one of the set of predefined responses includes displaying, in the first user interface, a menu including selectable elements corresponding to the set of predefined responses (e.g., a menu for adding a reaction to the first content item such as "like", "heart", question mark, emphasis, and/or laugh), such as the menu 822a in FIG. 8J.

In some embodiments, while displaying the menu including the selectable elements corresponding to the set of predefined responses, receiving, via the one or more input devices, a second input corresponding to selection of a respective element of the selectable element corresponding to a respective predefined response of the set of predefined responses (e.g., the electronic device detects a selection of one of the predefined reactions), such as input 801*a-i* selecting the heart tag 822*a*-1 in FIG. 8I.

In some embodiments, in response to receiving the second input, the electronic device adds the respective predefined response to the first content item to the messaging conversation, such as the heart tag being added to Photo 2 in the messaging conversation in FIG. 8L. For example, when a selectable option corresponding to one of the predefined responses is selected, that predefined response is added to the first content item in the messaging conversation. For example, if the electronic device detects a selection of a selectable option for adding a "heart" tag to the first content item in the messaging conversation, the electronic device adds the "heart" tag to the first content item in the messaging conversation. In some embodiments, after the electronic device adds the "heart" tag to the first content item, a representation of the heart tag is displayed at the location of the representation of the first content item in the messaging user interface. In some embodiments, when the electronic device detects a selection of a predefined response (e.g., a tag), the electronic device adds to the messaging conversation the predefined response. In some embodiments, other electronic devices associated with the users in the messaging conversation receive an indication that the electronic device has added the predefined response to the messaging conversation, and subsequently displays an indication of the predefined response in the messaging user interface.

The above-described manner of adding a predefined response to a respective content item in the messaging conversation provides an efficient way of responding to a content item in a messaging conversation in user interfaces other than a messaging user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the second input, updating an appearance of the respective selectable option in the first user interface to indicate that the respective predefined response to the first content item has been added to the messaging conversation, such as the selectable option 806*a*-3 in FIG. 8R indicating that a heart tag was added to Photo 2 in the messaging conversation. For example, after the electronic device adds a respective predefined response to the first content item, the visual appearance of the selectable option is updated to indicate the predefined response that has recently been added to the first content item by the electronic device and to also indicate predefined responses added to the first content item by other devices. In some embodiments, if the predefined response was added by the user of the device, the predefined response is displayed visually different than when the predefined response was added by another user in the messaging conversation (e.g., predefined responses are displayed with a blue background vs. a gray background). In some embodiments, the indications of predefined responses are ordered by recency, with the predefined response that was most recently added to the messaging conversation displayed on top/in front of other predefined responses.

The above-described manner of indicating the predefined responses that have been added to the first content item at a selectable option provides an efficient way for indicating the predefined responses that have been added to the first content item in the messaging conversation (e.g., while the electronic device is not displaying the messaging conversation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more selectable options that are selectable to add the corresponding messaging activity to the messaging conversation related to the first content item include a respective selectable option that is selectable to initiate a process to reply to the first content item in the messaging conversation, such as the selectable option 806*a*-4 in FIG. 8T. For example, the user interface associated with the first content items includes a selectable option that, when selectable, initiates a process for replaying to the first content item in the messaging conversation. In some embodiments, when the respective selectable option is selected, the user interface displays, overlaid the messaging user interface, a reply user interface. In some embodiments, the reply user interface includes a representation of the first content item, a soft keyboard, a text entry field, and a selectable option that, when selected, causes a reply message to the first content item to be added to the messaging conversation. In some embodiments, input is optionally directed to the soft keyboard for composing a reply to the first content item (and the contents of the current reply message are optionally indicated in the text entry field). In some embodiments, the reply message is displayed in the messaging user interface with a different visual characteristic than messages that are not a reply to a particular content item or message in the messaging conversation.

The above-described manner of including a selectable option for replying to a respective content item in a messaging conversation provides an efficient way of replying to content items in a messaging conversation in user interfaces other than a messaging user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first user interface includes a representation of the first content item without including representations of other content items in the plurality of content items, and the first user interface further includes a respective selectable option that is selectable to display a respective user interface that includes representations of the plurality of content items, such as the selectable option 805*a* in FIG. 8BB. For example, the first user interface includes a selectable option that, when selected, causes the electronic device to display representations of (e.g., all) the content items included in the first visual indication. For example, if the first visual indication includes a representation of a first content item, a representation of a second content item, and a representation of a third content item, the electronic device will display representations of the content items corresponding to the content items included in the first visual indication. In some embodiments, the representations of the content items included in the first visual indication and the representations of the content items included in the respective user interface have different characteristics, such as different aspect ratios, etc. In some embodiments, while the representations of the plurality of content items are being displayed in the respective user interface the representations are arranged in rows and/or columns (e.g., arranged in accordance with a grid layout).

The above-described manner of including a selectable option for displaying the plurality of content items included in the first messaging activity provides an efficient way of accessing a user interface that includes all of the content items included in the first messaging activity, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the respective user interface that includes the representations of the plurality of content items (e.g., the electronic device is displaying a respective user interface that corresponds to the content items included in the first visual indication. In some embodiments, the respective user interface is different than the messaging user interface), the electronic device receives, via the one or more input devices, a second input corresponding to selection of a respective representation of the representations of the plurality of content items, such as the selection of the representation 848-2 of Photo 5 in user interface 842*a*. For example, while the electronic device is displaying representations of the content items included in the first messaging activity (e.g., the messaging activity corresponding to the first visual indication) in the respective user interface, the electronic device detects a selection of a representation corresponding to a respective content item. In some embodiments, the electronic device detects a selection of a representation corresponding to a respective content item, when the electronic device detects that a touch contact performed a tapping gesture at a location on a touch screen corresponding to the representation of the respective content item.

In some embodiments, in response to receiving the second input, in accordance with a determination that the respective representation is of the first content item, the electronic device displays, via the display generation component, the first user interface associated with the first content item and including the one or more selectable options that are selectable to add corresponding messaging activity to the messaging conversation related to the first content item, such as the user interface 804*a*-2 of Photo 5 in FIG. 8EE. In some embodiments, in accordance with a determination that the respective representation is of a second content item, displaying, via the display generation component, a second user interface associated with the second content item and including the one or more selectable options that are selectable to add corresponding messaging activity to the messaging conversation related to the second content item. For example, based on the respective representation that is selected, the electronic device displays a user interface associated with the content item corresponding to the selected representation (and is not associated with any other content item). In some embodiments, the first user interface includes a representation of the first content item.

The above-described manner of displaying a user interface associated with the first content item when the representation of the first content item in the respective user interface is selected provides an efficient way of accessing user interfaces associated with the content item that corresponds to the selected representation, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the respective user interface that includes the representations of the plurality of content items, wherein the representations of the plurality of content items include the first representation of the first content item, in accordance with a determination that the first content item is associated with one or more predefined responses in the messaging conversation, the electronic device displays one or more visual indications of the one or more predefined responses in association with the first representation of the first content item in the respective user interface, such as the representation 848*a*-3 of Photo 2 being displayed with a representation of a heart and thumbs up message tab in FIG. 8DD. For example, if one or more users in the messaging conversation have added a predefined response to the first content item in the messaging conversation, the representation corresponding to the first content item in the respective user interface (e.g., the first representation of the first content item) includes an indication of the predefined responses currently associated with the first content item. Similarly, in some embodiments, if one or more users in the messaging conversation have added a predefined response to a second content item in the messaging conversation, the representation corresponding to the second content item in the respective user interface includes an indication of the predefined responses currently associated with the second content item in the messaging conversation. In some embodiments, one or more visual indications of the one or more predefined responses associated with a respective content item are displayed overlaid the representation corresponding to the respective content item in the respective user interface (e.g., overlaid at a respective edge or corner of the respective representation). In some embodiments, the representations of respective content items in the respective user interface are displayed with a first visual appearance (e.g., a visual indication indicating that the photo has not been saved to the electronic device such as not being displayed with a checkmark) if the corresponding content item has previously been saved to the electronic device, and is displayed with a second visual appearance (e.g., a visual indication indicating that the photo has been saved to the electronic device such as being displayed a checkmark) if the corresponding content item has not been previously saved to the electronic device. In some embodiments, in accordance with a determination that the first content item is not associated with one or more predefined responses in the messaging conversation, the first representation of the first content is displayed without an indication of one or more predefined responses.

The above-described manner of indicating the predefined responses that have been added to a respective content item in the messaging conversation at the corresponding representations in the respective user interface provides an efficient way for indicating the predefined responses that have been added to respective content items in the messaging conversation (e.g., while the electronic device is not displaying the messaging conversation), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface includes a respective selectable option that is selectable to initiate a process to save at least one of the plurality of content items to the electronic device (e.g., the respective user interface includes a selectable option that, when selected, initiates a process to save the content items corresponding to the representations of the plurality of content items), such as the selectable option 856a in FIG. 8HH. In some embodiments, while displaying the respective user interface, the electronic device receives, via the one or more input devices, a second input corresponding to selection of the respective selectable option, such as touch input 801a-ii selecting the selectable option 865a in FIG. 8II. In some embodiments, in response to receiving the second input, in accordance with a determination that a subset (or all) of the at least one of the plurality of content items is already saved to the electronic device, displaying, via the display generation component, a confirmation user interface that indicates that the subset (or all) of the at least one of the plurality of content items is already saved to the electronic device before saving the at least one of the plurality of content items to the electronic device, such as the menu 878a in FIG. 8BBB. For example, if respective user interface includes a first representation of a first content item, a second representation of a second content item, a third representation of a second content item, the electronic device displays the confirmation user interface if at least the first content item, the second content item, or the third content item have previously been downloaded to the electronic device. In some embodiments, the confirmation user interface includes a selectable option that, when selected, causes the electronic device to save the content items corresponding to the representations of content items that are displayed in the respective user interface. In some embodiments, the selectable option (when selected) only saves the content items (corresponding to the representations of content items) that have not been previously saved to the electronic device. In some embodiments, the confirmation user interface includes a second selectable option that, when selected, causes the electronic device to cease displaying the confirmation user interface without saving the at least one of the plurality of content items. In some embodiments, the content items are saved to a respective photos application installed on the electronic device.

In some embodiments, in response to receiving the second input, in accordance with a determination that the at least one of the plurality of content items is not already saved to the electronic device, saving the at least one of the plurality of content items to the electronic device without displaying the confirmation user interface, such as if none of the photos in FIG. 8BBB had previously been saved, the electronic device would not display menu 878a. For example, if the respective user interface includes a first representation of a first content item, a representation of a second content item, and a representation of a third content item, and the first, second, and third content items are not currently saved to the electronic device, the electronic device saves the first, second, and third content items to the electronic device in response to receiving the second input. In some embodiments, even if the first, second, and third content items have not been saved to the electronic device, the electronic device still displays a confirmation user interface in response to receiving the second input. In some embodiments, the confirmation user interface indicates that all photos will be saved if a particular selectable option is selected.

The above-described manner of saving the plurality of content items to the electronic device or displaying a confirmation user interface before saving the plurality of content items to the electronic devices provides an efficient way of indicating when at least of the plurality of content items have already been saved to the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the respective user interface during a process to save one or more selected content items of the plurality of content items to the electronic device (e.g., while device 500a in FIG. 8NN is in the content selection mode), wherein the respective user interface includes the first representation of the first content item and before saving the one or more selected content items to the electronic device in accordance with the process (e.g., in some embodiments, the process to save one or more selected content items is optionally started when a selectable object, displayed in the respective user interface, is selected to initiate a content selection mode), in accordance with a determination that the first content item is already saved to the electronic device, displaying, in the respective user interface, a visual indication in association with the first representation of the first content item that has a first visual appearance, device 500a displaying the indication 849a-1 with the representation 848a-1 of Photo 1 because Photo 1 has been saved to device 500. For example, the representations of content items in the respective user interface that have been previously saved to the electronic device are displayed with (e.g., in association with) a visual indication indicating that the content items corresponding to those representation have already been saved to the electronic device. In some embodiments, the visual indication is a hollow check mark. For example, if the first content item is already saved to the electronic device, the representation of the first content items in the respective user interface includes a hollow check mark. In some embodiments, the hollow check mark is displayed until the electronic device detects a selection of the representation of the first content item.

In some embodiments, in accordance with a determination that the first content item is not already saved to the electronic device and that the first content item has been selected for saving to the electronic device, displaying, in the respective user interface, a visual indication in association with the first representation of the first content item that has a second visual appearance, different from the first visual appearance, such as the device 500a not displaying the indication 849a-1 with the representation 848a-1 of Photo 1 if Photo 1 has not been saved to device 500a. For example, when a representation of a content item is selected, and that content item has not previously been saved to the electronic device, the electronic device updates the representation of that content item to display a visual indication indicating the first content item has been selected for saving to the electronic device. In some embodiments, the second visual appearance of the visual indication includes a solid checkmark.

The above-described manner of providing an indication of the content items that have already been saved to the electronic device provides an efficient way of indicating which content items corresponding to the representations of content items displayed in the respective user interface have already been saved to the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface includes a first respective selectable option that is selectable to initiate a process to save the plurality of content items to the electronic device, such as selectable option 856*a* in FIG. 8UU. For example, the respective user interface includes a first respective selectable option that, when selected, initiates a process to save the content items included in the first messaging activity to the electronic device. For example, in some embodiments, the first messaging activity includes a first content item, a second content item, and a third content item, and the respective user interface displays representations of the content items included in the first messaging activity (e.g., representations of the first content item, second content item, and the third content item). In some such embodiments, when a selection of the first selectable option is detected, the electronic device initiates a process to download the first content item, second content item, and the third content item to the electronic device.

In some embodiments, the first user interface associated with the first content item includes a second respective selectable option that is selectable to initiate a process to save the first content item to the electronic device without saving other content items of the plurality of content items to the electronic device, such as the selectable option 806*a*-5 in FIG. 8W. For example, when the electronic device is displaying a representation of a single content item, a process to save only that content item to the electronic device is initiated when the second respective selectable option is selected.

The above-described manner of saving a single content item when a user interface includes a representation of a single content item or saving multiple content items in a messaging conversation when a user interface includes representations of multiple content items provides an efficient way of saving content items in a messaging conversation in user interfaces other than a messaging user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface includes a first respective selectable option that is selectable to initiate a process to reply to the plurality of content items in the messaging conversation, such as the selectable option 858*a* in FIG. 8HHH. For example, the respective user interface includes a first respective selectable option that, when selected, initiates a process to reply to the messaging activity in the messaging conversation that corresponds to the first visual indication (e.g., reply to the plurality of content items). In some embodiments, when the first respective selectable option is selected, the electronic device displays overlaid the messaging user interface, a reply user interface. In some embodiments, the reply user interface includes a representation of the plurality of content items, a soft keyboard, a text entry field, and a selectable option that, when selected, causes a reply to the first messaging activity to be added to the messaging conversation. In some embodiments, input is optionally directed to the soft keyboard for composing a reply to the first content item (and contents of reply message are optionally indicated in the text entry field). In some embodiments, the reply message is displayed in the messaging user interface with a different visual character than messages that are not a reply to a particular content item or message in the messaging conversation.

In some embodiments, the first user interface associated with the first content item includes a second respective selectable option that is selectable to initiate a process to reply to the first content item in the messaging conversation without replying to other content items of the plurality of content items in the messaging conversation, such as the selectable option 806*a*-4. For example, the user interface associated with the first content item includes a second respective selectable option that, when selected, initiates a process to reply to the first content item in the messaging conversation. In some embodiments, when the second respective is selected, the electronic device displays overlaid the messaging user interface, a reply user interface. In some embodiments, the reply user interface includes a representation of the first content item, a soft keyboard, a text entry field, and a selectable option that, when selected, causes a reply message to the first content item to be added to the messaging conversation. In some embodiments, input is optionally directed to the soft keyboard for composing a reply to the first content item (and contents of the currently reply message are optionally indicated in the text entry field). In some embodiments, the reply message is displayed in the messaging user interface with a different visual character than messages that are not a replay to a particular content item or message in the messaging conversation.

The above-described manner of replying to a single content item when a user interface includes a representation of a single content item or replying to multiple content items in a messaging conversation when a user interface includes representations of multiple content items provides an efficient way of replying to content in a messaging conversation in user interfaces other than a messaging user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface includes a first respective selectable option that is selectable to initiate a process to share the plurality of content items with a second electronic device, different from the electronic device, such as the selectable option 854*a* in FIG. 8KKK. For example, the respective user interface includes a first respective selectable option that, when selected, initiates a process to share the content items included in the first messaging activity to the electronic device. For example, in some embodiments, the first messaging activity includes a first content item, a second content item, and a third content item, and the respective user interface displays representations of the content items included in the first messaging activity (e.g., representations of the first content item, second content item, and the third content item). In some such embodiments, when a selection of the first selectable option is detected, the electronic device initiates a process to share the first content item, second content item, and the third content item with one or more users associated with one or more second electronic devices.

In some embodiments, the first user interface associated with the first content item includes a second respective selectable option that is selectable to initiate a process to share the first content item with the second electronic device without sharing other content items of the plurality of content items with the second electronic device, such as the selectable option 801*a*-*aa* in FIG. 8AA. For example, when the electronic device is displaying a representation of a single content item, a process to share only that content item with one or more users associated with one or more second electronic devices is initiated when the second respective selectable option is selected.

The above-described manner of sharing a single content item when a user interface includes a representation of a single content item or sharing multiple content items in a messaging conversation when a user interface includes representations of multiple content items provides an efficient way of sharing content items in a messaging conversation in user interfaces other than a messaging user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface includes status information associated with the plurality of content items, such as indication 850*a* in FIG. 8DD. For example, in some embodiments, the respective user interface provides information about the plurality of content items with respect to the electronic device. For example, if the none of content items corresponding to the representations of content items (e.g., included in the first messaging activity) have been saved to the electronic device, the respective user interface indicates the number of content items that can be saved/downloaded to the electronic device (e.g., "2 content items", "10 content items", etc.). In some embodiments, if a subset of the content items have been downloaded to the electronic device, the respective user interface indicates the number of content items that have been downloaded (e.g., while also indicating the total number of content item that can be downloaded to the electronic device). In some embodiments, if the electronic device does not have access to a respective number of content items included in the first messaging activity because those content items are still being uploaded to a particular server, the respective user interface indicates the number of content items that are still uploading to the server. In some embodiments, the respective user interface indicates when the electronic device will no longer have access to the content items included in the first visual indication (e.g., the date at which the content items expire), such as in the case that the content items have been added to the messaging conversation by way of a link, transmitted to the messaging conversation, to a server that stores the content items (e.g., rather than the content items themselves being transmitted to the messaging conversation).

The above-described manner of indicating a status of the plurality of content items provides an efficient way of indicating a status of the plurality of content items with respect to an electronic device that is displaying representations of the plurality of content items, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the ways of displaying user interfaces associated with one or more content items in a messaging conversation described above with reference to method 900 optionally have one or more of the characteristics of the ways of displaying content items in a messaging user interface described herein with reference to other methods described herein (e.g., methods 700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 9 are, optionally, implemented by components depicted in FIGS. 1A-1B. For example, displaying operations 902 and 908 and receiving operation 904 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is receiving messages sent by one or more in a messaging conversation. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, license plate numbers, or any other personal information.

The present disclosure recognizes that the use of such personal information data, in the present technology, can be used to the benefit of users. For example, the personal information data can be used for providing a location of the user's current location to one or more users in a messaging conversation, sharing content items associated with a user's account, etc. Accordingly, use of such personal information data enables users to share information with one or more users in a messaging conversation. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can stop sharing the user's status with one or more users in a messaging conversation (e.g., whether a user has read a particular message in a messaging conversation). In yet another example, users can select to limit the users that have access to the user's contact information and/or the users that can send a message to the user. In addition to providing "opt in" and "opt out" options, the present disclosure contemplates providing notifications relating to the access or use of personal information. For instance, a user may be notified upon displaying the messaging application that other users able to receive read/delivery receipts for messages in a messaging conversation and then reminded again when leaving a messaging application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting messaging data associated with a plurality of messaging conversations rather than from an individual messaging conversation), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can communication with one or more users, in a messaging conversation, without sharing private content items with the one or users.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users, such as by anonymizing personally identifiable information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display generation component and one or more input devices:

displaying, via the display generation component, a messaging user interface that includes a messaging conversation associated with a plurality of users, wherein the messaging user interface includes a first visual indication of first messaging activity in the messaging conversation, and the first visual indication includes representations of a plurality of content items included in the first messaging activity;

while displaying the messaging user interface, receiving, via the one or more input devices, a first input corresponding to selection of a first content item of the plurality of content items included in the first messaging activity, including a first content item and a second content item; and in response to receiving the first input:

displaying, via the display generation component, a first user interface associated with the first content item, but not associated with the second content item, and including one or more selectable options that are selectable to add corresponding messaging activity to the messaging conversation related to the first content item but not related to the second content item;

while displaying the first user interface including the one or more selectable options, receiving, via the one or more input devices, a second input including a sequence of inputs corresponding to selection of a first option of the one or more selectable options, wherein the sequence of inputs corresponds to second messaging activity related to the first content item; and after receiving the second input, displaying, in the messaging user interface, the first visual indication, wherein the first visual indication is displayed with a second visual indication corresponding to the second messaging activity corresponding to the second input.

2. The method of claim 1, further comprising:
while displaying the messaging user interface, wherein a first representation of the first content item is visually emphasized in the first visual indication, receiving, via the one or more input devices, a third input corresponding to a swipe input on the first visual indication;

in response to receiving the third input, updating the first visual indication to visually emphasize a second representation of a second content item, different from the first content item, of the plurality of content items;

while displaying the updated first visual indication, receiving, via the one or more input devices, a fourth input corresponding to selection of the second content item of the plurality of content items included in the first visual indication of the first messaging activity; and in response to receiving the fourth input, displaying, via the display generation component, a second user interface associated with the second content item and including one or more selectable options that are selectable to add corresponding messaging activity to the messaging conversation related to the second content item.

3. The method of claim 1, wherein the representations of the plurality of content items in the first visual indication is associated with an order, the method further comprising:
while displaying, via the display generation component, the first user interface associated with the first content item, wherein the first user interface includes a representation of the first content item, receiving, via the one or more input devices, a third input corresponding to a request to switch to displaying a representation of a respective content item, different from the first content item, included in the plurality of content items; and in response to receiving the third input:
in accordance with a determination that the order associated with the representations of the plurality of content items in the first visual indication is a first order, displaying, via the display generation component, a second user interface associated with a second content item, different from the first content item, of the plurality of content items, wherein the second user interface includes a representation of the second content item; and in accordance with a determination that the order associated with the representations of the plurality of content items in the first visual indication is a second order, different from the first order, displaying, via the display generation component, a third user interface associated with a third content item, different from the first and the second content items, of the plurality of content items, wherein the third user interface includes a representation of the third content item.

4. The method of claim 3, further comprising:
after receiving the third input and while displaying the third user interface associated with the third content item in response to receiving the third input, receiving, via the one or more input devices, a fourths input corresponding to a request to cease display of the third user interface and display the messaging user interface; and in response to receiving the fourth input:
ceasing display of the third user interface, and displaying, via the display generation component, the messaging user interface, wherein the messaging user interface includes the first visual indication of the first messaging activity, and a third representation of the third content item of the plurality of content items is visually emphasized in the first visual indication of the first messaging activity.

5. The method of claim 1, wherein the one or more selectable options that are selectable to add the corresponding messaging activity to the messaging conversation related to the first content item include a respective selectable option that is selectable to initiate a process to respond to the first content item with at least one of a set of predefined responses.

6. The method of claim 5, wherein:
in accordance with a determination that a respective user of the plurality of users has responded to the first content item in the messaging conversation, the respective selectable option is displayed with a first visual appearance that indicates the response of the respective user to the first content item, and in accordance with a determination that the respective user has not responded to the first content item in the messaging conversation, the respective selectable option is displayed with a second visual appearance, different than the first visual appearance, that does not indicate the response of the respective user to the first content item.

7. The method of claim 5, wherein initiating the process to respond to the first content item with at least one of the set of predefined responses includes displaying, in the first user interface, a menu including selectable elements corresponding to the set of predefined responses, the method further comprising:
while displaying the menu including the selectable elements corresponding to the set of predefined responses, receiving, via the one or more input devices, a third input corresponding to selection of a respective element of the selectable elements corresponding to a respective predefined response of the set of predefined responses; and in response to receiving the third input, adding the respective predefined response to the first content item to the messaging conversation.

8. The method of claim 7, further comprising:
in response to receiving the third input, updating an appearance of the respective selectable option in the first user interface to indicate that the respective predefined response to the first content item has been added to the messaging conversation.

9. The method of claim 1, wherein the one or more selectable options that are selectable to add the corresponding messaging activity to the messaging conversation related to the first content item include a respective selectable option that is selectable to initiate a process to reply to the first content item in the messaging conversation.

10. The method of claim 1, wherein the first user interface includes a first representation of the first content item without including representations of other content items in the plurality of content items, and the first user interface further includes a respective selectable option that is selectable to display a respective user interface that includes representations of the plurality of content items.

11. The method of claim 10, further comprising:
while displaying the respective user interface that includes the representations of the plurality of content items, receiving, via the one or more input devices, a third input corresponding to selection of a respective representation of the representations of the plurality of content items; and
in response to receiving the third input:
in accordance with a determination that the respective representation is of the first content item, displaying, via the display generation component, the first user interface associated with the first content item and including the one or more selectable options that are selectable to add corresponding messaging activity to the messaging conversation related to the first content item.

12. The method of claim 11, wherein:
the respective user interface includes a first respective selectable option that is selectable to initiate a process to save the plurality of content items to the electronic device, and the first user interface associated with the first content item includes a second respective selectable option that is selectable to initiate a process to save the first content item to the electronic device without saving other content items of the plurality of content items to the electronic device.

13. The method of claim 10, further comprising:
while displaying the respective user interface that includes the representations of the plurality of content items, wherein the representations of the plurality of content items include the first representation of the first content item:
in accordance with a determination that the first content item is associated with one or more predefined responses in the messaging conversation, displaying one or more visual indications of the one or more predefined responses in association with the first representation of the first content item in the respective user interface.

14. The method of claim 10, wherein the respective user interface includes a respective selectable option that is selectable to initiate a process to save at least one of the plurality of content items to the electronic device, the method further comprising:
while displaying the respective user interface, receiving, via the one or more input devices, a third input corresponding to selection of the respective selectable option; and
in response to receiving the third input:
in accordance with a determination that a subset of the at least one of the plurality of content items is already saved to the electronic device, displaying, via the display generation component, a confirmation user interface that indicates that the subset of the at least one of the plurality of content items is already saved to the electronic device before saving the at least one of the plurality of content items to the electronic device; and
in accordance with a determination that the at least one of the plurality of content items is not already saved to the electronic device, saving the at least one of the plurality of content items to the electronic device without displaying the confirmation user interface.

15. The method of claim 10, further comprising:
while displaying the respective user interface during a process to save one or more selected content items of the plurality of content items to the electronic device, wherein the respective user interface includes the first representation of the first content item and before saving the one or more selected content items to the electronic device in accordance with the process:
in accordance with a determination that the first content item is already saved to the electronic device, displaying, in the respective user interface, a visual indication in association with the first representation of the first content item that has a first visual appearance; and
in accordance with a determination that the first content item is not already saved to the electronic device and that the first content item has been selected for saving to the electronic device, displaying, in the respective user interface, a visual indication in association with the first representation of the first content item that has a second visual appearance, different from the first visual appearance.

16. The method of claim 10, wherein:
the respective user interface includes a first respective selectable option that is selectable to initiate a process to reply to the plurality of content items in the messaging conversation, and
the first user interface associated with the first content item includes a second respective selectable option that is selectable to initiate a process to reply to the first content item in the messaging conversation without replying to other content items of the plurality of content items in the messaging conversation.

17. The method of claim 10, wherein:
the respective user interface includes a first respective selectable option that is selectable to initiate a process to share the plurality of content items with a second electronic device, different from the electronic device, and
the first user interface associated with the first content item includes a second respective selectable option that is selectable to initiate a process to share the first content item with the second electronic device without sharing other content items of the plurality of content items with the second electronic device.

18. The method of claim 10, wherein the respective user interface includes status information associated with the plurality of content items.

19. An electronic device, comprising:
one or more processors;
memory; and
one or more programs, wherein the one or more programs are stored in the memory and configured to be executed by the one or more processors, the one or more programs including instructions for:
displaying, via a display generation component, a messaging user interface that includes a messaging conversation associated with a plurality of users, wherein the messaging user interface includes a first visual indication of first messaging activity in the messaging conversation, and the first visual indication includes representations of a plurality of content items included in the first messaging activity, including a first content item and a second content item;

while displaying the messaging user interface, receiving, via one or more input devices, a first input corresponding to selection of a first content item of the plurality of content items included in the first messaging activity; and in response to receiving the first input:
  displaying, via the display generation component, a first user interface associated with the first content item, but not associated with the second content item, and including one or more selectable options that are selectable to add corresponding messaging activity to the messaging conversation related to the first content item but not related to the second content item;
  while displaying the first user interface including the one or more selectable options, receiving, via the one or more input devices, a second input including a sequence of inputs corresponding to selection of a first option of the one or more selectable options, wherein the sequence of inputs corresponds to second messaging activity related to the first content item; and
  after receiving the second input, displaying, in the messaging user interface, the first visual indication, wherein the first visual indication is displayed with a second visual indication corresponding to the second messaging activity corresponding to the second input.

20. The electronic device of claim 19, the instructions further for:
  while displaying the messaging user interface, wherein a first representation of the first content item is visually emphasized in the first visual indication, receiving, via the one or more input devices, a third input corresponding to a swipe input on the first visual indication;
  in response to receiving the third input, updating the first visual indication to visually emphasize a second representation of a second content item, different from the first content item, of the plurality of content items;
  while displaying the updated first visual indication, receiving, via the one or more input devices, a fourth input corresponding to selection of the second content item of the plurality of content items included in the first visual indication of the first messaging activity; and
  in response to receiving the fourth input, displaying, via the display generation component, a second user interface associated with the second content item and including one or more selectable options that are selectable to add corresponding messaging activity to the messaging conversation related to the second content item.

21. The electronic device of claim 19, wherein the representations of the plurality of content items in the first visual indication is associated with an order, the instructions further for:
  while displaying, via the display generation component, the first user interface associated with the first content item, wherein the first user interface includes a representation of the first content item, receiving, via the one or more input devices, a third input corresponding to a request to switch to displaying a representation of a respective content item, different from the first content item, included in the plurality of content items; and
  in response to receiving the third input:
    in accordance with a determination that the order associated with the representations of the plurality of content items in the first visual indication is a first order, displaying, via the display generation component, a second user interface associated with a second content item, different from the first content item, of the plurality of content items, wherein the second user interface includes a representation of the second content item; and
    in accordance with a determination that the order associated with the representations of the plurality of content items in the first visual indication is a second order, different from the first order, displaying, via the display generation component, a third user interface associated with a third content item, different from the first and the second content items, of the plurality of content items, wherein the third user interface includes a representation of the third content item.

22. The electronic device of claim 21, the instructions further for:
  after receiving the third input and while displaying the third user interface associated with the third content item in response to receiving the third input, receiving, via the one or more input devices, a fourth input corresponding to a request to cease display of the third user interface and display the messaging user interface; and
  in response to receiving the fourth input:
    ceasing display of the third user interface, and displaying, via the display generation component, the messaging user interface, wherein the messaging user interface includes the first visual indication of the first messaging activity, and a third representation of the third content item of the plurality of content items is visually emphasized in the first visual indication of the first messaging activity.

23. The electronic device of claim 19, wherein the one or more selectable options that are selectable to add the corresponding messaging activity to the messaging conversation related to the first content item include a respective selectable option that is selectable to initiate a process to respond to the first content item with at least one of a set of predefined responses.

24. The electronic device of claim 23, wherein:
  in accordance with a determination that a respective user of the plurality of users has responded to the first content item in the messaging conversation, the respective selectable option is displayed with a first visual appearance that indicates the response of the respective user to the first content item, and
  in accordance with a determination that the respective user has not responded to the first content item in the messaging conversation, the respective selectable option is displayed with a second visual appearance, different than the first visual appearance, that does not indicate the response of the respective user to the first content item.

25. The electronic device of claim 23, wherein initiating the process to respond to the first content item with at least one of the set of predefined responses includes displaying, in the first user interface, a menu including selectable elements corresponding to the set of predefined responses, the instructions further for:
  while displaying the menu including the selectable elements corresponding to the set of predefined responses, receiving, via the one or more input devices, a third input corresponding to selection of a respective element of the selectable elements corresponding to a respective predefined response of the set of predefined responses; and in response to receiving the third input, adding the respective predefined response to the first content item to the messaging conversation.

26. The electronic device of claim 25, the instructions further for:
in response to receiving the third input, updating an appearance of the respective selectable option in the first user interface to indicate that the respective predefined response to the first content item has been added to the messaging conversation.

27. The electronic device of claim 19, wherein the one or more selectable options that are selectable to add the corresponding messaging activity to the messaging conversation related to the first content item include a respective selectable option that is selectable to initiate a process to reply to the first content item in the messaging conversation.

28. The electronic device of claim 19, wherein the first user interface includes a first representation of the first content item without including representations of other content items in the plurality of content items, and the first user interface further includes a respective selectable option that is selectable to display a respective user interface that includes representations of the plurality of content items.

29. The electronic device of claim 28, the instructions further for:
while displaying the respective user interface that includes the representations of the plurality of content items, receiving, via the one or more input devices, a third input corresponding to selection of a respective representation of the representations of the plurality of content items; and
in response to receiving the third input:
in accordance with a determination that the respective representation is of the first content item, displaying, via the display generation component, the first user interface associated with the first content item and including the one or more selectable options that are selectable to add corresponding messaging activity to the messaging conversation related to the first content item.

30. The electronic device of claim 29, wherein:
the respective user interface includes a first respective selectable option that is selectable to initiate a process to save the plurality of content items to the electronic device, and the first user interface associated with the first content item includes a second respective selectable option that is selectable to initiate a process to save the first content item to the electronic device without saving other content items of the plurality of content items to the electronic device.

31. The electronic device of claim 28, the instructions further for:
while displaying the respective user interface that includes the representations of the plurality of content items, wherein the representations of the plurality of content items include the first representation of the first content item:
in accordance with a determination that the first content item is associated with one or more predefined responses in the messaging conversation, displaying one or more visual indications of the one or more predefined responses in association with the first representation of the first content item in the respective user interface.

32. The electronic device of claim 28, wherein the respective user interface includes a respective selectable option that is selectable to initiate a process to save at least one of the plurality of content items to the electronic device, the instructions further for:
while displaying the respective user interface, receiving, via the one or more input devices, a third input corresponding to selection of the respective selectable option; and
in response to receiving the third input:
in accordance with a determination that a subset of the at least one of the plurality of content items is already saved to the electronic device, displaying, via the display generation component, a confirmation user interface that indicates that the subset of the at least one of the plurality of content items is already saved to the electronic device before saving the at least one of the plurality of content items to the electronic device; and
in accordance with a determination that the at least one of the plurality of content items is not already saved to the electronic device, saving the at least one of the plurality of content items to the electronic device without displaying the confirmation user interface.

33. The electronic device of claim 28, the instructions further for:
while displaying the respective user interface during a process to save one or more selected content items of the plurality of content items to the electronic device, wherein the respective user interface includes the first representation of the first content item and before saving the one or more selected content items to the electronic device in accordance with the process:
in accordance with a determination that the first content item is already saved to the electronic device, displaying, in the respective user interface, a visual indication in association with the first representation of the first content item that has a first visual appearance; and
in accordance with a determination that the first content item is not already saved to the electronic device and that the first content item has been selected for saving to the electronic device, displaying, in the respective user interface, a visual indication in association with the first representation of the first content item that has a second visual appearance, different from the first visual appearance.

34. The electronic device of claim 28, wherein:
the respective user interface includes a first respective selectable option that is selectable to initiate a process to reply to the plurality of content items in the messaging conversation, and
the first user interface associated with the first content item includes a second respective selectable option that is selectable to initiate a process to reply to the first content item in the messaging conversation without replying to other content items of the plurality of content items in the messaging conversation.

35. The electronic device of claim 28, wherein:
the respective user interface includes a first respective selectable option that is selectable to initiate a process to share the plurality of content items with a second electronic device, different from the electronic device, and
the first user interface associated with the first content item includes a second respective selectable option that is selectable to initiate a process to share the first content item with the second electronic device without sharing other content items of the plurality of content items with the second electronic device.

36. The electronic device of claim 28, wherein the respective user interface includes status information associated with the plurality of content items.

37. A non-transitory computer readable storage medium storing one or more programs, the one or more programs comprising instructions, which when executed by one or more processors of an electronic device, cause the electronic device to perform a method comprising:
displaying, via a display generation component, a messaging user interface that includes a messaging conversation associated with a plurality of users, wherein the messaging user interface includes a first visual indication of first messaging activity in the messaging conversation, and the first visual indication includes representations of a plurality of content items included in the first messaging activity, including a first content item and a second content item;
while displaying the messaging user interface, receiving, via one or more input devices, a first input corresponding to selection of a first content item of the plurality of content items included in the first messaging activity; and
in response to receiving the first input:
displaying, via the display generation component, a first user interface associated with the first content item, but not associated with the second content item, and including one or more selectable options that are selectable to add corresponding messaging activity to the messaging conversation related to the first content item but not related to the second content item;
while displaying the first user interface including the one or more selectable options, receiving, via the one or more input devices, a second input including a sequence of inputs corresponding to selection of a first option of the one or more selectable options, wherein the sequence of inputs corresponds to second messaging activity related to the first content item; and
after receiving the second input, displaying, in the messaging user interface, the first visual indication, wherein the first visual indication is displayed with a second visual indication corresponding to the second messaging activity corresponding to the second input.

38. The non-transitory computer readable storage medium of claim 37, wherein the instructions further cause the device to:
while displaying the messaging user interface, wherein a first representation of the first content item is visually emphasized in the first visual indication, receive, via the one or more input devices, a third input corresponding to a swipe input on the first visual indication;
in response to receiving the third input, update the first visual indication to visually emphasize a second representation of a second content item, different from the first content item, of the plurality of content items;
while displaying the updated first visual indication, receive, via the one or more input devices, a fourth input corresponding to selection of the second content item of the plurality of content items included in the first visual indication of the first messaging activity; and
in response to receiving the fourth input, display, via the display generation component, a second user interface associated with the second content item and including one or more selectable options that are selectable to add corresponding messaging activity to the messaging conversation related to the second content item.

39. The non-transitory computer readable storage medium of claim 37, wherein the representations of the plurality of content items in the first visual indication is associated with an order, wherein the instructions further cause the device to:
while displaying, via the display generation component, the first user interface associated with the first content item, wherein the first user interface includes a representation of the first content item, receive, via the one or more input devices, a third input corresponding to a request to switch to displaying a representation of a respective content item, different from the first content item, included in the plurality of content items; and
in response to receiving the third input:
in accordance with a determination that the order associated with the representations of the plurality of content items in the first visual indication is a first order, display, via the display generation component, a second user interface associated with a second content item, different from the first content item, of the plurality of content items, wherein the second user interface includes a representation of the second content item; and
in accordance with a determination that the order associated with the representations of the plurality of content items in the first visual indication is a second order, different from the first order, display, via the display generation component, a third user interface associated with a third content item, different from the first and the second content items, of the plurality of content items, wherein the third user interface includes a representation of the third content item.

40. The non-transitory computer readable storage medium of claim 39, wherein the instructions further cause the device to:
after receiving the third input and while displaying the third user interface associated with the third content item in response to receiving the third input, receive, via the one or more input devices, a fourth input corresponding to a request to cease display of the third user interface and display the messaging user interface; and
in response to receiving the fourth input:
cease display of the third user interface, and display, via the display generation component, the messaging user interface, wherein the messaging user interface includes the first visual indication of the first messaging activity, and a third representation of the third content item of the plurality of content items is visually emphasized in the first visual indication of the first messaging activity.

41. The non-transitory computer readable storage medium of claim 37, wherein the one or more selectable options that are selectable to add the corresponding messaging activity to the messaging conversation related to the first content item include a respective selectable option that is selectable to initiate a process to respond to the first content item with at least one of a set of predefined responses.

42. The non-transitory computer readable storage medium of claim 41, wherein:
in accordance with a determination that a respective user of the plurality of users has responded to the first content item in the messaging conversation, the respective selectable option is displayed with a first visual appearance that indicates the response of the respective user to the first content item, and in accordance with a determination that the respective user has not responded to the first content item in the messaging conversation, the respective selectable option is displayed with a second visual appearance, different than the first visual appearance, that does not indicate the response of the respective user to the first content item.

43. The non-transitory computer readable storage medium of claim 41, wherein initiating the process to respond to the first content item with at least one of the set of predefined responses includes displaying, in the first user interface, a menu including selectable elements corresponding to the set of predefined responses, wherein the instructions further cause the device to:
while displaying the menu including the selectable elements corresponding to the set of predefined responses, receive, via the one or more input devices, a third input corresponding to selection of a respective element of the selectable elements corresponding to a respective predefined response of the set of predefined responses; and
in response to receiving the third input, add the respective predefined response to the first content item to the messaging conversation.

44. The non-transitory computer readable storage medium of claim 43, wherein the instructions further cause the device to:
in response to receiving the third input, update an appearance of the respective selectable option in the first user interface to indicate that the respective predefined response to the first content item has been added to the messaging conversation.

45. The non-transitory computer readable storage medium of claim 37, wherein the one or more selectable options that are selectable to add the corresponding messaging activity to the messaging conversation related to the first content item include a respective selectable option that is selectable to initiate a process to reply to the first content item in the messaging conversation.

46. The non-transitory computer readable storage medium of claim 37, wherein the first user interface includes a first representation of the first content item without including representations of other content items in the plurality of content items, and the first user interface further includes a respective selectable option that is selectable to display a respective user interface that includes representations of the plurality of content items.

47. The non-transitory computer readable storage medium of claim 46, wherein the instructions further cause the device to:
while displaying the respective user interface that includes the representations of the plurality of content items, receive, via the one or more input devices, a third input corresponding to selection of a respective representation of the representations of the plurality of content items; and
in response to receiving the third input:
in accordance with a determination that the respective representation is of the first content item, display, via the display generation component, the first user interface associated with the first content item and including the one or more selectable options that are selectable to add corresponding messaging activity to the messaging conversation related to the first content item.

48. The non-transitory computer readable storage medium of claim 47, wherein:
the respective user interface includes a first respective selectable option that is selectable to initiate a process to save the plurality of content items to the electronic device, and the first user interface associated with the first content item includes a second respective selectable option that is selectable to initiate a process to save the first content item to the electronic device without saving other content items of the plurality of content items to the electronic device.

49. The non-transitory computer readable storage medium of claim 46, wherein the instructions further cause the device to:
while displaying the respective user interface that includes the representations of the plurality of content items, wherein the representations of the plurality of content items include the first representation of the first content item:
in accordance with a determination that the first content item is associated with one or more predefined responses in the messaging conversation, display one or more visual indications of the one or more predefined responses in association with the first representation of the first content item in the respective user interface.

50. The non-transitory computer readable storage medium of claim 46, wherein the respective user interface includes a respective selectable option that is selectable to initiate a process to save at least one of the plurality of content items to the electronic device, wherein the instructions further cause the device to:
while displaying the respective user interface, receive, via the one or more input devices, a third input corresponding to selection of the respective selectable option; and
in response to receiving the third input:
in accordance with a determination that a subset of the at least one of the plurality of content items is already saved to the electronic device, display, via the display generation component, a confirmation user interface that indicates that the subset of the at least one of the plurality of content items is already saved to the electronic device before saving the at least one of the plurality of content items to the electronic device; and
in accordance with a determination that the at least one of the plurality of content items is not already saved to the electronic device, save the at least one of the plurality of content items to the electronic device without displaying the confirmation user interface.

51. The non-transitory computer readable storage medium of claim 46, wherein the instructions further cause the device to:
while displaying the respective user interface during a process to save one or more selected content items of the plurality of content items to the electronic device, wherein the respective user interface includes the first representation of the first content item and before saving the one or more selected content items to the electronic device in accordance with the process:
in accordance with a determination that the first content item is already saved to the electronic device, display, in the respective user interface, a visual indication in association with the first representation of the first content item that has a first visual appearance; and
in accordance with a determination that the first content item is not already saved to the electronic device and that the first content item has been selected for saving to the electronic device, display, in the respective user interface, a visual indication in association with the first representation of the first content item that has a second visual appearance, different from the first visual appearance.

52. The non-transitory computer readable storage medium of claim 46, wherein:
   the respective user interface includes a first respective selectable option that is selectable to initiate a process to reply to the plurality of content items in the messaging conversation, and
   the first user interface associated with the first content item includes a second respective selectable option that is selectable to initiate a process to reply to the first content item in the messaging conversation without replying to other content items of the plurality of content items in the messaging conversation.

53. The non-transitory computer readable storage medium of claim 46, wherein:
   the respective user interface includes a first respective selectable option that is selectable to initiate a process to share the plurality of content items with a second electronic device, different from the electronic device, and
   the first user interface associated with the first content item includes a second respective selectable option that is selectable to initiate a process to share the first content item with the second electronic device without sharing other content items of the plurality of content items with the second electronic device.

54. The non-transitory computer readable storage medium of claim 46, wherein the respective user interface includes status information associated with the plurality of content items.

* * * * *

UNITED STATES PATENT AND TRADEMARK OFFICE
CERTIFICATE OF CORRECTION

| | |
|---|---|
| PATENT NO. | : 11,671,387 B2 |
| APPLICATION NO. | : 17/485354 |
| DATED | : June 6, 2023 |
| INVENTOR(S) | : Zheng Xuan Hong et al. |

It is certified that error appears in the above-identified patent and that said Letters Patent is hereby corrected as shown below:

In the Claims

In Column 94, Line 5, in Claim 4, please delete "fourths" and insert -- fourth --.

Signed and Sealed this
Ninth Day of December, 2025

John A. Squires
*Director of the United States Patent and Trademark Office*